(12) United States Patent
Nakanishi

(10) Patent No.: US 10,519,875 B2
(45) Date of Patent: Dec. 31, 2019

(54) DIAGNOSTIC DEVICE

(71) Applicant: DENSO CORPORATION, Kariya, Aichi-pref. (JP)

(72) Inventor: Daisuke Nakanishi, Kariya (JP)

(73) Assignee: DENSO CORPORATION, Kariya (JP)

(\*) Notice: Subject to any disclaimer, the term of this patent is extended or adjusted under 35 U.S.C. 154(b) by 673 days.

(21) Appl. No.: 15/220,493

(22) Filed: Jul. 27, 2016

(65) Prior Publication Data

US 2017/0030274 A1 Feb. 2, 2017

(30) Foreign Application Priority Data

| Jul. 28, 2015 | (JP) | 2015-148512 |
| Sep. 9, 2015 | (JP) | 2015-177538 |
| Sep. 9, 2015 | (JP) | 2015-177690 |
| Sep. 15, 2015 | (JP) | 2015-181822 |
| Sep. 24, 2015 | (JP) | 2015-186707 |
| Sep. 15, 2018 | (JP) | 2015-181498 |

(51) Int. Cl.
*F02D 17/02* (2006.01)
*F01P 7/16* (2006.01)
*F02D 37/02* (2006.01)

(52) U.S. Cl.
CPC ........... *F02D 17/02* (2013.01); *F01P 7/16* (2013.01); *F01P 2037/00* (2013.01); *F02D 37/02* (2013.01)

(58) Field of Classification Search
CPC .... F02D 17/02; F02D 41/221; F02D 13/0215; F02D 2200/021; F02D 37/02; F01P 7/16; F01P 2037/00; Y02T 10/40; F02B 29/0425; F02P 5/1502
See application file for complete search history.

(56) References Cited

U.S. PATENT DOCUMENTS

| 5,553,488 A * | 9/1996 | Ishii | B60T 8/885 |
| | | | 73/114.61 |
| 6,230,553 B1 | 5/2001 | Uchiyama et al. | |
| 6,279,390 B1 * | 8/2001 | Oka | F01P 11/14 |
| | | | 73/114.68 |
| 6,283,381 B1 * | 9/2001 | Uchiyama | F01P 11/16 |
| | | | 123/41.15 |
| 6,752,011 B2 * | 6/2004 | Matsumoto | F01P 11/16 |
| | | | 73/114.48 |

(Continued)

FOREIGN PATENT DOCUMENTS

| JP | 10-121963 | 5/1998 |
| JP | 11-223126 | 8/1999 |

(Continued)

*Primary Examiner* — Hung Q Nguyen
(74) *Attorney, Agent, or Firm* — Nixon & Vanderhye P.C.

(57) ABSTRACT

An ECU that is a diagnostic device includes a calculation unit that is a water temperature obtaining unit obtaining the temperature of a discharge coolant which is a coolant discharged from an engine, a diagnostic unit that diagnoses a thermostat which is a temperature adjusting valve by comparing the temperature of the discharge coolant and a threshold, and a suspending unit that suspends a diagnosis performed by the diagnostic unit. The suspending unit suspends a diagnosis performed by the diagnostic unit in a case where the temperature of the discharge coolant is estimated to be lower than the threshold according to an operating condition of the vehicle even though the thermostat is normal.

12 Claims, 72 Drawing Sheets

(56) References Cited

U.S. PATENT DOCUMENTS

| | | | |
|---|---|---|---|
| 8,122,858 B2 * | 2/2012 | Fujimoto | F01P 11/16 123/41.1 |
| 9,605,584 B2 * | 3/2017 | Nethercutt | F01P 7/16 |
| 2002/0111734 A1 * | 8/2002 | Wakahara | F01P 11/16 701/114 |
| 2002/0156569 A1 | 10/2002 | Masuda et al. | |
| 2002/0188415 A1 | 12/2002 | Fujimoto et al. | |
| 2003/0172882 A1 | 9/2003 | Nakano | |
| 2004/0181333 A1 * | 9/2004 | Tsukamoto | F01P 11/16 701/114 |
| 2011/0120216 A1 | 5/2011 | Sugimoto | |
| 2012/0106590 A1 | 5/2012 | Suzuki | |
| 2012/0137992 A1 | 6/2012 | Kinomuka et al. | |
| 2013/0253758 A1 | 9/2013 | Nishi | |
| 2014/0023107 A1 * | 1/2014 | Furuta | G01N 25/72 374/4 |
| 2015/0107345 A1 | 4/2015 | Sugimoto et al. | |

FOREIGN PATENT DOCUMENTS

| | | |
|---|---|---|
| JP | 2000-104549 | 4/2000 |
| JP | 2000-303842 | 10/2000 |
| JP | 2001-329840 | 11/2001 |
| JP | 2001-329841 | 11/2001 |
| JP | 2005-163795 | 6/2005 |
| JP | 2010-007569 | 1/2010 |
| JP | 2010-065671 | 3/2010 |
| JP | 2010-169055 | 8/2010 |
| JP | 2010-242510 | 10/2010 |
| JP | 2012-117378 | 6/2012 |
| JP | 2013-164003 | 8/2013 |
| JP | 2015-078657 | 4/2015 |

* cited by examiner

FIG. 67

| | FIRST MALFUNCTION FLAG | SECOND MALFUNCTION FLAG | THIRD MALFUNCTION FLAG | FAILURE STATUS |
|---|---|---|---|---|
| L1 | OFF | OFF | OFF | NORMAL |
| L2 | ON | OFF | OFF | VALVE POSITION MALFUNCTION |
| L3 | ON | ON | OFF | VALVE LEAKAGE MALFUNCTION |
| L4 | OFF | ON | OFF | VALVE FUNCTIONAL MALFUNCTION |
| L5 | OFF | OFF | ON | VALVE FUNCTIONAL MALFUNCTION |
| L6 | ON | OFF | ON | VALVE FUNCTIONAL + VALVE POSITION MALFUNCTION |
| L7 | ON | ON | ON | VALVE FUNCTIONAL + VALVE POSITION MALFUNCTION |
| L8 | OFF | ON | ON | VALVE FUNCTIONAL + VALVE LEAKAGE MALFUNCTION |

DIAGNOSTIC DEVICE

CROSS REFERENCE TO RELATED APPLICATION

This application is based on Japanese Patent Applications No. 2015-177538 filed on Sep. 9, 2015, No. 2015-177690 filed on Sep. 9, 2015, No. 2015-181498 filed on Sep. 15, 2015, No. 2015-148512 filed on Jul. 28, 2015, No. 2015-181822 filed on Sep. 15, 2015, and No. 2015-186707 filed on Sep. 24, 2015, the disclosures of which are incorporated herein by reference.

TECHNICAL FIELD

The present disclosure relates to a diagnostic device for a temperature adjusting valve that adjusts the temperature of a coolant supplied to an engine of a vehicle.

BACKGROUND

The temperature of an engine of a vehicle is increased to a high temperature by a great amount of heat of combustion generated in a combustion stroke of the engine. Thus, the vehicle is equipped with a cooling device that maintains the engine at an appropriate temperature. Such a cooling device is generally such that a coolant is supplied to the engine by a circulation flow channel and that the coolant discharged from the engine (discharge coolant) is cooled by a radiator.

Upon starting the engine, increasing the temperature of the engine as promptly as possible to an appropriate temperature (warm-up) is required in order to increase the combustion efficiency of the engine. The temperature of the engine can be promptly increased during the warm-up by circulating the discharge coolant in the engine without cooling the discharge coolant in the radiator. Thus, a circulation flow channel that circulates the discharge coolant to the radiator and a bypass flow channel that circulates the discharge coolant to the engine without circulating the discharge coolant to the radiator are provided. The circulation flow channel is provided with a thermostat for adjusting the temperature of the coolant supplied to the engine. The thermostat is a temperature adjusting valve that adjusts the temperature of the coolant supplied to the engine by being operated to be opened or closed according to the temperature of the coolant from the radiator. The thermostat is required to have high reliability for appropriately warming-up or cooling the engine.

A vehicle that diagnoses the thermostat is disclosed in Patent Literature 1. Specifically, a control device included in the vehicle measures the temperature of the coolant during the warm-up and diagnoses the presence of a malfunction of the thermostat on the basis of a relationship between the measured temperature and a threshold. A likelihood of an erroneous diagnosis exists in a case where the measured temperature of the coolant tends to be decreased, and thus, the vehicle stops diagnosing the thermostat.

A diagnostic device that diagnoses the presence of a malfunction of the thermostat, which is a temperature adjusting valve, on the basis of a measured value and an estimated value of the temperature of the discharge coolant is disclosed in Patent Literature 2. Specifically, the diagnostic device calculates a deviation between the measured value and the estimated value of the temperature of the discharge coolant and diagnoses the thermostat as having a malfunction in a case where the deviation is greater than a threshold.

The diagnostic device, in a case where a diagnosis is made that some malfunction occurs in the vehicle, informs a driver of the occurrence of a malfunction by, for example, turning on a warning lamp on a front panel.

One of items diagnosed by the diagnostic device is exemplified by a malfunction of the temperature adjusting valve. The temperature adjusting valve is a valve that is provided midway of a flow channel through which the coolant circulates between an internal combustion engine and the radiator of the vehicle. The temperature of the coolant is adjusted by switching the path of the flow of the coolant with the temperature adjusting valve. If, for example, an open failure occurs in such a temperature adjusting valve, the coolant is supplied to the radiator at all times, and the temperature of the coolant is excessively decreased. Thus, the diagnostic device is capable of determining whether or not the temperature adjusting valve is normally operated, on the basis of the temperature of the coolant.

A failure diagnostic device that diagnoses an electrically controlled thermostat valve, which is a temperature adjusting valve, is disclosed in Patent Literature 3. In a vehicle equipped with the failure diagnostic device, opening and closing operations of the thermostat valve are controlled in such a manner to match the temperature of the coolant circulated to the radiator and a target temperature. When the deviation between the target temperature and the actual coolant temperature is greater than a predetermined value during such control, a malfunction is determined to occur in the thermostat valve.

[Patent Literature 1] JP 2015-78657 A
[Patent Literature 2] JP 2000-104549 A
[Patent Literature 3] JP 2001-329840 A A malfunction of the thermostat significantly affects cooling of the engine. Thus, a diagnosis of the thermostat is preferably performed after completion of the warm-up as well. In the related art disclosed in Patent Literature 1, a diagnosis of the thermostat is not permitted in a case where the measured temperature of the coolant tends to be decreased. When the warm-up of the engine is completed, the coolant circulates in the radiator and is supplied to the engine by operation of the thermostat, and the temperature of the coolant is changed on the basis of various causes. Therefore, if the thermostat is diagnosed simply on the basis of a change in the measured temperature of the coolant, the thermostat cannot be accurately diagnosed in a case where the temperature of the coolant is decreased by a cause other than a malfunction of the thermostat.

A malfunction of the temperature adjusting valve significantly affects cooling of the engine. Thus, a diagnosis thereof is preferably performed after completion of the warm-up as well. In the above related art, a diagnosis of the temperature adjusting valve is not permitted in a case where the measured temperature of the discharge coolant tends to be decreased. When the warm-up of the engine is completed, the discharge coolant circulates in the radiator and is supplied to the engine by operation of the temperature adjusting valve, and the temperature of the coolant is changed on the basis of various causes. Therefore, if the temperature adjusting valve is diagnosed simply on the basis of a change in the measured temperature of the discharge coolant, the temperature adjusting valve cannot be accurately diagnosed in a case where the temperature of the discharge coolant is decreased by a cause other than a malfunction of the temperature adjusting valve.

Among the items diagnosed by the diagnostic device, some item is permitted to be diagnosed only when the temperature of the coolant is greater than or equal to a predetermined temperature. Therefore, when the temperature of the coolant is decreased by, for example, an open failure of the thermostat, a part of the items remains not diagnosed.

If a diagnosis of the thermostat is not permitted as in the vehicle disclosed in Patent Literature 1 when the temperature of the coolant tends to be decreased, driving is continued while a determination such that a malfunction occurs in the thermostat is not made. As a result, the timing at which the temperature of the coolant reaches the predetermined temperature may be delayed with some malfunction not detected. In this case, since a failure diagnosis is not performed for a while, the timing at which a failure occurring in the vehicle is detected may be delayed.

When the temperature of the coolant is decreased, it is estimated that an open failure occurs in the temperature adjusting valve and that the coolant is excessively cooled by the radiator. However, a decrease in the temperature of the coolant may be generated by a cause other than an open failure of the radiator. For example, the temperature of the coolant may be decreased because a heating device is operated and consumes the heat of the coolant in order to heat the inside of the vehicle. Alternatively, the temperature of the coolant may be decreased because a heat generation amount of the engine is comparatively small. Therefore, an erroneous determination may be made if a determination such that an open failure occurs in the temperature adjusting valve is made at all times from a decrease in the temperature of the coolant.

In Patent Literature 1, a diagnosis of an open failure of the thermostat is disclosed as being not permitted in a case where the temperature of the coolant tends to be decreased, since a likelihood of an erroneous diagnosis exists. However, if a diagnosis is not permitted when the temperature of the coolant is decreased, a failure of the thermostat, if actually occurring at that time, remains not detected, and operation of the vehicle is continued.

The diagnostic device disclosed in Patent Literature 2 diagnoses the thermostat during the warm-up of the engine. However, since a malfunction of the thermostat significantly affects cooling of the engine, a diagnosis of the thermostat is preferably performed after completion of the warm-up of the engine as well.

However, the temperature of the discharge coolant after the warm-up is changed in a complicated manner on the basis of various causes such as the opening ratio of the thermostat and the operational state of the engine. Therefore, the measured value and the estimated value of the temperature of the discharge coolant may be changed by a cause other than a malfunction of the thermostat, and in this case, the thermostat cannot be accurately diagnosed.

A malfunction of the temperature adjusting valve, if occurring, does not immediately change the temperature of the coolant. The temperature of the coolant is changed after time elapses from the occurrence of a malfunction. Thus, in the failure diagnostic device disclosed in Patent Literature 1, the timing at which the occurrence of a malfunction in the temperature adjusting valve is detected is delayed, and informing the driver of a malfunction may be delayed.

Malfunctions occurring in the temperature adjusting valve include, for example, inoperability of a valve body of the temperature adjusting valve and a leakage of the coolant in the radiator due to, for example, a crack occurring in the valve body. That is, a malfunction may occur in the temperature adjusting valve due to various causes. However, the failure diagnostic device disclosed in Patent Literature 1 is not capable of determining a specific type of malfunction, though being capable of determining whether or not a malfunction occurs in the temperature adjusting valve.

SUMMARY

An object of the present disclosure is to provide a diagnostic device that is capable of accurately diagnosing a temperature adjusting valve after completion of a warm-up of an engine.

According to an aspect of the present disclosure, there is provided a diagnostic device for a temperature adjusting valve that adjusts the temperature of a coolant supplied to an engine of a vehicle, the device including a water temperature obtaining unit that obtains the temperature of a discharge coolant which is the coolant discharged from the engine, a diagnostic unit that diagnoses the temperature adjusting valve by comparing the temperature of the discharge coolant and a threshold, and a suspending unit that suspends a diagnosis performed by the diagnostic unit. The suspending unit suspends a diagnosis performed by the diagnostic unit in a case where the temperature of the discharge coolant is estimated to be lower than the threshold according to an operating condition of the vehicle even though the temperature adjusting valve is normal.

A diagnosis performed by the diagnostic unit is suspended in the diagnostic device according to the present disclosure in a case where the temperature of the discharge coolant is estimated to be lower than the threshold according to the operating condition of the vehicle even though the temperature adjusting valve is normal. Therefore, the temperature adjusting valve can be accurately diagnosed in a case where the diagnostic unit diagnoses the temperature adjusting valve by comparing the temperature of the discharge coolant and the threshold.

According to another aspect of the present disclosure, there is provided a diagnostic device for a temperature adjusting valve that adjusts the temperature of a coolant supplied to an internal combustion engine of a vehicle, the device including a water temperature obtaining unit that obtains the temperature of a discharge coolant which is the coolant discharged from the internal combustion engine, and a diagnostic unit that diagnoses a state of the temperature adjusting valve on the basis of the temperature of the discharge coolant. The diagnostic unit performs a heat radiating amount decreasing control decreasing a heat radiating amount of the discharge coolant in a radiator of the vehicle and diagnoses the temperature adjusting valve as having a malfunction in a case where an increase in the temperature of the discharge coolant based on the heat radiating amount decreasing control is greater than or equal to an increase threshold.

The heat radiating amount decreasing control that decreases the heat radiating amount of the discharge coolant in the radiator is performed in the diagnostic device configured as such. When such a heat radiating amount decreasing control is performed in a case where the discharge coolant is supplied to the radiator by a malfunction of the temperature adjusting valve, the temperature of the discharge coolant is increased. The temperature adjusting valve is diagnosed as having a malfunction in the diagnostic device in a case where an increase in the temperature of the discharge coolant is greater than or equal to the increase threshold. Therefore, according to the diagnostic device, the temperature adjusting valve can be accurately diagnosed in a case where the temperature of the discharge coolant is decreased after completion of a warm-up of an internal combustion engine.

According to still another aspect of the present disclosure, there is provided a diagnostic device included in a vehicle, the device including a water temperature obtaining unit that obtains the temperature of a coolant discharged from an engine of the vehicle, a malfunction determination unit that determines, by comparing the temperature obtained by the water temperature obtaining unit with a predetermined determination threshold, a malfunction of a temperature adjusting valve which is provided in the vehicle to adjust the temperature of the coolant, and a vehicle diagnostic unit that diagnoses an operational state of the vehicle when the temperature obtained by the water temperature obtaining unit is greater than or equal to a predetermined permitted threshold. The vehicle diagnostic unit changes the permitted threshold to be smaller when the temperature obtained by the water temperature obtaining unit falls below the determination threshold.

The permitted threshold is changed to be smaller in such a diagnostic device when the temperature of the coolant is decreased and falls below the determination threshold. That is, a condition for performing a failure diagnosis is facilitated in a case where the temperature of the coolant is decreased by an open failure occurring in the temperature adjusting valve (for example, a thermostat) or by other causes. Accordingly, an opportunity of a failure diagnosis is appropriately secured, and thus, a delay in the timing of detecting a failure occurring in the vehicle is prevented.

According to still another aspect of the present disclosure, there is provided a diagnostic device included in a vehicle, the device including a water temperature obtaining unit that obtains an outlet water temperature which is the temperature of a coolant discharged from an engine of the vehicle, a state obtaining unit that obtains an operational state of the vehicle, and a malfunction determination unit that determines, on the basis of both the outlet water temperature and the operational state, a malfunction of a temperature adjusting valve which is provided in the vehicle to adjust the temperature of the coolant.

A malfunction of the temperature adjusting valve is not determined on the basis of only the outlet water temperature in such a diagnostic device. A malfunction of the temperature adjusting valve is determined on the basis of both the outlet water temperature and the operational state. Thus, erroneously determining a malfunction to occur in the temperature adjusting valve is prevented in a case where the outlet water temperature is decreased by a cause other than a malfunction of the temperature adjusting valve.

According to still another aspect of the present disclosure, there is provided a diagnostic device for a temperature adjusting valve that adjusts the temperature of a coolant supplied to an internal combustion engine of a vehicle, the device including a water temperature obtaining unit that obtains a measured value of the temperature of a discharge coolant which is the coolant discharged from the internal combustion engine, an estimation unit that performs estimation related to the temperature of the discharge coolant on the basis of operational states of the internal combustion engine and the vehicle, and a diagnostic unit that diagnoses the presence of a malfunction of the temperature adjusting valve on the basis of the measured value and a result of estimation performed by the estimation unit. The temperature adjusting valve, in a case where the temperature adjusting valve is normal, is configured to be opened on the basis that the temperature of the discharge coolant is greater than or equal to a valve open threshold and to supply the discharge coolant to a radiator included in the vehicle. The estimation unit performs the estimation only in a case where the measured value is lower than the valve open threshold.

According to this configuration, the estimation related to the temperature of the discharge coolant is performed only in a case where the measured value of the temperature of the discharge coolant is lower than the valve open threshold that is the temperature at which the temperature adjusting valve is opened. Accordingly, the estimation related to the temperature of the discharge coolant can be performed under a condition that the discharge coolant does not radiate heat in the radiator if the temperature adjusting valve is normal. Therefore, the temperature adjusting valve can be accurately diagnosed in a case where the diagnostic unit diagnoses the temperature adjusting valve on the basis of the measured value of the temperature of the discharge coolant and the result of the estimation related to the temperature of the discharge coolant.

According to still another aspect of the present disclosure, there is provided a diagnostic device included in a vehicle, the device including a water temperature obtaining unit that obtains the temperature of a coolant discharged from an internal combustion engine of the vehicle, and a malfunction determination unit that determines a malfunction of a temperature adjusting valve which is provided in the vehicle to adjust the temperature of the coolant. The temperature adjusting valve is configured to operate a valve body therein and change the opening ratio of the valve body by receiving supply of power and performs a control that, in a case where the vehicle is operated, causes the position of the valve body to match a target position and thereby causes the temperature of the coolant to match a target temperature. The malfunction determination unit determines a malfunction of the temperature adjusting valve on the basis of a position deviation that is the difference between the position of the valve body and the target position and on the basis of a water temperature deviation that is the difference between the temperature of the coolant and the target temperature.

A malfunction of the temperature adjusting valve is determined in such a diagnostic device on the basis of not only the water temperature deviation which is the difference between the temperature of the coolant and the target temperature but also the position deviation which is the difference between the position of the valve body and the target position. Influence of a malfunction of the temperature adjusting valve appears in a shorter amount of time on the position deviation than the influence thereof does on the water temperature deviation. Thus, according to the diagnostic device, a malfunction occurring in the temperature adjusting valve can be detected in a short amount of time.

In a case, for example, where the water temperature deviation is great and the position deviation is small, the coolant is estimated to leak on a radiator side of the valve body even though the valve body is normally operated. Thus, in such a case, the cause of a malfunction of the temperature adjusting valve can be specified as not an operational failure of the valve body but the valve body itself, a crack in the valve body, and the like.

The "position" of the valve body described above includes the rotation angle of the valve body in a case where the valve body has a rotational motion in addition to the position of the valve body in a case where the valve body has a translational motion. That is, the position of the valve body can be said to indicate the amount of operation of the valve body in a case where the valve body is operated to change the opening ratio of the temperature adjusting valve.

According to the present disclosure, it is possible to provide a diagnostic device that is capable of accurately diagnosing a temperature adjusting valve after completion of a warm-up of an engine or in a case where the temperature of a coolant is decreased.

BRIEF DESCRIPTION OF THE DRAWINGS

The above and other objects, features and advantages of the present disclosure will become more apparent from the following detailed description made with reference to the accompanying drawings. In the drawings:

FIG. 67 is a diagram illustrating a relationship among a first malfunction flag, a second malfunction flag, a third malfunction flag, and a failure status that is determined on the basis of these flags.

DETAILED DESCRIPTION

First Embodiment

Hereinafter, a first embodiment will be described with reference to the appended drawings. For better understanding of descriptions, the same constituent in each drawing will be designated by the same reference sign if possible, and a duplicate description will not be provided.

Figure 1:
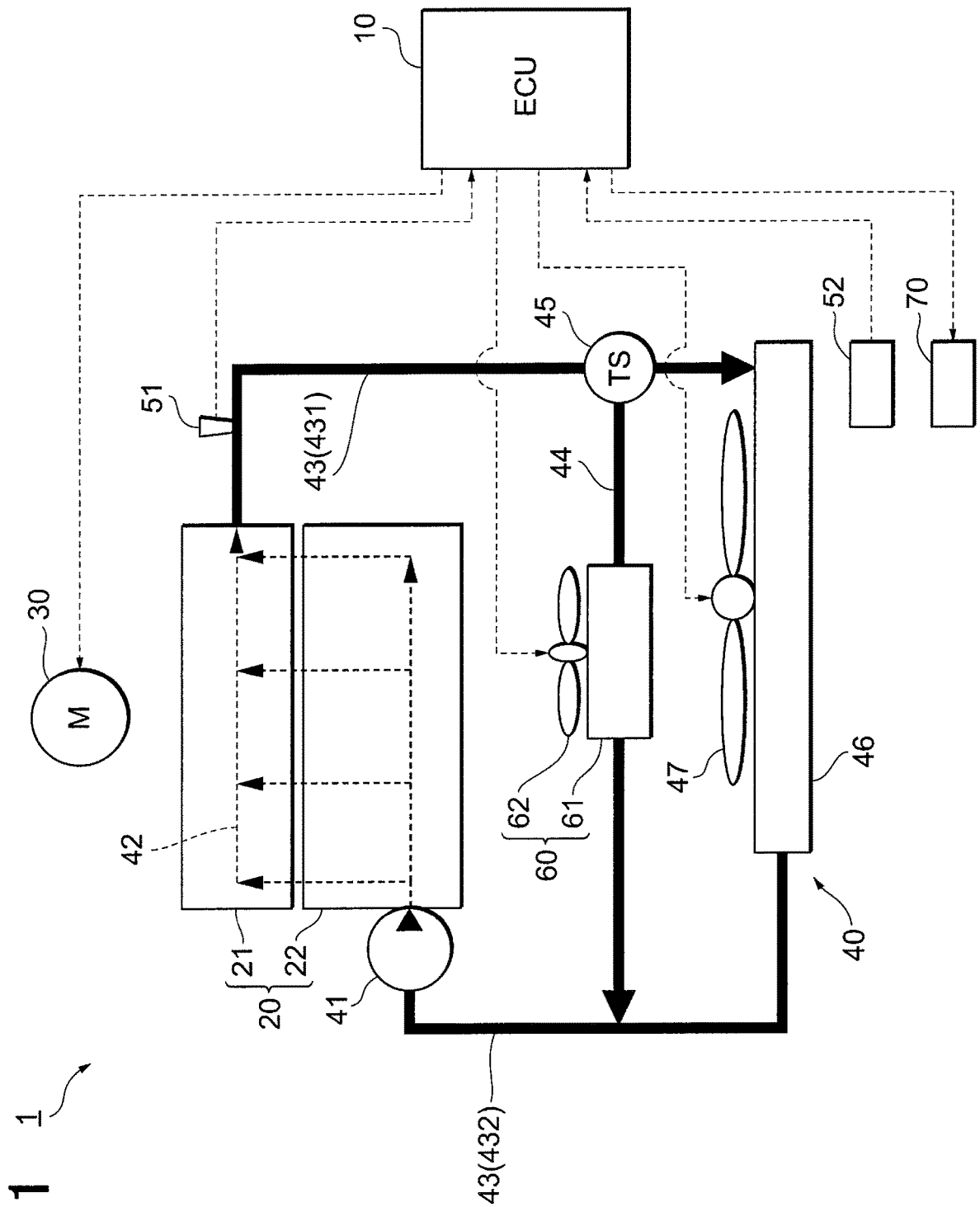
FIG. 1 is a schematic diagram illustrating a vehicle equipped with an ECU according to a first embodiment.

First, an ECU 10 according to the first embodiment and a vehicle 1 equipped with the ECU 10 will be described with reference to FIG. 1. The vehicle 1 is a so-called hybrid automobile that is equipped with an engine 20 and a motor 30 as power sources.

The engine 20 is an internal combustion engine that uses, for example, gasoline as fuel and includes a cylinder head 21 and a cylinder block 22. The engine 20 includes multiple cylinders (not illustrated) and generates a torque by each cylinder repeating each stroke of an intake stroke, a compression stroke, a combustion stroke, and an exhaust stroke. The torque is output through a crankshaft (not illustrated) included in the engine 20 and is used for traveling of the vehicle 1.

The motor 30 is an electric motor that generates a torque by receiving supply of electricity. A three-phase AC motor, for example, is used as the motor 30, and the motor 30 generates a torque on the basis of an electrical signal supplied from the ECU 10. The motor 30 is capable of causing the vehicle 1 to travel by rotating an axle (not illustrated) of the vehicle 1 using a torque generated by the motor 30 alone or is capable of causing the vehicle 1 to travel by generating a torque that assists the engine 20.

The vehicle 1 is also equipped with a cooling device 40 and a heating device 60.

The cooling device 40 is a device that cools the engine 20 generating a great amount of heat of combustion in the combustion stroke and maintains the engine 20 at an appropriate temperature. The cooling device 40 includes a water pump 41, an engine cooling flow channel 42, a circulation flow channel 43, a bypass flow channel 44, and a radiator 46.

The water pump 41 is a fluid machine that pumps a coolant. The coolant contains an LLC which is an antifreeze. The water pump 41 is rotationally driven by receiving a part of the output of the engine 20 through the crankshaft. Rotational driving of the water pump 41 pressurizes the coolant supplied from the upstream side of the water pump 41, and the coolant is fed to the downstream side of the water pump 41.

The engine cooling flow channel 42 is a coolant channel that is provided in the engine 20. For example, the engine cooling flow channel 42 is provided in the cylinder block 22 to enclose each cylinder.

The circulation flow channel 43 is a coolant channel that is provided in a pipe. The pipe has one end connected to the downstream end of the engine cooling flow channel 42 and the other end connected to the water pump 41. Accordingly, the circulation flow channel 43 with the engine cooling flow channel 42 constitutes a channel that circulates the coolant to the engine 20. The circulation flow channel 43 includes a first circulation flow channel 431 that extends from the downstream end of the engine cooling flow channel 42 to the radiator 46 described later and a second circulation flow channel 432 that extends from the radiator 46 to the water pump 41.

The bypass flow channel 44 is a coolant channel that is provided in a pipe. The pipe has one end connected midway of the pipe constituting the first circulation flow channel 431 and the other end connected midway of the pipe constituting the second circulation flow channel 432. Accordingly, the bypass flow channel 44 constitutes a channel that branches off from the first circulation flow channel 431 and joins the second circulation flow channel 432 midway of the second circulation flow channel 432 by detouring the radiator 46.

The radiator 46 is a heat exchanger that is provided in the circulation flow channel 43. The radiator 46 is provided by alternately stacking a metal tube (not illustrated) in which the coolant flows and a corrugated fin (not illustrated) that is provided by folding a metal plate. A radiator fan 47 that is adjacent to the radiator 46 transports air into the radiator 46. The air flows between adjacent tubes and passes through the radiator 46 and exchanges heat with the coolant that flows in the tubes. Accordingly, the coolant that flows in the radiator 46 is cooled, and the temperature thereof is decreased.

The heating device 60 is a device that heats the vehicle interior of the vehicle 1. The heating device 60 includes a heater core 61 and a heating blower 62.

The heater core 61 is a heat exchanger that is provided midway of the bypass flow channel 44. The heater core 61 is provided by alternately stacking a metal tube (not illustrated) in which the coolant flows and a corrugated fin (not illustrated) that is provided by folding a metal plate. Air taken from the vehicle interior or from the vehicle exterior by the heating blower 62 adjacent to the heater core 61 is transported into the heater core 61. The air flows between adjacent tubes and passes through the heater core 61 and exchanges heat with the coolant that flows in the tubes. Accordingly, the air that flows between the tubes is heated, and the temperature thereof is increased.

A thermostat 45 is arranged at a part where the pipe constituting the bypass flow channel 44 branches off from the pipe constituting the circulation flow channel 43. The thermostat 45 includes a valve body (not illustrated), and the valve body is configured to be moved in response to the temperature of the coolant in the vicinity thereof. The thermostat 45 is configured to be switched between a closed state and an opened state by the movement of the valve body. The thermostat 45, on the basis of the temperature of the coolant, adjusts the ratio of the flow rate of the coolant supplied to the engine 20 through the radiator 46 and the flow rate of the coolant supplied to the engine 20 through the bypass flow channel 44.

Next, operation of the cooling device 40 and the heating device 60 configured as described heretofore will be described with reference to FIG. 1.

When the engine 20 is started by receiving supply of fuel, a great amount of heat of combustion generated in the combustion stroke gradually increases the temperature of the engine 20. The water pump 41 receives the output through the crankshaft and is rotationally driven. Accordingly, the coolant of the second circulation flow channel 432 is pressurized and is fed to the engine cooling flow channel 42 of the engine 20.

The coolant exchanges heat with the cylinder head 21 and the cylinder block 22 while flowing in the engine cooling flow channel 42. Accordingly, the cylinder head 21 and the cylinder block 22 lose heat and are cooled, while the coolant receives heat and the temperature thereof is increased.

The temperature of the engine 20 is comparatively low in a state immediately after the engine 20 is started. Thus, the temperature of the coolant discharged from the engine cooling flow channel 42 and flowing in the first circulation flow channel 431 (discharge coolant) is also comparatively low. In this case, the valve body of the thermostat 45 is arranged in a position closing the downstream side of the first circulation flow channel 431 and opening the bypass flow channel 44.

Accordingly, the coolant discharged from the engine 20 is not supplied to the radiator 46 and flows in the bypass flow channel 44 and is supplied to the second circulation flow channel 432. That is, the coolant circulates while detouring the radiator 46 in a state where the temperature of the engine 20 is comparatively low. In this case, since the coolant is not cooled by the radiator 46, the coolant, if supplied to the engine cooling flow channel 42, does not excessively cool the engine 20. Therefore, a warm-up upon starting the engine 20 is not impeded by the coolant.

Meanwhile, the temperature of the coolant discharged from the engine cooling flow channel 42 is comparatively high in a state where the temperature of the engine 20 is greater than or equal to an appropriate temperature. In this case, the valve body of the thermostat 45 is arranged in a position opening both the downstream side of the first circulation flow channel 431 and the bypass flow channel 44.

Accordingly, a part of the coolant discharged from the engine 20 is supplied to the radiator 46, and the remaining part flows in the bypass flow channel 44 and is supplied to the second circulation flow channel 432. That is, in a state where the temperature of the engine 20 is greater than or equal to an appropriate temperature, the coolant supplied to the radiator 46 is cooled, and the remaining part of the coolant flows by detouring the radiator 46. These coolants join each other in the second circulation flow channel 432, and the joined coolant is pressurized by the water pump 41 and is again fed to the engine cooling flow channel 42.

As described above, the coolant flowing in the bypass flow channel 44 exchanges heat with air when passing through the heater core 61. The air of which temperature is increased by heating through the exchange of heat is guided into the vehicle interior of the vehicle 1 by a duct (not illustrated) and is used to heat the vehicle interior.

Next, the electronic control unit (ECU) 10 will be described with reference to FIG. 2. A part or the entirety of the ECU 10 includes an analog circuit or a digital processor. Either way, a functional control block is included in the ECU 10 in order to achieve a function of outputting a control signal on the basis of a received signal.

Figure 2:
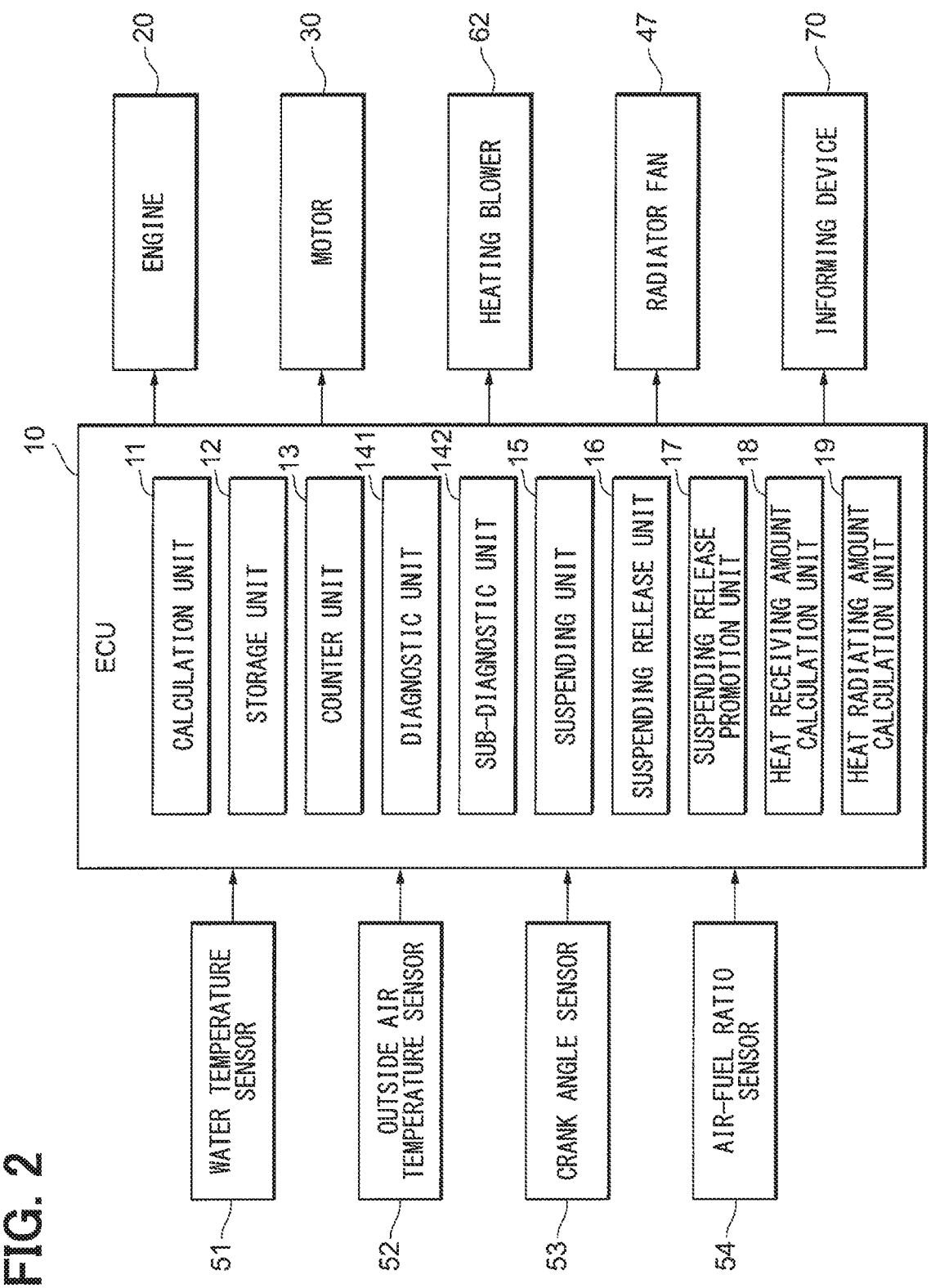
FIG. 2 is a functional block diagram illustrating the ECU of FIG. 1.

FIG. 2 illustrates a functional control block diagram of the ECU 10. Software modules that are incorporated into the analog circuit or the digital processor constituting the ECU 10 are not necessarily required to be divided as the control blocks illustrated in FIG. 2. That is, in actuality, analog circuits or modules may be configured to function as the multiple control blocks illustrated in FIG. 2 or may be further subdivided. The actual configuration in the ECU 10 can be appropriately modified by those skilled in the art, provided that the ECU 10 is configured to be capable of performing processes described later.

The ECU 10 is electrically connected with each sensor of a water temperature sensor 51, an outside air temperature sensor 52, a crank angle sensor 53, and an air-fuel ratio sensor 54. The water temperature sensor 51 is a sensor that is arranged in the first circulation flow channel 431 (refer to FIG. 1) and generates and transmits a signal corresponding to the temperature of the coolant discharged from the engine 20. The outside air temperature sensor 52 is a sensor that is arranged in a portion of the vehicle 1 which is in contact with the outside air (refer to FIG. 1) and generates and transmits a signal corresponding to the outside air temperature. The crank angle sensor 53 is a sensor that generates and transmits a signal corresponding to the angle of the crankshaft of the engine 20. The air-fuel ratio sensor 54 is a sensor that generates and transmits a signal corresponding to the oxygen concentration of combustion gas discharged from each cylinder of the engine 20.

The ECU 10 is also electrically connected with each vehicle-mounted device of the engine 20, the motor 30, the heating blower 62, the radiator fan 47, and an informing device 70. The informing device 70 is a device that informs an occupant of the vehicle 1 in various manners and includes known devices such as a display panel and a buzzer. The ECU 10 transmits a control signal to control driving of each vehicle-mounted device.

The meaning of the expression "electrically connected" used in the present application is not limited to a form in which one is connected to another by a signal line and may include a form in which one is capable of communicating with another in a wireless manner.

The ECU 10 includes a calculation unit 11, a storage unit 12, a counter unit 13, a diagnostic unit 141, a sub-diagnostic unit 142, a suspending unit 15, a suspending release unit 16, a suspending release promotion unit 17, a heat receiving amount calculation unit 18, and a heat radiating amount calculation unit 19.

The calculation unit 11 is a part that performs various calculations required for controlling each vehicle-mounted device. Specifically, the calculation unit 11, in response to a driver stepping on an accelerator (not illustrated), performs a calculation that causes the engine 20 and the motor 30 to generate a torque. The calculation unit 11 performs a predetermined calculation on the basis of a signal received from the water temperature sensor 51 and obtains the temperature of the coolant. The calculation unit 11 performs a predetermined calculation on the basis of a signal received from the outside air temperature sensor 52 and obtains the outside air temperature. The calculation unit 11 performs a predetermined calculation on the basis of a signal received from the crank angle sensor 53 and obtains the engine speed. The calculation unit 11 performs a predetermined calculation on the basis of a signal received from the air-fuel ratio sensor 54 and calculates the air-fuel ratio in the cylinders of the engine 20, the flow rate of air supplied into the cylinders, and the like.

The storage unit 12 is a part that stores various types of information and includes, for example, a non-volatile memory. Information such as a map is stored in advance in the storage unit 12, and the information is read by the calculation unit 11 and is used for calculations. The storage unit 12 is capable of storing results of calculations of the calculation unit 11.

The counter unit 13 is a part that performs various types of counting. The counter unit 13 counts, for example, the time length in which the engine 20 is operated in a specific operation region of multiply divided operation regions of the engine 20.

The diagnostic unit 141 is a part that diagnoses the thermostat 45. Specifically, the diagnostic unit 141 diagnoses the presence of a malfunction that the valve body of the thermostat 45 cannot be normally moved and that the thermostat 45 is not switched between the above closed state and the opened state.

The sub-diagnostic unit 142 is a part that diagnoses the thermostat 45 in a case where a diagnosis performed by the diagnostic unit 141 is suspended. As described later, the sub-diagnostic unit 142 diagnoses the presence of a malfunction in the thermostat 45 on the basis of the temperature of the coolant.

The suspending unit 15 is a part that suspends a diagnosis performed by the diagnostic unit 141. As described later, the suspending unit 15 suspends a diagnosis of the thermostat 45 performed by the diagnostic unit 141 in a case where a likelihood of an erroneous diagnosis exists.

The suspending release unit 16 is a part that releases a suspended diagnosis in a case where the suspending unit 15 suspends a diagnosis performed by the diagnostic unit 141. Specifically, the suspending release unit 16 determines the likelihood of an erroneous diagnosis to be diminished on the basis of an increase in the temperature of the coolant and releases a diagnosis suspended by the suspending unit 15.

The suspending release promotion unit 17 is a part that controls vehicle-mounted devices such as the engine 20 and the motor 30 to promote release of a suspended diagnosis performed by the suspending release unit 16. Specifically, the suspending release promotion unit 17 performs a suspending release promotion control that controls vehicle-mounted devices to at least increase the amount of heat received by the coolant from the outside (heat receiving amount) or decrease the amount of heat radiated by the coolant to the outside (heat radiating amount).

The heat receiving amount calculation unit 18 is a part that calculates the heat receiving amount of the coolant. As described later, the heat receiving amount calculation unit 18 calculates the heat receiving amount on the basis of the engine speed and the like.

The heat radiating amount calculation unit 19 is a part that calculates the heat radiating amount of the coolant. As described later, the heat radiating amount calculation unit 19 calculates the heat radiating amount on the basis of the outside air temperature and the like.

Next, a relationship between the operation regions of the engine 20 and the heat receiving amount of the coolant will be described with reference to FIG. 3.

Figure 3:
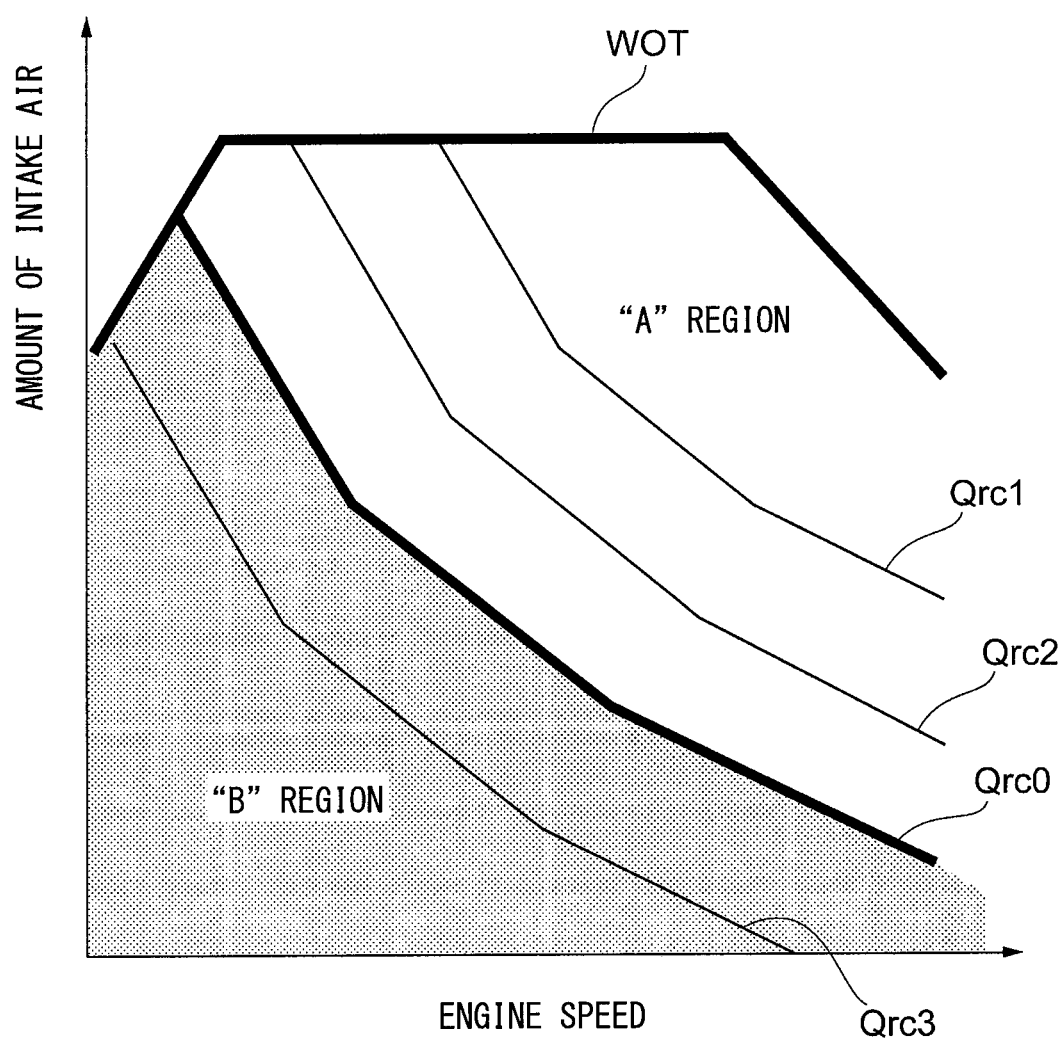
FIG. 3 is a descriptive diagram illustrating operation regions of an engine of FIG. 1.

FIG. 3 illustrates a map of a heat receiving amount Qrc in which the engine speed is plotted on the horizontal axis and the amount of air taken into the engine 20 is plotted on the vertical axis. The map of the heat receiving amount Qrc is stored in the storage unit 12 of the ECU 10. The amount of air taken into the engine 20 at each speed have upper limit values illustrated by a solid line WOT (wide open throttle; the wide opened state of a throttle valve).

The heat receiving amount Qrc of the coolant in a case where the engine 20 is operated along solid lines Qrc1, Qrc2, Qrc0, and Qrc3 is respectively Qrc1, Qrc2, Qrc0, and Qrc3. The values of the heat receiving amounts Qrc1, Qrc2, Qrc0, and Qrc3 decrease in this order. That is, the heat receiving amount Qrc of the coolant has a greater value as the region in which the engine 20 is operated moves upward and rightward in the map illustrated in FIG. 3. The same map as the map illustrated in FIG. 3 can be created by plotting a torque generated by the engine 20 on the vertical axis instead of the amount of air taken into the engine 20.

The heat receiving amount Qrc of the coolant is greater than a heat radiating amount Qrd in a case where the engine 20 is operated in an "A" region where the heat receiving amount Qrc of the coolant has a greater value than Qrc0 (a region to which the heat receiving amounts Qrc1 and Qrc2 belong). In this case, the temperature of the coolant tends to be increased on the basis of heat balance.

Meanwhile, the heat receiving amount Qrc of the coolant is smaller than the heat radiating amount Qrd in a case where the engine 20 is operated in a "B" region where the heat receiving amount Qrc of the coolant has a smaller value than Qrc0 (a region to which the heat receiving amount Qrc3 belongs). In this case, the temperature of the coolant tends to be decreased on the basis of heat balance. That is, the heat receiving amount Qrc0 is a threshold as a boundary at which the temperature of the coolant is changed to be increased or decreased.

It is difficult to determine whether a decrease in the temperature of the coolant discharged from the engine 20 while the engine 20 is operated in the "B" region is due to a malfunction of the thermostat 45 or other causes. Therefore, if the thermostat 45 is diagnosed in such a state, a concern for an erroneous diagnosis result is increased. A diagnosis of the thermostat 45 is preferably suspended in a case where the frequency of the engine 20 being operated in the "B" region is high.

Next, determination of permitting or suspending a diagnosis of the thermostat 45 will be described with reference to FIG. 4 and FIG. 5.

Figure 4:
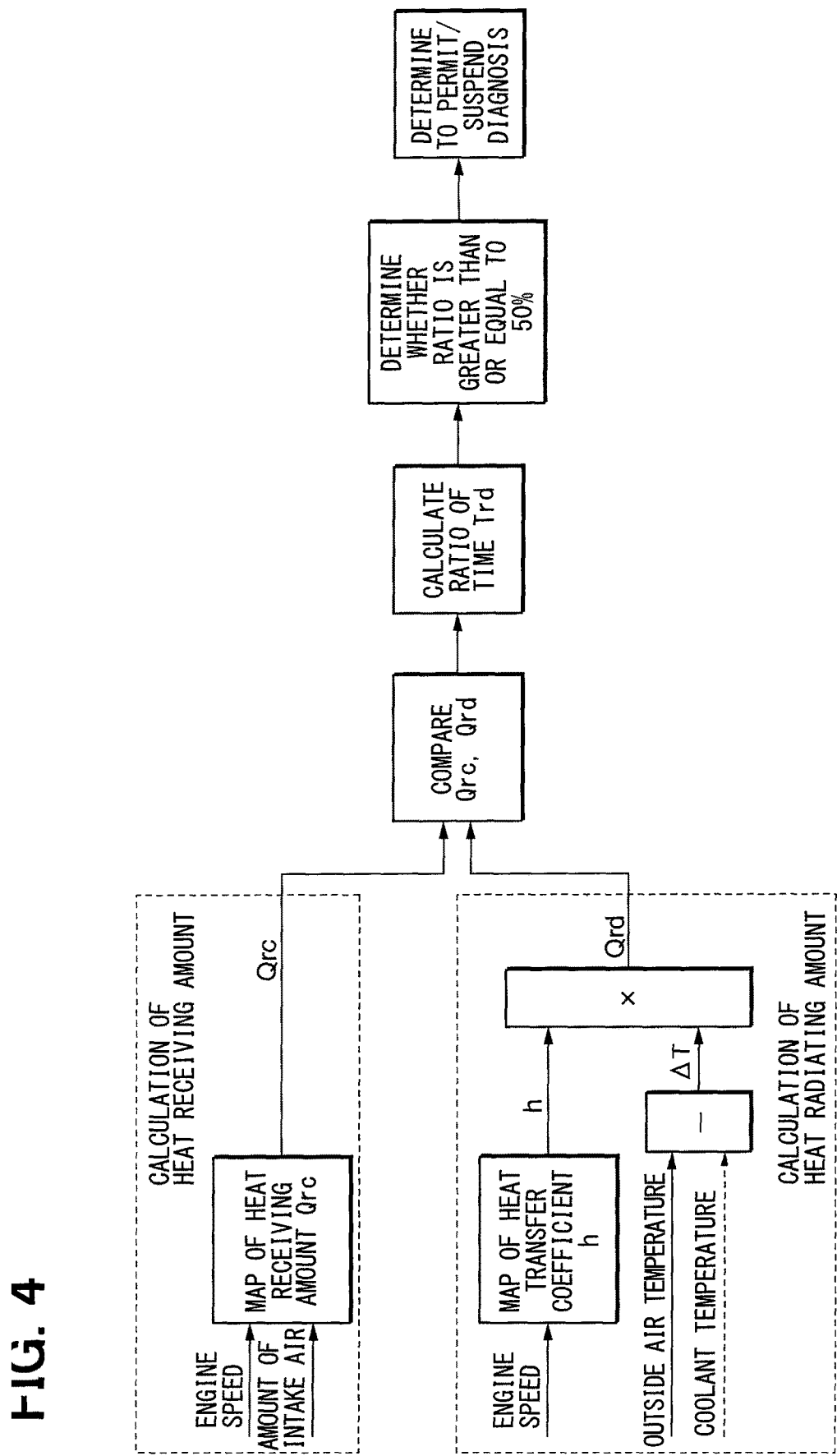
FIG. 4 is a descriptive diagram illustrating a determination logic for permitting or suspending a diagnosis of a thermostat performed by the ECU of FIG. 1.

The heat receiving amount calculation unit 18 (refer to FIG. 2) of the ECU 10 compares the engine speed and the amount of air taken into the engine 20 with the map of the heat receiving amount Qrc stored in the storage unit 12 as illustrated in FIG. 4. Accordingly, the heat receiving amount Qrc of the coolant in the operational state of the engine 20 is obtained.

The heat radiating amount calculation unit 19 (refer to FIG. 2) of the ECU 10 compares the engine speed with a map of a heat transfer coefficient "h". The heat transfer coefficient "h" is a constant that is used when the amount of heat transferred from the coolant to the outside air is calculated. The heat transfer coefficient "h" is experimentally determined in advance considering material properties and the shapes of the pipes constituting the circulation flow channel 43 and the bypass flow channel 44 and correlates with the flow speed of the coolant. Since the water pump 41 that pumps the coolant is rotationally driven by receiving the output of the engine 20 in the first embodiment, the flow speed of the coolant correlates with the engine speed. Therefore, the engine speed and the heat transfer coefficient "h" at the engine speed are associated with each other in the map of the heat transfer coefficient "h". The heat transfer coefficient "h" is obtained by comparing the engine speed with the map of the heat transfer coefficient "h".

The heat radiating amount calculation unit 19 calculates a temperature difference $\Delta T$ that is the difference between the outside air temperature and the temperature of the coolant. The heat radiating amount calculation unit 19 obtains the heat radiating amount Qrd of the coolant by multiplying the temperature difference $\Delta T$ by the heat transfer coefficient "h".

The ECU 10 compares the heat receiving amount Qrc of the coolant and the heat radiating amount Qrd obtained as described heretofore. In a case where the heat radiating amount Qrd is greater than the heat receiving amount Qrc, the engine 20 is operated in the "B" region illustrated in FIG. 3, and the temperature of the coolant tends to be decreased.

The ECU 10, during a predetermined period in which the engine 20 is operated, calculates a time Trd in which the heat radiating amount Qrd is greater than the heat receiving amount Qrc and calculates the ratio of the time Trd to the time length of the predetermined period. The ECU 10 determines whether or not the ratio is greater than or equal to 50%. In a case where the ratio is greater than or equal to 50%, the engine 20 is frequently operated in the "B" region, and a concern for an erroneous result of a diagnosis of the thermostat 45 is high. Thus, the suspending unit 15 of the ECU 10 suspends a diagnosis performed by the diagnostic unit 141. Meanwhile, in a case where the ratio of the time Trd to the time length of the predetermined period is smaller than 50%, a concern for an erroneous result of a diagnosis of the thermostat 45 is low. Thus, the suspending unit 15 of the ECU 10 does not suspend a diagnosis performed by the diagnostic unit 141 (permits a diagnosis).

Figure 5:
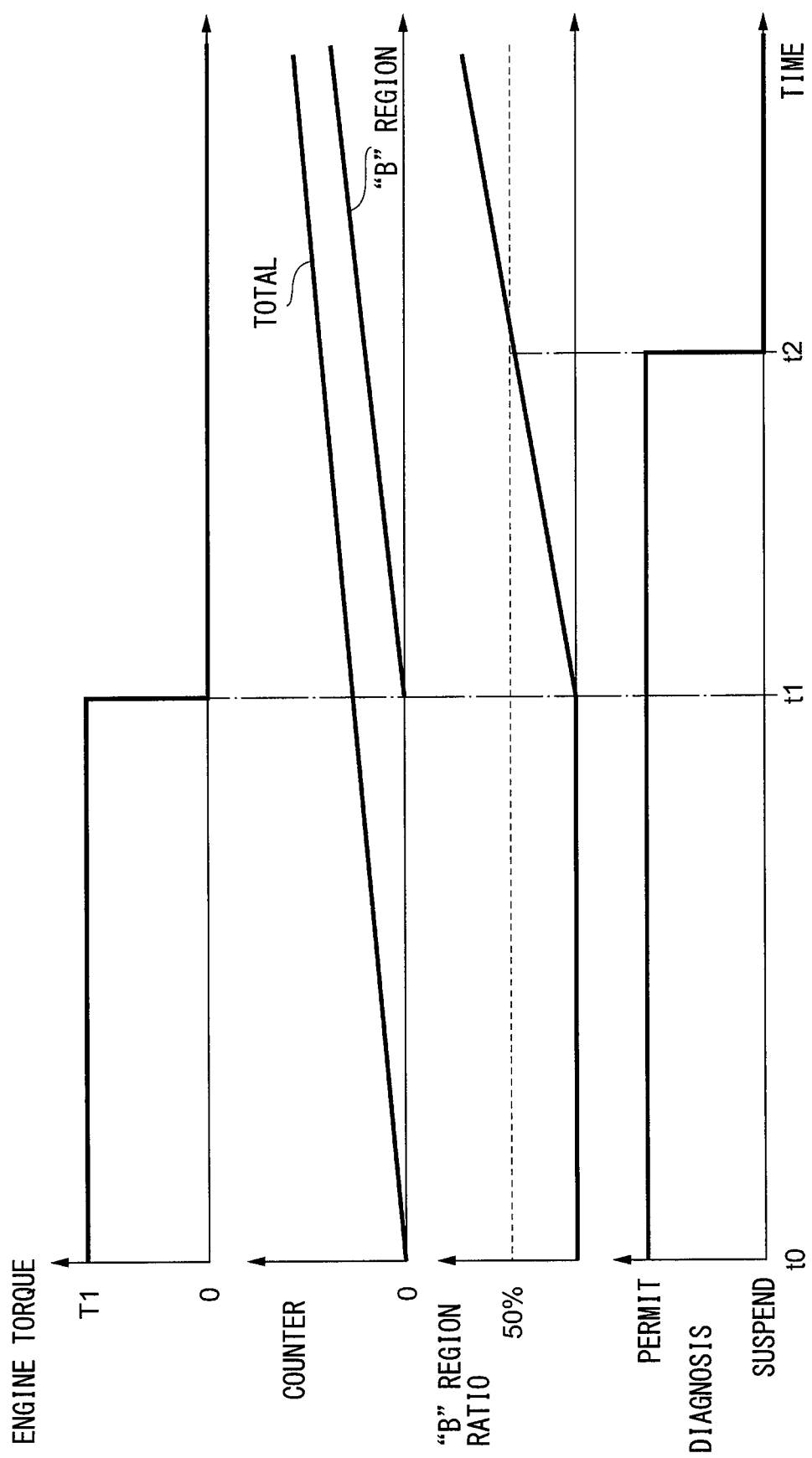
FIG. 5 is a time chart illustrating a change in the operational state of the engine of FIG. 1 and permitting or suspending a diagnosis of the thermostat.

FIG. 5 illustrates a change in permitting or suspending a diagnosis of the thermostat 45 and a change in time. As illustrated in FIG. 5, the ECU 10 causes the engine 20 to be operated and generate a torque T1 from a time point t0 to a time point t1. The counter unit 13 (refer to FIG. 2) of the ECU 10 counts the time of operation of the engine 20 from the time point t0. The engine 20 is not operated in the "B" region illustrated in FIG. 3 from the time point t0 to the time point t1. Thus, the ratio of the time Trd ("B" region) to the time length of operation of the engine 20 (total) is smaller than 50%. In this case, the suspending unit 15 of the ECU 10 does not suspend a diagnosis performed by the diagnostic unit 141 (permits a diagnosis).

The ECU 10 causes operation of the engine 20 to stop when the vehicle 1 transitions at the time point t1 to a mode of travel that uses only the torque generated by the motor 30. Thus, the torque generated by the engine 20 is equal to zero at the time point t1. Since new heat of combustion is not generated in the engine 20, the heat receiving amount of the coolant is decreased, and the frequency of the engine 20 being operated in the "B" region is gradually increased. The counter unit 13 of the ECU 10 starts counting the time Trd in which the engine 20 is operated in the "B" region.

The suspending unit 15 of the ECU 10 suspends a diagnosis performed by the diagnostic unit 141 when the ratio of the time Trd to the total time length of operation of the engine 20 reaches 50% at a time point t2. Accordingly, a diagnosis of the thermostat 45 is suspended in a situation where a concern for an erroneous diagnosis is high. That is, the temperature of the coolant in the operating condition of the engine 20 after the time point t2 is decreased from the temperature of the coolant in the operating condition of the engine 20 until the time point t2.

Figure 6:
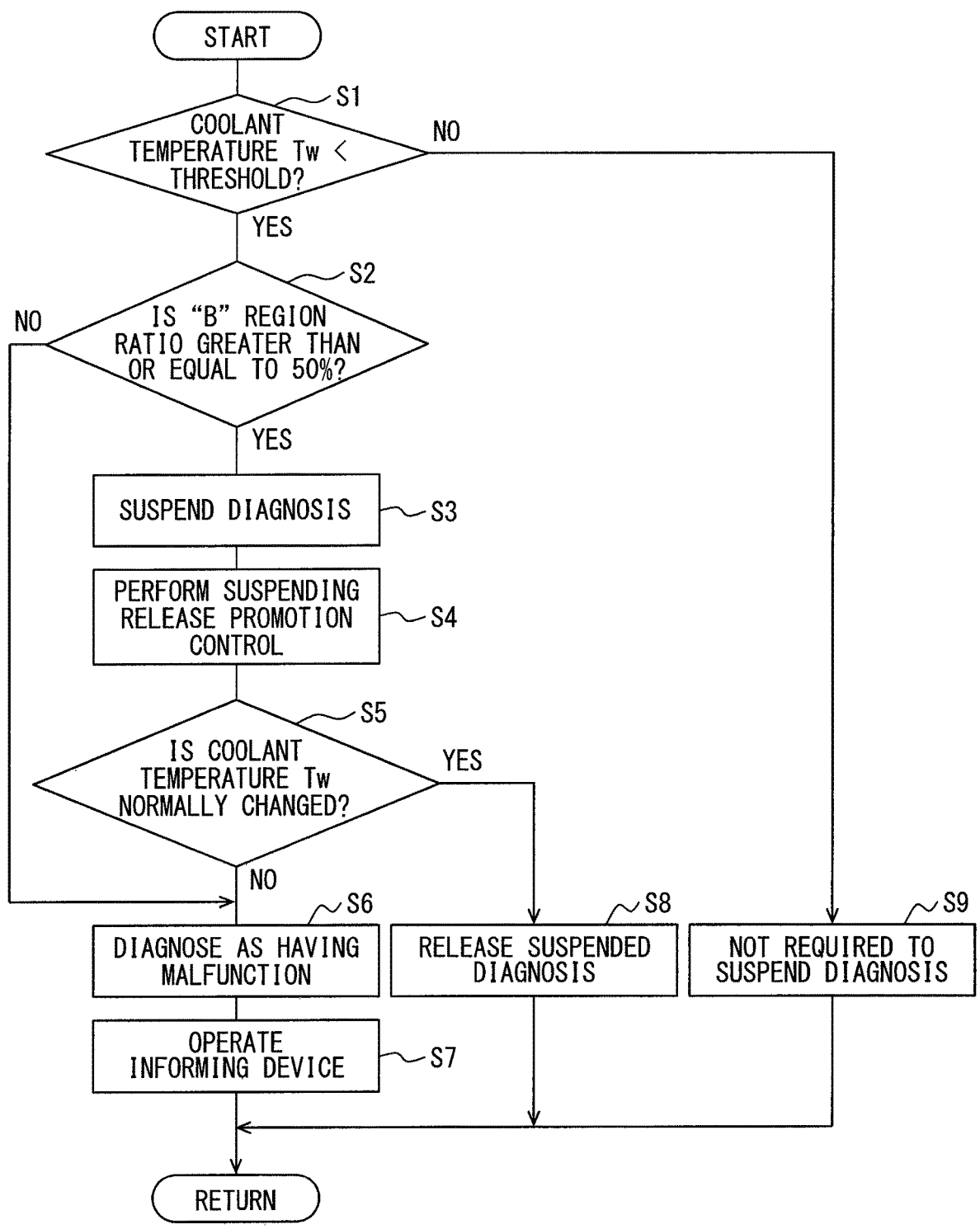
FIG. 6 is a flowchart illustrating a process performed by the ECU of FIG. 1.
Figure 7:
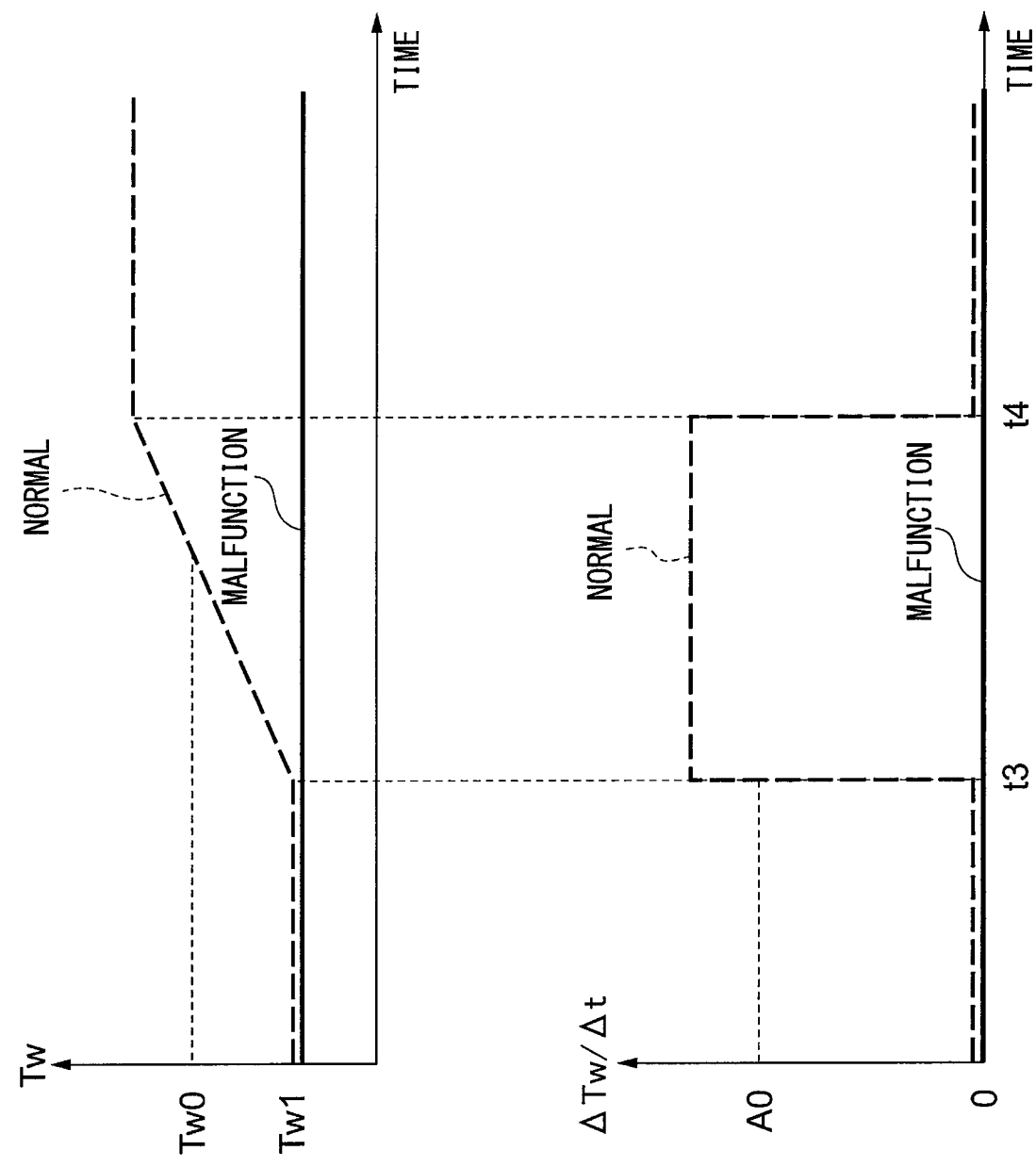
FIG. 7 is a time chart illustrating a change in the temperature of a coolant accompanied by a suspending release promotion control.

Next, the flow of a process performed by the ECU 10 will be described with reference to FIG. 6 and FIG. 7. FIG. 6 is a flowchart illustrating a process that is performed by the ECU 10 after completion of the warm-up of the engine 20. Hereinafter, a process that is specifically performed by the calculation unit 11 and the like of the ECU 10 will be generally described as being performed by the ECU 10 for simplification.

First, the ECU 10 in S1 determines whether or not a temperature Tw of the coolant is lower than a predetermined threshold. The ECU 10 proceeds to the process of S9 in a case where the temperature Tw of the coolant is determined not to be lower than the threshold (No in S1) and determines suspending a diagnosis of the thermostat 45 not to be required (permits a diagnosis). Meanwhile, the ECU 10 proceeds to the process of S2 in a case where the temperature Tw of the coolant is determined to be lower than the predetermined threshold in S1 (Yes in S1).

Next, the ECU 10 in S2 determines whether or not the ratio of operation of the engine 20 in the "B" region illustrated in FIG. 3 is greater than or equal to 50%. The ECU 10 proceeds to the process of S3 in a case where the ratio is determined to be greater than or equal to 50%.

Next, the ECU 10 in S3 suspends a diagnosis of the thermostat 45. That is, since it is determined in S2 that the engine 20 is frequently operated in the "B" region and that a concern for an erroneous result of the diagnosis is high, the ECU 10 suspends the diagnosis.

Next, the ECU 10 in the above S4 performs the suspending release promotion control. As described above, vehicle-mounted devices are controlled in the suspending release promotion control in such a manner that at least the heat receiving amount of the coolant is increased or the heat radiating amount of the coolant is decreased. The ECU 10 stops driving of the heating blower 62 of the heating device 60 in the first embodiment. Accordingly, the amount of heat of the coolant captured by air in the heater core 61 is decreased, and thus, the heat radiating amount of the coolant is decreased.

An example of the temperature Tw of the coolant in a case of performing the suspending release promotion control as described above is illustrated in FIG. 7. In FIG. 7, the temperature Tw of the coolant and the time derivative value thereof in a case where a malfunction is present in the thermostat 45 are illustrated by solid lines, and the temperature Tw of the coolant and the time derivative value thereof in a case where the thermostat 45 is normal are illustrated by broken lines.

The ECU 10 performs the above suspending release promotion control from a time point t3 to a time point t4 in a case where the temperature Tw of the coolant immediately after a diagnosis of the thermostat 45 is suspended is equal to Tw1. In this case, since the heat radiating amount of the coolant is decreased, the temperature Tw of the coolant tends to be increased if the thermostat 45 is normal. Meanwhile, performing the suspending release promotion control in a case where a malfunction is present in the thermostat 45 does not affect the temperature Tw of the coolant in a portion where the water temperature sensor 51 is arranged.

The ECU 10 determines the temperature Tw of the coolant to be normally changed if the temperature Tw of the coolant is greater than or equal to a threshold Tw0 as a result of the suspending release promotion control. The ECU 10 may determine the temperature Tw of the coolant to be normally changed if the time derivative value of the temperature Tw of the coolant is greater than or equal to a threshold A0.

FIG. 6 is referred to again for description. The ECU 10 in the subsequent S5 determines whether or not the coolant temperature is normally changed as a result of the suspending release promotion control. The ECU 10 proceeds to S8, releases a suspended diagnosis of the thermostat 45, and resumes the diagnosis in a case where the temperature Tw of the coolant tends to be increased by performing the suspending release promotion control as illustrated by the broken lines in FIG. 7 (Yes in S5). Meanwhile, the ECU 10 proceeds to the process of S6 in a case where the temperature Tw of the coolant does not tend to be increased as illustrated by a solid line in FIG. 7 even though the suspending release promotion control is performed (No in S5).

Next, the ECU 10 in S6 diagnoses the thermostat 45 as having a malfunction. The ECU 10 in the subsequent S7 causes the informing device 70 to be operated on the basis of the diagnosis and is capable of prompting a user of the vehicle 1 to perform inspection and the like.

Meanwhile, the ECU 10 proceeds to the processes of S6 and S7 in a case where the ratio of operation of the engine 20 in the "B" region is determined not to be greater than or equal to 50% in S2 (No in S2). That is, a determination can be made that a malfunction is present in the thermostat 45 also in a case where the temperature Tw of the coolant, even though lower than the threshold, is not the cause of frequent operation of the engine 20 in the "B" region. Therefore, the ECU 10 in this case as well causes the informing device 70 to be operated and prompts the user of the vehicle 1 to perform inspection and the like.

As described heretofore, the ECU 10 according to the first embodiment suspends a diagnosis performed by the diagnostic unit 141 in a case where the temperature of the discharge coolant is estimated to be lower than the threshold according to the operating condition of the vehicle 1 even if the thermostat 45 is normal. Therefore, according to the ECU 10, a diagnosis performed by the diagnostic unit 141 is suspended in a case where the vehicle 1 is operated under an operating condition in which the temperature of the discharge coolant is decreased by a cause other than a malfunction of the thermostat 45 after completion of the warm-up of the engine 20, and the thermostat 45 can be accurately diagnosed.

The ECU 10 includes the heat receiving amount calculation unit 18 that calculates the heat receiving amount Qrc of the coolant after completion of the warm-up of the engine 20 and includes the heat radiating amount calculation unit 19 that calculates the heat radiating amount Qrd of the coolant after completion of the warm-up of the engine 20. The suspending unit 15 suspends a diagnosis performed by the diagnostic unit 141 in a case where the heat radiating amount Qrd calculated by the heat radiating amount calculation unit 19 is greater than the heat receiving amount Qrc calculated by the heat receiving amount calculation unit 18.

According to this configuration, a decrease in the temperature of the discharge coolant even if the thermostat 45 is normal can be estimated on the basis that the heat radiating amount Qrd is greater than the heat receiving amount Qrc. Therefore, the thermostat 45 can be accurately diagnosed by suspending a diagnosis performed by the diagnostic unit 141 in a case where the heat radiating amount Qrd is greater than the heat receiving amount Qrc.

The heat receiving amount calculation unit 18 calculates the heat receiving amount Qrc of the coolant in a predetermined period after completion of the warm-up of the engine 20, and the heat radiating amount calculation unit 19 calculates the heat radiating amount Qrd of the coolant in the predetermined period.

According to this configuration, a decrease in the temperature of the discharge coolant even if the thermostat 45 is normal can be estimated with a decrease in processing load of the ECU 10 by providing a setting such that the heat receiving amount Qrc and the heat radiating amount Qrd of the coolant in the predetermined period are calculated.

The suspending unit 15 suspends a diagnosis performed by the diagnostic unit 141 in a case where the ratio of the time Trd, in which the heat radiating amount Qrd calculated by the heat radiating amount calculation unit 19 is greater than the heat receiving amount Qrc calculated by the heat receiving amount calculation unit 18 in the predetermined period, to the time length of the predetermined period is greater than 50%.

According to this configuration, a decrease in the temperature of the discharge coolant even if the thermostat 45 is normal can be estimated on the basis that the ratio of the time Trd, in which the heat radiating amount Qrd is greater than the heat receiving amount Qrc, to the time length of the predetermined period is greater than 50%. Therefore, the thermostat 45 can be accurately diagnosed by suspending a diagnosis performed by the diagnostic unit 141 in a case where the ratio is greater than 50%.

The ECU 10 includes the suspending release unit 16 that releases suspending performed by the suspending unit 15 on the basis of an increase in the temperature of the discharge coolant.

According to this configuration, a suspended diagnosis performed by the diagnostic unit 141 can be released in a case where the temperature of the discharge coolant is increased to the level at which a concern for an erroneous diagnosis is low, and a diagnosis of the thermostat 45 can be resumed.

The ECU 10 includes the suspending release promotion unit 17 that performs the suspending release promotion control which at least increases the heat receiving amount Qrc of the coolant or decreases the heat radiating amount Qrd of the coolant in a case where a diagnosis performed by the diagnostic unit 141 is suspended.

According to this configuration, a diagnosis of the thermostat 45 performed by the diagnostic unit 141 can be promptly resumed by actively increasing the temperature of the discharge coolant.

The ECU 10 includes the sub-diagnostic unit 142 that diagnoses the thermostat 45 in a case where a diagnosis performed by the diagnostic unit 141 is suspended. The sub-diagnostic unit 142 diagnoses the thermostat 45 as having a malfunction in a case where the temperature of the discharge coolant is not increased even though the suspending release promotion unit 17 performs the suspending release promotion control.

According to this configuration, the presence of a malfunction of the thermostat 45 can be diagnosed on the basis of a change in the temperature of the discharge coolant when a diagnosis of the thermostat 45 is desired to be resumed by performing the suspending release promotion control.

An embodiment of the present disclosure is described heretofore with reference to specific examples. However, the present disclosure is not limited to the specific examples. That is, the specific examples after appropriately modified in design by those skilled in the art are to be included in the scope of the present disclosure, provided that the modified specific examples include the features of the present disclosure. Each element included in above each specific example and the arrangement, the material, the condition, the shape, the size, and the like thereof are not limited to the illustrations and can be appropriately modified.

For example, while the suspending release promotion unit 17 stops driving of the heating blower 62 of the heating device 60 as the suspending release promotion control in the first embodiment, the present disclosure is not limited thereto. That is, the suspending release promotion unit 17, as the suspending release promotion control, may increase the heat receiving amount Qrc of the coolant by not permitting an idle stop operation that stops supply of fuel to the engine 20 during a stoppage of the vehicle 1.

Such an idle stop operation is widely used as one of solutions to improve fuel consumption of the vehicle 1. Since new heat of combustion is not generated in the engine 20 during the idle stop operation, the heat receiving amount Qrc of the coolant is decreased.

Meanwhile, fuel is supplied to the engine 20 during a stoppage of the vehicle 1 by not permitting the idle stop operation as the suspending release promotion control. Thus, new heat of combustion is generated, and the heat receiving amount Qrc of the coolant can be increased. As a result, a diagnosis of the thermostat 45 performed by the diagnostic unit 141 can be promptly resumed by increasing the temperature of the discharge coolant.

The suspending release promotion unit 17, as the suspending release promotion control, may increase the heat receiving amount Qrc of the coolant by increasing the engine speed during a stoppage of the vehicle 1.

The amount of fuel supplied to the engine 20 is required to be increased in order to increase the engine speed during a stoppage of the vehicle 1. Supplying a great amount of fuel to the engine 20 allows more heat of combustion to be generated and thus can increase the heat receiving amount Qrc of the coolant. As a result, a diagnosis of the thermostat 45 performed by the diagnostic unit 141 can be promptly resumed by increasing the temperature of the discharge coolant.

The suspending release promotion unit 17 may increase the heat receiving amount Qrc of the coolant by restraining a fuel cut-off operation that stops supply of fuel to the engine 20 during traveling of the vehicle 1.

The fuel cut-off operation that stops supply of fuel to the engine 20 during traveling of the vehicle 1 is also widely used as one of solutions to improve fuel consumption of the vehicle 1. Since new heat of combustion is not generated in the engine 20 during the fuel cut-off operation, the heat receiving amount Qrc of the coolant is decreased.

Meanwhile, fuel is supplied to the engine 20 by the suspending release promotion unit 17 restraining the fuel cut-off operation as the suspending release promotion control. Thus, new heat of combustion is generated, and the heat receiving amount Qrc of the coolant can be increased. As a result, a diagnosis of the thermostat 45 performed by the diagnostic unit 141 can be promptly resumed by increasing the temperature of the discharge coolant.

The suspending release promotion unit 17 may increase the heat receiving amount of the coolant by restraining driving of the motor 30 that assists the engine 20 by generating a torque during traveling of the vehicle 1.

The amount of fuel required to be supplied to the engine 20 is smaller in a state where the vehicle 1 travels using the torques generated by the engine 20 and the motor 30 than in a state where the vehicle 1 travels using only the torque generated by the engine 20. Thus, the heat of combustion generated in the engine 20 is also small, and the heat receiving amount Qrc of the coolant is decreased.

Meanwhile, the amount of fuel supplied to the engine 20 is increased by the suspending release promotion unit 17 restraining driving of the motor 30 as the suspending release promotion control. Thus, a great amount of heat of combustion is generated, and the heat receiving amount Qrc of the coolant can be increased. As a result, a diagnosis of the thermostat 45 performed by the diagnostic unit 141 can be promptly resumed by increasing the temperature of the discharge coolant.

The suspending release promotion unit 17 may increase the heat receiving amount Qrc of the coolant by retarding the ignition timing in the engine 20.

The suspending release promotion unit 17 retarding the fuel ignition timing in the engine 20 as the suspending release promotion control decreases kinetic energy conversion efficiency in the engine 20 and allows an increase in heat energy. As a result, a diagnosis of the thermostat 45 performed by the diagnostic unit 141 can be promptly resumed by increasing the temperature of the discharge coolant.

Second Embodiment

Figure 8:
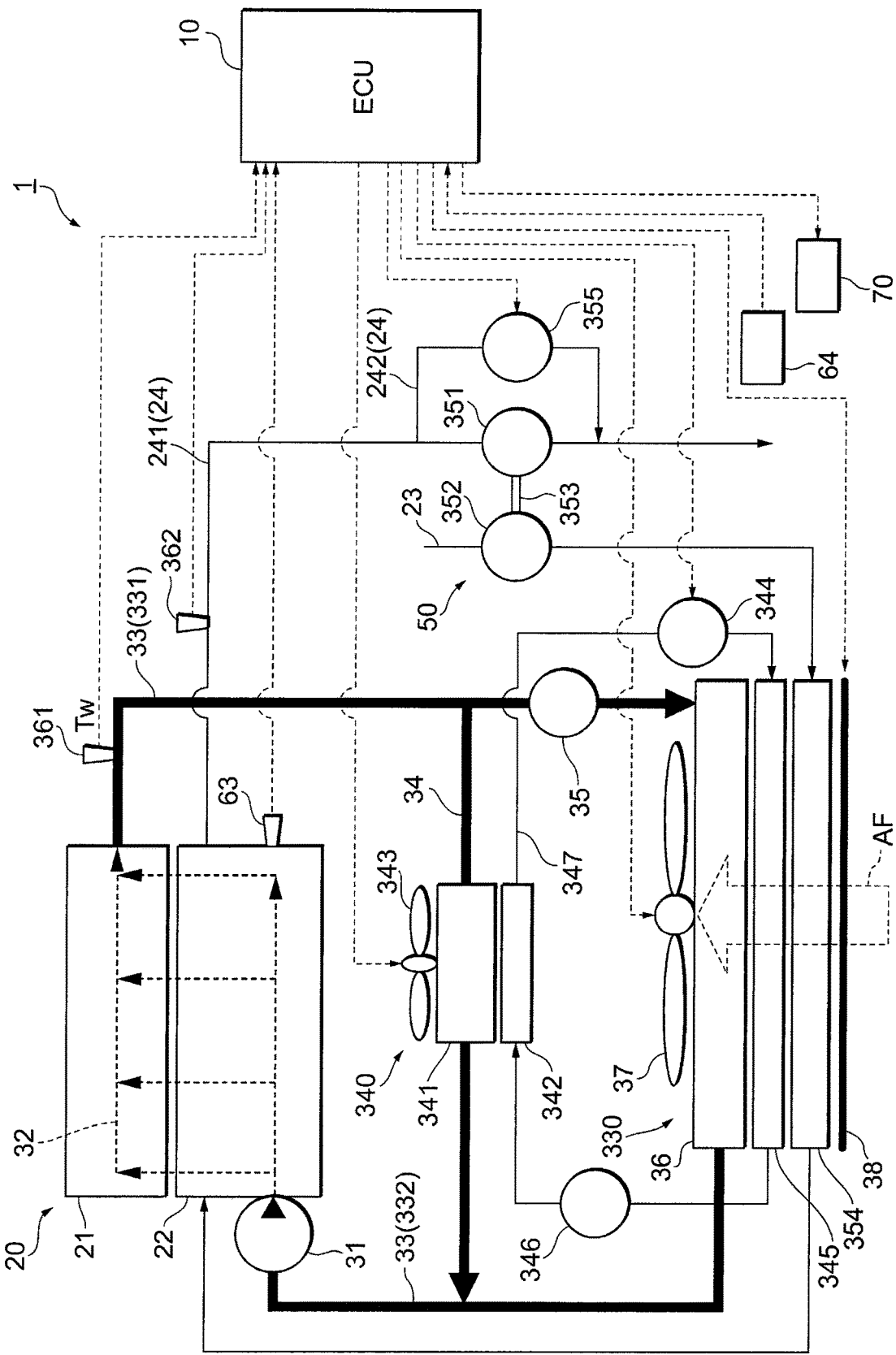
FIG. 8 is a schematic diagram illustrating configurations of a diagnostic device according to a second embodiment and a vehicle equipped with the diagnostic device.

An ECU 10 according to a second embodiment and a vehicle 1 equipped with the ECU 10 will be described with reference to FIG. 8. The vehicle 1 is equipped with an engine 20 which is an internal combustion engine as a power source.

The engine 20 is, for example, a reciprocating engine that uses gasoline as fuel. The engine 20 includes a cylinder head 21 and a cylinder block 22. The engine 20 includes multiple cylinders not illustrated. Each cylinder generates a torque by repeating each stroke of an intake stroke, a compression stroke, a combustion stroke, and an exhaust stroke. The torque is output through a crankshaft, not illustrated, included in the engine 20 and is used for traveling of the vehicle 1.

Each cylinder of the engine 20 in the intake stroke takes combustion air from the outside through an air introducing passage 23. Each cylinder of the engine 20 discharges gas generated in the cylinder in the combustion stroke to a discharge gas flow channel 24 in the exhaust stroke. Both of the air introducing passage 23 and the discharge gas flow channel 24 are air channels provided in pipes. The discharge gas flow channel 24 includes a first discharge flow channel 241 and a second discharge flow channel 242. The second discharge flow channel 242 is provided to branch off from the first discharge flow channel 241 and to join the first discharge flow channel 241 on the downstream side thereof. Accordingly, the second discharge flow channel 242 is a channel that detours a turbine 351 provided in the first discharge flow channel 241.

The vehicle 1 is also equipped with a cooling device 330, an air conditioning device 340, and a supercharger device 50.

The cooling device 330 is a device that cools the engine 20 generating a great amount of heat of combustion in the combustion stroke and maintains the engine 20 at an appropriate temperature. The cooling device 330 includes a water pump 31, an engine cooling flow channel 32, a circulation flow channel 33, a bypass flow channel 34, a radiator 36, a radiator fan 37, and a radiator shutter 38.

The water pump 31 is a fluid machine that pumps a coolant. The coolant contains an LLC which is an antifreeze. The water pump 31 is rotationally driven by receiving a part of the output of the engine 20 through the crankshaft. Rotational driving of the water pump 31 pressurizes the coolant supplied from the upstream side of the water pump 31, and the coolant is supplied to the downstream side of the water pump 31.

The engine cooling flow channel 32 is a coolant channel that is provided in the engine 20. For example, the engine cooling flow channel 32 is provided in the cylinder block 22 to enclose each cylinder.

The circulation flow channel 33 is a coolant channel that is provided in a pipe. The pipe has one end connected to the downstream end of the engine cooling flow channel 32 and the other end connected to the water pump 31. Accordingly, the circulation flow channel 33 with the engine cooling flow channel 32 constitutes a channel that circulates the coolant to the engine 20. The circulation flow channel 33 includes a first circulation flow channel 331 that extends from the downstream end of the engine cooling flow channel 32 to the radiator 36 described later and a second circulation flow channel 332 that extends from the radiator 36 to the water pump 31.

The bypass flow channel 34 is a coolant channel that is provided in a pipe. The pipe has one end connected midway of the pipe constituting the first circulation flow channel 331 and the other end connected midway of the pipe constituting the second circulation flow channel 332. Accordingly, the bypass flow channel 34 constitutes a channel that branches off from the first circulation flow channel 331 and joins the second circulation flow channel 332 midway of the second circulation flow channel 332 by detouring the radiator 36.

The radiator 36 is a heat exchanger that is provided in the circulation flow channel 33. The radiator 36 includes a tube and a corrugated fin, all of which are not illustrated. The tube is a metal tubular member in which the coolant flows. The corrugated fin is provided by folding a metal plate. The radiator 36 is provided by alternately stacking multiple tubes and multiple corrugated fins.

The radiator fan 37 is a blower that is provided adjacent to the radiator 36. When the radiator fan 37 is rotationally driven by receiving a control signal transmitted by the ECU 10, air is taken through a grille, not illustrated, of the vehicle 1 as illustrated by an arrow AF. The air flows between adjacent tubes of the radiator 36 and passes through the radiator 36 and exchanges heat with the coolant that flows in the tubes. Accordingly, the heat of the coolant flowing in the radiator 36 is radiated, and the temperature of the coolant is decreased.

The radiator shutter 38 is provided on the upstream side of the radiator 36 in the flow direction of air illustrated by the arrow AF. The radiator shutter 38 is configured to receive a control signal transmitted by the ECU 10 and change the opening ratio thereof on the basis of the control signal. Changing the opening ratio of the radiator shutter 38 allows the flow rate of air passing through the radiator 36 and the area in which heat is exchanged between the coolant and air in the radiator 36 to be changed.

A thermostat 35 is arranged on the downstream side and the radiator 36 side of a part at which the pipe constituting the bypass flow channel 34 branches off from the pipe constituting the circulation flow channel 33. The thermostat 35 includes a valve body not illustrated. The valve body in the thermostat 35 is configured to be moved in response to the temperature of the coolant in the vicinity thereof. The thermostat 35 is configured to be switched between a closed state and an opened state by the movement of the valve body. The thermostat 35, on the basis of the temperature of the coolant, adjusts the ratio of the flow rate of the coolant supplied to the engine 20 through the radiator 36 and the flow rate of the coolant supplied to the engine 20 through the bypass flow channel 34.

The air conditioning device 340 is a device that adjusts the temperature in the vehicle interior of the vehicle 1. The air conditioning device 340 includes a refrigerant flow channel 347 that circulates a refrigerant. The air conditioning device 340 also includes a heater core 341, an evaporator 342, a blower 343, a compressor 344, a condenser 345, and an expansion valve 346.

The heater core 341 is a heat exchanger that is provided midway of the bypass flow channel 34. The heater core 341 includes a tube and a corrugated fin, all of which are not illustrated. The tube is a metal tubular member in which the coolant flows. The corrugated fin is provided by folding a metal plate. The heater core 341 is provided by alternately stacking multiple tubes and multiple corrugated fins.

The evaporator 342 is a heat exchanger that is provided in the refrigerant flow channel 347. A flow channel, not illustrated, in which the refrigerant flows, is provided in the evaporator 342. The liquid-phase refrigerant flowing in the flow channel in the evaporator 342 allows the evaporator 342 to capture heat from air flowing on the surface of the evaporator 342. The liquid-phase refrigerant is evaporated by the captured heat, and the air flowing on the surface of the evaporator 342 is cooled.

The blower 343 is a fan that is provided in the vicinity of the heater core 341 and the evaporator 342. When the blower 343 is rotationally driven by receiving a control signal transmitted by the ECU 10, air is taken from the vehicle interior or from the vehicle exterior the vehicle and is supplied to the heater core 341 and the evaporator 342. The air exchanges heat with the heater core 341 and the evaporator 342 when passing through the heater core 341 and the evaporator 342, and the temperature of the air is adjusted. The air of which the temperature is adjusted is supplied into the vehicle interior.

The compressor 344 is a fluid machine that is provided in the refrigerant flow channel 347. When the compressor 344 is rotationally driven by receiving a control signal transmitted by the ECU 10, the refrigerant discharged from the evaporator 342 is compressed by the compressor 344. The compressed refrigerant is supplied to the downstream side of the refrigerant flow channel 347.

The condenser 345 is a heat exchanger that is provided in the refrigerant flow channel 347. The condenser 345 is provided on the upstream side of the radiator 36 in the flow direction of air illustrated by the arrow AF. A flow channel, not illustrated, in which the refrigerant flows, is provided in the condenser 345. The refrigerant compressed by the compressor 344 and supplied to the downstream side is supplied to the flow channel in the condenser 345. The refrigerant that flows in the flow channel radiates heat by exchanging heat with air that passes through the condenser 345 as illustrated by the arrow AF.

The expansion valve 346 is a valve mechanism that is provided in the refrigerant flow channel 347. The expansion valve 346 depressurizes the refrigerant that is supplied to the evaporator 342 by passing through the condenser 345.

The supercharger device 50 is a device that compresses air of the air introducing passage 23 and supplies compressed air to the engine 20. The supercharger device 50 includes a turbine 351, an air compressor 352, an intercooler 354, and a wastegate valve 355.

The turbine 351 is a motor that converts the energy of a fluid into mechanical power. The turbine 351 is provided in the first discharge flow channel 241 of the discharge gas flow channel 24. When discharge gas discharged from each cylinder of the engine 20 flows in the first discharge flow channel 241 and passes through the turbine 351, the turbine 351 is rotated by using the energy of the discharge gas.

The air compressor 352 is a fluid machine that compresses a fluid by rotation. The air compressor 352 is provided in the air introducing passage 23. The air compressor 352 is connected with the turbine 351 by a shaft 353. When the turbine 351 is rotated by using the energy of the discharge gas flowing in the first discharge flow channel 241, a rotational torque thereof is transmitted to the air compressor 352 by the shaft 353. Accordingly, the air compressor 352 is rotated and compresses the air in the air introducing passage 23 and supplies the compressed air to the downstream side of the air introducing passage 23.

The intercooler 354 is a heat exchanger that is provided in a portion of the air introducing passage 23 on the downstream side of the air compressor 352. A flow channel, not illustrated, in which air flows, is provided in the intercooler 354. Air that is compressed by the air compressor 352 to have a high temperature is supplied to the flow channel in the intercooler 354. The air flowing in the flow channel radiates heat by exchanging heat with air flowing outside of the intercooler 354, and the temperature thereof is decreased.

The wastegate valve 355 is a valve mechanism that opens and closes a flow channel. The wastegate valve 355 is provided in the second discharge flow channel 242 of the discharge gas flow channel 24. The wastegate valve 355 is configured to receive a control signal transmitted by the ECU 10 and change the opening ratio thereof on the basis of the control signal. Changing the opening ratio of the wastegate valve 355 allows the ratio of the flow rate of discharge gas flowing in the first discharge flow channel 241 of the discharge gas flow channel 24 to the turbine 351 side and the flow rate of discharge gas flowing to the second discharge flow channel 242 side from the first discharge flow channel 241 to be adjusted. Accordingly, the rotating speed of the turbine 351 is controlled, a stable supercharging pressure is obtained, and the turbine 351 can be protected from damage.

Next, operation of the cooling device 330, the air conditioning device 340, and the supercharger device 50 configured as described heretofore will be described with reference to FIG. 8.

Operation of Cooling Device 330

When the engine 20 is started by receiving supply of fuel, a great amount of heat of combustion generated in the combustion stroke gradually increases the temperature of the engine 20. The water pump 31 receives the output of the engine 20 through the crankshaft and is rotationally driven. Accordingly, the coolant of the second circulation flow channel 332 is pressurized and is supplied to the engine cooling flow channel 32 of the engine 20.

The coolant exchanges heat with the cylinder head 21 and the cylinder block 22 while flowing in the engine cooling flow channel 32. Accordingly, the cylinder head 21 and the cylinder block 22 lose heat and are cooled, while the coolant receives heat and the temperature thereof is increased.

The temperature of the engine 20 is comparatively low in a state immediately after the engine 20 is started. Thus, the temperature of the coolant discharged from the engine cooling flow channel 32 and flowing in the first circulation flow channel 331 (hereinafter, referred to as "discharge coolant" as well) is also comparatively low. In this case, the valve body of the thermostat 35 is arranged in a position closing the first circulation flow channel 331.

Accordingly, the discharge coolant is not supplied to the radiator 36 and flows in the bypass flow channel 34 and is supplied to the second circulation flow channel 332. That is, the coolant circulates while detouring the radiator 36 in a state where the temperature of the engine 20 is comparatively low. In this case, since the discharge coolant is not cooled by the radiator 36, the engine 20 is not excessively cooled by the coolant. Therefore, a warm-up upon starting the engine 20 is not impeded by the coolant.

Meanwhile, the temperature of the discharge coolant is comparatively high in a state where the temperature of the engine 20 is greater than or equal to an appropriate temperature. In this case, the valve body of the thermostat 35 is arranged in a position opening the first circulation flow channel 331.

Accordingly, a part of the discharge coolant is supplied to the radiator 36, and the remaining part flows in the bypass flow channel 34 and is supplied to the second circulation flow channel 332. That is, in a state where the temperature of the engine 20 is greater than or equal to an appropriate temperature, the part of the discharge coolant supplied to the radiator 36 is cooled, and the remaining part of the discharge coolant flows by detouring the radiator 36. These coolants join each other in the second circulation flow channel 332, and the joined coolant is pressurized by the water pump 31 and is again supplied to the engine cooling flow channel 32.

Operation of Air Conditioning Device 340

Air that is taken from the cabin or from the outside of the vehicle is first cooled by passing through the evaporator 342 when the air conditioning device 340 heats the interior of the vehicle 1. Water vapor included in the air becomes condensed water and is removed upon this cooling, thereby dehumidifying the air. The air conditioning device 340 causes the dehumidified air to subsequently pass through the heater core 341 and exchange heat with the high temperature discharge coolant flowing in the heater core 341. The air of which the temperature is increased by the exchange of heat is guided into the cabin of the vehicle 1 by a duct not illustrated, thereby heating the vehicle interior.

Meanwhile, the air that is cooled by passing through the evaporator 342 is not caused to pass through the heater core 341, or caused to barely pass through the heater core 341, and is guided into the cabin when the air conditioning device 340 cools the vehicle interior of the vehicle 1. Accordingly, the air cooled in the evaporator 342 is supplied into the vehicle interior, and the inside of the cabin is cooled.

Operation of Supercharger Device 50

As described above, when discharge gas discharged from the engine 20 rotates the turbine 351 by passing therethrough, the air compressor 352 is rotated as a result. The air in the air introducing passage 23 is compressed by the rotating air compressor 352 to have a high temperature and a high pressure and is supplied to the intercooler 354 provided on the downstream side of the air introducing passage 23.

The air supplied to the intercooler 354 flows in the flow channel provided in the intercooler 354. The air flowing in the flow channel radiates heat by exchanging heat with air flowing outside of the intercooler 354, and the temperature thereof is decreased. The high pressure air of which the temperature is decreased is supplied to the engine 20 by the air introducing passage 23 and is used for combustion of fuel. Thus, combustion efficiency is increased, and the output of the engine 20 can be increased.

Next, the electronic control unit (ECU) 10 will be described with reference to FIG. 9. A part or the entirety of the ECU 10 includes an analog circuit or a digital processor. Either way, a functional control block is included in the ECU 10 in order to achieve a function of outputting a control signal on the basis of a received signal.

Figure 9:
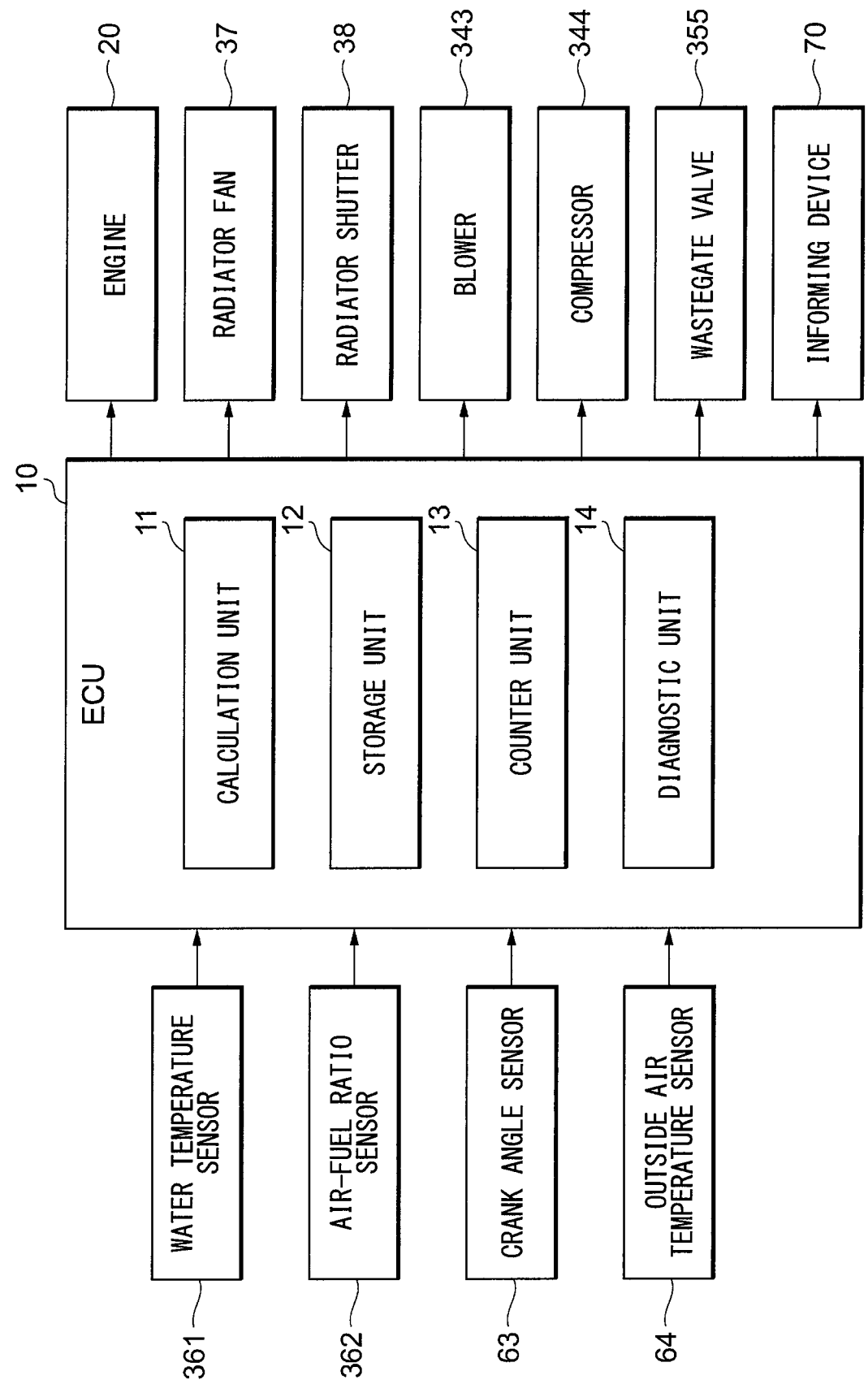
FIG. 9 is a functional block diagram illustrating an ECU of FIG. 8.

FIG. 9 illustrates a functional control block diagram of the ECU 10. Software modules that are incorporated into the analog circuit or the digital processor constituting the ECU 10 are not necessarily required to be divided as the control blocks illustrated in FIG. 9. That is, in actuality, analog circuits or modules may be configured to function as the multiple control blocks illustrated in FIG. 9 or may be further subdivided. The actual configuration in the ECU 10 can be appropriately modified by those skilled in the art, provided that the ECU 10 is configured to be capable of performing processes described later.

The ECU 10 is electrically connected with each sensor of a water temperature sensor 361, an air-fuel ratio sensor 362, a crank angle sensor 63, and an outside air temperature sensor 64. The water temperature sensor 361 is a sensor that is arranged in the first circulation flow channel 331 (refer to FIG. 8) and generates and transmits a signal corresponding to a temperature Tw of the discharge coolant. The air-fuel ratio sensor 362 is a sensor that is provided in the discharge gas flow channel 24 (refer to FIG. 8) and generates and transmits a signal corresponding to the oxygen concentration of discharge gas. The crank angle sensor 63 is a sensor that is attached to the engine 20 (refer to FIG. 8) and generates and transmits a signal corresponding to the angle of the crankshaft. The outside air temperature sensor 64 is a sensor that is arranged in a portion of the vehicle 1 which is in contact with the outside air (refer to FIG. 8) and generates and transmits a signal corresponding to the outside air temperature.

The ECU 10 is also electrically connected with each vehicle-mounted device of the engine 20, the radiator fan 37, the radiator shutter 38, the blower 343, the compressor 344, the wastegate valve 355, and an informing device 70. The informing device 70 is a device that informs an occupant of the vehicle 1 in various manners. The informing device 70 includes known devices such as a display panel and a buzzer. The ECU 10 transmits a control signal to control operation of each vehicle-mounted device.

The meaning of the expression "electrically connected" used in the present application is not limited to a form in which one is connected to another by a signal line and may include a form in which one is capable of communicating with another in a wireless manner.

The ECU 10 includes a calculation unit 11, a storage unit 12, a counter unit 13, and a diagnostic unit 14.

The calculation unit 11 is a part that performs various calculations required for controlling each vehicle-mounted device. Specifically, the calculation unit 11, in response to a driver stepping on an accelerator not illustrated, performs a calculation that causes the engine 20 to generate a torque. The calculation unit 11 performs a predetermined calculation on the basis of a signal received from the water temperature sensor 361 and obtains the temperature of the discharge coolant. The calculation unit 11 performs a predetermined calculation on the basis of a signal received from the air-fuel ratio sensor 362 and calculates the air-fuel ratio in the cylinders of the engine 20, the flow rate of air supplied into the cylinders, and the like. The calculation unit 11 performs a predetermined calculation on the basis of a signal received from the crank angle sensor 63 and obtains the engine speed. The calculation unit 11 performs a predetermined calculation on the basis of a signal received from the outside air temperature sensor 64 and obtains the outside air temperature. The calculation unit 11, as described later, calculates the amount of heat transmitted per unit time from the engine 20 to the coolant (hereinafter, referred to as "heat receiving amount" as well) on the basis of the engine speed and the like. The calculation unit 11, as described later, calculates the amount of heat radiated per unit time from the coolant to the outside (hereinafter, referred to as "heat radiating amount" as well) on the basis of the outside air temperature and the like.

The storage unit 12 is a part that stores various types of information. The storage unit 12 includes, for example, a non-volatile memory. The storage unit 12 stores information such as a map in advance. The information is read by the calculation unit 11 and is used for calculations. The storage unit 12 is capable of storing results of calculations of the calculation unit 11.

The counter unit 13 is a part that performs various types of counting. The counter unit 13 counts, for example, the time length in which the engine 20 is operated in a specific operation region of multiply divided operation regions of the engine 20.

The diagnostic unit 14 is a part that diagnoses the thermostat 35. Specifically, the diagnostic unit 14 diagnoses the presence of a malfunction that the valve body of the thermostat 35 cannot be normally moved and is not switched between the above closed state and the opened state.

Figure 10:
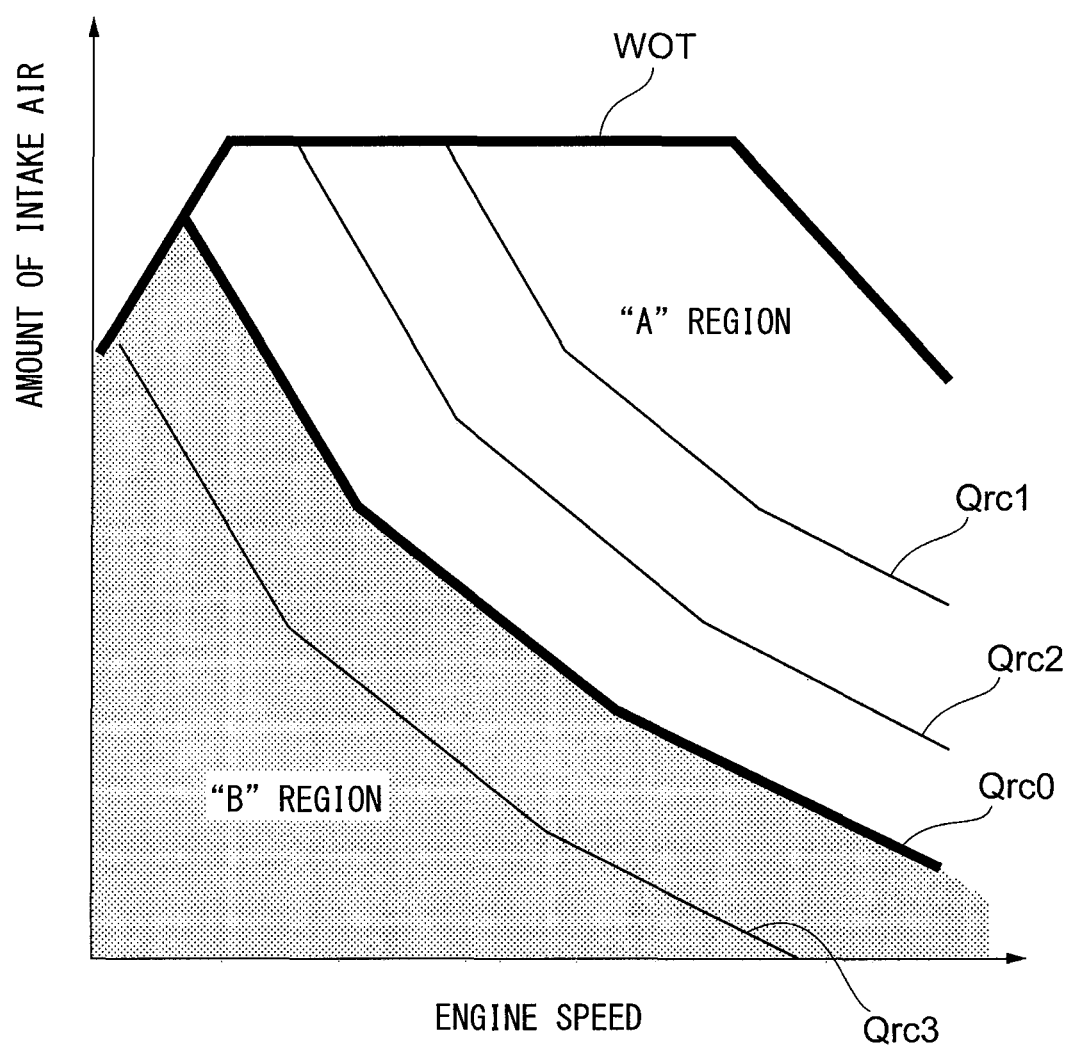
FIG. 10 is a descriptive diagram illustrating operation regions of an engine of FIG. 8.

FIG. 10 illustrates a map of a heat receiving amount Qrc in which the engine speed is plotted on the horizontal axis and the amount of air taken into the engine 20 is plotted on the vertical axis. The map of the heat receiving amount Qrc is stored in the storage unit 12 of the ECU 10. The amount of air taken into the engine 20 at each engine speed has upper limit values illustrated by a solid line WOT (wide open throttle; the wide opened state of a throttle valve).

The heat receiving amount Qrc of the coolant in a case where the engine 20 is operated along solid lines Qrc1, Qrc2, Qrc0, and Qrc3 is respectively Qrc1, Qrc2, Qrc0, and Qrc3. The values of the heat receiving amounts Qrc1, Qrc2, Qrc0, and Qrc3 decrease in this order. That is, the heat receiving amount Qrc of the coolant has a greater value as the region in which the engine 20 is operated moves upward and rightward in the map illustrated in FIG. 10. The same map as the map illustrated in FIG. 10 can be created by plotting a torque generated by the engine 20 on the vertical axis instead of the amount of air taken into the engine 20.

The heat receiving amount Qrc of the coolant is greater than a heat radiating amount Qrd in a case where the engine 20 is operated in an "A" region where the heat receiving amount Qrc of the coolant has a greater value than Qrc0 and has a smaller value than the solid line WOT (that is, a region to which the heat receiving amounts Qrc1 and Qrc2 belong). In this case, the temperature of the discharge coolant tends to be increased on the basis of heat balance.

Meanwhile, the heat receiving amount Qrc of the coolant is smaller than the heat radiating amount Qrd in a case where the engine 20 is operated in a "B" region where the heat receiving amount Qrc of the coolant has a smaller value than Qrc0 and has a smaller value than the solid line WOT (that is, a region to which the heat receiving amount Qrc3 belongs). In this case, the temperature of the discharge coolant tends to be decreased on the basis of heat balance. That is, the heat receiving amount Qrc0 is a threshold as a boundary at which the temperature of the discharge coolant is changed to be increased or decreased.

It is difficult to determine whether a decrease in the temperature of the discharge coolant while the engine 20 is operated in the "B" region is due to a malfunction of the thermostat 35 or other causes. Therefore, if the thermostat 35 is diagnosed in such a state, a concern for an erroneous diagnosis result is increased. A diagnosis of the thermostat 35 is preferably suspended in a case where the frequency of the engine 20 being operated in the "B" region is high.

Next, determination of permitting or suspending a diagnosis of the thermostat 35 will be described with reference to FIG. 11 and FIG. 12.

Figure 11:
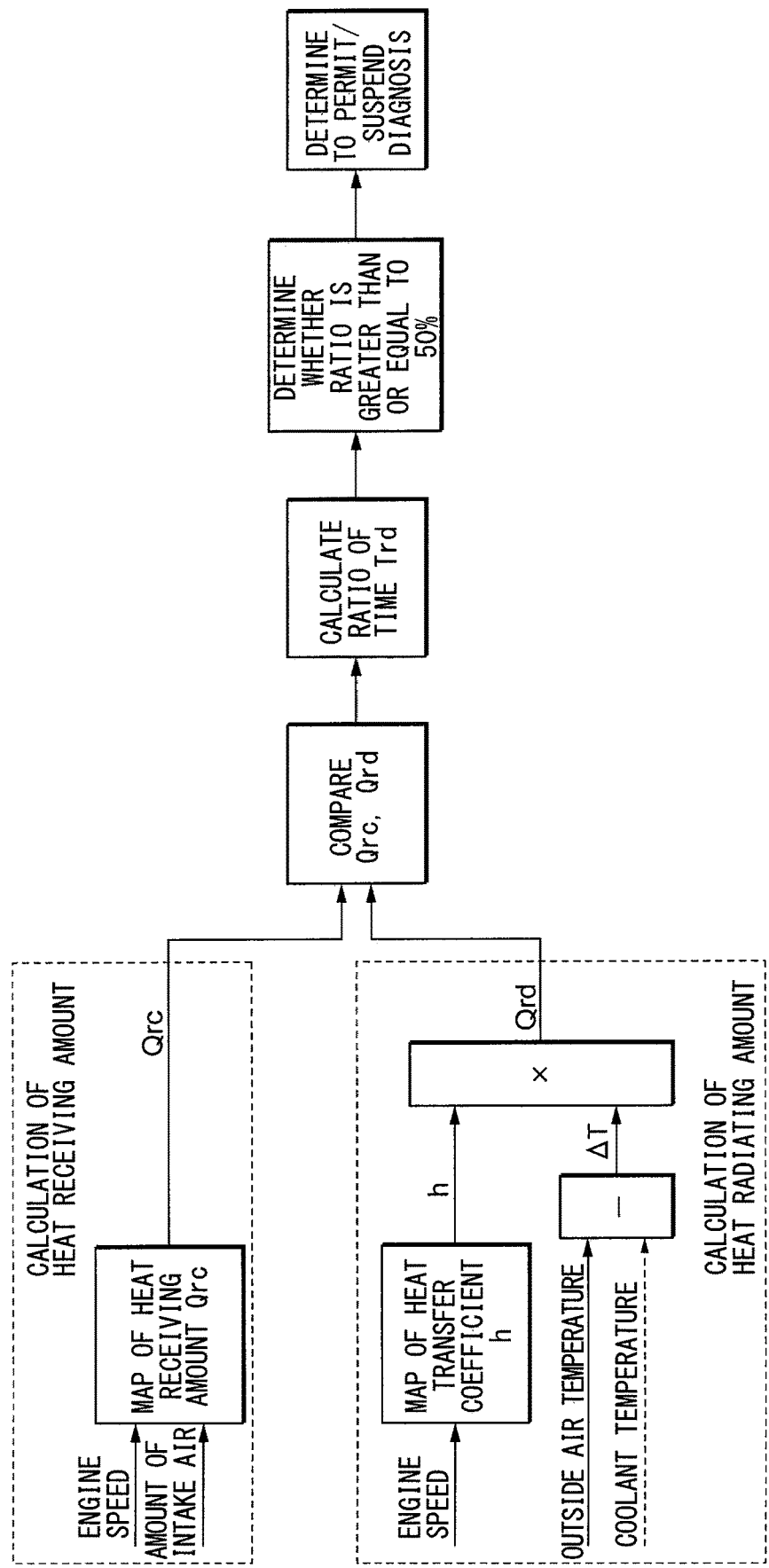
FIG. 11 is a descriptive diagram illustrating a determination logic for permitting or suspending a diagnosis performed by the ECU of FIG. 8.

The calculation unit 11 (refer to FIG. 9) of the ECU 10 compares the engine speed and the amount of air taken into the engine 20 with the map of the heat receiving amount Qrc stored in the storage unit 12 as illustrated in FIG. 11. Accordingly, the heat receiving amount Qrc of the coolant in the operational state of the engine 20 is obtained.

The calculation unit 11 of the ECU 10 compares the engine speed with a map of a heat transfer coefficient "h". The heat transfer coefficient "h" is a constant that is used when the amount of heat transferred from the coolant to the outside air is calculated. The heat transfer coefficient "h" is experimentally determined in advance considering material properties and the shapes of the pipes constituting the circulation flow channel 33 and the bypass flow channel 34 and correlates with the flow speed of the coolant. Since the water pump 31 that pumps the coolant is rotationally driven by receiving the output of the engine 20 in the present embodiment, the flow speed of the coolant correlates with the engine speed. Therefore, the engine speed and the heat transfer coefficient "h" at the engine speed are associated with each other in the map of the heat transfer coefficient "h". The heat transfer coefficient "h" is obtained by comparing the engine speed with the map of the heat transfer coefficient "h".

The calculation unit 11 calculates a temperature difference $\Delta T$ that is the difference between the outside air temperature and the temperature of the coolant. The calculation unit 11 obtains the heat radiating amount Qrd of the coolant by multiplying the temperature difference $\Delta T$ by the heat transfer coefficient "h".

The ECU 10 compares the heat receiving amount Qrc of the coolant and the heat radiating amount Qrd obtained as described heretofore. In a case where the heat radiating amount Qrd is greater than the heat receiving amount Qrc, the engine 20 is operated in the "B" region illustrated in FIG. 10, and the temperature of the discharge coolant tends to be decreased.

The ECU 10, during a predetermined period in which the engine 20 is operated, calculates a time Trd in which the heat radiating amount Qrd is greater than the heat receiving amount Qrc and calculates the ratio of the time Trd to the time length of the predetermined period. The ECU 10 determines whether or not the ratio is greater than or equal to 50%. In a case where the ratio is greater than or equal to 50%, the engine 20 is frequently operated in the "B" region, and a concern for an erroneous result of a diagnosis of the thermostat 35 is high. Thus, the diagnostic unit 14 of the ECU 10 suspends a diagnosis of the thermostat 35. Meanwhile, in a case where the ratio of the time Trd to the time length of the predetermined period is smaller than 50%, a concern for an erroneous result of a diagnosis of the thermostat 35 is low. Thus, the diagnostic unit 14 of the ECU 10 does not suspend a diagnosis (that is, permits a diagnosis).

Figure 12:
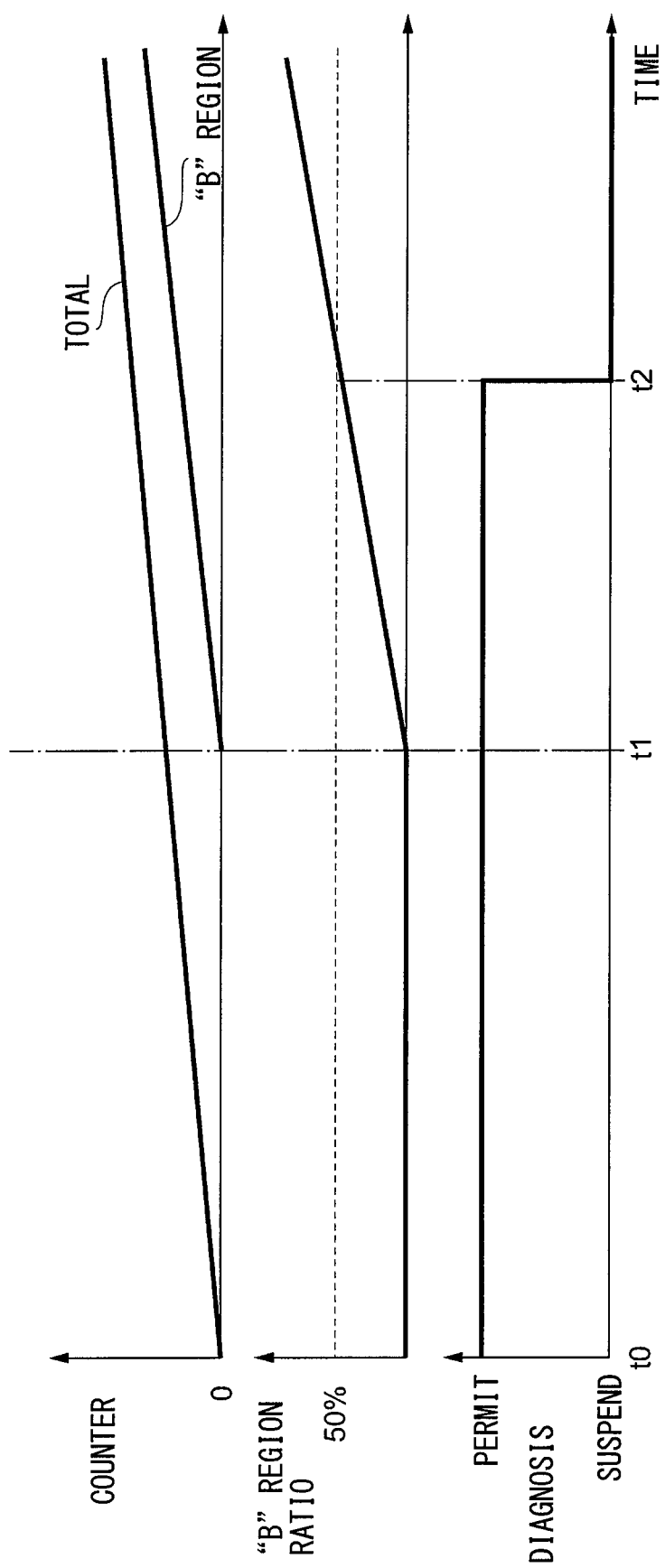
FIG. 12 is a time chart illustrating a change in permitting or suspending a diagnosis performed by the ECU of FIG. 8.

FIG. 12 illustrates a change in permitting or suspending a diagnosis of the thermostat 35 and a change in time. The counter unit 13 (refer to FIG. 9) of the ECU 10 counts the time of operation of the engine 20 from a time point t0. The engine 20 is not operated in the "B" region illustrated in FIG. 10 from the time point t0 to a time point t1. Thus, the ratio of the time Trd (a line illustrated as "B region" in FIG. 12) to the time length of operation of the engine 20 (a line illustrated as "total" in FIG. 12) is smaller than 50%. In this case, the diagnostic unit 14 of the ECU 10 does not suspend a diagnosis (that is, permits a diagnosis).

When, for example, new heat of combustion generated in the engine 20 is decreased at the time point t1, the heat receiving amount of the coolant is decreased, and the frequency of the engine 20 being operated in the "B" region is gradually increased. The counter unit 13 of the ECU 10 starts counting the time Trd in which the engine 20 is operated in the "B" region.

The diagnostic unit 14 of the ECU 10 suspends a diagnosis when the ratio of the time Trd to the total time length of operation of the engine 20 reaches 50% at a time point t2. Accordingly, a diagnosis of the thermostat 35 is suspended in a situation where a concern for an erroneous diagnosis is high. That is, the temperature of the discharge coolant in the operating condition of the engine 20 after the time point t2 is decreased from the temperature of the discharge coolant in the operating condition of the engine 20 until the time point t2.

Figure 13:
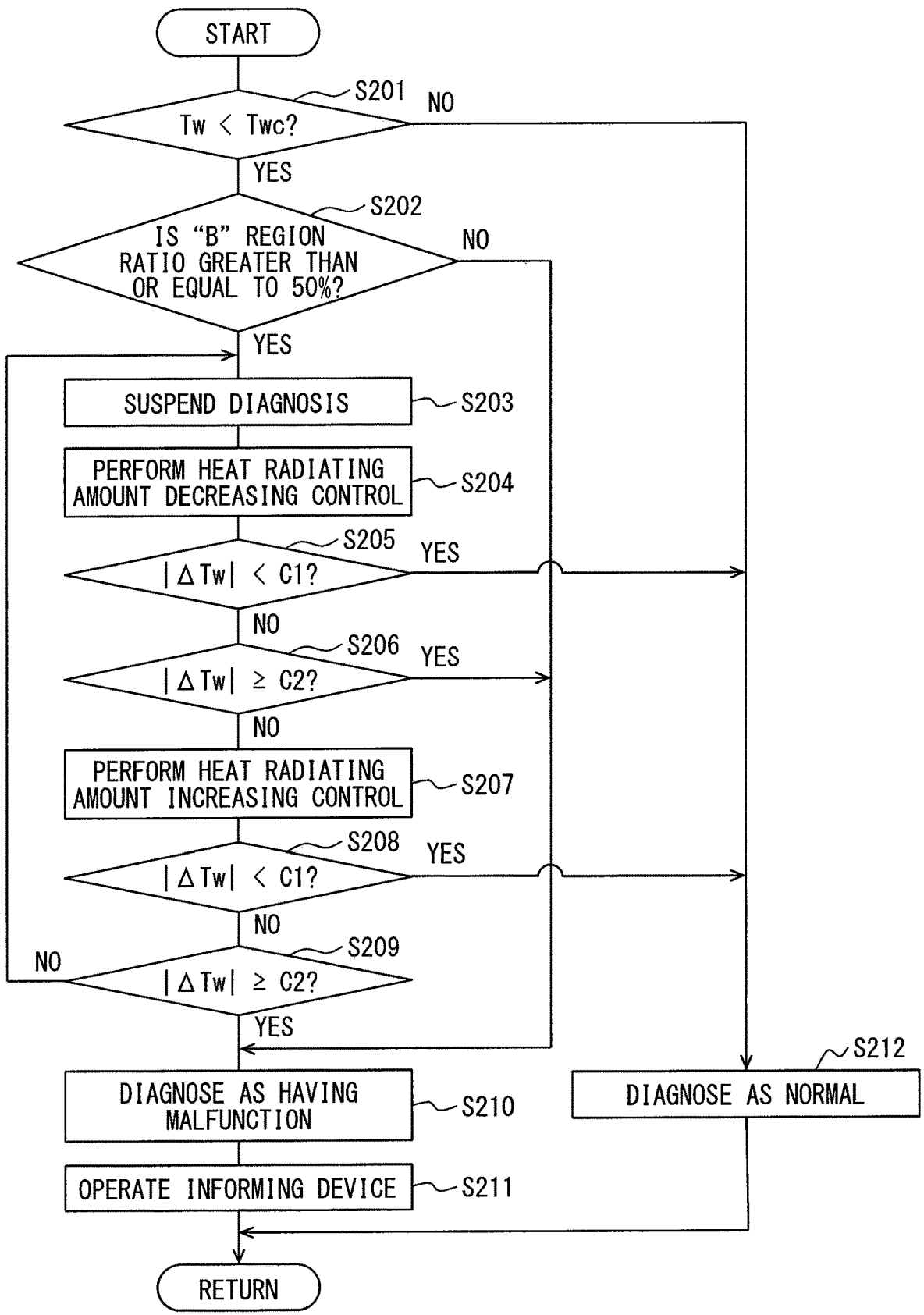
FIG. 13 is a flowchart illustrating a process performed by the ECU of FIG. 8.

Next, the flow of a process performed by the ECU 10 will be described with reference to FIG. 13 and FIG. 14. FIG. 13 is a flowchart illustrating a process that is performed by the ECU 10 after completion of the warm-up of the engine 20.

Hereinafter, a process that is specifically performed by the calculation unit 11 and the like of the ECU 10 will be generally described as being performed by the ECU 10 for simplification.

First, the ECU 10 in S201 illustrated in FIG. 13 determines whether or not the temperature Tw of the discharge coolant is lower than a predetermined threshold Twc. The ECU 10 proceeds to the process of S212 in a case where the temperature Tw of the discharge coolant is determined not to be lower than the threshold Twc, and the thermostat 35 is diagnosed as normal. Meanwhile, the ECU 10 proceeds to the process of S202 illustrated in FIG. 13 in a case where the temperature Tw of the discharge coolant is determined to be lower than the threshold Twc as illustrated at a time point t3 in FIG. 14.

Next, the ECU 10 in S202 determines whether or not the ratio of operation of the engine 20 in the "B" region illustrated in FIG. 10 is greater than or equal to 50%. The ECU 10 proceeds to the process of S203 in a case where the ratio is determined to be greater than or equal to 50%.

Next, the ECU 10 in S203 suspends a diagnosis of the thermostat 35. That is, since it is determined in the above S202 that the engine 20 is frequently operated in the "B" region and that a concern for an erroneous result of the diagnosis is high, the ECU 10 suspends the diagnosis.

Next, the ECU 10 in S204 performs a heat radiating amount decreasing control. The heat radiating amount decreasing control controls vehicle-mounted devices in such a manner to decrease the heat radiating amount of the discharge coolant in the radiator 36. Hereinafter, the heat radiating amount decreasing control will be described.

Figure 14:
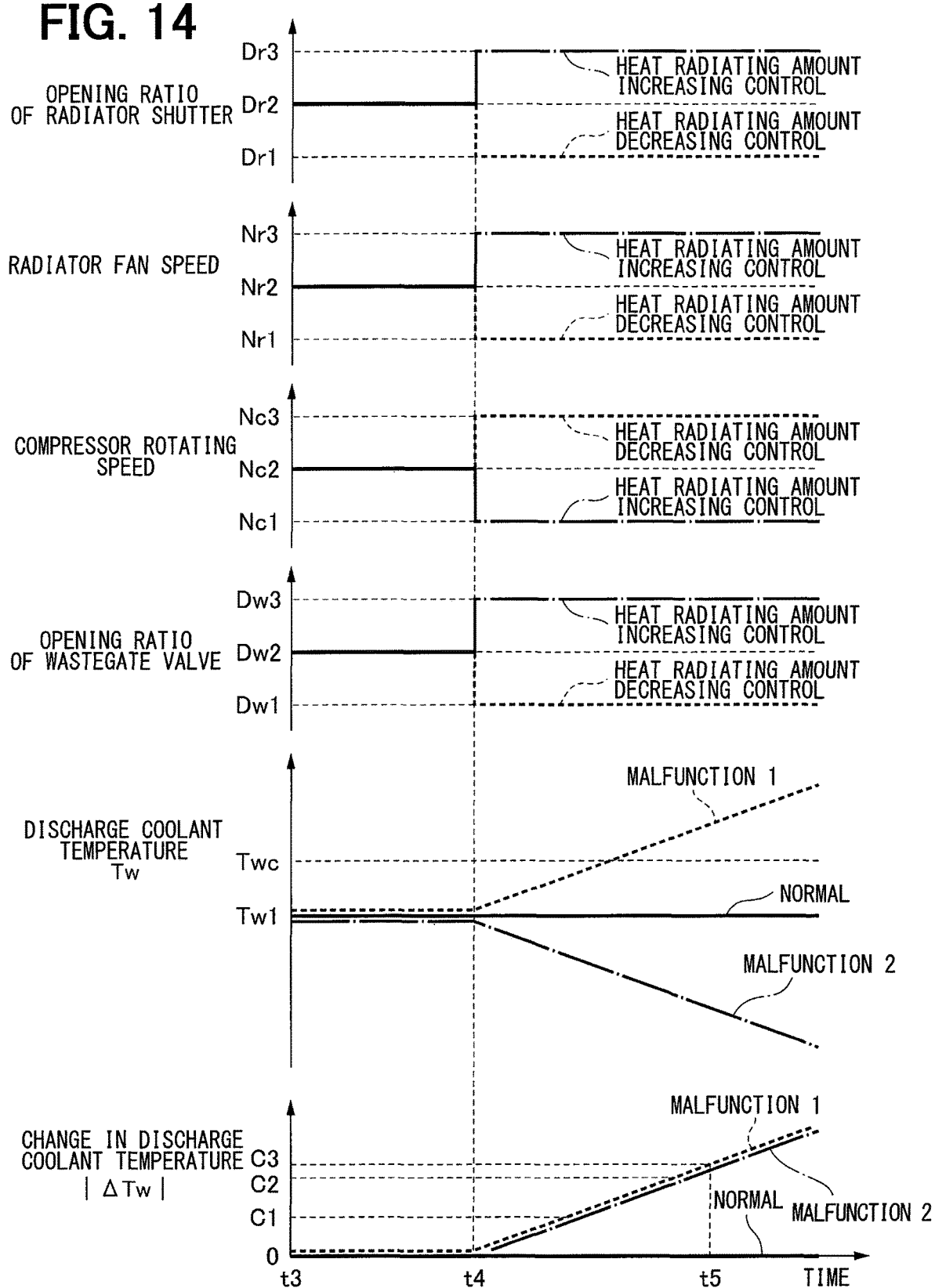
FIG. 14 is a descriptive diagram illustrating a heat radiating amount decreasing control and a heat radiating amount increasing control performed by the ECU of FIG. 8.

The ECU 10 changes the opening ratio of the radiator shutter 38 from Dr2 to Dr1 at a time point t4 as illustrated by a broken line in FIG. 14. The opening ratio Dr1 is a value smaller than the opening ratio Dr2. When the opening ratio of the radiator shutter 38 is decreased in the heat radiating amount decreasing control, the flow rate of air passing through the radiator 36 and the area in which heat is exchanged between the discharge coolant and air in the radiator 36 are decreased.

Decreases in the flow rate of air passing through the radiator 36 and the like slow down the exchange of heat between the discharge coolant and air in the radiator 36. Accordingly, the heat radiating amount of the discharge coolant is decreased in the radiator 36.

The temperature Tw of the discharge coolant flowing in the circulation flow channel 33 is increased when the ECU 10 performs such a heat radiating amount decreasing control. However, the valve body in the thermostat 35 is moved in response to an increase in the temperature Tw of the discharge coolant in a case where the thermostat 35 is normal, and a greater amount of the discharge coolant is supplied to the radiator 36. As a result, the temperature Tw of the discharge coolant, as illustrated by "normal" in FIG. 14, is maintained approximately constantly even after the time point t4 at which the heat radiating amount decreasing control is started. Therefore, a change |ΔTw| in the temperature of the discharge coolant from the time point t4 is approximately equal to zero. The change |ΔTw| in the temperature of the discharge coolant is an absolute value.

Meanwhile, the valve body in the thermostat 35 cannot be appropriately moved in a case where the thermostat 35 has a malfunction, even if the heat radiating amount decreasing control is performed. As a result, the temperature Tw of the discharge coolant, as illustrated by "malfunction 1" in FIG. 14, tends to be increased after the time point t4 at which the heat radiating amount decreasing control is started. Therefore, the change |ΔTw| in the temperature of the discharge coolant from the time point t4 is increased.

FIG. 13 is referred to again for description. The ECU 10 in S205 determines whether or not the change |ΔTw| in the temperature of the discharge coolant is smaller than a predetermined threshold C1. The ECU 10 performs the process of S205 from the time point t4 at which the heat radiating amount decreasing control is started (refer to FIG. 14) to a time point t5 until which a predetermined amount of time elapses. The valve body in the thermostat 35 can be estimated to be capable of being appropriately moved in accordance with the heat radiating amount decreasing control in a case where the change |ΔTw| in the temperature of the discharge coolant is smaller than the threshold C1. Therefore, in this case, the ECU 10 proceeds to the process of S212, and the thermostat 35 is diagnosed as normal.

Meanwhile, the ECU 10 proceeds to the process of S206 in a case where the change |ΔTw| in the temperature of the discharge coolant is determined not to be smaller than the threshold C1 at the time point t4 as illustrated by "malfunction 1" in FIG. 14.

Next, the ECU 10 in S206 determines whether or not the change |ΔTw| in the temperature of the discharge coolant is greater than or equal to a predetermined threshold C2. The threshold C2 is a value greater than the above threshold C1. The valve body in the thermostat 35 can be estimated not to be capable of being appropriately moved in accordance with the heat radiating amount decreasing control in a case where the change |ΔTw| in the temperature of the discharge coolant at the time point t4 is equal to C3 that is greater than or equal to the threshold C2 as illustrated by "malfunction 1" in FIG. 14. Therefore, in this case, the ECU 10 proceeds to the process of S210, and the thermostat 35 is diagnosed as having a malfunction. Furthermore, the ECU 10 in S211 causes the informing device 70 to be operated and is capable of prompting a user of the vehicle 1 to perform inspection and the like.

Meanwhile, it is difficult to clearly diagnose a normal or malfunctioning state of the thermostat 35 in a case where the change |ΔTw| in the temperature of the discharge coolant is determined not to be greater than or equal to the threshold C2 (that is, in a case of C1<|ΔTw|<C2) in S206. In this case, the ECU 10 proceeds to the process of S207.

Next, the ECU 10 in S207 performs a heat radiating amount increasing control. The heat radiating amount increasing control controls vehicle-mounted devices in such a manner to increase the heat radiating amount of the discharge coolant in the radiator 36. Hereinafter, the heat radiating amount increasing control will be described.

The ECU 10 changes the opening ratio of the radiator shutter 38 from Dr2 to Dr3 at the time point t4 as illustrated by a dot-dashed line in FIG. 14. The opening ratio Dr3 is a value greater than the opening ratio Dr2. When the opening ratio of the radiator shutter 38 is increased in the heat radiating amount increasing control, the flow rate of air passing through the radiator 36 and the area in which heat is exchanged between the discharge coolant and air in the radiator 36 are increased.

Increases in the flow rate of air passing through the radiator 36 and the like promote the exchange of heat between the discharge coolant and air in the radiator 36. Accordingly, the heat radiating amount of the discharge coolant in the radiator 36 is increased.

The temperature Tw of the discharge coolant flowing in the circulation flow channel 33 is decreased when the ECU 10 performs such a heat radiating amount increasing control. However, the valve body in the thermostat 35 is moved in response to a decrease in the temperature Tw of the discharge coolant in a case where the thermostat 35 is normal, and the flow rate of the coolant supplied to the radiator 36 is decreased. As a result, the temperature Tw of the discharge coolant, as illustrated by "normal" in FIG. 14, is maintained approximately constantly even after the time point t4 at which the heat radiating amount increasing control is started. Therefore, the change |ΔTw| in the temperature of the discharge coolant from the time point t4 is approximately equal to zero.

Meanwhile, the valve body in the thermostat 35 cannot be appropriately moved in a case where the thermostat 35 has a malfunction, even if the heat radiating amount increasing control is performed. As a result, the temperature Tw of the discharge coolant, as illustrated by "malfunction 2" in FIG. 14, tends to be decreased after the time point t4 at which the heat radiating amount increasing control is started. Therefore, the change |ΔTw| in the temperature of the discharge coolant from the time point t4 is increased.

FIG. 13 is referred to again for description. The ECU 10 in S208 determines whether or not the change |ΔTw| in the temperature of the discharge coolant is smaller than the predetermined threshold C1. The ECU 10 performs the process of S208 from the time point t4 at which the heat radiating amount increasing control is started (refer to FIG. 14) to the time point t5 until which a predetermined amount of time elapses. The valve body in the thermostat 35 can be estimated to be capable of being appropriately moved in accordance with the heat radiating amount increasing control in a case where the change |ΔTw| in the temperature of the discharge coolant is smaller than the threshold C1. Therefore, in this case, the ECU 10 proceeds to the process of S212, and the thermostat 35 is diagnosed as normal.

Meanwhile, the ECU 10 proceeds to the process of S209 in a case where the change |ΔTw| in the temperature of the discharge coolant is determined not to be smaller than the threshold C1 at the time point t4 as illustrated by "malfunction 2" in FIG. 14.

Next, the ECU 10 in S209 determines whether or not the change |ΔTw| in the temperature of the discharge coolant is greater than or equal to the predetermined threshold C2. The valve body in the thermostat 35 can be estimated not to be capable of being appropriately moved in accordance with the heat radiating amount increasing control in a case where the change |ΔTw| in the temperature of the discharge coolant at the time point t4 is equal to C3 that is greater than or equal to the threshold C2 as illustrated by "malfunction 2" in FIG. 14. Therefore, in this case, the ECU 10 proceeds to the process of S210, and the thermostat 35 is diagnosed as having a malfunction. Furthermore, the ECU 10 in S211 causes the informing device 70 to be operated and is capable of prompting a user of the vehicle 1 to perform inspection and the like.

Meanwhile, it is difficult to clearly diagnose a normal or malfunctioning state of the thermostat 35 in a case where the change |ΔTw| in the temperature of the discharge coolant is determined not to be greater than or equal to the threshold C2 (that is, in a case of C1<|ΔTw|<C2) in S209. In this case, the ECU 10 returns to the process of S203 and performs the above process.

As described heretofore, the ECU 10 according to the second embodiment is a diagnostic device for the thermostat 35 that adjusts the temperature of the coolant supplied to the engine 20 of the vehicle 1. The ECU 10 includes the calculation unit 11 that obtains the temperature Tw of the discharge coolant, which is the coolant discharged from the engine 20, and the diagnostic unit 14 that diagnoses the state of the thermostat 35 on the basis of the temperature Tw of the discharge coolant. The diagnostic unit 14 performs the heat radiating amount decreasing control, which decreases the heat radiating amount of the discharge coolant in the radiator 36 of the vehicle 1, and diagnoses the thermostat 35 as having a malfunction in a case where an increase in the temperature of the discharge coolant based on the heat radiating amount decreasing control is greater than or equal to C2 that is an increase threshold.

The ECU 10 configured as such performs the heat radiating amount decreasing control that decreases the heat radiating amount of the discharge coolant in the radiator 36. When such a heat radiating amount decreasing control is performed in a case where the discharge coolant is supplied to the radiator 36 by a malfunction of the thermostat 35, the temperature Tw of the discharge coolant is increased. The ECU 10 diagnoses the thermostat 35 as having a malfunction in a case where an increase in the temperature Tw of the discharge coolant (corresponds to the above change |ΔTw| in the temperature of the discharge coolant) is greater than or equal to the threshold C2. Therefore, according to the ECU 10, the thermostat 35 can be accurately diagnosed in a case where the temperature Tw of the discharge coolant is decreased after completion of the warm-up of the engine 20.

The diagnostic unit 14 in the ECU 10 performs the heat radiating amount increasing control, which increases the heat radiating amount of the discharge coolant in the radiator 36, after the heat radiating amount decreasing control and diagnoses the thermostat 35 as having a malfunction in a case where a decrease in the temperature Tw of the discharge coolant based on the heat radiating amount increasing control is greater than or equal to C2 that is a decrease threshold.

The ECU 10 configured as such performs the heat radiating amount increasing control that increases the heat radiating amount of the discharge coolant in the radiator 36. When such a heat radiating amount increasing control is performed in a case where the discharge coolant is supplied to the radiator 36 by a malfunction of the thermostat 35, the temperature Tw of the discharge coolant tends to be decreased. The ECU 10 diagnoses the thermostat 35 as having a malfunction in a case where a decrease in the temperature Tw of the discharge coolant (corresponds to the above change |ΔTw| in the temperature of the discharge coolant) is greater than or equal to the threshold C2. Therefore, according to the ECU 10, the thermostat 35 can be accurately diagnosed in a case where the temperature Tw of the discharge coolant is decreased after completion of the warm-up of the engine 20.

The threshold C2 serves as both an increase threshold and a decrease threshold in the ECU 10 according to the second embodiment. However, the increase threshold and the decrease threshold are not necessarily required to have the same value and may be set to different values according to characteristics of the engine 20 and the coolant.

The diagnostic unit 14 in the ECU 10 performs the heat radiating amount increasing control in a case where an increase in the temperature Tw of the discharge coolant based on the heat radiating amount decreasing control is not greater than or equal to C2 which is the increase threshold.

The ECU 10 configured as such is capable of performing the heat radiating amount increasing control in a case where it is difficult to clearly diagnose a normal or malfunctioning state of the thermostat 35 even if the heat radiating amount decreasing control is performed. Accordingly, a diagnosis can be promptly completed in a case where the thermostat 35 can be diagnosed from the result of only the heat radiating amount decreasing control, and the accuracy of a diagnosis can be increased by performing the heat radiating amount increasing control as well in a case where it is difficult to make a clear diagnosis from the result of only the heat radiating amount decreasing control.

A likelihood that the temperature Tw of the discharge coolant is further decreased exists if the heat radiating amount increasing control is performed before the heat radiating amount decreasing control even though the temperature Tw of the discharge coolant is lower than the threshold Twc and a malfunction of the thermostat 35 is suspected. In this case, the engine 20 and the like may be significantly adversely affected by a decrease in the temperature Tw of the discharge coolant. Regarding this point, the ECU 10 performs the heat radiating amount increasing control in a case where an increase in the temperature Tw of the discharge coolant based on the heat radiating amount decreasing control is not greater than or equal to C2 which is the increase threshold. Thus, such an adverse effect can be reduced.

The diagnostic unit 14 in the ECU 10 diagnoses a temperature adjusting valve as having a malfunction in a case where |ΔTw|, which is an increase or a decrease in the temperature of the discharge coolant, is greater than or equal to C2 that is a first threshold as a result of one of the heat radiating amount increasing control and the heat radiating amount decreasing control being performed. The diagnostic unit 14 performs the other of the heat radiating amount increasing control and the heat radiating amount decreasing control in a case where |ΔTw|, which is an increase or a decrease in the temperature of the discharge coolant, is smaller than the threshold C2 and greater than C1 that is a second threshold.

The ECU 10 configured as such is capable of performing the other of the heat radiating amount increasing control and the heat radiating amount decreasing control in a case where |ΔTw|, which is an increase or a decrease in the temperature of the discharge coolant, is greater than the threshold C1 and smaller than the threshold C2 and where it is difficult to clearly diagnose a normal or malfunctioning state of the thermostat 35. Accordingly, a diagnosis can be promptly completed in a case where the thermostat 35 can be diagnosed by performing only the heat radiating amount decreasing control, and the accuracy of a diagnosis can be increased by performing the heat radiating amount increasing control as well in a case where it is difficult to make a clear diagnosis by performing only the heat radiating amount decreasing control.

The diagnostic unit 14 in the ECU 10 performs at least one of the heat radiating amount decreasing control and the heat radiating amount increasing control by changing the opening ratio of the radiator shutter 38.

Changing the opening ratio of the radiator shutter 38 allows the flow rate of air passing through the radiator 36 and the area in which heat is exchanged between the discharge coolant and air in the radiator 36 to be changed. The ECU 10, by changing the opening ratio of the radiator shutter 38, slows down or promotes exchange of heat between the discharge coolant and air in the radiator 36 and is capable of performing the heat radiating amount decreasing control or the heat radiating amount increasing control.

The heat radiating amount decreasing control and the heat radiating amount increasing control in the second embodiment are described as being performed by the ECU 10 changing the opening ratio of the radiator shutter 38. However, the heat radiating amount decreasing control and the heat radiating amount increasing control are not limited to changing the opening ratio of the radiator shutter 38.

For example, the ECU 10 may perform at least one of the heat radiating amount decreasing control and the heat radiating amount increasing control by changing the radiator fan speed.

In this case, the ECU 10 changes the radiator fan speed from Nr2 to Nr1 in the heat radiating amount decreasing control as illustrated in FIG. 14. The radiator fan speed Nr1 is a value smaller than the radiator fan speed Nr2. When the ECU 10 decreases the radiator fan speed, the flow rate of air passing through the radiator 36 is decreased, and exchange of heat between the discharge coolant and air in the radiator 36 is slowed down. As a result, the heat radiating amount of the discharge coolant in the radiator 36 can be decreased.

Meanwhile, the ECU 10 changes the radiator fan speed from Nr2 to Nr3 in the heat radiating amount increasing control as illustrated in FIG. 14. The radiator fan speed Nr3 is a value greater than the radiator fan speed Nr2. When the ECU 10 increases the radiator fan speed, the flow rate of air passing through the radiator 36 is increased, and exchange of heat between the discharge coolant and air in the radiator 36 is promoted. As a result, the heat radiating amount of the discharge coolant in the radiator 36 can be decreased.

The ECU 10 may perform at least one of the heat radiating amount decreasing control and the heat radiating amount increasing control by changing the compressor rotating speed.

In this case, the ECU 10 changes the compressor rotating speed from Nc2 to Nc3 in the heat radiating amount decreasing control as illustrated in FIG. 14. The compressor rotating speed number Nc3 is a value greater than the compressor rotating speed Nc2. When the ECU 10 increases the compressor rotating speed, the temperature of the refrigerant compressed by the compressor 344 and supplied to the condenser 345 is increased. Therefore, air that passes through the condenser 345 as illustrated by the arrow AF in FIG. 8 has a comparatively high temperature by exchanging heat with the refrigerant.

As described above, the condenser 345 is provided on the upstream side of the radiator 36 in the flow direction of air illustrated by the arrow AF. Therefore, heat is exchanged in the radiator 36 between the discharge coolant flowing in the radiator 36 and the comparatively high temperature air passing through the condenser 345. As a result, the heat radiating amount of the discharge coolant in the radiator 36 can be decreased.

Meanwhile, the ECU 10 changes the compressor rotating speed from Nc2 to Nc1 in the heat radiating amount increasing control as illustrated in FIG. 14. The compressor rotating speed Nc1 is a value smaller than the compressor rotating speed Nc2. When the compressor rotating speed is decreased, the temperature of the refrigerant compressed by the compressor 344 and supplied to the condenser 345 is decreased. Therefore, air that passes through the condenser 345 as illustrated by the arrow AF in FIG. 8 has a comparatively low temperature by exchanging heat with the refrigerant.

Therefore, heat is exchanged in the radiator 36 between the discharge coolant flowing in the radiator 36 and the comparatively low temperature air passing through the condenser 345. As a result, the heat radiating amount of the discharge coolant in the radiator 36 can be increased.

The ECU 10 may perform at least one of the heat radiating amount decreasing control and the heat radiating amount increasing control by changing the opening ratio of the wastegate valve 355.

In this case, the ECU 10 changes the opening ratio of the wastegate valve 355 from Dw2 to Dw1 in the heat radiating amount decreasing control as illustrated in FIG. 14. The opening ratio Dw1 is a value smaller than the opening ratio Dw2. When the ECU 10 decreases the opening ratio of the wastegate valve 355, the flow rate of discharge gas that flows to the second discharge flow channel 242 side from the first discharge flow channel 241 is decreased. That is, the flow rate of discharge gas passing through the turbine 351 is increased. Thus, the speed of the turbine 351 and the air compressor 352 are increased, and the temperature of air compressed by the air compressor 352 and supplied to the intercooler 354 is increased. Therefore, air that passes through the intercooler 354 as illustrated by the arrow AF in FIG. 8 has a comparatively high temperature by exchanging heat with air compressed by the air compressor 352.

As described above, the intercooler 354 is provided on the upstream side of the radiator 36 in the flow direction of air illustrated by the arrow AF. Therefore, heat is exchanged in the radiator 36 between the discharge coolant flowing in the radiator 36 and the comparatively high temperature air passing through the intercooler 354. As a result, the heat radiating amount of the discharge coolant in the radiator 36 can be decreased.

Meanwhile, the ECU 10 changes the opening ratio of the wastegate valve 355 from Dw2 to Dw3 in the heat radiating amount increasing control as illustrated in FIG. 14. The opening ratio Dw3 is a value greater than the opening ratio Dw2. When the ECU 10 increases the opening ratio of the wastegate valve 355, the flow rate of discharge gas that flows to the second discharge flow channel 242 side from the first discharge flow channel 241 is increased. That is, the flow rate of discharge gas passing through the turbine 351 is decreased. Thus, the numbers of rotations of the turbine 351 and the air compressor 352 are decreased, and the temperature of air compressed by the air compressor 352 and supplied to the intercooler 354 is decreased. Therefore, air that passes through the intercooler 354 as illustrated by the arrow AF in FIG. 8 has a comparatively low temperature by exchanging heat with air compressed by the air compressor 352.

Therefore, heat is exchanged in the radiator 36 between the discharge coolant flowing in the radiator 36 and the comparatively low temperature air passing through the intercooler 354. As a result, the heat radiating amount of the discharge coolant in the radiator 36 can be decreased.

Changing the opening ratio of the radiator shutter 38, changing the radiator fan speed, changing the rotational speed of the compressor 344, and changing the opening ratio of the wastegate valve 355 described heretofore may be independently performed or may be performed in appropriate combination with each other.

Third Embodiment

Figure 15:
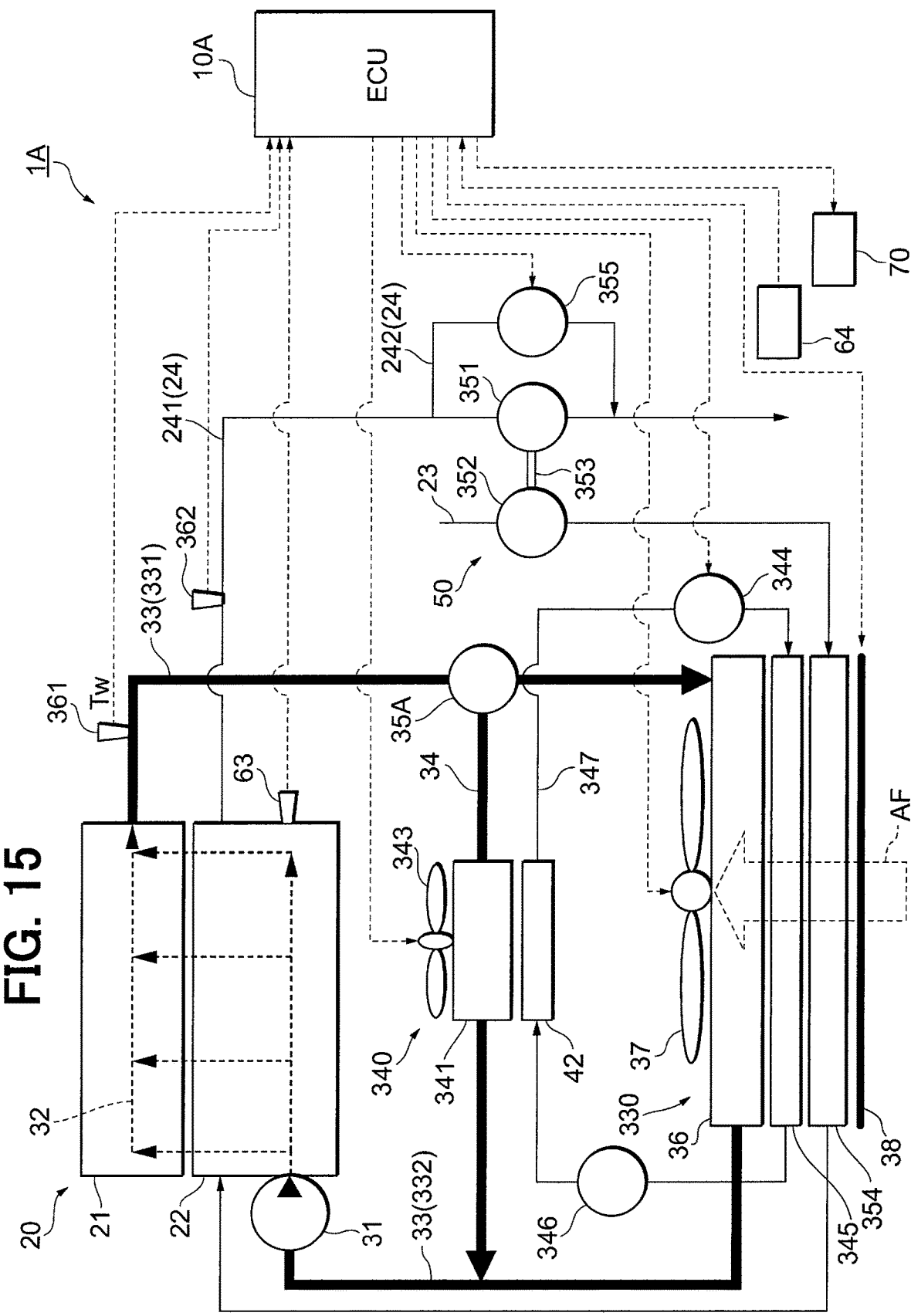
FIG. 15 is a schematic diagram illustrating configurations of a diagnostic device according to a third embodiment and a vehicle equipped with the diagnostic device.

Next, an ECU 10A according to a third embodiment will be described with reference to FIG. 15 and FIG. 16. The ECU 10A is an electronic control unit with which a vehicle 1A is equipped and that diagnoses an electric valve 35A which is a temperature adjusting valve. A part of the vehicle 1A and the ECU 10A having the same configuration as the vehicle 1 and the ECU 10 according to the second embodiment will be appropriately designated by the same reference sign and will not be described.

The electric valve 35A is provided at a part where a bypass flow channel 34 branches off from a first circulation flow channel 331. The electric valve 35A includes a valve body not illustrated. The valve body is configured to be rotated on the basis of a control signal received by the electric valve 35A from the ECU 10A.

Figure 16:
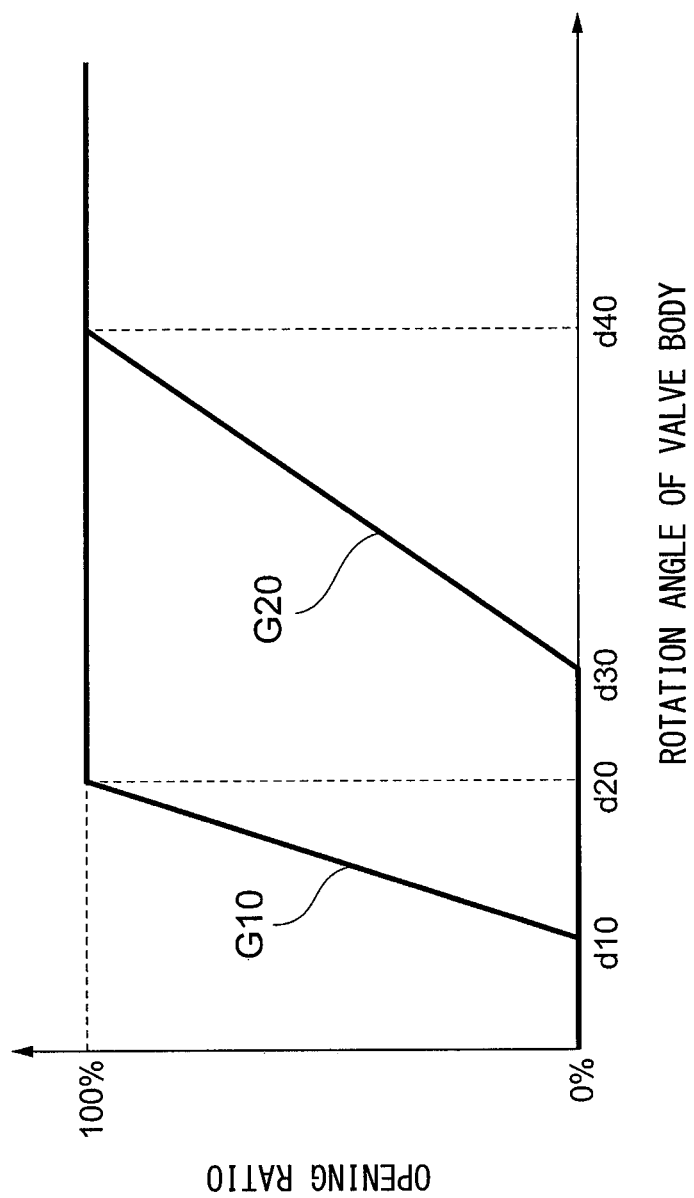
FIG. 16 is a descriptive diagram illustrating operation of an electric valve of FIG. 15.

A graph that illustrates characteristics of the electric valve 35A is illustrated in FIG. 16. The rotation angle of the valve body, which is provided in the electric valve 35A, from a predetermined reference position is plotted on the horizontal axis of the graph. The opening ratio of the electric valve 35A is plotted on the vertical axis of the graph. A change in the opening ratio of a channel provided from the electric valve 35A toward the bypass flow channel 34 is illustrated by a line G10. A change in the opening ratio of a channel provided from the electric valve 35A toward the first circulation flow channel 331 on the radiator 36 side of the electric valve 35A is illustrated by a line G20.

Both the channel toward the bypass flow channel 34 and the channel toward the first circulation flow channel 331 on the radiator 36 side of the electric valve 35A are closed in a case where the rotation angle of the valve body is smaller than d10.

The opening ratio of only the channel toward the bypass flow channel 34 starts to increase when the rotation angle of the valve body is increased over d10. When the rotation angle is increased to d20, only the channel toward the bypass flow channel 34 is wide opened.

The opening ratio of the channel toward the first circulation flow channel 331 on the radiator 36 side of the electric valve 35A starts to increase when the rotation angle is increased to d30. At this point, the channel toward the bypass flow channel 34 remains wide opened. When the rotation angle is increased to d40, both the channel toward the bypass flow channel 34 and the channel toward the first circulation flow channel 331 on the radiator 36 side of the electric valve 35A are wide opened.

As such, the ECU 10A according to the third embodiment is capable of finely adjusting the temperature of the coolant supplied to the engine 20 on the basis of the operational state of the engine 20 by actively changing the opening ratio of each flow channel. However, a malfunction that the rotation angle of the valve body does not correspond to a signal received from the ECU 10A may be generated by sticking of the valve body of the electric valve 35A, problems in signal transmission and reception, and the like. The ECU 10A diagnoses the electric valve 35A that is operated as described heretofore.

The ECU 10A performs the processes illustrated in FIG. 13 and FIG. 14 in a diagnosis of the electric valve 35A in the same manner as the ECU 10 according to the above second embodiment. That is, the ECU 10A performs the heat radiating amount decreasing control and the heat radiating amount increasing control and diagnoses the electric valve 35A on the basis of a change |ΔTw| in the temperature of the discharge coolant upon performing the heat radiating amount decreasing control and the heat radiating amount increasing control.

The ECU 10A performs the above heat radiating amount decreasing control and the heat radiating amount increasing control after transmitting to the electric valve 35A a stop signal that causes supply of the discharge coolant to the radiator 36 to be stopped. That is, the ECU 10A performs the heat radiating amount decreasing control and the heat radiating amount increasing control after transmitting a control signal that causes the rotation angle of the valve body to be decreased below d30 to the electric valve 35A.

If the rotation angle of the valve body is greater than or equal to d30, the discharge coolant is supplied to the radiator 36 even though the electric valve 35A is normal. In such a state, even if the temperature of the discharge coolant is changed by performing the heat radiating amount decreasing control or the heat radiating amount increasing control, a determination cannot be performed of whether or not the change is due to a malfunction of the electric valve 35A.

Therefore, the ECU 10A, as described above, performs the heat radiating amount decreasing control and the heat radiating amount increasing control after transmitting a control signal that causes the rotation angle of the valve body to be decreased below d30 to the electric valve 35A. When the temperature of the discharge coolant is changed by performing the heat radiating amount decreasing control and the heat radiating amount increasing control even though such a control signal is transmitted, the coolant can be estimated to be supplied to the radiator 36. The ECU 10A is capable of diagnosing the state of the electric valve 35A on the basis of the change |ΔTw| in the temperature of the discharge coolant in the same manner as the second embodiment.

An embodiment of the present disclosure is described heretofore with reference to specific examples. However, the present disclosure is not limited to the specific examples. That is, the specific examples after appropriately modified in design by those skilled in the art are to be included in the scope of the present disclosure, provided that the modified specific examples include the features of the present disclosure. Each element included in above each specific example and the arrangement, the material, the condition, the shape, the size, and the like thereof are not limited to the illustrations and can be appropriately modified.

Fourth Embodiment

A diagnostic device 100 according to a fourth embodiment is a device that diagnoses the operational state of a vehicle 1. First, a configuration of the vehicle 1 will be described with reference to FIG. 17. The vehicle 1 is configured as a so-called hybrid vehicle that includes an engine 20 and a motor M.

The engine 20 is a four-cycle reciprocating engine that is driven by using gasoline as fuel. The engine 20 includes a cylinder head 21 and a cylinder block 22. Multiple cylinders not illustrated are provided in the cylinder head 21 and the cylinder block 22. Each stroke of an intake stroke, a compression stroke, a combustion stroke, and an exhaust stroke is repeated in each cylinder, thereby generating driving power required for traveling of the vehicle 1.

The motor M is a three-phase AC motor. The vehicle 1 is equipped with a battery and a power converter (all of which are not illustrated). DC power that is output from the battery is converted into three-phase AC power by the power converter, and the three-phase AC power is supplied to the motor M. When the three-phase AC power is supplied to the motor M, driving power required for traveling of the vehicle 1 is generated. The magnitude of the driving power is adjusted by a switching operation of the power converter.

The vehicle 1 is capable of traveling using both driving power of the engine 20 and driving power of the motor M. The vehicle 1 is capable of traveling using only the driving power of the engine 20 or traveling using only the driving power of the motor M.

The vehicle 1 includes a variable valve timing mechanism 440, a cooling device 50, an A/F sensor 460, and an informing device 70 in addition to the engine 20 and the motor M described heretofore.

The variable valve timing mechanism 440 adjusts the opening and closing timings of an intake valve and an exhaust valve (all of which are not illustrated) provided in each cylinder of the engine 20 according to an operating status. A configuration of the variable valve timing mechanism 440 will be described with reference to FIG. 18.

Figure 18:
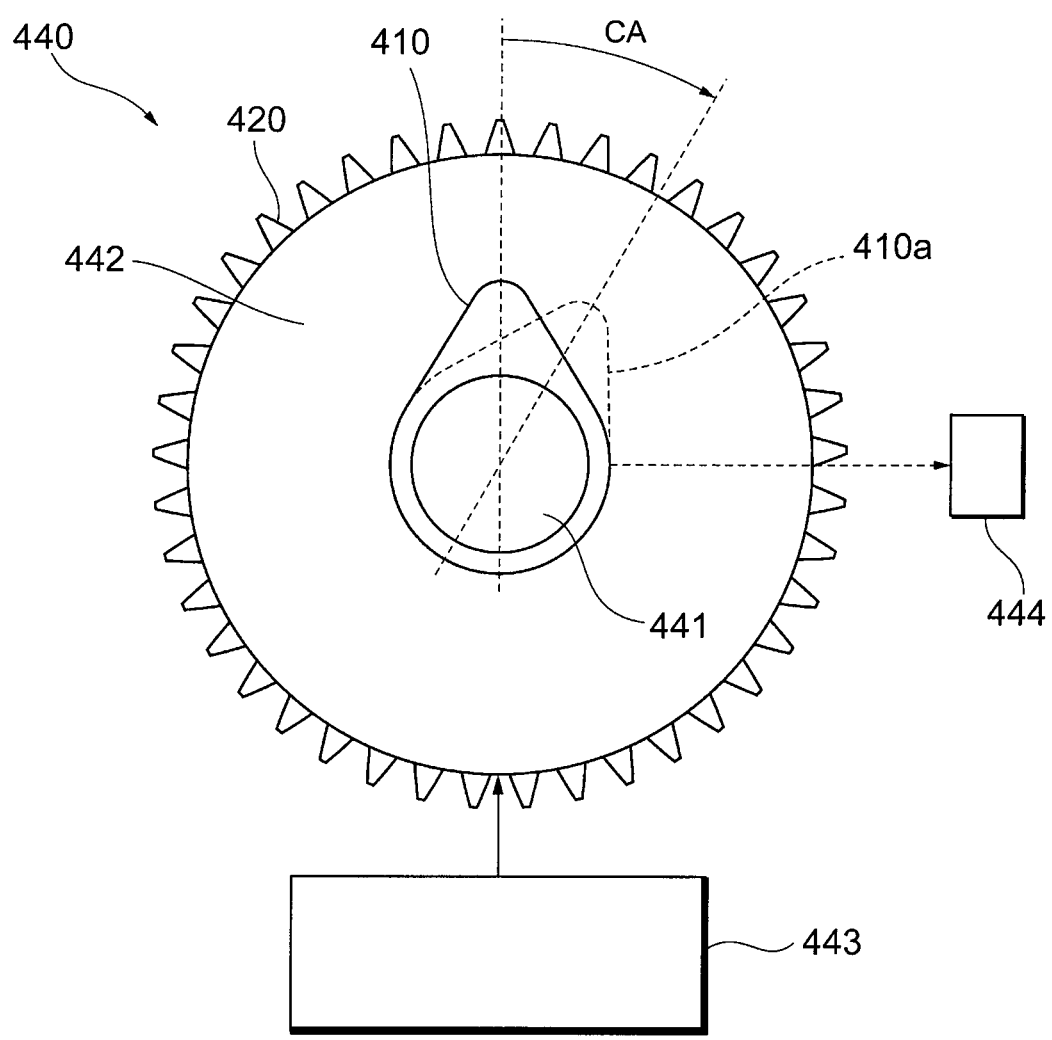
FIG. 18 is a diagram illustrating a configuration of a variable valve system.

The variable valve timing mechanism 440 includes a camshaft 441 and a timing sprocket 442. The camshaft 441 is a shaft that is provided in a circular columnar shape. The camshaft 441 receives force from the timing sprocket 442 described later and is rotated around a central axis thereof. Multiple cams 410 are fixed to the camshaft 441. The multiple cams 410 are linearly arranged in the longitudinal direction of the camshaft 441 (in the depth direction on the page of FIG. 18), though only one cam 410 is illustrated in FIG. 18.

The intake valve and the exhaust valve of each cylinder are opened and closed by the cam 410 when the camshaft 441 and the cam 410 are rotated.

The timing sprocket 442 is rotated by receiving force from a crankshaft not illustrated, thereby rotating the camshaft 441. The timing sprocket 442 is usually fixed to the camshaft 441 and is rotated as a whole with the camshaft 441.

The timing sprocket 442 is provided in a circular columnar shape, and multiple teeth 420 are provided on the circumferential surface thereof. Force from the crankshaft is transmitted to the timing sprocket 442 by a timing chain not illustrated. The teeth 420 engage with the timing chain.

When the crankshaft is rotated, rotational force thereof is transmitted to the timing sprocket 442 by the timing chain. Accordingly, the timing sprocket 442 is rotated with the camshaft 441 and the cam 410. As a result, the intake valve and the like are opened and closed at timings when the rotational phase of the crankshaft matches a predetermined phase.

The variable valve timing mechanism 440 rotates the camshaft 441 relative to the timing sprocket 442, thereby changing the opening and closing timings of the intake valve and the like. When oil is supplied from a hydraulic device 443 to the timing sprocket 442, the camshaft 441 and the cam 410 are rotated relative to the timing sprocket 442.

The hydraulic device 443 and the timing sprocket 442 constitute a hydraulic actuator. The cam 410 is a movable member of which the position is changed by the hydraulic actuator. The variable valve timing mechanism 440 can be said to be a hydraulic device that changes the position of the movable member using the hydraulic actuator.

The shape of the cam 410 after relative rotation is illustrated by a dotted line in FIG. 18, and the shape is designated by a reference sign 410a. The angle of the cam 410 is rotated by an angle CA from a reference by the hydraulic device 443 in the example of FIG. 18 with the position of the cam 410 before rotation as a reference. Hereinafter, such a change in the angle with a specific position as a reference will be referred to as "adjustment angle" as well.

The adjustment angle is measured by an angle sensor 444 at all times, and a measured value is input into the diagnostic device 100. The measured value is also input into an ECU (not illustrated) that controls the entirety of the vehicle 1. The ECU controls operation of the hydraulic device 443 during traveling of the vehicle 1 in such a manner that the value of the adjustment angle measured by the angle sensor 444 matches a target value.

FIG. 17 is referred to again for description. The cooling device 50 is a device that cools the engine 20 generating a great amount of heat during operation thereof and maintains the engine 20 at an appropriate temperature. The cooling device 50 includes a circulation flow channel 510, a water pump 520, a radiator 530, a bypass flow channel 540, and a temperature adjusting valve 560.

The circulation flow channel 510 is a channel that circulates a coolant between the engine 20 and the radiator 530 described later. Hereinafter, a channel of the circulation flow channel 510 in which the coolant flows from the engine 20 toward the radiator 530 will be referred to as "first flow channel 511" as well. A channel of the circulation flow channel 510 in which the coolant flows from the radiator 530 toward the engine 20 will be referred to as "second flow channel 512" as well.

An internal flow channel 210 is provided in the engine 20. The coolant that is supplied to the engine 20 by passing through the second flow channel 512 captures heat from the engine 20 while passing through the internal flow channel 210. Accordingly, the temperature of the coolant is increased, and the coolant is discharged from the internal flow channel 210 to the first flow channel 511.

A water temperature sensor 570 that measures the temperature of the coolant is provided midway of the first flow channel 511. A signal that is based on a water temperature measured by the water temperature sensor 570 is input into the diagnostic device 100.

The water pump 520 is a device that pumps the coolant to circulate the coolant in the circulation flow channel 510. The water pump 520 is arranged at a position near the engine 20 in the second flow channel 512. Operation of the water pump 520 is controlled by an ECU of the vehicle 1.

The radiator 530 is a heat exchanger that decreases the temperature of the coolant by causing the coolant flowing in the circulation flow channel 510 to exchange heat with air introduced from the outside of the vehicle 1. A radiator fan 531 is provided in the vicinity of the radiator 530. The radiator fan 531 transports air into the radiator 530 so that heat is efficiently exchanged in the radiator 530.

The bypass flow channel 540 is a channel that is provided to connect the first flow channel 511 and the second flow channel 512. Operation of the temperature adjusting valve 560 described later allows the coolant to flow only in the bypass flow channel 540 without passing through the radiator 530. In addition, operation of the temperature adjusting valve 560 allows the coolant to flow in both the radiator 530 and the bypass flow channel 540.

A heater core 550 is provided midway of the bypass flow channel 540. The heater core 550 constitutes a part of a heating device included in the vehicle 1. The heater core 550 is a heat exchanger that increases the temperature of air passing through the heater core 550 by causing the high temperature coolant flowing in the heater core 550 to exchange heat with the air. A blower 551 is provided in the vicinity of the heater core 550. The blower 551 transports air into the heater core 550 so that heat is efficiently exchanged in the heater core 550. Air that passes through the heater core 550 and of which the temperature is increased is supplied into the vehicle interior of the vehicle 1 by passing through a duct not illustrated. The temperature of the coolant is decreased by exchange of heat with air when the coolant passes through the heater core 550.

The temperature adjusting valve 560 is provided at a part where the first flow channel 511 and the bypass flow channel 540 branch. The temperature adjusting valve 560 is a thermostat that is switched opened and closed according to the temperature of the coolant. The temperature adjusting valve 560 includes a valve body not illustrated. When the temperature of the coolant is decreased below a predetermined temperature, the valve body is moved, and a flow channel from the temperature adjusting valve 560 toward the radiator 530 is closed. Accordingly, the entirety of the coolant discharged from the engine 20 flows in the bypass flow channel 540 and returns to the engine 20 without passing through the radiator 530. Since the heat of the coolant is not captured in the radiator 530, a warm-up of the engine 20 immediately after a start of the engine 20 is promptly performed.

The valve body moves in the temperature adjusting valve 560 when the temperature of the coolant is increased to the predetermined temperature or higher. Accordingly, the flow channel from the temperature adjusting valve 560 toward the radiator 530 is opened. A part of the coolant discharged from the engine 20 flows in the bypass flow channel 540, and the remaining part flows in the radiator 530. Since the heat of the coolant is captured in the radiator 530, an excessive increase in the temperature of the coolant is prevented. As such, the temperature of the coolant is adjusted to an appropriate temperature by the temperature adjusting valve 560.

Hereinafter, the state where the flow channel from the temperature adjusting valve 560 toward the radiator 530 is opened will be referred to as "opened state" as well. The state where the flow channel from the temperature adjusting valve 560 toward the radiator 530 is closed will be referred to as "closed state" as well.

The A/F sensor 460 is a sensor that detects a so-called air-fuel ratio on the basis of the oxygen concentration of discharge gas generated in the engine 20. The A/F sensor 460 is provided in a flow channel (not illustrated) that discharges the discharge gas to the outside of the vehicle. A signal that is based on the air-fuel ratio measured by the A/F sensor 460 is input from the A/F sensor 460 into the ECU of the vehicle and is also input into the diagnostic device 100.

The informing device 70 is a device that informs a driver of a diagnosis result of the vehicle 1 performed by the diagnostic device 100. When the diagnostic device 100 diagnoses any malfunction occurring in the vehicle 1, the informing device 70 informs the driver by turning on a warning lamp provided on a front panel.

The diagnostic device 100 is configured as a computer system that includes a CPU, a ROM, a RAM, and the like. The diagnostic device 100 may be configured as a separate device from the ECU which controls the entirety of the vehicle 1 or may be configured as a device integrated with the ECU. That is, a part or the entirety of the function of the diagnostic device 100 described below may be included in the ECU of the vehicle 1.

The diagnostic device 100 includes a water temperature obtaining unit 110, a malfunction determination unit 120, and a vehicle diagnostic unit 130 as functional control blocks.

The water temperature obtaining unit 110 is a part that calculates and obtains the temperature of the coolant discharged from the engine 20 on the basis of a signal received from the water temperature sensor 570.

The malfunction determination unit 120 is a part that determines whether or not a malfunction occurs in the temperature adjusting valve 560 on the basis of the temperature of the coolant obtained by the water temperature obtaining unit 110. The temperature adjusting valve 560 is estimated not to be moved and to remain opened when, for example, a state where the temperature of the coolant is low continues for a long amount of time. That is, since the temperature adjusting valve 560 is not closed, the coolant is estimated to be kept cooled by passing through the radiator 530. Hereinafter, a state where the temperature adjusting valve 560 is not moved and remains opened as described above will be referred to as "open failure" as well. A specific manner of determination performed by the malfunction determination unit 120 will be described later.

The vehicle diagnostic unit 130 is a part that performs various diagnoses related to the operational state of the vehicle 1. Various items are diagnosed by the vehicle diagnostic unit 130. A method for diagnosing the operational state of the variable valve timing mechanism 440 as one of the items will be described.

Figure 19:
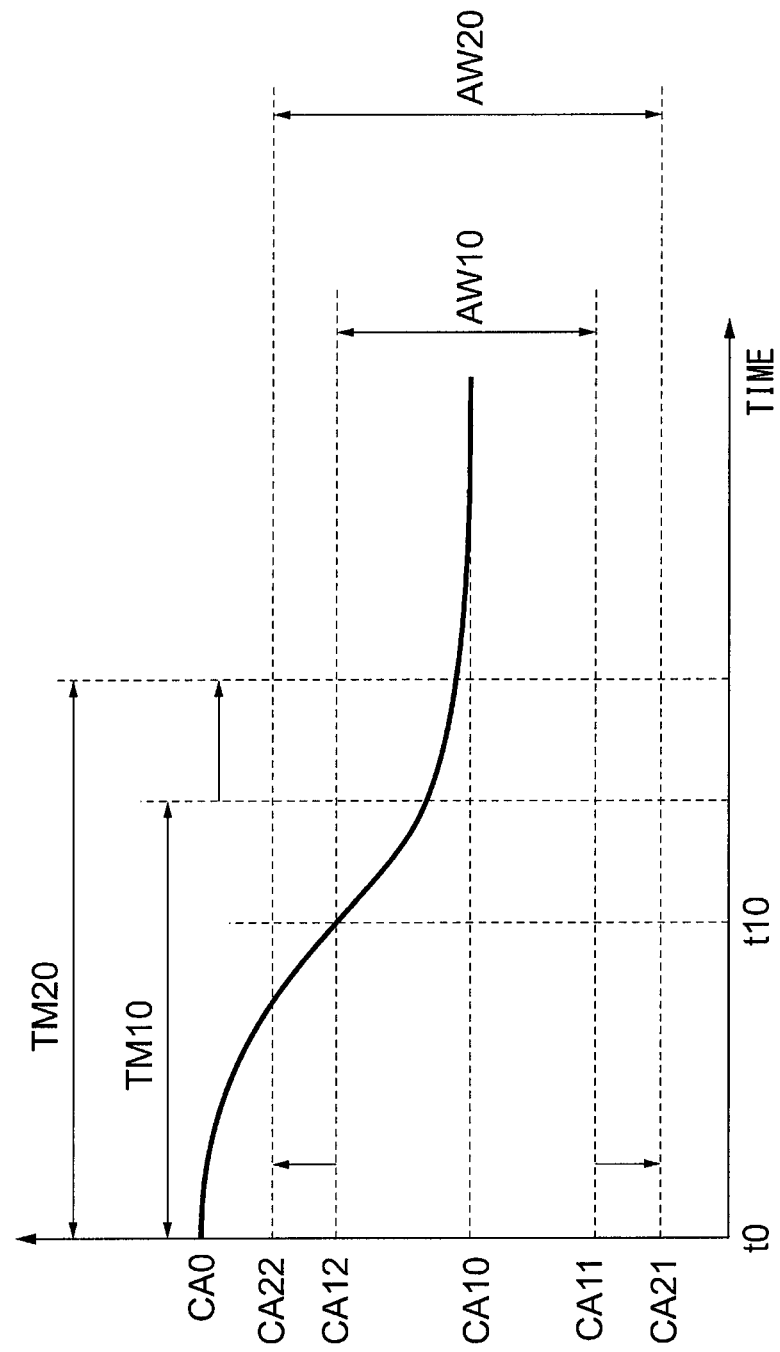
FIG. 19 is a graph illustrating a method for diagnosing the operational state of the variable valve system.

FIG. 19 illustrates a graph illustrating a change in the measured value of the adjustment angle in a case where the target value of the adjustment angle is changed. The target value of the adjustment angle is changed from a value CA0 to a value CA10 at a time point t0 in the example illustrated in FIG. 19. The actual value of the adjustment angle starts to be changed from the value CA0 and approach the value CA10 after the time point t0 and approximately matches the value CA10 finally.

The vehicle diagnostic unit 130 monitors whether or not a deviation in the adjustment angle, that is, the amount of difference between the actual adjustment angle and the target value CA10, settles within a predetermined allowable range AW10. The allowable range AW10 is the range from a lower limit value CA11 to an upper limit value CA12, and the center thereof is the target value CA10.

The variable valve timing mechanism 440 is determined to be normally operated if the deviation in the adjustment angle settles within the allowable range AW10 until a predetermined period TM10 elapses from the time point t0 at which the target value is changed. The deviation in the adjustment angle settles within the allowable range AW10 at a time point t10 before the predetermined period TM10 elapses in the example of FIG. 19. Therefore, the vehicle diagnostic unit 130 determines the variable valve timing mechanism 440 to be normally operated.

Meanwhile, the vehicle diagnostic unit 130 determines a malfunction to occur in operation of the variable valve timing mechanism 440 in a case where the deviation in the adjustment angle does not settle or settles within the allowable range AW10 in a period longer than the predetermined period TM10.

Figure 20:
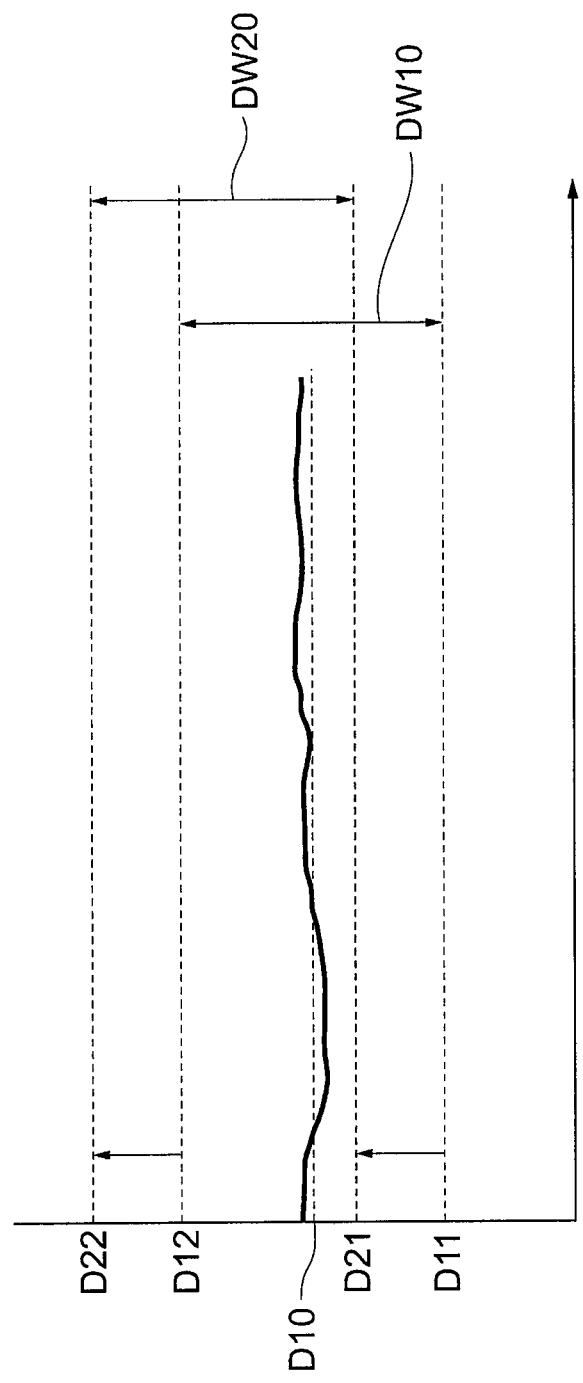
FIG. 20 is a graph illustrating a method for diagnosing an air-fuel ratio.

A diagnosis of the air-fuel ratio as another one of the items diagnosed by the vehicle diagnostic unit 130 will be described. FIG. 20 illustrates a graph illustrating an example of a change in the air-fuel ratio measured by the A/F sensor 460. The graph of FIG. 20 is drawn in such a manner that the air-fuel ratio is leaner toward the upper side of the graph and is richer toward the lower side thereof.

The injection amount of fuel in the engine 20 is controlled in the vehicle 1 in such a manner that the air-fuel ratio approximately matches a theoretical air-fuel ratio D10. This control is performed by the ECU of the vehicle 1 by providing feedback to the A/F sensor 460.

The vehicle diagnostic unit 130 monitors whether or not the air-fuel ratio measured by the A/F sensor 460 falls within a predetermined normal range DW10. The normal range DW10 is the range from a lower limit value D11 to an upper limit value D12, and the center thereof is the theoretical air-fuel ratio D10.

The vehicle diagnostic unit 130 monitors whether or not the measured air-fuel ratio falls within the normal range DW10. The vehicle diagnostic unit 130 determines the air-fuel ratio not to be normal in a case where the air-fuel ratio exceeds the upper limit value D12 or falls below the lower limit value D11.

Figure 21:
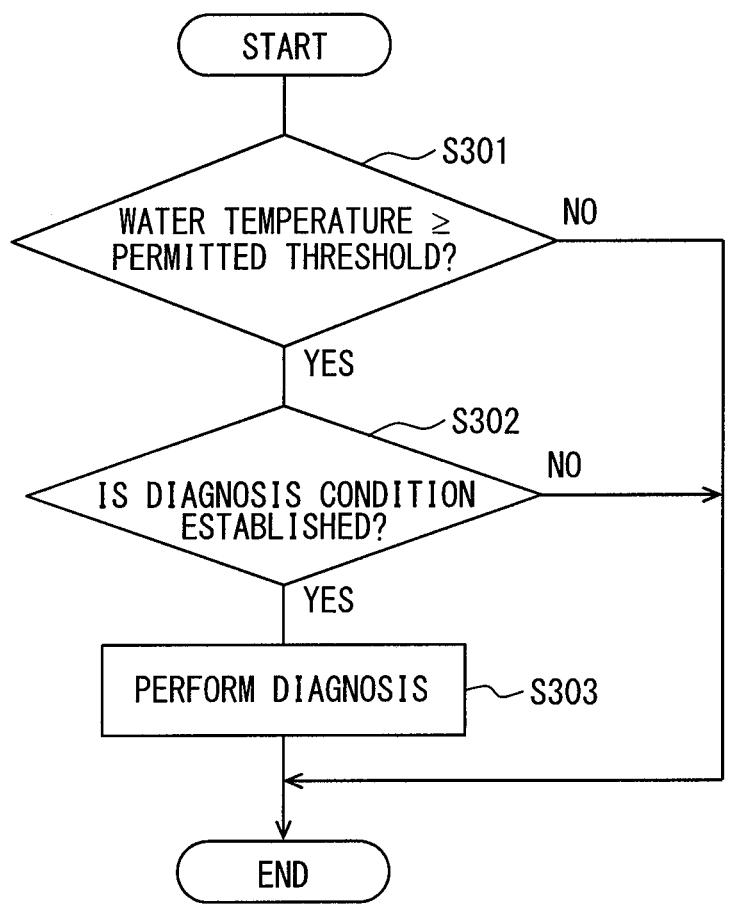
FIG. 21 is a flowchart illustrating the flow of a process performed in the diagnostic device.

Such a diagnosis illustrated heretofore is performed by the vehicle diagnostic unit 130 during traveling of the vehicle 1. A condition for performing a diagnosis will be described with reference to FIG. 21. A series of processes illustrated in FIG. 21 is repeated by the vehicle diagnostic unit 130 each time a predetermined cycle elapses.

A determination of whether or not the temperature of the coolant obtained by the water temperature obtaining unit 110 is greater than or equal to a predetermined permitted threshold is performed in the initial S301. The permitted threshold is a threshold that is individually set for each diagnosis item to a water temperature indicating that the state of the vehicle 1 is stable to the extent in which a diagnosis thereof is performed. The series of processes illustrated in FIG. 21 is ended in a case where the temperature of the coolant is smaller than the permitted threshold. In this case, a diagnosis is not performed by the vehicle diagnostic unit 130.

A transition is made to S302 in a case where the temperature of the coolant is greater than or equal to the permitted threshold. A determination of whether or not a diagnosis condition is established is performed in S302.

An item such that a diagnosis is required to be completed while the vehicle 1 travels in a specific driving mode (for example, an LA#4 mode, a JC08 mode, and an NEDC mode) exists in the diagnosis items. The diagnosis condition is a condition that the vehicle 1 travels in a specific driving mode at the current point in time and is individually set for each diagnosis item. A diagnosis may be required at all times regardless of the travel state of the vehicle 1 according to a diagnosis item. For such a diagnosis item, a transition is made to S303 without performing the determination of S302.

The series of processes illustrated in FIG. 21 is ended in a case where the diagnosis condition is not established. In this case, a diagnosis is not performed by the vehicle diagnostic unit 130. A transition is made to S303 if the diagnosis condition is established. A diagnosis is performed in S303.

Figure 22:
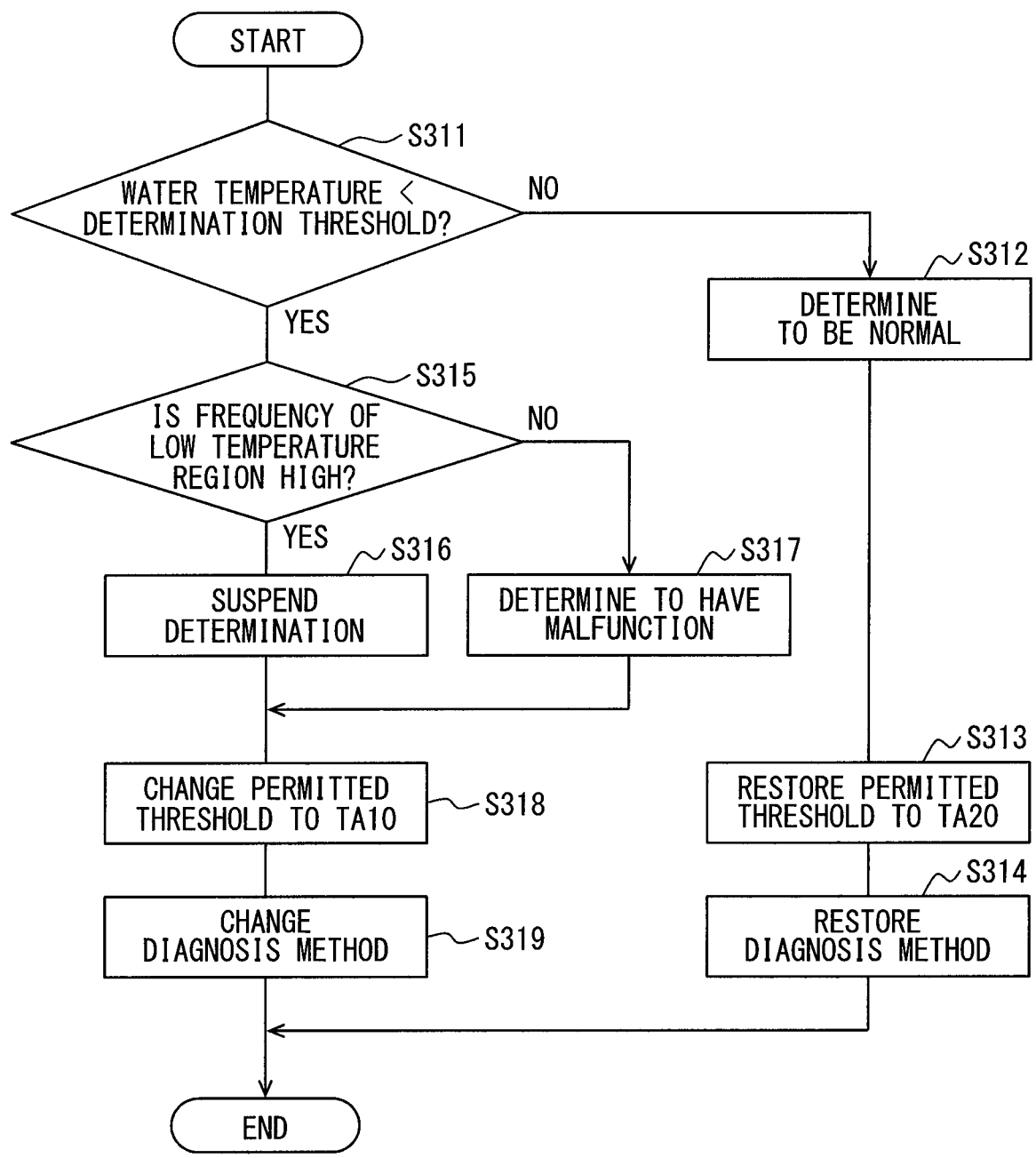
FIG. 22 is a flowchart illustrating the flow of a process performed in the diagnostic device.

The permitted threshold and a diagnosis method are changed according to the temperature of the coolant in the diagnostic device 100 according to the fourth embodiment. A specific content of a process performed for the change will be described with reference to FIG. 22. A series of processes illustrated in FIG. 22 is repeated by the diagnostic device 100 each time a predetermined cycle elapses. The series of processes illustrated in FIG. 22 is performed in parallel with the series of processes illustrated in FIG. 21.

A determination of whether or not the temperature of the coolant obtained by the water temperature obtaining unit 110 falls below a predetermined determination threshold is performed in the initial S311. The determination threshold is a threshold that is set in advance to a value below which the temperature of the coolant is not supposed to reside if the temperature adjusting valve 560 is normally operated after completion of the warm-up. Therefore, if the temperature of the coolant is greater than or equal to the determination threshold, a transition is made to S312, and the temperature adjusting valve 560 is determined to be normal. Such a determination is performed by the malfunction determination unit 120 of the diagnostic device 100.

The determination threshold in the fourth embodiment is set to a value that is equal to the highest value of the permitted threshold set for each diagnosis item.

The permitted threshold is set to a value TA20 in S313 subsequent to S312. As described later, the permitted threshold may be changed from the usual value TA20 to a lower value TA10. The permitted threshold returns to the value TA20 which is the usual value thereof in S313. The permitted threshold is not changed in S313 in a case where the permitted threshold is previously equal to the value TA20.

The diagnosis method is restored to an original state thereof in S314 subsequent to S313. As described later, the diagnosis method described with reference to FIG. 19 and FIG. 20 (for example, the size of the upper limit value D12 and the like in FIG. 20) may be temporarily changed. The changed diagnosis method is restored to the original method in S314. The diagnosis method is not changed in S314 in a case where the diagnosis method is not previously changed.

A transition is made to S315 in a case where the temperature of the coolant is determined to reside below the determination threshold in S311. A change in the amount of heat transmitted per unit time from the engine 20 to the coolant (hereinafter, referred to as "heat receiving amount" as well) will be described with reference to FIG. 23 prior to describing a determination performed in S315.

Figure 23:
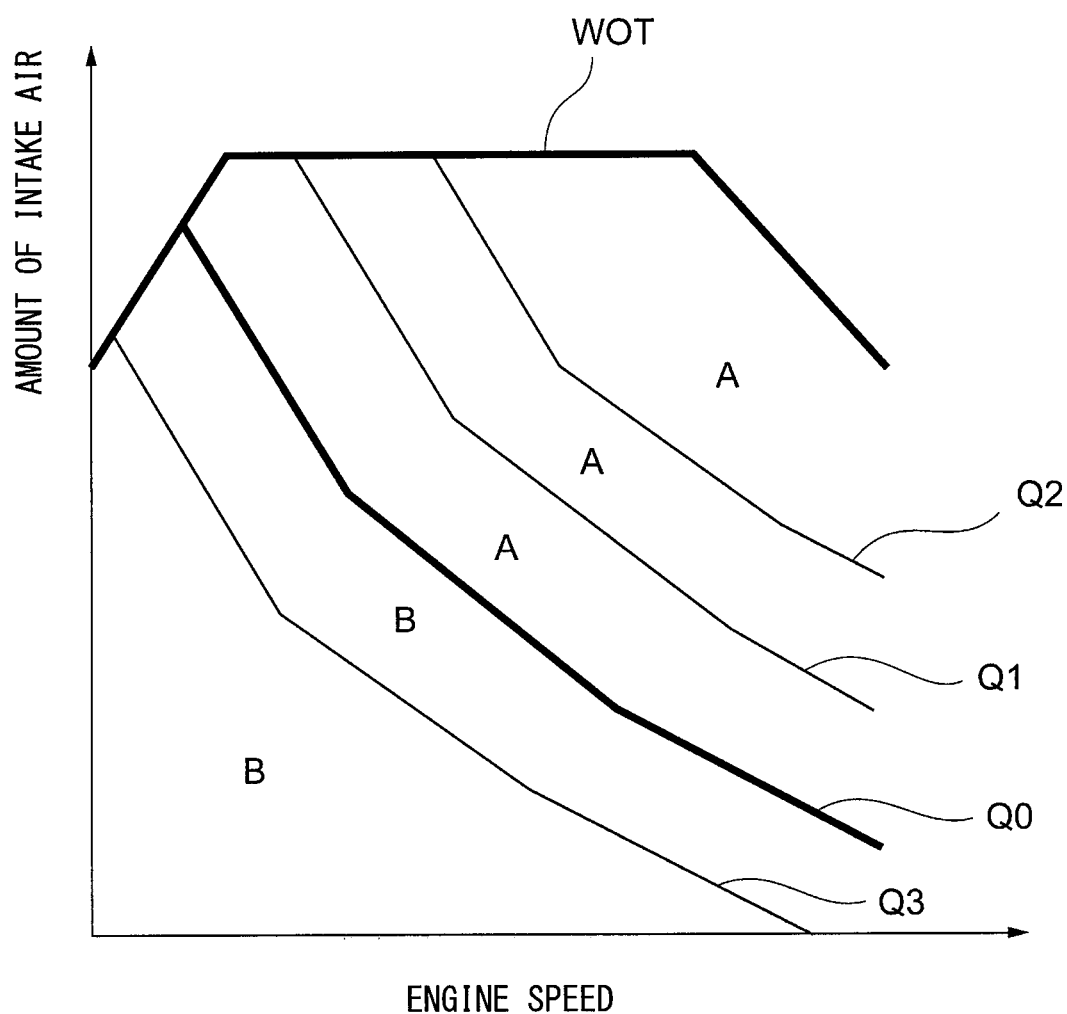
FIG. 23 is a diagram illustrating a relationship between the operational state of an engine and a heat receiving amount of a coolant.

FIG. 23 illustrates a map illustrating a relationship between the operational state of the engine 20 and the heat receiving amount of the coolant. The heat receiving amount of the coolant is the amount of heat added per unit time to the coolant circulating in the circulation flow channel 510. The engine speed is illustrated on the horizontal axis of the map, and the amount of air taken into the engine 20 is illustrated on the vertical axis of the map. The heat receiving amount in each operational state that is determined by the engine speed on the horizontal axis and the amount of air on the vertical axis is drawn by contour lines in FIG. 23. The map of FIG. 23 is created in advance and is stored in the ROM included in the diagnostic device 100.

A boldfaced line WOT illustrates the upper limit value of the amount of air taken into the engine 20 at each engine speed, that is, the flow rate of air taken into the engine 20 in a state where a throttle valve is wide opened.

The heat receiving amount of the coolant approximately matches the amount of heat radiated per unit time from the coolant to the outside (hereinafter, referred to as "heat radiating amount" as well) in an operational state such as illustrated along a line Q0 of FIG. 23. The heat receiving amount of the coolant is greater than the heat radiating amount in an operational state such as illustrated along a line Q1 of FIG. 23. Thus, the temperature of the coolant tends to be increased in a case where the coolant does not pass through the radiator 530.

The heat receiving amount of the coolant is further increased in an operational state such as illustrated along a line Q2 of FIG. 23. Thus, the temperature of the coolant tends to be further increased in a case where the coolant does not pass through the radiator 530.

The heat receiving amount of the coolant is smaller than the heat radiating amount in an operational state such as illustrated along a line Q3 of FIG. 23. Thus, the temperature of the coolant may tend to be decreased even in a case where the coolant does not pass through the radiator 530.

As such, the heat receiving amount of the coolant has a greater value as the operation region of the engine 20 moves upward and rightward in the map illustrated in FIG. 23. Conversely, the heat receiving amount of the coolant has a smaller value as the operation region of the engine 20 moves downward and leftward. A torque generated by the engine 20 may be illustrated on the vertical axis of the map. Even in that case, approximately the same map as FIG. 23 is drawn.

Hereinafter, an operation region on the upper side of the line Q0, that is, an operation region designated by a reference sign "A" in FIG. 23, will be referred to as "A region". An operation region on the lower side of the line Q0, that is, an operation region designated by a reference sign "B" in FIG. 23, will be referred to as "B region". The "A" region is an operation region in which the heat receiving amount of the coolant is greater than the heat radiating amount. The "B" region is an operation region in which the heat receiving amount of the coolant is smaller than the heat radiating amount.

As described above, an open failure may occur in the temperature adjusting valve 560 when the temperature of the coolant is decreased. However, even when an open failure does not occur in the temperature adjusting valve 560 and the temperature adjusting valve is closed, the temperature of the coolant is unlikely to be increased if the engine 20 is operated in the "B" region.

That is, when the frequency of operation in the "B" region is high, the cause of the temperature of the coolant residing below the determination threshold is not limited to an open failure of the temperature adjusting valve 560. Therefore, when the frequency of operation in the "B" region is high, a determination of whether or not a malfunction occurs in the temperature adjusting valve 560 is not performed and is suspended in the fourth embodiment. Accordingly, an erroneous determination of the state of the temperature adjusting valve 560 is prevented.

Figure 24:
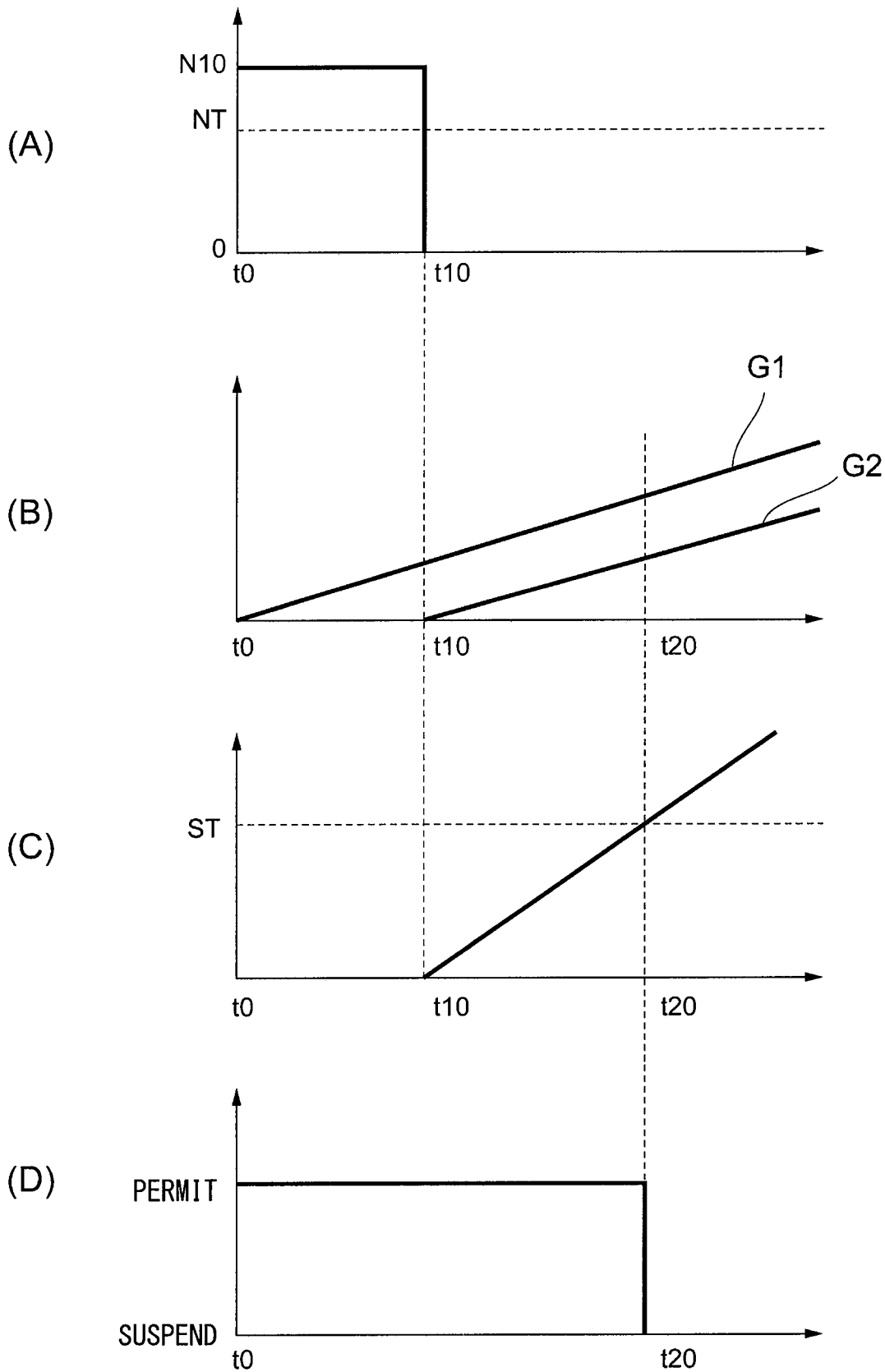
FIG. 24 is a diagram illustrating a condition for suspending a diagnosis of a temperature adjusting valve.

An example of a case where a determination performed by the malfunction determination unit 120 is suspended will be described with reference to FIG. 24. FIG. 24(A) illustrates a change in the torque generated by the engine 20. A torque of a value N10 higher than a threshold NT is generated during a period from the time point t0 until the time point t10 in the example of FIG. 24(A). At this point, the operation region of the engine 20 is the "A" region in which the heat receiving amount is great.

The engine 20 is stopped after the time point t10, and the vehicle 1 travels using only the driving power of the motor M. The torque of the engine 20 is decreased below the threshold NT to zero. Then, the operation region of the engine 20 is the "B" region in which the heat receiving amount is small.

FIG. 24B illustrates a line G1 illustrating the cumulative value of the amount of time of operation after the time point t0 and a line G2 illustrating the cumulative value of the amount of time of operation in the "B" region. FIG. 24C illustrates a change in the ratio of the cumulative value of the amount of time of operation in the "B" region to the cumulative value of the amount of time of operation. That is, a change in the ratio of the value illustrated by the line G2 to the value illustrated by the line G1 is illustrated. The ratio is gradually increased by operation of the engine 20 in the "B" region after the time point t10.

The malfunction determination unit 120 suspends a determination of whether or not a malfunction occurs in the temperature adjusting valve 560 when the ratio of operation of the engine 20 in the "B" region exceeds a predetermined threshold ST. FIG. 24D is a graph illustrating how a state where the determination is permitted is switched to a state where the determination is suspended. The ratio of the "B" region exceeds the threshold ST at a time point t20 in the example of FIG. 24, and a determination performed by the malfunction determination unit 120 is suspended after the time point t20. The threshold ST is set to 50% in the fourth embodiment.

Such cumulation of the amount of time of operation in the "B" region and calculation of the ratio of the cumulative value described heretofore are continuously performed in the diagnostic device 100 independently of the measured value of the temperature of the coolant.

While the line Q0 indicating a boundary between the "A" region and the "B" region (refer to FIG. 23) is described heretofore as being fixed, a manner that may be used is such that the boundary is changed in a real-time manner on the basis of an estimated value of the heat radiating amount at the current point in time.

The heat radiating amount at the current point in time can be estimated on the basis of, for example, the temperature of the coolant, the outside air temperature, and the engine speed. The heat receiving amount obtained from the map of FIG. 23 is compared with the estimated heat radiating amount. When the heat receiving amount is greater, it can be determined that the engine 20 is currently operated in the "A" region. Conversely, when the heat radiating amount is greater, it can be determined that the engine 20 is currently operated in the "B" region.

FIG. 22 is referred to again for description. A determination of whether or not the frequency of operation in the "B" region where the temperature of the coolant is likely to be decreased is high is performed in S315. Specifically, a determination is performed of whether or not the ratio of the cumulative value of the "B" region illustrated in FIG. 24C exceeds the threshold ST. A transition is made to S316 in a case where the ratio of the cumulative value of the "B" region exceeds the threshold ST. When a transition is made to S316, a determination performed by the malfunction determination unit 120 is suspended.

A transition is made to S317 in a case where the ratio of the cumulative value of the "B" region does not exceed the threshold ST in S315. A transition to S317 means that the temperature of the coolant falls below the determination threshold even though the heat receiving amount of the coolant is comparatively great and the temperature of the coolant is likely to be increased. In this case, the coolant is highly likely to be supplied to the radiator 530 due to an open failure occurring in the temperature adjusting valve 560. Thus, the malfunction determination unit 120 determines a malfunction to occur in the temperature adjusting valve 560 in S317.

A transition is made to S318 after the process of S316 or S317 is performed. The permitted threshold is changed from the original value TA20 to the value TA10 in S318. The value TA10 is set in advance to a value that is smaller than the original value TA20 and smaller than the determination threshold.

Figure 25:
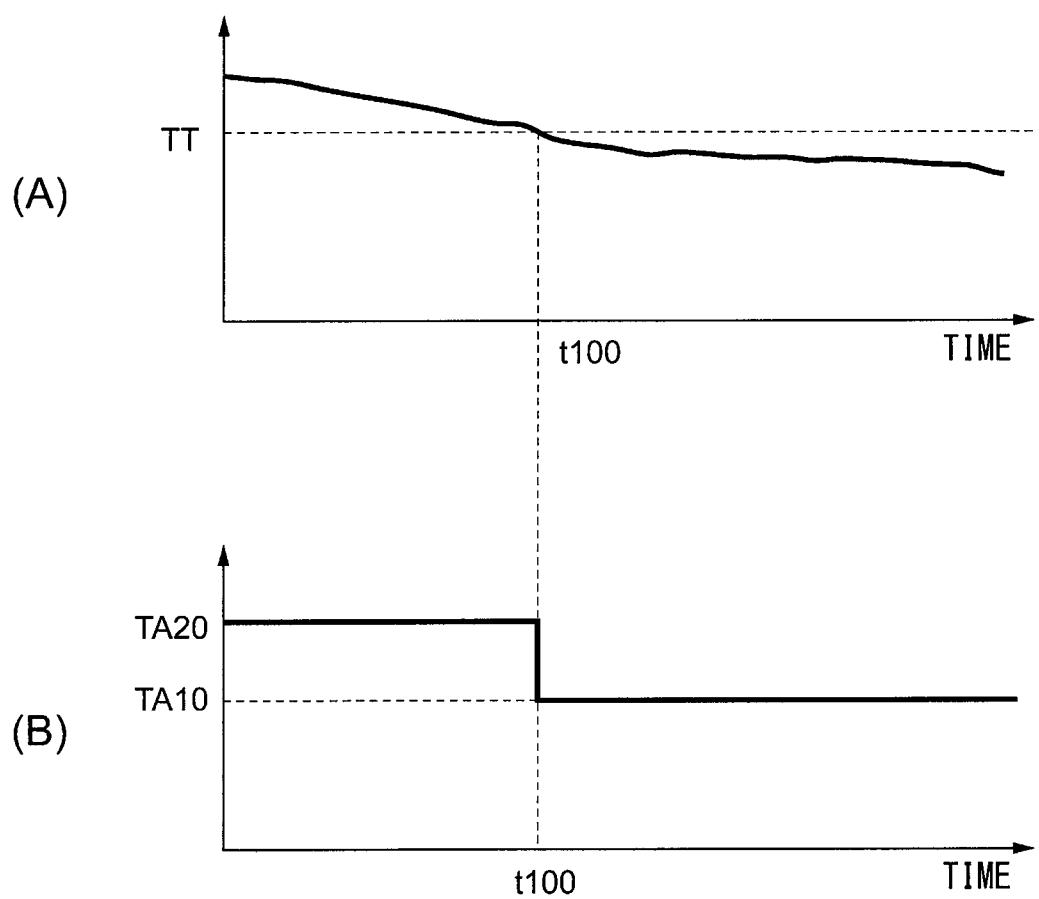
FIG. 25 is a diagram illustrating changing a permitted threshold.

FIG. 25 illustrates an example of how the value of the permitted threshold is changed. FIG. 25(A) illustrates a change in the temperature of the coolant obtained by the water temperature obtaining unit 110. FIG. 25(B) illustrates a change in the value of the permitted threshold. As illustrated in FIG. 25, when the temperature of the coolant falls below a determination threshold TT at a time point t100, the permitted threshold is changed from the value TA20 to the value TA10.

As such, since the permitted threshold is changed to be decreased from the original value thereof, a diagnosis performed by the vehicle diagnostic unit 130 is permitted even if the temperature of the coolant falls below the determination threshold or the value TA20. That is, a condition for performing a failure diagnosis is facilitated, and an opportunity of a failure diagnosis is appropriately secured. Accordingly, a delay in the timing of detecting a failure occurring in the vehicle 1 is prevented.

When the temperature of the coolant falls below the value TA20, the operational state of each unit of the vehicle 1 may be different from the usual operational state thereof, that is, the operational state thereof when the temperature of the coolant is greater than or equal to the value TA20. Therefore, a concern exists that a diagnosis may not be accurately performed if a diagnosis is performed by the vehicle diagnostic unit 130 in the same manner as usual after S318. For example, a concern exists that a malfunction is determined to be present even though a failure does not occur actually.

Therefore, a method for a diagnosis performed by the vehicle diagnostic unit 130 is changed in S319 subsequent to S318. An example of a specific manner of the change will be described with reference to FIG. 19 again.

In this example, the allowable range of the deviation in the adjustment angle is changed from the allowable range AW10 to an allowable range AW20 when the permitted threshold is changed from the value TA20 to the value TA10. An upper limit value CA22 of the allowable range AW20 is a value greater than the upper limit value CA12 of the allowable range AW10. A lower limit value CA21 of the allowable range AW20 is a value smaller than the lower limit value CA11 of the allowable range AW10. The allowable range AW20 is a range wider than the allowable range AW10 and is a range that includes the entirety of the allowable range AW10.

A predetermined period that is set as a target amount of time in which the deviation in the adjustment angle settles within the allowable range AW20 is changed from the predetermined period TM10 to a predetermined period TM20. The predetermined period TM20 is a period longer than the predetermined period TM10.

The viscosity of oil at a movable part of the variable valve timing mechanism 440 is high when the temperature of the coolant is decreased. Thus, even if a control that changes the adjustment angle is started, response of the cam 410 which is the movable part may be delayed, or some position deviation may remain. As a result, a malfunction may be determined to occur in the variable valve timing mechanism 440 even though no failure occurs in the variable valve timing mechanism 440.

Therefore, the allowable range AW10 is changed to be wider than the allowable range before, and the predetermined period TM10 is changed to be longer than the predetermined period before as described above in the fourth embodiment. That is, when the temperature of the coolant obtained by the water temperature obtaining unit 110 falls below the determination threshold, a criterion for a diagnosis related to operation of the movable member of which the position is changed by the hydraulic actuator is facilitated. Thus, determining a malfunction to occur in the variable valve timing mechanism 440 even though no failure occurs in the variable valve timing mechanism 440 is prevented.

While both the allowable range AW10 and the predetermined period TM10 may be changed as in the fourth embodiment, only one of the allowable range AW10 and the predetermined period TM10 may be changed.

Another example of the manner of changing the diagnosis method will be described with reference to FIG. 20 again. In this example, the normal range of the air-fuel ratio is changed from the normal range DW10 to a normal range DW20 when the permitted threshold is changed from the value TA20 to the value TA10. An upper limit value D22 of the normal range DW20 is a value on the leaner side of the upper limit value D12 of the normal range DW10. A lower limit value D21 of the normal range DW20 is a value on the leaner side of the lower limit value D11 of the normal range DW10. As such, the normal range DW20 is a range to which the entirety of the normal range DW10 is shifted to the leaner side.

The temperature of the engine 20 is also decreased when the temperature of the coolant is decreased. Thus, the volatility of fuel is decreased, and the value of the air-fuel ratio measured by the A/F sensor 460 tends to be shifted to the leaner side. As a result, the air-fuel ratio may be determined not to be normal even though fuel injection and the like are normally performed in the engine 20.

Therefore, both the upper limit value D12 and the lower limit value D11 of the normal range DW10 are changed to be shifted to the leaner side as described above in the fourth embodiment. Thus, determining the air-fuel ratio not to be normal even though fuel injection and the like are normally performed is prevented.

While both the upper limit value D12 and the lower limit value D11 may be changed as in the fourth embodiment, only one of the upper limit value D12 and the lower limit value D11 may be changed. The width of the normal range DW10 and the width of the normal range DW20 may be the same or may be different from each other.

It is considered that a criterion for a determination of a normal state is facilitated at all times regardless of the temperature of the coolant if only preventing an erroneous diagnosis is considered. For example, it is considered that a determination is performed by using the longer allowable range AW20 at all times in the example of FIG. 19. However, in that case, the amount of time required for a diagnosis performed during traveling of the vehicle 1 is increased.

An item such that a diagnosis is required to be completed in a period during which the vehicle 1 travels in a specific travel mode (for example, the LA#4 mode, the JC08 mode, and the NEDC mode) exists in the diagnosis items. Therefore, when the criterion for a determination of a normal state is facilitated at all times as described above, it is difficult to complete a diagnosis in the period of traveling in a specific travel mode. As a result, a problem may arise in that the frequency of a diagnosis of a part of the items is decreased. Therefore, it is desirable to appropriately change the diagnosis method used by the vehicle diagnostic unit 130 according to the temperature of the coolant in order to secure diagnosis frequency.

A thermostat that is switched opened and closed according to the temperature of the coolant is used as the temperature adjusting valve 560 in the fourth embodiment. That is, the temperature adjusting valve 560 is not switched opened and closed by an external electrical control but is switched opened and closed by an internal mechanism that senses and reacts to the temperature of the coolant.

Figure 17:
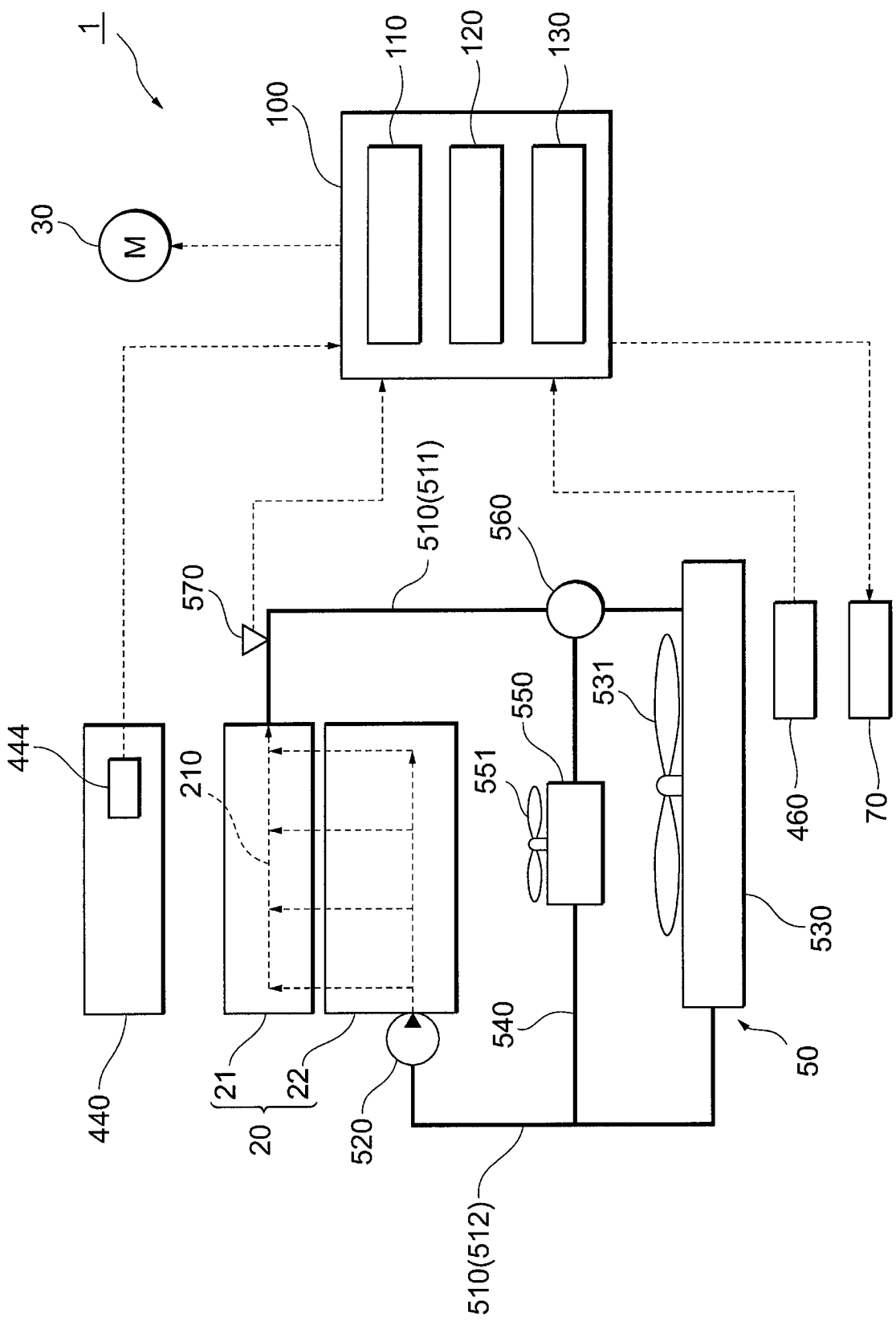
FIG. 17 is a diagram illustrating configurations of a diagnostic device according to a fourth embodiment of the present disclosure and a vehicle equipped with the diagnostic device.

However, the type of the temperature adjusting valve 560 is not particularly limited for embodying the present disclosure. An electric type may be used as the temperature adjusting valve 560. Hereinafter, a case where the temperature adjusting valve 560 of FIG. 17 is replaced by an electric temperature adjusting valve will be described. The electric temperature adjusting valve will be referred to as "temperature adjusting valve 560" in the same manner as heretofore described.

Figure 26:
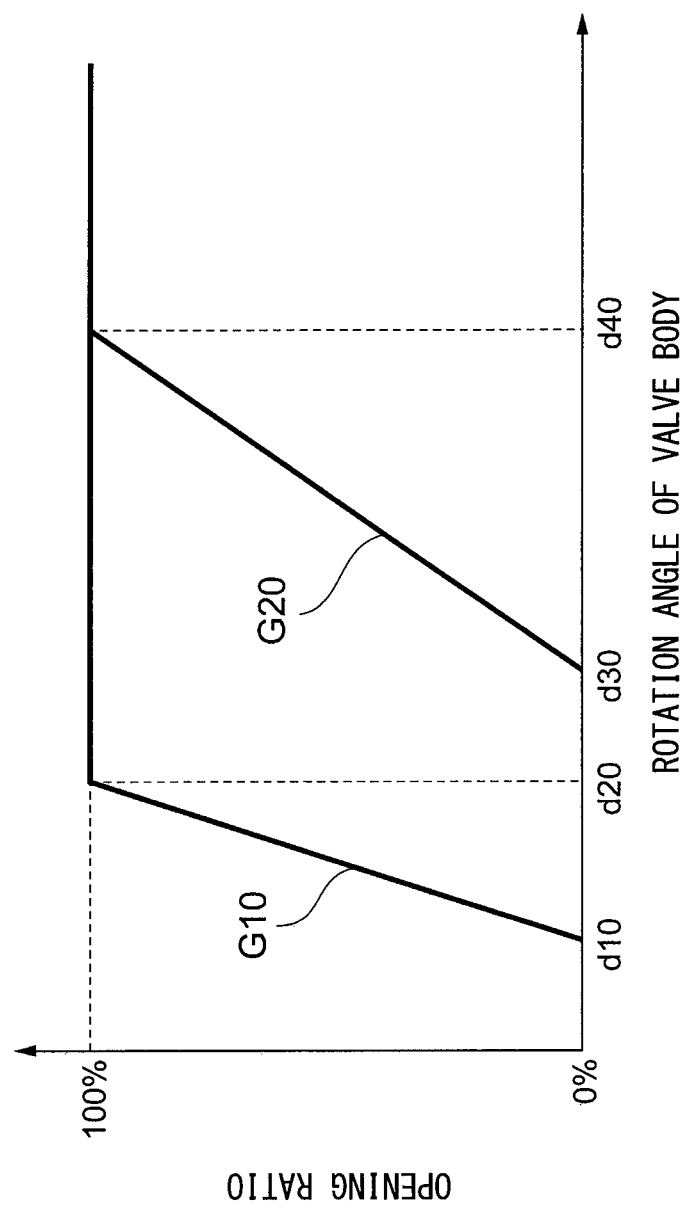
FIG. 26 is a diagram illustrating operation of a temperature adjusting valve in a case where an electric temperature adjusting valve is used.

FIG. 26 illustrates a graph illustrating operating characteristics of the electric temperature adjusting valve 560. The horizontal axis of the graph is the rotation angle of the valve body provided in the temperature adjusting valve 560. The vertical axis of the graph is the ratio of opening, that is, the opening ratio of the temperature adjusting valve 560. A line G10 illustrates a change in the opening ratio of a flow channel from the temperature adjusting valve 560 toward the heater core 550. A line G20 illustrates a change in the opening ratio of the flow channel from the temperature adjusting valve 560 toward the radiator 530.

The valve body of the electric temperature adjusting valve 560 is rotated on the basis of an external control signal. When the rotation angle of the valve body is smaller than d10, both the flow channel toward the heater core 550 and the channel toward the radiator 530 are closed.

When the rotation angle is increased over d10, only the opening ratio of the flow channel toward the heater core 550 is increased in accordance with the change in the rotation angle. When the rotation angle is equal to d20, only the flow channel toward the heater core 550 is wide opened.

Then, when the rotation angle is increased over d30, the opening ratio of the flow channel toward the radiator 530 is increased in accordance with the change in the rotation angle. At this point, the flow channel toward the heater core 550 remains wide opened. When the rotation angle is equal to d40, both the flow channel toward the radiator 530 and the channel toward the heater core 550 are wide opened.

Even the use of such an electric temperature adjusting valve 560 achieves the same effect as described heretofore.

An embodiment of the present disclosure is described heretofore with reference to specific examples. However, the present disclosure is not limited to the specific examples. That is, the specific examples after appropriately modified in design by those skilled in the art are to be included in the scope of the present disclosure, provided that the modified specific examples include the features of the present disclosure. For example, each element included in above each specific example and the arrangement, the material, the condition, the shape, and the size thereof are not limited to the illustrations and can be appropriately modified. Each element included in above each embodiment can be combined to the extent technically possible, and combined elements are to be included in the scope of the present disclosure provided that the combined elements include the features of the present disclosure.

Fifth Embodiment

A diagnostic device 100 according to the present embodiment is a device that diagnoses the operational state of a vehicle 1. First, a configuration of the vehicle 1 will be described with reference to FIG. 27. The vehicle 1 is configured as a so-called hybrid vehicle that includes an engine 20 and a motor M.

The engine 20 is a four-cycle reciprocating engine that is driven by using gasoline as fuel. The engine 20 includes a cylinder head 21 and a cylinder block 22. Multiple cylinders not illustrated are provided in the cylinder head 21 and the cylinder block 22. Each stroke of an intake stroke, a compression stroke, a combustion stroke, and an exhaust stroke is repeated in each cylinder, thereby generating driving power required for traveling of the vehicle 1.

The motor M is a three-phase AC motor. The vehicle 1 is equipped with a battery and a power converter (all of which are not illustrated). DC power that is output from the battery is converted into three-phase AC power by the power converter, and the three-phase AC power is supplied to the motor M. When the three-phase AC power is supplied to the motor M, driving power required for traveling of the vehicle 1 is generated. The magnitude of the driving power is adjusted by a switching operation of the power converter.

The vehicle 1 is capable of traveling using both driving power of the engine 20 and driving power of the motor M. The vehicle 1 is capable of traveling using only the driving power of the engine 20 or traveling using only the driving power of the motor M.

The vehicle 1 includes a cooling device 50, a current sensor 561, and an informing device 70 in addition to the engine 20 and the motor M described heretofore.

The cooling device 50 is a device that cools the engine 20 generating a great amount of heat during operation thereof and maintains the engine 20 at an appropriate temperature. The cooling device 50 includes a circulation flow channel 510, a water pump 520, a radiator 530, a bypass flow channel 540, and a temperature adjusting valve 560.

The circulation flow channel 510 is a channel that circulates a coolant between the engine 20 and the radiator 530 described later. Hereinafter, a channel of the circulation flow channel 510 in which the coolant flows from the engine 20 toward the radiator 530 will be referred to as "first flow channel 511" as well. A channel of the circulation flow channel 510 in which the coolant flows from the radiator 530 toward the engine 20 will be referred to as "second flow channel 512" as well.

An internal flow channel 210 is provided in the engine 20. The coolant that is supplied to the engine 20 by passing through the second flow channel 512 captures heat from the engine 20 while passing through the internal flow channel 210. Accordingly, the temperature of the coolant is increased, and the coolant is discharged from the internal flow channel 210 to the first flow channel 511.

A water temperature sensor 570 that measures the temperature of the coolant immediately after discharged from the engine 20 is provided at a position near the engine 20 in the first flow channel 511. A signal that is based on a water temperature measured by the water temperature sensor 570 is input into the diagnostic device 100. Hereinafter, the temperature of the coolant measured by the water temperature sensor 570 will be referred to as "outlet water temperature" as well.

A water temperature sensor 571 that measures the temperature of the coolant immediately before supplied to the engine 20 is provided at a position near the engine 20 in the second flow channel 512. A signal that is based on a water temperature measured by the water temperature sensor 571 is input into the diagnostic device 100. Hereinafter, the temperature of the coolant measured by the water temperature sensor 571 will be referred to as "inlet water temperature" as well.

The water pump 520 is an electric pump that pumps the coolant to circulate the coolant in the circulation flow channel 510. The water pump 520 is arranged at a position near the engine 20 in the second flow channel 512. Operation of the water pump 520 is controlled by an ECU (not illustrated) that controls the entirety of the vehicle 1. The diagnostic device 100 is also capable of controlling operation of the water pump 520 through the ECU.

The water pump 520 outputs a signal that indicates the rotational speed of the water pump 520. The signal is input into both the diagnostic device 100 and the ECU. The ECU controls operation of the water pump 520 by referencing the signal from the water pump 520.

The radiator 530 is a heat exchanger that decreases the temperature of the coolant by causing the coolant flowing in the circulation flow channel 510 to exchange heat with air introduced from the outside of the vehicle 1. A radiator fan 531 is provided in the vicinity of the radiator 530. The radiator fan 531 transports air into the radiator 530 so that heat is efficiently exchanged in the radiator 530.

The bypass flow channel 540 is a channel that is provided to connect the first flow channel 511 and the second flow channel 512. Operation of the temperature adjusting valve 560 described later allows the coolant to flow only in the bypass flow channel 540 without passing through the radiator 530. In addition, operation of the temperature adjusting valve 560 allows the coolant to flow in both the radiator 530 and the bypass flow channel 540.

A heater core 550 is provided midway of the bypass flow channel 540. The heater core 550 constitutes a part of a heating device included in the vehicle 1. The heater core 550 is a heat exchanger that increases the temperature of air passing through the heater core 550 by causing the high temperature coolant flowing in the heater core 550 to exchange heat with the air. A blower 551 is provided in the vicinity of the heater core 550. The blower 551 transports air into the heater core 550 so that heat is efficiently exchanged in the heater core 550. Air that passes through the heater core 550 and of which the temperature is increased is supplied into the vehicle interior of the vehicle 1 by passing through a duct not illustrated.

The temperature of the coolant is decreased by exchange of heat with air when the coolant passes through the heater core 550. The amount of heat that the coolant loses when passing through the heater core 550 is changed according to the operational state of the heating device that includes the heater core 550.

The temperature adjusting valve 560 is provided at a part where the first flow channel 511 and the bypass flow channel 540 branch. The temperature adjusting valve 560 is a thermostat that is switched opened and closed according to the temperature of the coolant. The temperature adjusting valve 560 includes a valve body not illustrated. When the temperature of the coolant is decreased below a predetermined temperature, the valve body is moved, and a flow channel from the temperature adjusting valve 560 toward the radiator 530 is closed. Accordingly, the entirety of the coolant discharged from the engine 20 flows in the bypass flow channel 540 and returns to the engine 20 without passing through the radiator 530. Since the heat of the coolant is not captured in the radiator 530, a warm-up of the engine 20 immediately after a start of the engine 20 is promptly performed.

The valve body moves in the temperature adjusting valve 560 when the temperature of the coolant is increased to the predetermined temperature or higher. Accordingly, the flow channel from the temperature adjusting valve 560 toward the radiator 530 is opened. A part of the coolant discharged from the engine 20 flows in the bypass flow channel 540, and the remaining part flows in the radiator 530. Since the heat of the coolant is captured in the radiator 530, an excessive increase in the temperature of the coolant is prevented. As such, the temperature of the coolant is adjusted to an appropriate temperature by the temperature adjusting valve 560.

Hereinafter, the state where the flow channel from the temperature adjusting valve 560 toward the radiator 530 is opened will be referred to as "opened state" as well. The state where the flow channel from the temperature adjusting valve 560 toward the radiator 530 is closed will be referred to as "closed state" as well.

The current sensor 561 is a current meter that measures the magnitude of currents consumed in various power consuming devices with which the vehicle 1 is equipped. The current sensor 561 measures the total value of currents consumed in all of the power consuming devices including the water pump 520. Hereinafter, the total value will be referred to as "consumed current value" as well. A signal that is based on the consumed current value measured by the current sensor 561 is input into the diagnostic device 100.

The informing device 70 is a device that informs a driver of a diagnosis result of the vehicle 1 performed by the diagnostic device 100. When the diagnostic device 100 diagnoses any malfunction occurring in the vehicle 1, the informing device 70 informs the driver by turning on a warning lamp provided on a front panel.

The diagnostic device 100 is configured as a computer system that includes a CPU, a ROM, a RAM, and the like. The diagnostic device 100 may be configured as a separate device from the ECU which controls the entirety of the vehicle 1 or may be configured as a device integrated with the ECU. That is, a part or the entirety of the function of the diagnostic device 100 described below may be included in the ECU of the vehicle 1.

The diagnostic device 100 includes a water temperature obtaining unit 110, a state obtaining unit 150, a heat generation amount acquisition unit 130, and a malfunction determination unit 120 as functional control blocks.

The water temperature obtaining unit 110 is a part that calculates and obtains the temperature of the coolant discharged from the engine 20, that is, the outlet water temperature, on the basis of a signal received from the water temperature sensor 570.

The state obtaining unit 150 is a part that obtains the operational state of the vehicle 1. The operational state is exemplified by various items indicating the operational state of the vehicle 1, such as the rotating speed of the water pump 520. However, the outlet water temperature obtained by the water temperature obtaining unit 110 is not included in the operational state. The inlet water temperature measured by the water temperature sensor 571 is obtained as the operational state by the state obtaining unit 150 in the present embodiment.

Figure 28:
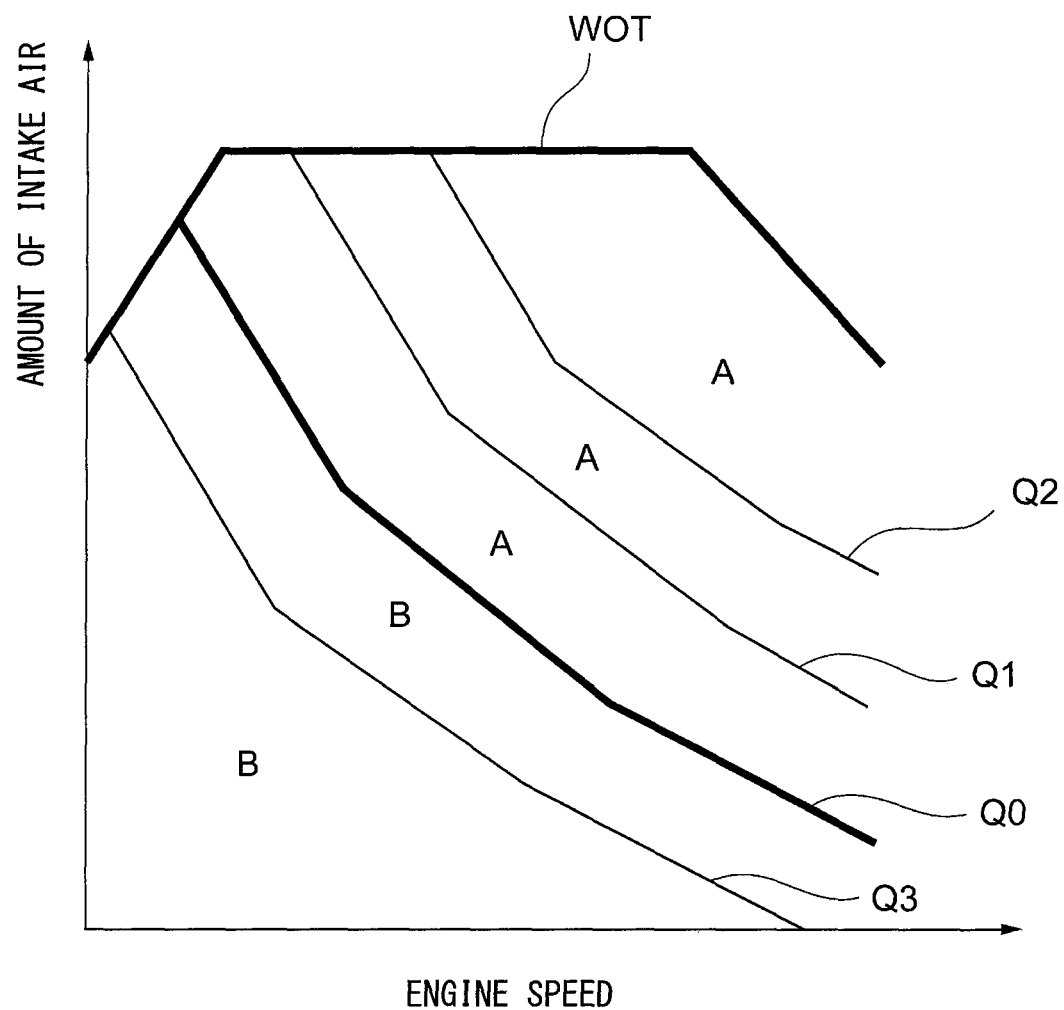
FIG. 28 is a diagram illustrating a relationship between the operational state of an engine and a heat receiving amount of a coolant.

The heat generation amount acquisition unit 130 is a part that calculates and obtains the heat generation amount of the engine 20 at the current point in time. A calculation method for the heat generation amount used by the heat generation amount acquisition unit 130 will be described with reference to FIG. 28. FIG. 28 illustrates a map illustrating a relationship between the operational state of the engine 20 and the heat receiving amount of the coolant. The heat receiving amount of the coolant is the amount of heat added per unit time to the coolant circulating in the circulation flow channel 510.

The engine speed is illustrated on the horizontal axis of the map of FIG. 28, and the amount of air taken into the engine 20 is illustrated on the vertical axis of the map. The heat receiving amount in each operational state that is determined by the engine speed on the horizontal axis and the amount of air on the vertical axis is drawn by contour lines in FIG. 28. The map of FIG. 28 is created in advance and is stored in the ROM included in the diagnostic device 100.

A boldfaced line WOT illustrates the upper limit value of the amount of air taken into the engine 20 at each engine speed, that is, the flow rate of air taken into the engine 20 in a state where a throttle valve is wide opened.

The heat receiving amount of the coolant approximately matches the amount of heat radiated per unit time from the coolant to the outside (hereinafter, referred to as "heat radiating amount" as well) in an operational state such as illustrated along a line Q0 of FIG. 28. The heat receiving amount of the coolant is greater than the heat radiating amount in an operational state such as illustrated along a line Q1 of FIG. 28. Thus, the temperature of the coolant tends to be increased in a case where the coolant does not pass through the radiator 530.

The heat receiving amount of the coolant is further increased in an operational state such as illustrated along a line Q2 of FIG. 28. Thus, the temperature of the coolant tends to be further increased in a case where the coolant does not pass through the radiator 530.

The heat receiving amount of the coolant is smaller than the heat radiating amount in an operational state such as illustrated along a line Q3 of FIG. 28. Thus, the temperature of the coolant may tend to be decreased even in a case where the coolant does not pass through the radiator 530.

As such, the heat receiving amount of the coolant has a greater value as the operation region of the engine 20 moves upward and rightward in the map illustrated in FIG. 28. Conversely, the heat receiving amount of the coolant has a smaller value as the operation region of the engine 20 moves downward and leftward. A torque generated by the engine 20 may be illustrated on the vertical axis of the map. Even in that case, approximately the same map as FIG. 28 is drawn.

The heat receiving amount calculated from the map of FIG. 28 approximately matches the heat generation amount of the engine 20. Therefore, the heat generation amount acquisition unit 130 of the present embodiment calculates the heat receiving amount at the current point in time by referencing the map of FIG. 28 and obtains the heat receiving amount as is as the heat generation amount of the engine 20. Instead of such a manner, a manner that may be used is such that a map in which the heat generation amount of the engine 20 is directly calculated is created in advance and that the heat generation amount acquisition unit 130 calculates the heat generation amount on the basis of the map.

The malfunction determination unit 120 is a part that determines whether or not a malfunction occurs in the temperature adjusting valve 560. The temperature adjusting valve 560 is estimated not to be moved and to remain opened when, for example, a state where the outlet water temperature is low continues for a long amount of time. That is, since the temperature adjusting valve 560 is not closed, the coolant is estimated to be kept cooled by passing through the radiator 530. Hereinafter, a state where the temperature adjusting valve 560 is not moved and remains opened as described above will be referred to as "open failure" as well.

A determination performed by the malfunction determination unit 120 is not based on only the outlet water temperature obtained by the water temperature obtaining unit 110 but is based on both the outlet water temperature and the operational state obtained by the state obtaining unit 150.

Figure 29:
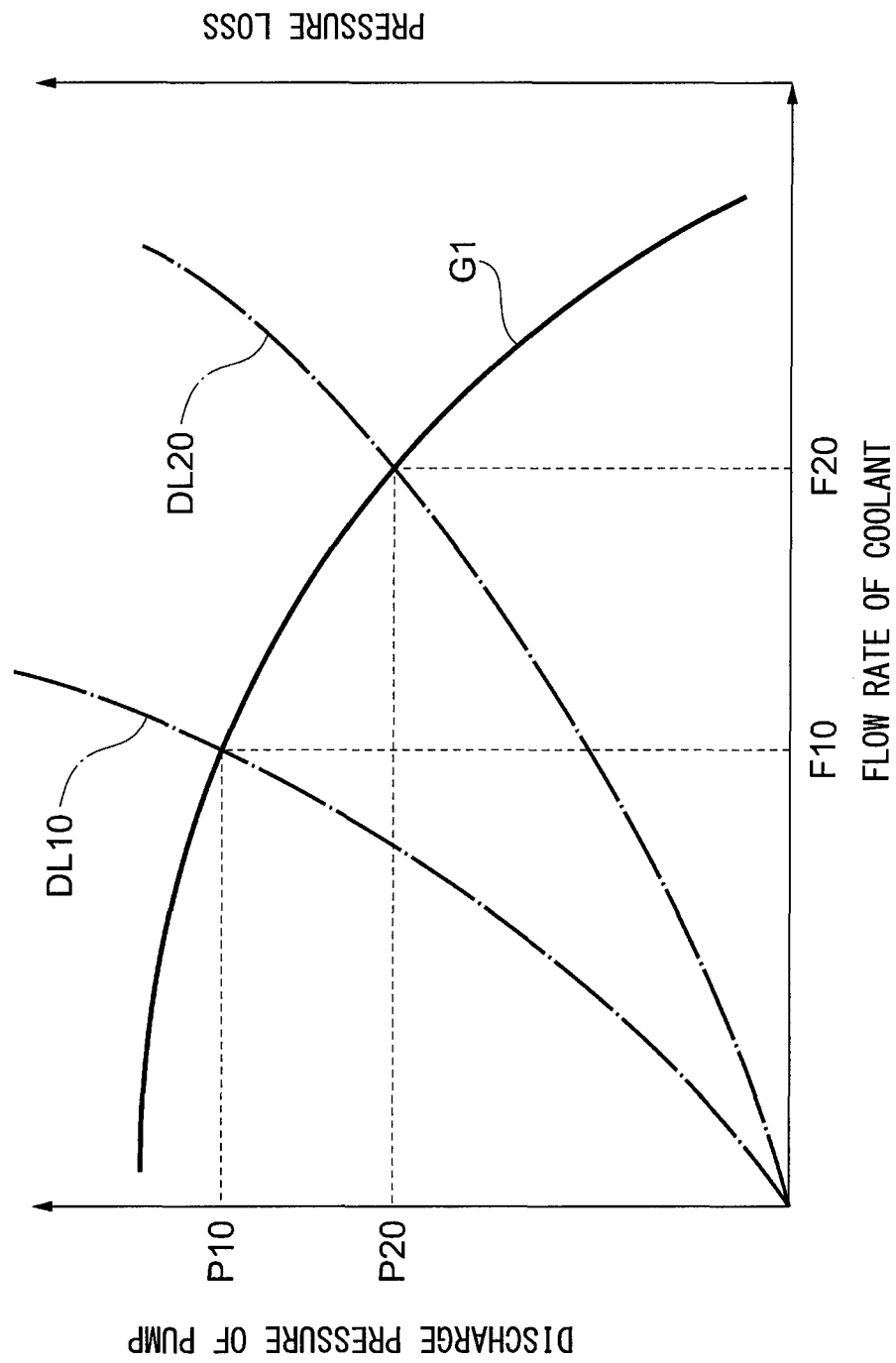
FIG. 29 is a diagram illustrating a relationship between the pressure of the coolant and the flow rate of the coolant.

A summary of a determination performed by the malfunction determination unit 120 will be described with reference to FIG. 29. A line G1 of FIG. 29 illustrates a relationship between the flow rate of the coolant and the discharge pressure of the water pump 520. As illustrated by the line G1, the discharge pressure of the water pump 520, that is, the pressure of the coolant at an outlet part of the water pump 520, tends to be decreased in accordance with an increase in the flow rate of the coolant flowing in the circulation flow channel 510.

Both a line DL10 and a line DL20 illustrate a relationship between the flow rate of the coolant and a pressure loss in a pipe constituting the circulation flow channel 510. The line DL10 illustrates a pressure loss when the temperature adjusting valve 560 is closed. The line DL20 illustrates a pressure loss when the temperature adjusting valve 560 is opened.

As illustrated by the line DL10 and the line DL20, when the flow rate of the coolant is increased, a pressure loss is increased as a result. A pressure loss when the temperature adjusting valve 560 is closed is greater than a pressure loss when the temperature adjusting valve 560 is opened.

An operating point when the water pump 520 is operated, that is, each value of the amount of coolant and the discharge pressure, is represented at the intersection of the line G1 and the line DL10 or at the intersection of the line G1 and the line DL20. That is, when the temperature adjusting valve 560 is closed, the flow rate of the coolant is equal to a flow rate F10, and the discharge pressure of the water pump 520 is equal to a pressure P10. When the temperature adjusting valve 560 is opened, the flow rate of the coolant is equal to a flow rate F20, and the discharge pressure of the water pump 520 is equal to a pressure P20. The flow rate F20 is greater than the flow rate F10.

As such, when the temperature adjusting valve 560 is opened, a pressure loss is decreased from a pressure loss in the closed state. As a result, the flow rate of the coolant is increased.

A heat generation amount Q per unit time in the engine 20 can be represented by the following Equation (1).

$$Q = mc\Delta T \quad (1)$$

The term m in the equation is the mass flow rate of the coolant passing through the engine 20. The term c is the specific heat capacity of the coolant. The term $\Delta T$ is an increase in the temperature of the coolant when passing through the engine 20. That is, the term $\Delta T$ is the difference between the outlet water temperature and the inlet water temperature.

If the heat generation amount Q is assumed to be approximately constant with no change in the operational state of the engine 20, the term $\Delta T$ is decreased as the mass flow rate m is increased. When the temperature adjusting valve 560 is opened, the flow rate of the coolant passing through the circulation flow channel 510 is increased, and accordingly, the term $\Delta T$ tends to be decreased.

Therefore, a determination of whether or not an open failure occurs in the temperature adjusting valve 560 is performed by referencing not only the outlet temperature but also the term $\Delta T$ in the present embodiment.

Figure 30:
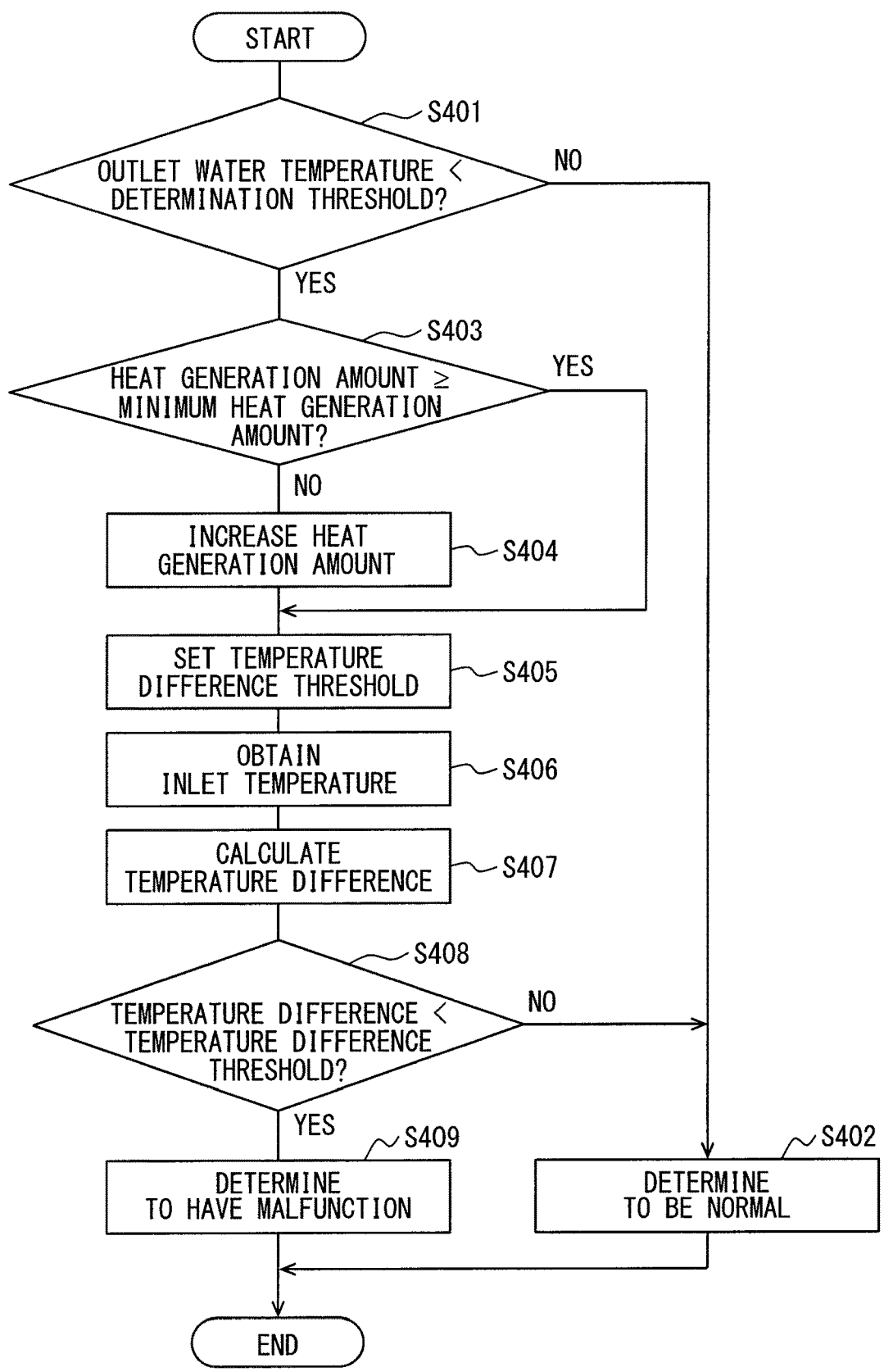
FIG. 30 is a flowchart illustrating the flow of a process performed in the diagnostic device.

A specific content of a process performed by the diagnostic device 100 will be described with reference to FIG. 30. A series of processes illustrated in FIG. 30 is repeated by the malfunction determination unit 120 each time a predetermined cycle elapses.

A determination of whether or not the outlet water temperature obtained by the water temperature obtaining unit 110 falls below a predetermined determination threshold is performed in the initial S401. The determination threshold is a threshold that is set in advance to a value below which the outlet water temperature is not supposed to reside if the temperature adjusting valve 560 is normally operated after completion of the warm-up. Therefore, if the outlet water temperature is greater than or equal to the determination threshold, a transition is made to S402, and the temperature adjusting valve 560 is determined to be normal.

A transition is made to S403 in a case where the outlet water temperature is determined to reside below the determination threshold in S401. A determination of whether or not the heat generation amount of the engine 20 at the current point in time, that is, the heat generation amount obtained by the heat generation amount acquisition unit 130, is greater than or equal to a predetermined minimum heat generation amount is performed in S403.

A transition is made to S404 in a case where the obtained heat generation amount is smaller than the minimum heat generation amount in S403. A process for increasing the heat generation amount of the engine 20 is performed in S404. A signal is transmitted from the diagnostic device 100 to the ECU of the vehicle 1 in the present embodiment. The ECU, when receiving the signal, causes the engine speed to be increased and causes the amount of air taken into the engine 20 to be increased. That is, the ECU causes the state of the engine 20 to be changed to the operation region illustrated at an upper right part of the map illustrated in FIG. 28. A transition is made to S405 when the process of S404 is completed.

A transition is made to S405 without passing through S404 in a case where the obtained heat generation amount is greater than or equal to the minimum heat generation amount in S403.

A temperature difference threshold is set in S405. The temperature difference threshold is a threshold that is compared with a temperature difference when an open failure of the temperature adjusting valve 560 is determined on the basis of the term $\Delta T$ of Equation (1), that is, the temperature difference between the outlet water temperature and the inlet water temperature. The temperature difference threshold is not a fixed value and is a value that is set on the basis of the heat generation amount of the engine 20 in the present embodiment.

Figure 31:
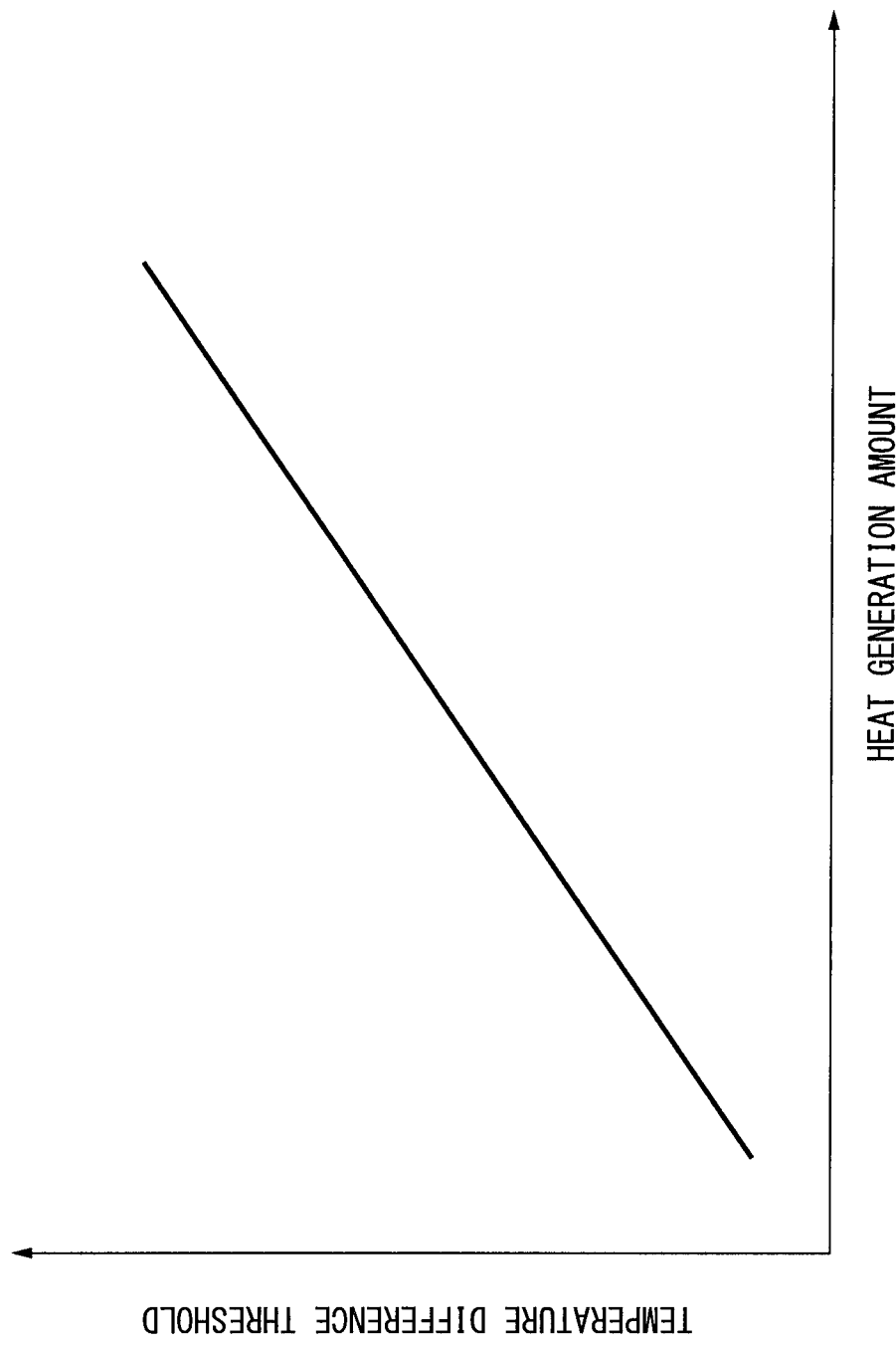
FIG. 31 is a diagram illustrating a relationship between a heat generation amount of the engine and a temperature difference threshold that is set.

The temperature difference threshold is set to a greater value as the heat generation amount is increased as illustrated in FIG. 31. A relationship between the heat generation amount and the temperature difference threshold is created in advance as a map such as illustrated in FIG. 31 and is stored in the ROM included in the diagnostic device 100. The temperature difference threshold is set in correspondence with the heat generation amount at the current point in time by referencing the map of FIG. 31 in S405 of FIG. 30.

The temperature of the coolant measured by the water temperature sensor 571, that is, the inlet water temperature, is obtained by the state obtaining unit 150 in S406 subsequent to S405. The temperature difference is calculated by subtracting the inlet water temperature from the outlet water temperature in S407 subsequent to S406.

A determination of whether or not the temperature difference calculated in S407 is smaller than the temperature difference threshold set in S405 is performed in S408 subsequent to S407. A transition is made to S409 in a case where the temperature difference is smaller than the temperature difference threshold.

A transition to S409 means that the temperature difference is comparatively small. In this case, as described with reference to Equation (1), the flow rate of the coolant passing through the engine 20 is comparatively high. Thus, the temperature adjusting valve 560 is highly likely to be opened.

However, the temperature adjusting valve 560 is supposed to be originally closed since the outlet water temperature falls below the determination threshold in S401. In such a situation, an open failure is estimated to occur in the temperature adjusting valve 560 since the temperature difference is smaller than the temperature difference threshold. Thus, a malfunction is determined to occur in the temperature adjusting valve 560 in S409.

A transition is made to S402 in a case where the temperature difference is greater than or equal to the temperature difference threshold in S408. The temperature difference being greater than or equal to the temperature difference threshold means that the flow rate of the coolant passing through the engine 20 is comparatively low. Thus, the temperature adjusting valve 560 is highly likely to be closed. That is, while the outlet water temperature falls below the determination threshold, the cause of the decrease in the outlet water temperature is highly unlikely to be an open failure of the temperature adjusting valve 560. Thus, the temperature adjusting valve 560 is determined to be normal in S402.

As described heretofore, a malfunction of the temperature adjusting valve 560 is not determined on the basis of only the outlet water temperature in the diagnostic device 100 according to the present embodiment. A malfunction of the temperature adjusting valve 560 is determined on the basis of both the outlet water temperature and the inlet water temperature obtained by the state obtaining unit 150. Specifically, a malfunction is determined to occur in the temperature adjusting valve 560 when the outlet water temperature falls below the predetermined determination threshold and the difference between the outlet water temperature and the inlet water temperature falls below the predetermined temperature difference threshold.

Thus, erroneously determining a malfunction to occur in the temperature adjusting valve 560 is prevented in a case where the outlet water temperature is decreased by a cause other than an open failure of the temperature adjusting valve 560. The "cause other than an open failure" is considered to be, for example, an increase in the amount of heat that the coolant loses when operation of the heating device is started and the coolant passes through the heater core 550.

The present embodiment includes the heat generation amount acquisition unit 130 that obtains the amount of heat generated in the engine 20. The malfunction determination unit 120 changes the temperature difference threshold according to the obtained heat generation amount. Specifically, as described with reference to FIG. 31, the temperature difference threshold is changed to be increased as the heat generation amount is higher.

When the heat generation amount of the engine 20 is increased, the difference between the outlet temperature and the inlet temperature is also increased regardless of whether or not an open failure occurs in the temperature adjusting valve 560. Thus, appropriately changing the temperature difference threshold on the basis of the heat generation amount as described above allows an accurate determination of whether or not a malfunction occurs in the temperature adjusting valve 560.

The temperature difference between the outlet temperature and the inlet temperature is decreased when the heat generation amount of the engine is comparatively small. In this case, the process performed in S408 of FIG. 30 becomes a comparison between infinitesimal values. Thus, it is difficult to perform an accurate determination. That is, it is difficult to determine a malfunction of the temperature adjusting valve 560 on the basis of the temperature difference.

Therefore, when the heat generation amount obtained by the heat generation amount acquisition unit 130 is smaller than the predetermined minimum heat generation amount, a control that increases the heat generation amount of the engine 20 is performed before a determination is performed by the malfunction determination unit 120 (specifically, in S404 of FIG. 30) in the present embodiment. The control increases the temperature difference between the outlet temperature and the inlet temperature. Thus, a determination based on the temperature difference can be comparatively easily performed.

Figure 32:
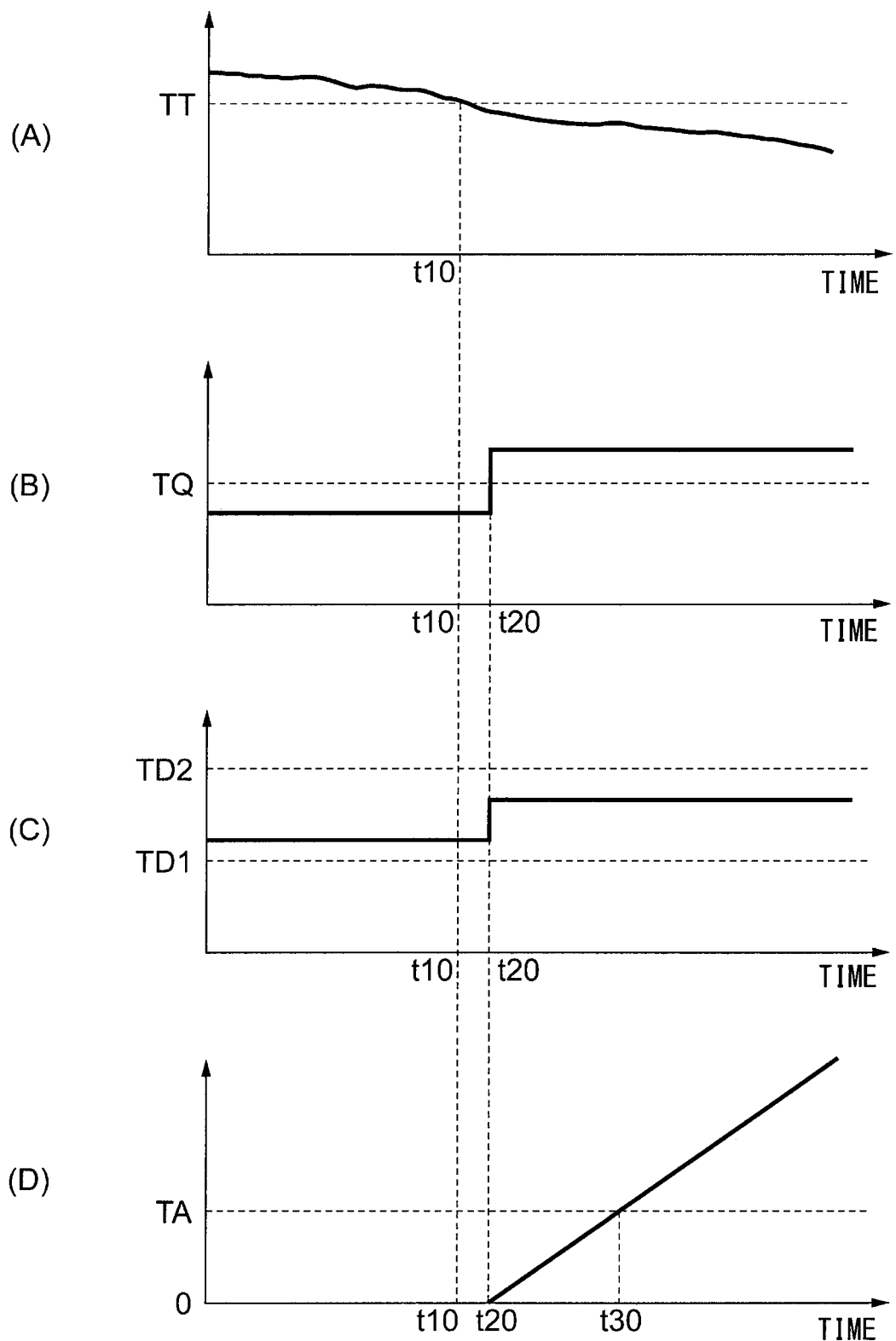
FIG. 32 is a diagram illustrating a change in the operational state of the vehicle and the like when a malfunction of a temperature adjusting valve is determined.

An example of changes in the temperature of the coolant, the heat generation amount, and the like when a determination is performed by the malfunction determination unit 120 as described heretofore will be described with reference to FIG. 32. FIG. 32(A) illustrates a change in the outlet water temperature obtained by the water temperature obtaining unit 110. In this example, the outlet water temperature is decreased as time elapses, and the outlet water temperature falls below a determination threshold TT at a time point t10.

FIG. 32B illustrates a change in the heat generation amount of the engine 20, that is, the heat generation amount obtained by the heat generation amount acquisition unit 130. In this example, the heat generation amount at the time point t10 falls below a minimum heat generation amount TQ. Thus, a process that increases the heat generation amount of the engine 20 is performed at a time point t20 slightly after the time point t10. This process is the process illustrated in S404 of FIG. 30. The heat generation amount of the engine 20 after the time point t20 is greater than the minimum heat generation amount TQ.

FIG. 32C illustrates a change in the temperature difference obtained by subtracting the inlet water temperature from the outlet water temperature. In this example, the temperature difference is constant in a period before the time point t20. The temperature difference is increased at the time point t20 when the heat generation amount of the engine 20 is increased. Then, the temperature difference again becomes constant.

A reference sign TD1 of FIG. 32C illustrates a temperature difference threshold that is set in the period before the time point t20. Hereinafter, the temperature difference threshold will be referred to as "temperature difference threshold TD1" as well. A reference TD2 of FIG. 32C illustrates a temperature difference threshold that is set in a period after the time point t20. Hereinafter, the temperature difference threshold will be referred to as "temperature difference threshold TD2" as well.

The temperature difference threshold is changed from the temperature difference threshold TD1 to the temperature difference threshold TD2 at the time point t20 in accordance with an increase in the heat generation amount in the engine 20. The temperature difference threshold TD2 is greater than the temperature difference threshold TD1.

The calculated temperature difference is greater than the temperature difference threshold TD1 in the period before the time point t20. Thus, as described in S408 of FIG. 30, the temperature adjusting valve 560 is determined to be normal. Meanwhile, the calculated temperature difference is smaller than the temperature difference threshold TD2 in the period after the time point t20. Thus, as described in S408 of FIG. 30, a malfunction is determined to occur in the temperature adjusting valve 560.

While determining a malfunction to occur in the temperature adjusting valve 560 may be performed immediately at a point in time when it is confirmed that the temperature difference falls below the temperature difference threshold, the determination may be performed at a different point in time. For example, a manner of determination that may be used is such that a malfunction is determined to occur in the temperature adjusting valve 560 at a point in time when a state in which the temperature difference falls below the temperature difference threshold continues for a predetermined period after the state is confirmed.

An example of a determination performed in such a manner will be described. FIG. 32D illustrates a change in the cumulative value of the amount of time in which the temperature difference falls below the temperature difference threshold. In this example, the cumulative value is continuously increased after the time point t20 and exceeds a predetermined cumulation upper limit value TA at a time point t30. In this case, a malfunction is determined to occur in the temperature adjusting valve 560 at the time point t30 when the cumulative value exceeds the cumulation upper limit value TA.

Sixth Embodiment

A diagnostic device 100 according to a sixth embodiment of the present disclosure will be described. Only the type of an operational state obtained by a state obtaining unit 150 and the content of a process performed by the diagnostic device 100 in the sixth embodiment are different from those in the fifth embodiment. Other points are the same as the fifth embodiment.

Figure 33:
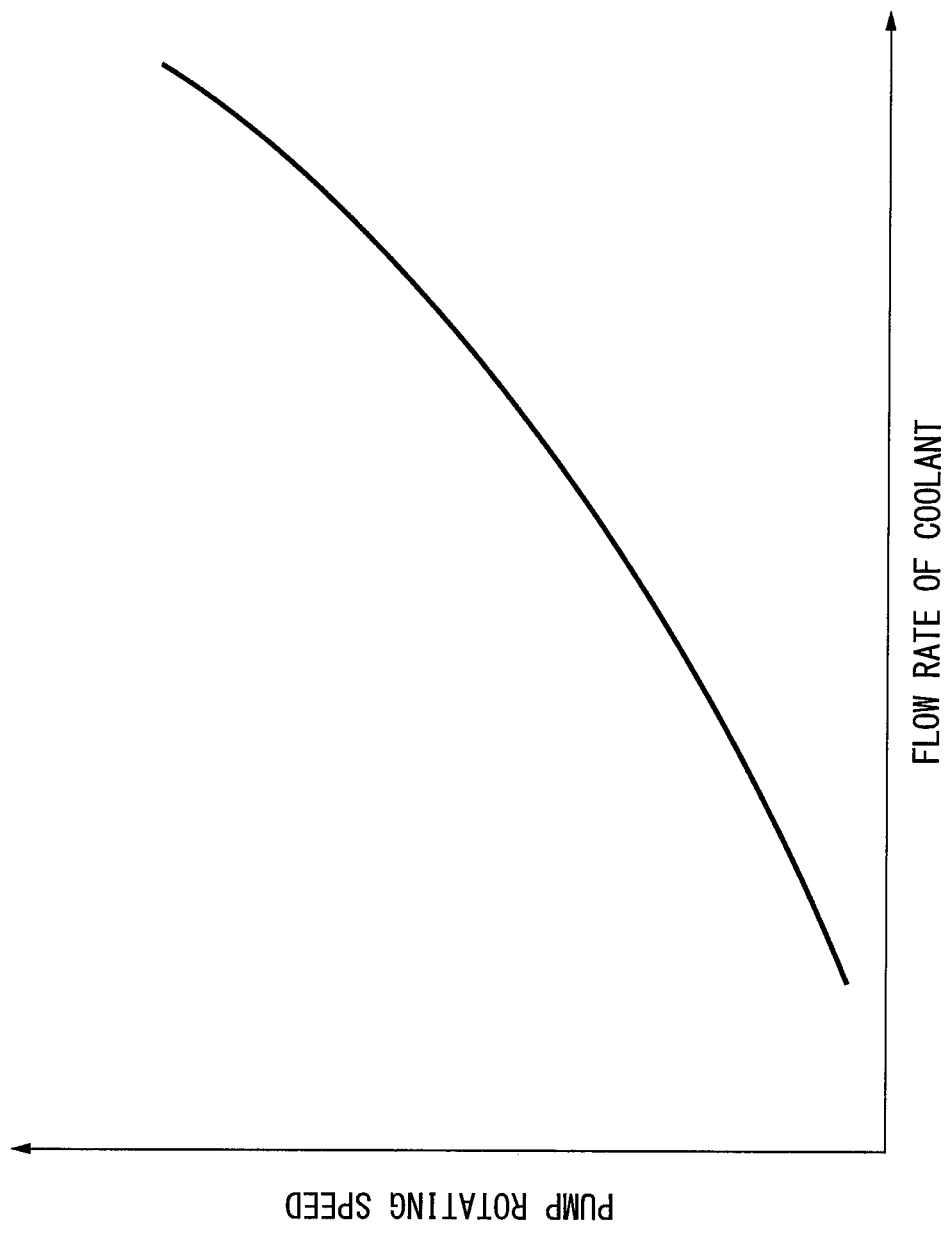
FIG. 33 is a diagram illustrating a relationship between the flow rate of the coolant and the rotational speed of a water pump.

A summary of a determination performed by the malfunction determination unit 120 will be described with reference to FIG. 33. FIG. 33 illustrates a relationship between the flow rate of the coolant passing through the engine 20 and the rotating speed of the water pump 520. As illustrated in FIG. 33, the rotating speed of the water pump 520 is great when the flow rate of the coolant is high.

As described with reference to FIG. 29, the flow rate of the coolant when the temperature adjusting valve 560 is opened is greater than the flow rate of the coolant when the temperature adjusting valve 560 is closed. Therefore, the rotating speed the water pump 520 when the temperature adjusting valve 560 is opened is greater than the rotating speed of the water pump 520 when the temperature adjusting valve 560 is closed.

Therefore, a determination of whether or not an open failure occurs in the temperature adjusting valve 560 is performed by referencing not only the outlet temperature but also the rotating speed of the water pump 520 in the present embodiment. The rotating speed of the water pump 520 is obtained as the operational state by the state obtaining unit 150 in the present embodiment.

Figure 34:
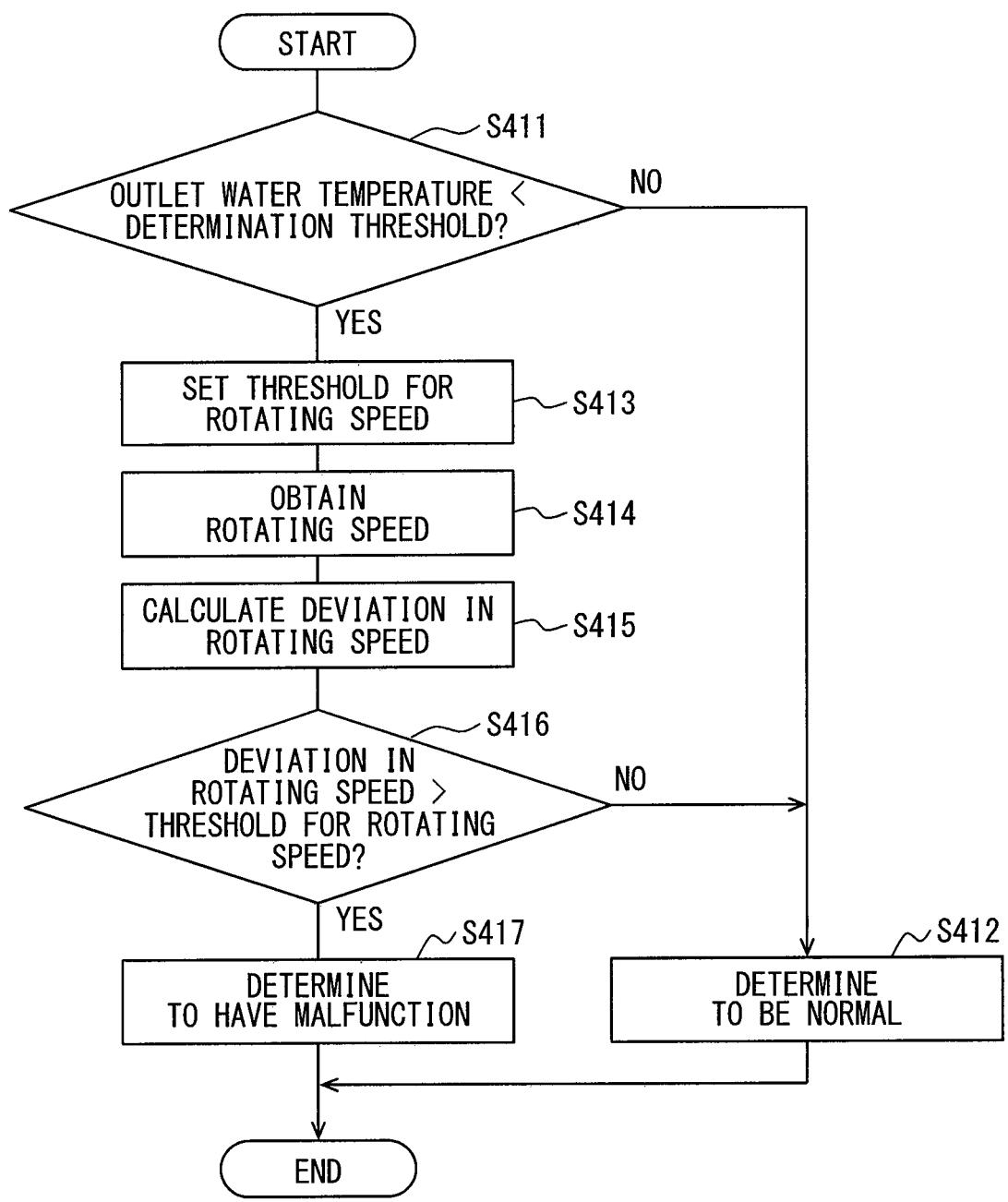
FIG. 34 is a flowchart illustrating the flow of a process performed in a diagnostic device according to a sixth embodiment of the present disclosure.

A specific content of a process performed by the diagnostic device 100 will be described with reference to FIG. 34. A series of processes illustrated in FIG. 34 is repeated by the malfunction determination unit 120 each time a predetermined cycle elapses.

A determination of whether or not the outlet water temperature obtained by the water temperature obtaining unit 110 falls below a predetermined determination threshold is performed in the initial S411. The process performed in S411 is the same as the process performed in S401 of FIG. 30. A transition is made to S412 if the outlet water temperature is greater than or equal to the determination threshold. The temperature adjusting valve 560 is determined to be normal in S412.

A transition is made to S413 in a case where the outlet water temperature is determined to reside below the determination threshold in S411. A threshold for the rotating speed is set in S413. The threshold for the rotating speed is a threshold that is compared with a deviation in rotating speed described later when an open failure of the temperature adjusting valve 560 is determined on the basis of operation of the water pump 520. The threshold for the rotating speed is set to the same value at all times in the present embodiment. Instead of such a manner, a manner that may be used is such that the threshold for the rotating speed is differently set according to the operational state of the vehicle 1.

The rotating speed of the water pump 520 is obtained by the state obtaining unit 150 in S414 subsequent to S413. Obtaining the rotating speed is performed by receiving a signal that is transmitted from the water pump 520.

The deviation in the rotating speed is calculated in S415 subsequent to S414. The deviation in the rotating speed is a value that is calculated by subtracting a reference rotating speed which is a fixed value from the actual rotating speed. The calculated deviation in the rotating speed is increased as the actual rotating speed is increased.

A determination of whether or not the deviation in the rotating speed calculated in S415 is greater than the threshold for the rotating speed set in S413 is performed in S416 subsequent to S415. The threshold for the rotating speed described above is set to a value above which the deviation in the rotating speed calculated as described above is not supposed to reside if the temperature adjusting valve 560 is closed.

Therefore, if the deviation in the rotating speed is smaller than or equal to the threshold for the rotating speed in S416, a transition is made to S412, and the temperature adjusting valve 560 is determined to be normal. A transition is made to S417 in a case where the deviation in the rotating speed is greater than the threshold for the rotating speed.

A transition to S417 means that the rotating speed of the water pump 520 is great and the flow rate of the coolant is high. Thus, the temperature adjusting valve 560 is highly likely to be opened.

However, the temperature adjusting valve 560 is supposed to be originally closed since the outlet water temperature falls below the determination threshold in S411. In such a situation, an open failure is estimated to occur in the temperature adjusting valve 560 since the deviation in the rotating speed is greater than the threshold for the rotating speed. Thus, a malfunction is determined to occur in the temperature adjusting valve 560 in S417.

As described heretofore, the rotating speed of the water pump 520 is used as the operational state obtained by the state obtaining unit 150 in the diagnostic device 100 according to the present embodiment. Specifically, a malfunction is determined to occur in the temperature adjusting valve 560 when the outlet water temperature falls below the predetermined determination threshold and the deviation in the rotating speed, which is the difference between the actual rotating speed and the predetermined reference rotating speed, is greater than the predetermined threshold for the rotating speed. Even in such a manner, the same effect as the fifth embodiment is achieved.

Figure 35:
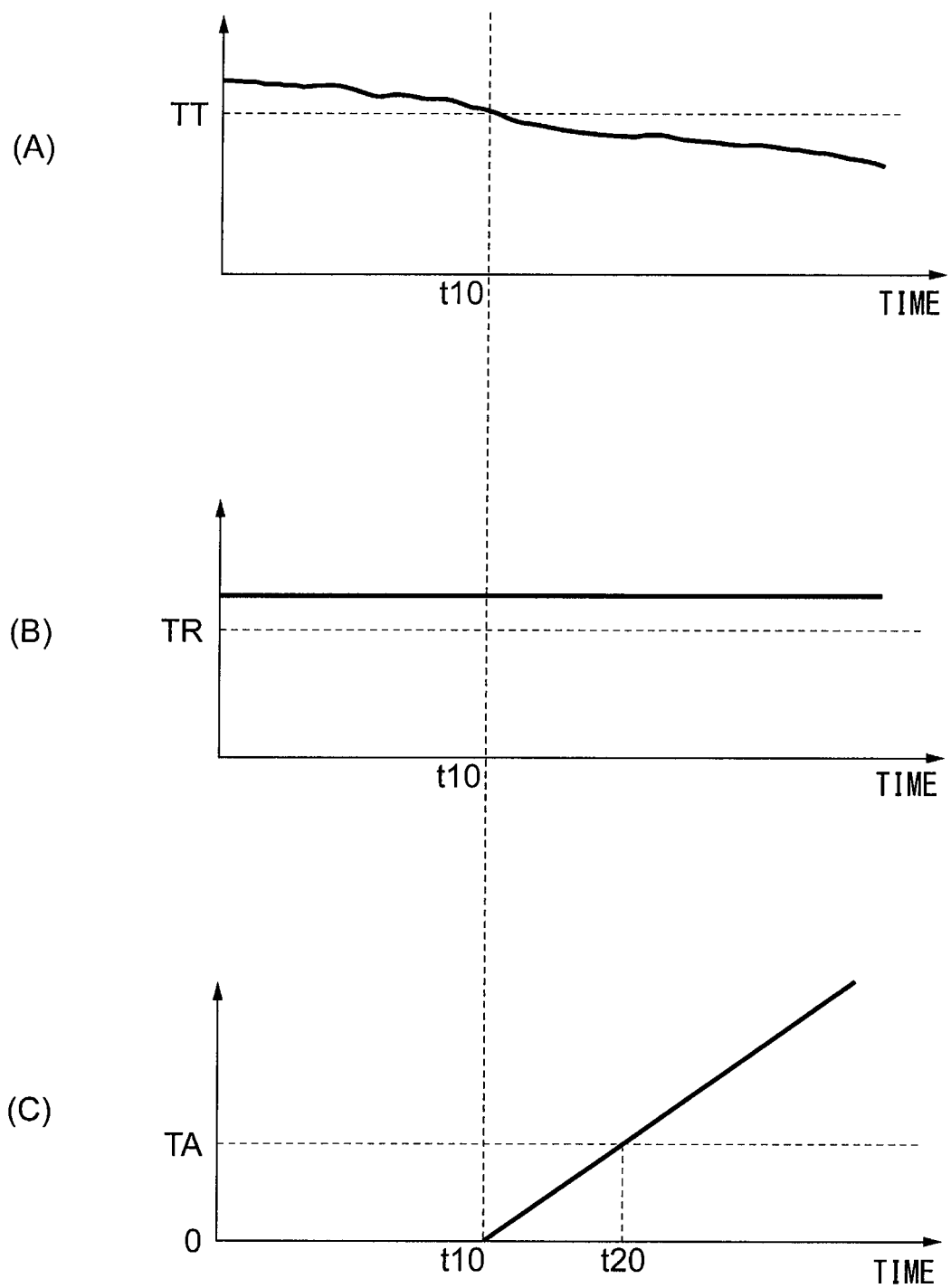
FIG. 35 is a diagram illustrating a change in the operational state of a vehicle and the like when a malfunction of a temperature adjusting valve is determined.

An example of changes in the temperature of the coolant, the rotating speed of the water pump 520, and the like when a determination is performed by the malfunction determination unit 120 as described heretofore will be described with reference to FIG. 35. FIG. 35(A) illustrates a change in the outlet water temperature obtained by the water temperature obtaining unit 110. In this example, the outlet water temperature is decreased as time elapses, and the outlet water temperature falls below the determination threshold TT at the time point t10 as in FIG. 32(A).

FIG. 35(B) illustrates a change in the deviation in the rotating speed calculated in S415 of FIG. 34. In this example, the deviation in the rotating speed is constant and is greater than a threshold TR for the rotating speed at all times. Thus, as described in S416 of FIG. 34, a malfunction is determined to occur in the temperature adjusting valve 560 after the time point t10.

While determining a malfunction to occur in the temperature adjusting valve 560 may be performed immediately at a point in time when it is confirmed that the deviation in the rotating speed falls above the threshold for the rotating speed, the determination may be performed at a different point in time. For example, a manner of determination that may be used is such that a malfunction is determined to occur in the temperature adjusting valve 560 at a point in time when a state in which the deviation in the rotating speed falls above the threshold for the rotating speed continues for a predetermined period after the state is confirmed.

An example of a determination performed in such a manner will be described. FIG. 35C illustrates a change in the cumulative value of the amount of time in which the deviation in the rotating speed falls above the threshold for the rotating speed. In this example, the cumulative value is continuously increased after the time point t10 and exceeds the predetermined cumulation upper limit value TA at the time point t20. In this case, a malfunction is determined to occur in the temperature adjusting valve 560 at the time point t20 when the cumulative value exceeds the cumulation upper limit value TA.

Seventh Embodiment

A diagnostic device 100 according to a seventh embodiment of the present disclosure will be described. Only the type of an operational state obtained by a state obtaining unit 150 and the content of a process performed by the diagnostic device 100 in the seventh embodiment are different from those in the fifth embodiment. Other points are the same as the fifth embodiment.

Figure 36:
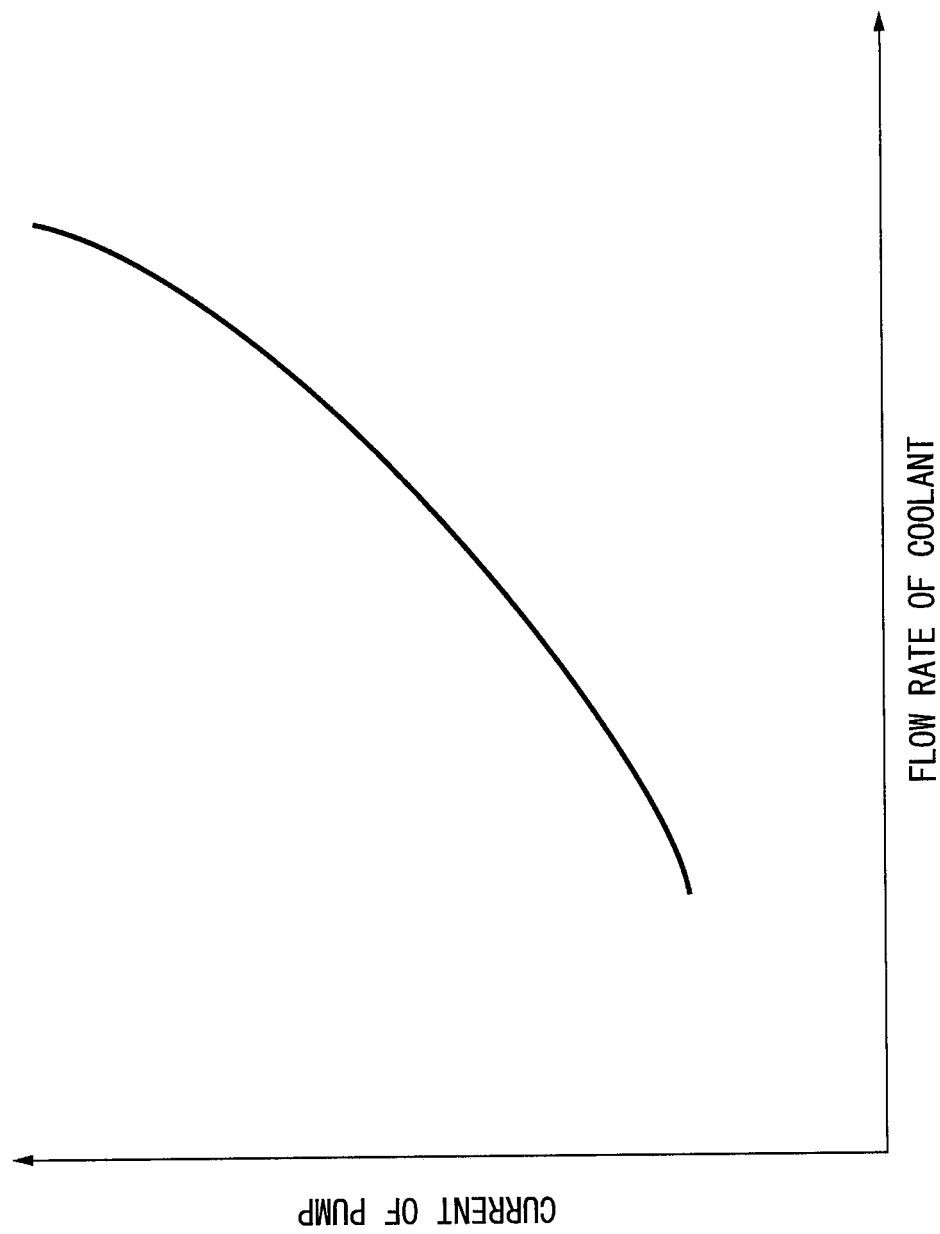
FIG. 36 is a diagram illustrating a relationship between the flow rate of a coolant and a consumed current value.

A summary of a determination performed by the malfunction determination unit 120 will be described with reference to FIG. 36. FIG. 36 illustrates a relationship between the flow rate of the coolant passing through the engine 20 and the consumed current value measured by the current sensor 561. As illustrated in FIG. 36, the consumed current value is great when the flow rate of the coolant is high. The reason is that a current consumed by the water pump 520 is increased in accordance with an increase in the rotating speed of the water pump 520.

As described with reference to FIG. 29, the flow rate of the coolant when the temperature adjusting valve 560 is opened is greater than the flow rate of the coolant when the temperature adjusting valve 560 is closed. Therefore, the magnitude of a current consumed by the water pump 520 when the temperature adjusting valve 560 is opened is greater than the magnitude of a current consumed by the water pump 520 when the temperature adjusting valve 560 is closed. Thus, the consumed current value when the temperature adjusting valve 560 is opened tends to be greater than the consumed current value when the temperature adjusting valve 560 is closed.

Therefore, a determination of whether or not an open failure occurs in the temperature adjusting valve 560 is performed by referencing not only the outlet temperature but also the consumed current value in the present embodiment. The consumed current value measured by the current sensor 561 is obtained as the operational state by the state obtaining unit 150 in the present embodiment.

Figure 37:
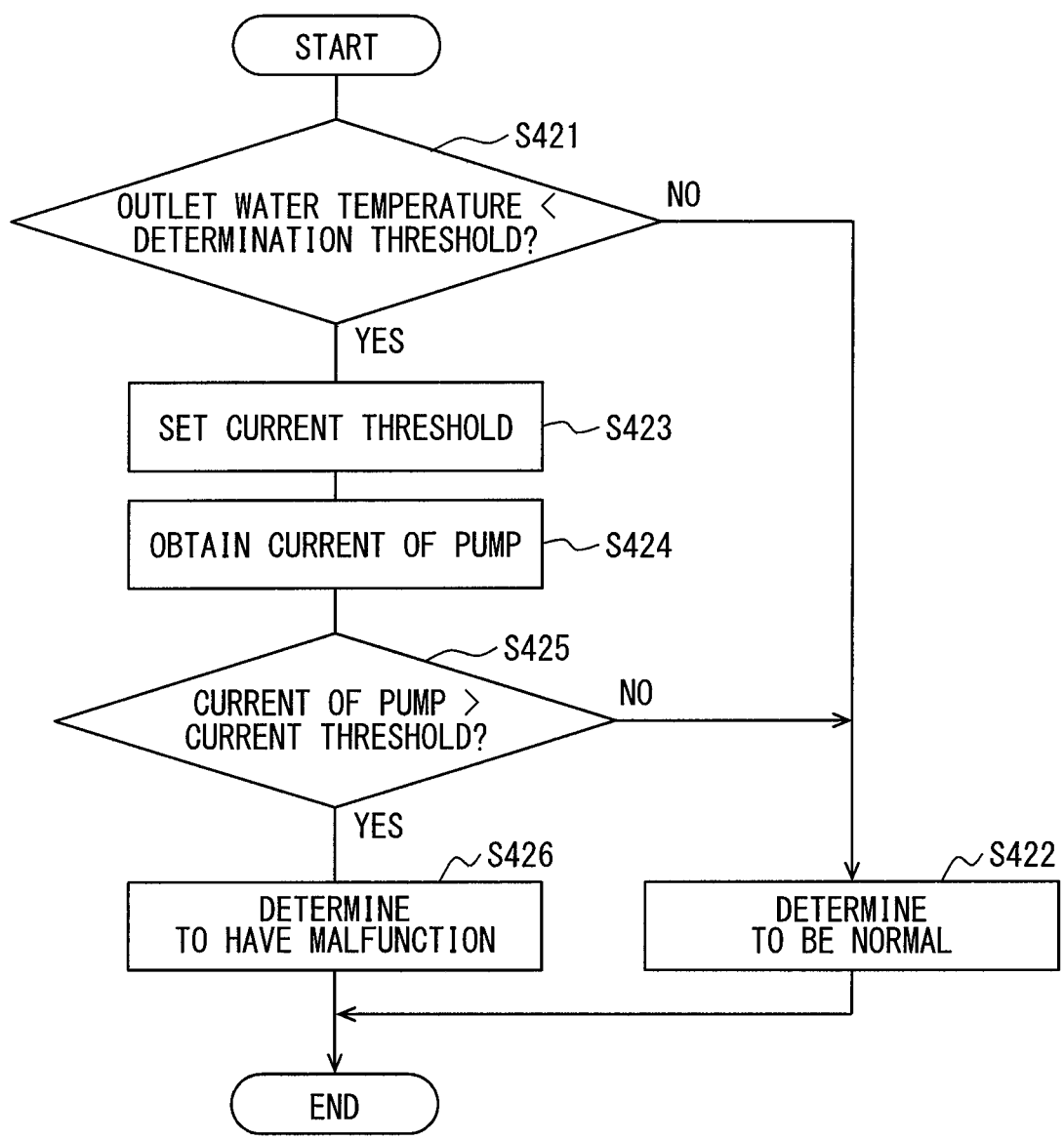
FIG. 37 is a flowchart illustrating the flow of a process performed in a diagnostic device according to a seventh embodiment of the present disclosure.

A specific content of a process performed by the diagnostic device 100 will be described with reference to FIG. 37. A series of processes illustrated in FIG. 37 is repeated by the malfunction determination unit 120 each time a predetermined cycle elapses.

A determination of whether or not the outlet water temperature obtained by the water temperature obtaining unit 110 falls below a predetermined determination threshold is performed in the initial S421. The process performed in S421 is the same as the process performed in S401 of FIG. 30. A transition is made to S422 if the outlet water temperature is greater than or equal to the determination threshold. The temperature adjusting valve 560 is determined to be normal in S422.

A transition is made to S423 in a case where the outlet water temperature is determined to reside below the determination threshold in S421. A current threshold is set in S423. The current threshold is a threshold that is compared with the consumed current value when an open failure of the temperature adjusting valve 560 is determined on the basis of the consumed current value. The current threshold is set to the same value at all times in the present embodiment. Instead of such a manner, a manner that may be used is such that the current threshold is differently set according to the operational state of a vehicle 1.

The consumed current value is obtained by the state obtaining unit 150 in S424 subsequent to S423. Obtaining the consumed current value is performed by receiving a signal that is transmitted from the current sensor 561.

A determination of whether or not the consumed current value obtained in S424 is greater than the current threshold set in S423 is performed in S425 subsequent to S424. The current threshold described above is set to a value above which the consumed current value is not supposed to reside if the temperature adjusting valve 560 is closed.

Therefore, if the consumed current value is smaller than or equal to the current threshold in S425, a transition is made to S422, and the temperature adjusting valve 560 is determined to be normal. A transition is made to S426 in a case where the consumed current value is greater than the current threshold.

A transition to S426 means that the magnitude of a current consumed by the water pump 520 is great and the flow rate of the coolant is high. Thus, the temperature adjusting valve 560 is highly likely to be opened.

However, the temperature adjusting valve 560 is supposed to be originally closed since the outlet water temperature falls below the determination threshold in S421. In such a situation, an open failure is estimated to occur in the temperature adjusting valve 560 since the consumed current value is greater than the current threshold. Thus, a malfunction is determined to occur in the temperature adjusting valve 560 in S426.

As described heretofore, the consumed current value measured by the current sensor 561 is used as the operational state obtained by the state obtaining unit 150 in the diagnostic device 100 according to the present embodiment. Specifically, a malfunction is determined to occur in the temperature adjusting valve 560 when the outlet water temperature falls below the predetermined determination threshold and the consumed current value is greater than the predetermined current threshold. Even in such a manner, the same effect as the fifth embodiment is achieved.

Figure 38:
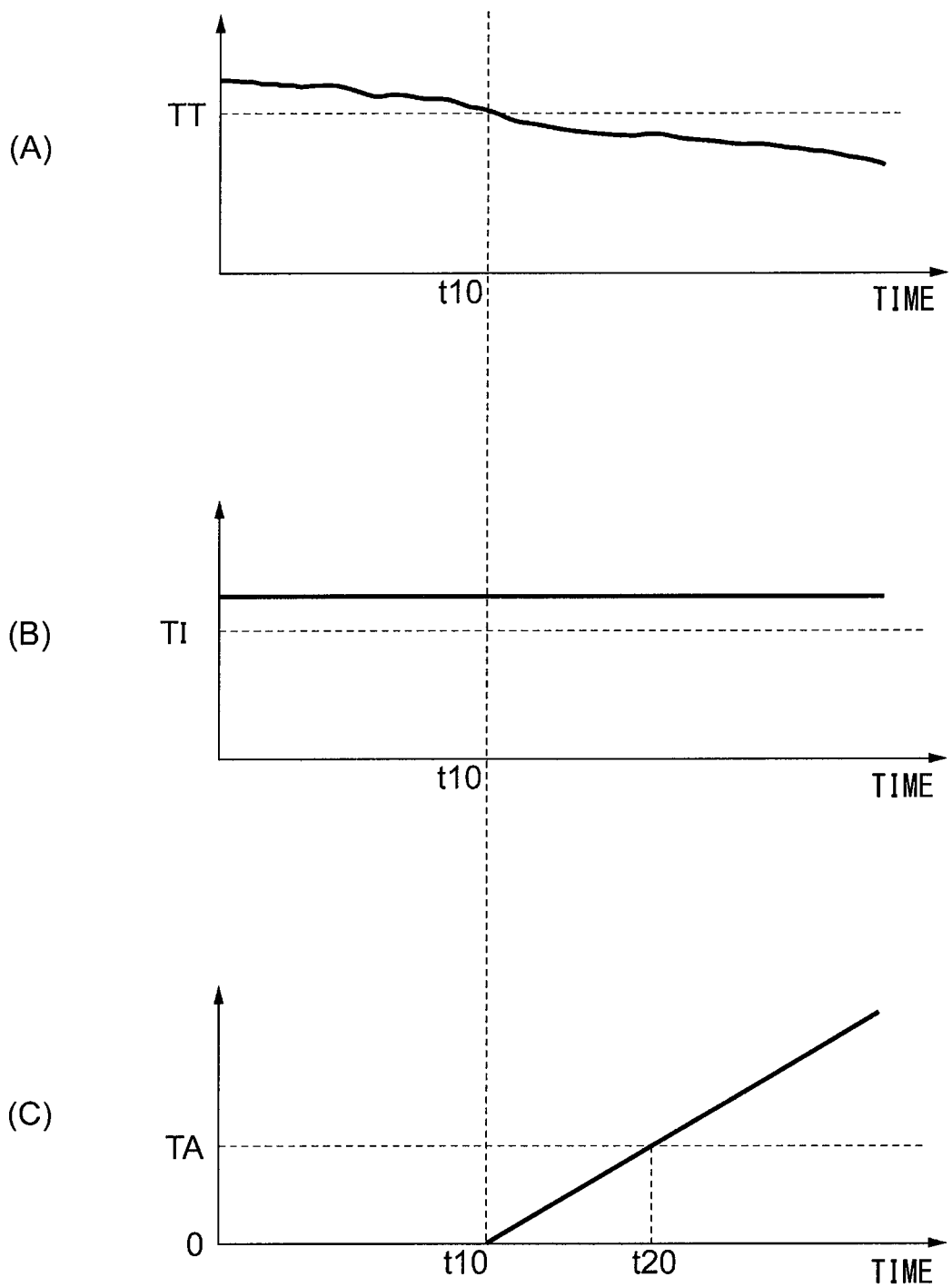
FIG. 38 is a diagram illustrating a change in the operational state of a vehicle and the like when a malfunction of a temperature adjusting valve is determined.

An example of changes in the temperature of the coolant, the consumed current value, and the like when a determination is performed by the malfunction determination unit 120 as described heretofore will be described with reference to FIG. 38. FIG. 38(A) illustrates a change in the outlet water temperature obtained by the water temperature obtaining unit 110. In this example, the outlet water temperature is decreased as time elapses, and the outlet water temperature falls below the determination threshold TT at the time point t10 as in FIG. 32(A).

FIG. 38(B) illustrates a change in the consumed current value obtained in S424 of FIG. 37. In this example, the consumed current value is constant and is greater than a current threshold TI at all times. Thus, as described in S425 of FIG. 37, a malfunction is determined to occur in the temperature adjusting valve 560 after the time point t10.

While determining a malfunction to occur in the temperature adjusting valve 560 may be performed immediately at a point in time when it is confirmed that the consumed current value falls above the current threshold, the determination may be performed at a different point in time. For example, a manner of determination that may be used is such that a malfunction is determined to occur in the temperature adjusting valve 560 at a point in time when a state in which the consumed current value falls above the current threshold continues for a predetermined period after the state is confirmed.

An example of a determination performed in such a manner will be described. FIG. 38C illustrates a change in the cumulative value of the amount of time in which the consumed current value falls above the current threshold. In this example, the cumulative value is continuously increased after the time point t10 and exceeds the predetermined cumulation upper limit value TA at the time point t20. In this case, a malfunction is determined to occur in the temperature adjusting valve 560 at the time point t20 when the cumulative value exceeds the cumulation upper limit value TA.

An example in which a malfunction is determined to occur in the temperature adjusting valve 560 when the consumed current value is greater than the current threshold is described heretofore. Instead of such a manner, a manner of determination that may be used is such that a malfunction is determined to occur in the temperature adjusting valve 560 when the cumulative value of the consumed current value is greater than the current threshold.

Figure 39:
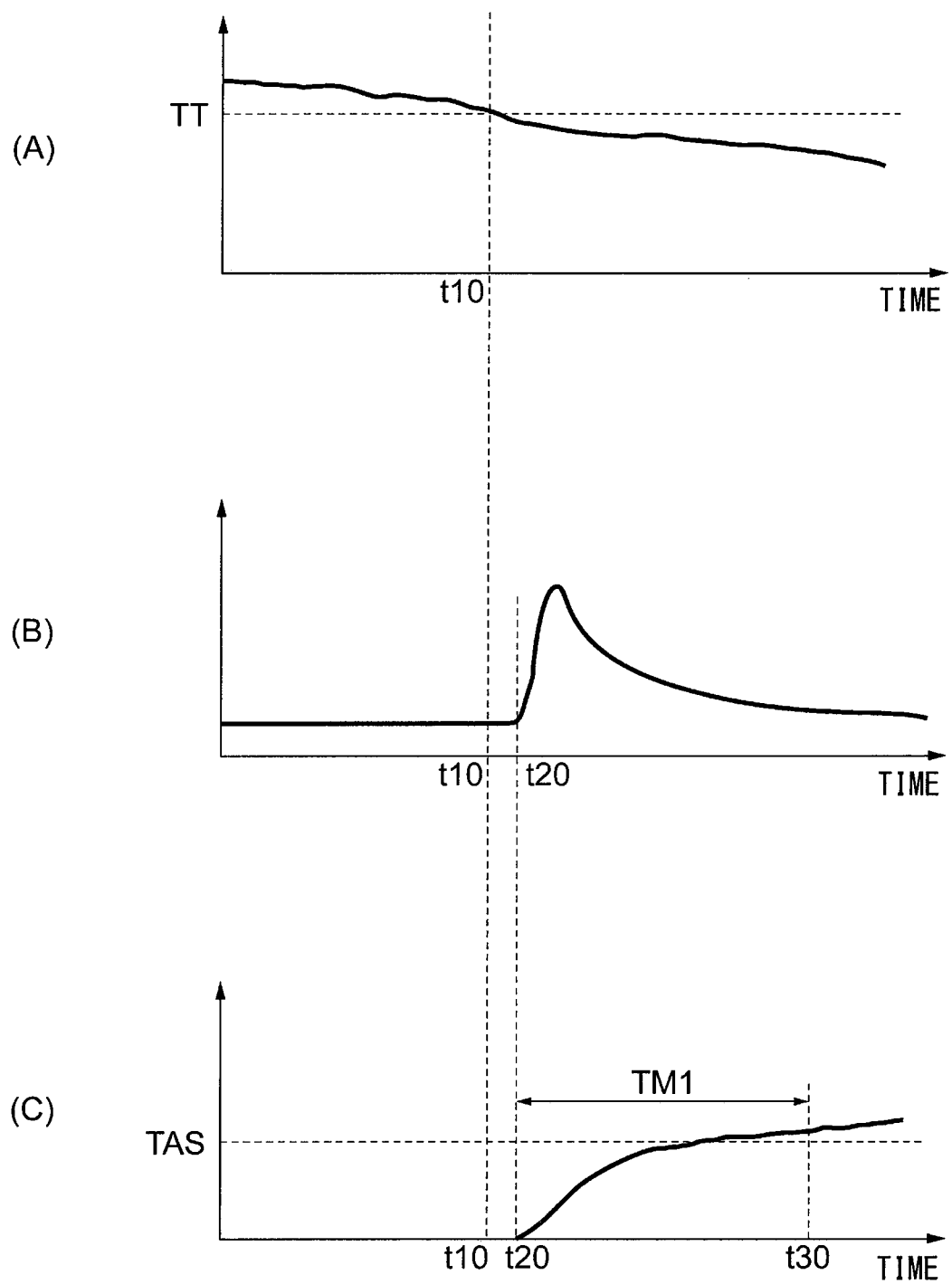
FIG. 39 is a diagram illustrating a change in the operational state of the vehicle and the like when a malfunction of the temperature adjusting valve is determined.

An example of such a manner of determination will be described with reference to FIG. 39. FIG. 39(A) is the same diagram as FIG. 38(A). FIG. 39(B) illustrates a change in the consumed current value. In this example, a control that increases the rotating speed of the water pump 520 in a step shape is performed at the time point t20 slightly after the time point t10 at which the outlet water temperature falls below the determination threshold TT. Accordingly, the consumed current value is temporarily increased after the time point t20.

FIG. 39(C) illustrates a change in the cumulative value of the consumed current value. In this example, the cumulative value is temporarily reset at the time point t20 when the control that increases the rotating speed of the water pump 520 in a step shape is started. A change in the cumulative value before the time point t20 is not illustrated.

A malfunction may be determined to occur in the temperature adjusting valve 560 in a case where the cumulative value falls above a predetermined current threshold TAS from the time point t20 until a predetermined period TM1 elapses. Meanwhile, the temperature adjusting valve 560 may be determined to be normal in a case where the cumulative value does not reside above the current threshold TAS until the period TM1 elapses from the time point t20.

In the example illustrated in FIG. 39(C), the cumulative value falls above the current threshold TAS at a point in time before the time point t30 at which the period TM1 elapses from the time point t20. Therefore, a malfunction is determined to occur in the temperature adjusting valve 560.

As such, a determination of whether or not a malfunction occurs in the temperature adjusting valve 560 may be performed not on the basis of the consumed current value but on the basis of whether or not the cumulative value of the consumed current value falls above the current threshold. Particularly, if the control that changes the rotating speed of the water pump 520 in a step shape is performed upon determination as in the example of FIG. 39, it is desirable to perform a determination not on the basis of an instantaneous value of the consumed current value but on the basis of the cumulative value thereof.

Eighth Embodiment

A diagnostic device 100 according to an eighth embodiment of the present disclosure will be described. Only the type of an operational state obtained by a state obtaining unit 150 and the content of a process performed by the diagnostic device 100 in the eighth embodiment are different from those in the fifth embodiment. Other points are the same as the fifth embodiment.

When a control that changes the rotating speed of a water pump 520 in a step shape is performed, the rate of change in the actual rotating speed is comparatively high if the temperature adjusting valve 560 is opened. That is, the actual rotating speed comparatively rapidly follows a change in a command value of the rotating speed. The reason is considered to be a small pressure loss in a circulation flow channel.

Meanwhile, the rate of change in the actual rotating speed is comparatively small if the temperature adjusting valve 560 is closed. That is, the actual rotating speed slowly follows a change in the command value of the rotating speed. The reason is considered to be an increase in the pressure in the circulation flow channel.

That is, the rate of change in the rotating speed of the water pump 520 is different according to the state of the temperature adjusting valve 560. Therefore, the control that changes the rotating speed of the water pump 520 in a step shape is performed in the present embodiment when a malfunction of the temperature adjusting valve 560 is determined. The rate of change in the actual rotating speed at that time is obtained as the operational state by the state obtaining unit 150.

Figure 40:
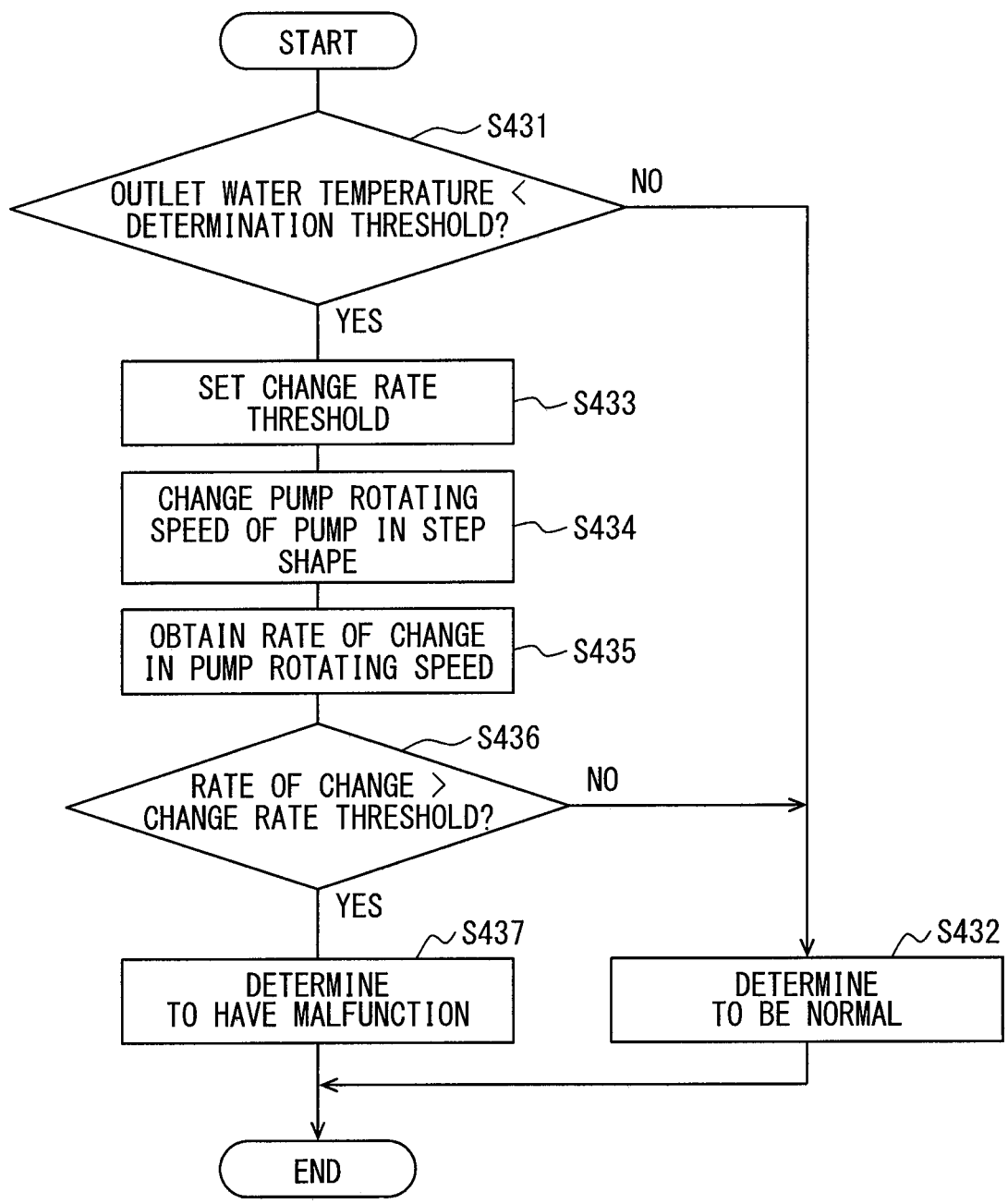
FIG. 40 is a flowchart illustrating the flow of a process performed in a diagnostic device according to an eighth embodiment of the present disclosure.

A specific content of a process performed by the diagnostic device 100 will be described with reference to FIG. 40. A series of processes illustrated in FIG. 40 is repeated by the malfunction determination unit 120 each time a predetermined cycle elapses.

A determination of whether or not the outlet water temperature obtained by the water temperature obtaining unit 110 falls below a predetermined determination threshold is performed in the initial S431. The process performed in S431 is the same as the process performed in S401 of FIG. 30. A transition is made to S432 if the outlet water temperature is greater than or equal to the determination threshold. The temperature adjusting valve 560 is determined to be normal in S432.

A transition is made to S433 in a case where the outlet water temperature is determined to reside below the determination threshold in S431. A change rate threshold is set in S433. The change rate threshold is a threshold that is compared with the rate of change when an open failure of the temperature adjusting valve 560 is determined on the basis of the rate of change in the rotating speed of the water pump 520. The change rate threshold is set to the same value at all times in the present embodiment. Instead of such a manner, a manner that may be used is such that the change rate threshold is differently set according to the operational state of a vehicle 1.

A control that increases the rotating speed of the water pump 520 in a step shape is performed in S434 subsequent to S433. Specifically, a signal that causes the command value of the rotating speed to be increased in a step shape is transmitted from the diagnostic device 100 to the ECU of the vehicle 1. The ECU causes the rotating speed of the water pump 520 to be increased in a step shape on the basis of the signal.

Then, the rotating speed of the water pump 520 starts to be increased. However, the actual rotating speed is not increased in a step shape but is gradually increased by slowly following a change in a target value.

The rate of change in the rotating speed of the water pump 520 is calculated and is obtained by the state obtaining unit 150 in S435 subsequent to S434. The rate of change in the rotating speed is calculated by the diagnostic device 100 on the basis of the rotating speed obtained by repeatedly receiving a signal transmitted from the water pump 520.

The rate of change in the rotating speed can be calculated by, for example, dividing an increase in the rotating speed until a predetermined period elapses from increasing the command value of the rotating speed in a step shape by the predetermined period.

A determination of whether or not the rate of change obtained in S435 is greater than the change rate threshold set in S433 is performed in S436 subsequent to S435. The change rate threshold described above is set to a value above which the rate of change in the rotating speed is not supposed to reside if the temperature adjusting valve 560 is closed.

Therefore, if the rate of change is smaller than or equal to the change rate threshold in S436, a transition is made to S432, and the temperature adjusting valve 560 is determined to be normal. A transition is made to S437 in a case where the rate of change is greater than the change rate threshold.

A transition to S437 means that the pressure in the circulation flow channel 510 is decreased to the extent in which the rotating speed of the water pump 520 may be comparatively promptly changed. Thus, the temperature adjusting valve 560 is highly likely to be opened.

However, the temperature adjusting valve 560 is supposed to be originally closed since the outlet water temperature falls below the determination threshold in S431. In such a situation, an open failure is estimated to occur in the temperature adjusting valve 560 since the rate of change is greater than the change rate threshold. Thus, a malfunction is determined to occur in the temperature adjusting valve 560 in S437.

As described heretofore, the rate of change in the rotating speed of the water pump 520 is used as the operational state obtained by the state obtaining unit 150 in the diagnostic device 100 according to the present embodiment. Specifically, a malfunction is determined to occur in the temperature adjusting valve 560 when the outlet water temperature falls below the predetermined determination threshold and the rate of change is greater than the change rate threshold. Even in such a manner, the same effect as the fifth embodiment is achieved.

Figure 41:
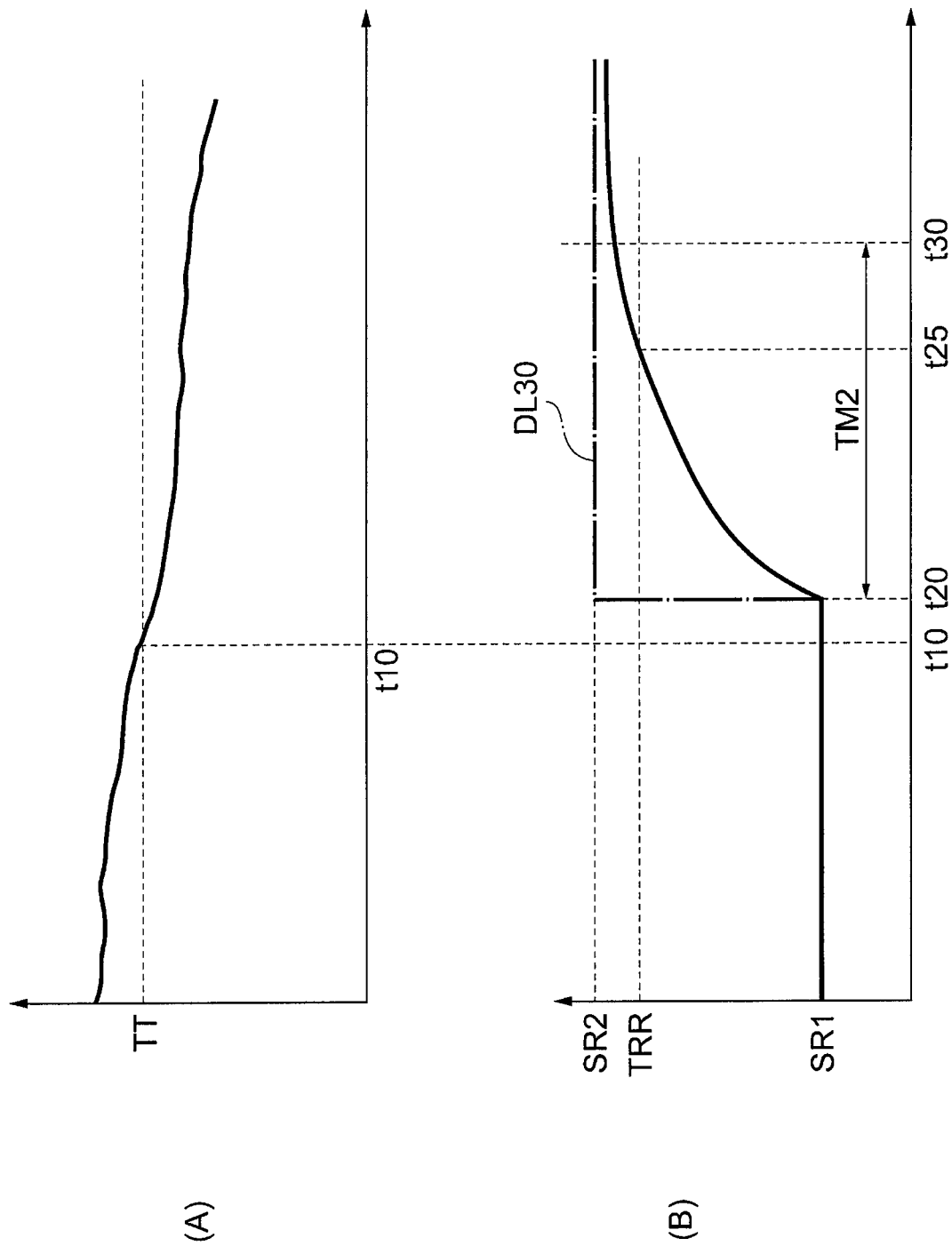
FIG. 41 is a diagram illustrating a change in the operational state of a vehicle and the like when a malfunction of a temperature adjusting valve is determined.

An example of changes in the temperature of a coolant, the rotating speed, and the like when a determination is performed by the malfunction determination unit 120 as described heretofore will be described with reference to FIG. 41. FIG. 41(A) illustrates a change in the outlet water temperature obtained by the water temperature obtaining unit 110. In this example, the outlet water temperature is decreased as time elapses, and the outlet water temperature falls below the determination threshold TT at the time point t10 as in FIG. 32(A).

FIG. 41(B) illustrates a change in the rotating speed of the water pump 520. In this example, the target value of the rotating speed is changed at the time point t20 slightly after the time point t10 at which the outlet water temperature falls below the determination threshold TT. Specifically, the target value of the rotating speed is changed in a step shape in such a manner to be increased from a target value SR1 to a target value SR2 in a step shape. The actual rotating speed is also increased after the time point t20.

In this example, a threshold TRR that is lower than the target value SR2 is set. The threshold TRR is, for example, a value that is obtained by multiplying the target value SR2 by a predetermined percentage (for example, 80%).

The change rate threshold in this example is set to a rate of change at which the rotating speed reaches the threshold TRR until a predetermined period TM2 elapses from the time point t20. That is, the rate of change in the rotating speed is determined to reside above the threshold for the rotating speed in a case where the rotating speed falls above the threshold TRR at the time point t30 when the period TM2 elapses from the time point t20.

In the example illustrated in FIG. 41B, the rotating speed reaches the threshold TRR at a time point t25 before the period TM2 elapses from the time point t20. That is, the rate of change in the rotating speed falls above the threshold for the rotating speed. Therefore, in this case, a malfunction is determined to occur in the temperature adjusting valve 560.

Ninth Embodiment

A diagnostic device 100 according to a ninth embodiment of the present disclosure will be described. Only the content of a process performed by the diagnostic device 100 in the ninth embodiment is different from that in the fifth embodiment. Other points are the same as the fifth embodiment.

A summary of a determination performed in the present embodiment will be described with reference to FIG. 28 again. Hereinafter, an operation region on the upper side of the line Q0, that is, an operation region designated by a reference sign "A" in FIG. 28, will be referred to as "A region". An operation region on the lower side of the line Q0, that is, an operation region designated by a reference sign "B" in FIG. 28, will be referred to as "B region". The "A" region is an operation region in which the heat receiving amount of the coolant is greater than the heat radiating amount. The "B" region is an operation region in which the heat receiving amount of the coolant is smaller than the heat radiating amount.

As described above, an open failure may occur in the temperature adjusting valve 560 when the temperature of the coolant is decreased. However, even when an open failure does not occur in the temperature adjusting valve 560 and the temperature adjusting valve is closed, the temperature of the coolant is unlikely to be increased if the engine 20 is operated in the "B" region.

The cause of the outlet water temperature residing below the determination threshold when the frequency of operation in the "A" region is high is estimated to be an open failure of the temperature adjusting valve 560. Conversely, when the frequency of operation in the "B" region is high, the cause of the outlet water temperature residing below the determination threshold is not limited to an open failure of the temperature adjusting valve 560.

Therefore, the present embodiment is configured to determine a malfunction of the temperature adjusting valve 560 on the basis of only the outlet water temperature when the frequency of operation in the "A" region is high. Meanwhile, when the frequency of operation in the "B" region is high, a determination of a malfunction based on only the outlet water temperature is suspended. In this case, the same processes as S403 and the subsequent processes of FIG. 30 are performed, and a malfunction of the temperature adjusting valve 560 is determined on the basis of both the outlet water temperature and the operational state obtained by the state obtaining unit 150.

Figure 42:
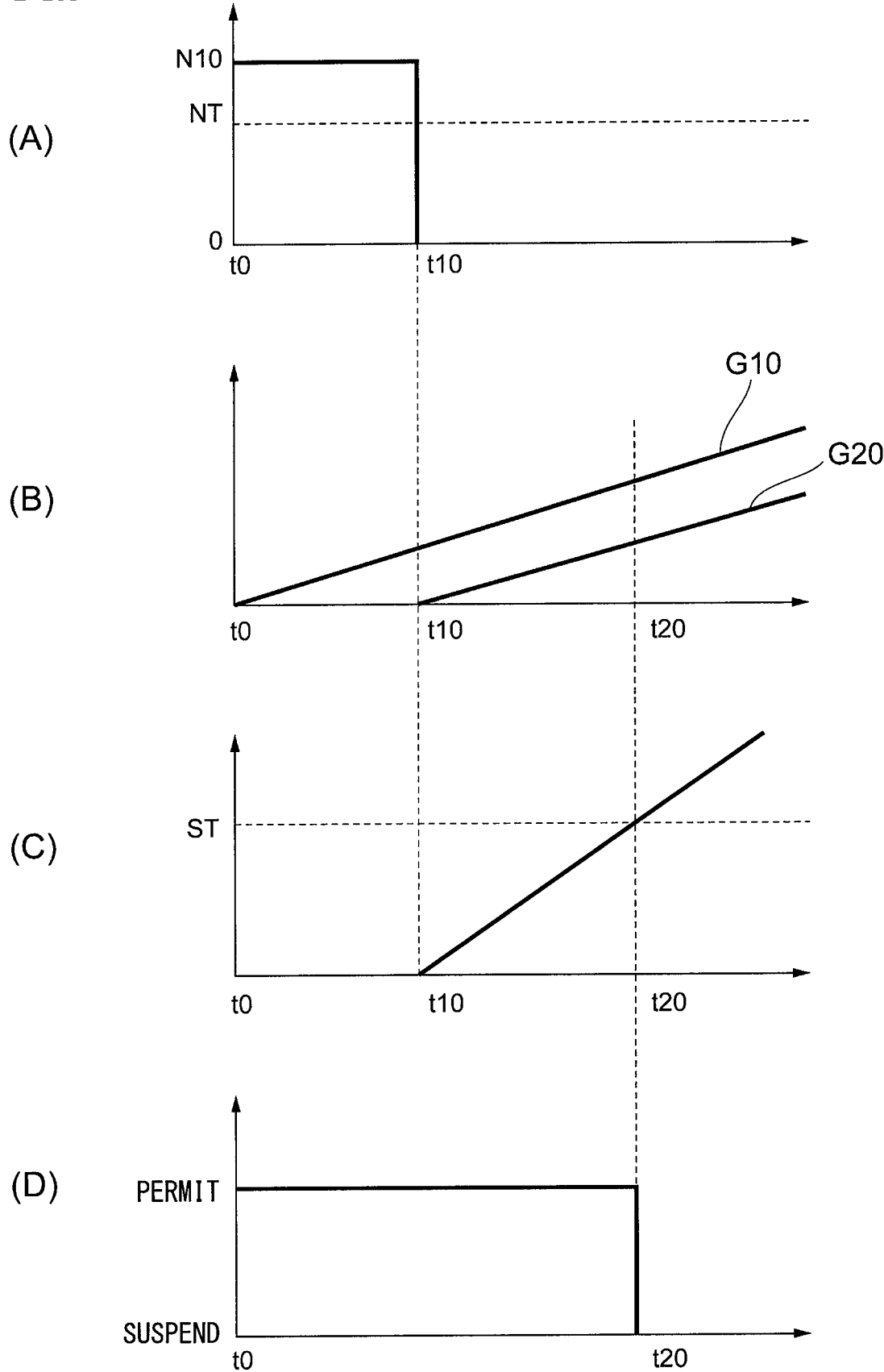
FIG. 42 is a diagram illustrating a condition for suspending a diagnosis of the temperature adjusting valve based on only an outlet water temperature.

An example of a case where a determination of a malfunction based on only the outlet water temperature is suspended will be described with reference to FIG. 42. FIG. 42(A) illustrates a change in the torque generated by the engine 20. A torque of a value N10 higher than a threshold NT is generated during a period from a time point t0 until the time point t10 in the example of FIG. 42(A). At this point, the operation region of the engine 20 is the "A" region in which the heat receiving amount is great.

The engine 20 is stopped after the time point t10, and the vehicle 1 travels using only the driving power of the motor M. The torque of the engine 20 is decreased below the threshold NT to zero. Then, the operation region of the engine 20 is the "B" region in which the heat receiving amount is small.

FIG. 42B illustrates a line G10 illustrating the cumulative value of the amount of time of operation after the time point t0 and a line G20 illustrating the cumulative value of the amount of time of operation in the "B" region. FIG. 42C illustrates a change in the ratio of the cumulative value of the amount of time of operation in the "B" region to the cumulative value of the amount of time of operation. That is, a change in the ratio of the value illustrated by the line G20 to the value illustrated by the line G10 is illustrated. The ratio is gradually increased by operation of the engine 20 in the "B" region after the time point t10.

The diagnostic device 100 suspends a determination of a malfunction based on only the outlet water temperature when the ratio of operation in the "B" region exceeds a predetermined threshold ST. FIG. 42D is a graph illustrating how a state where the determination is permitted is switched to a state where the determination is suspended. The ratio of the "B" region exceeds the threshold ST at the time point t20 in the example of FIG. 42, and a determination of a malfunction based on only the outlet water temperature is suspended after the time point t20. The threshold ST is set to 50% in the present embodiment.

Such cumulation of the amount of time of operation in the "B" region and calculation of the ratio of the cumulative value described heretofore are continuously performed in the diagnostic device 100 independently of the measured value of the temperature of the coolant.

While the line Q0 indicating a boundary between the "A" region and the "B" region (refer to FIG. 28) is described heretofore as being fixed, the boundary may be changed in a real-time manner on the basis of an estimated value of the heat radiating amount at the current point in time.

The heat radiating amount at the current point in time can be estimated on the basis of, for example, the temperature of the coolant, the outside air temperature, and the engine speed. The heat receiving amount obtained from the map of FIG. 28 is compared with the estimated heat radiating amount. When the heat receiving amount is greater, it can be determined that the engine 20 is currently operated in the "A" region. Conversely, when the heat radiating amount is greater, it can be determined that the engine 20 is currently operated in the "B" region.

Figure 43:
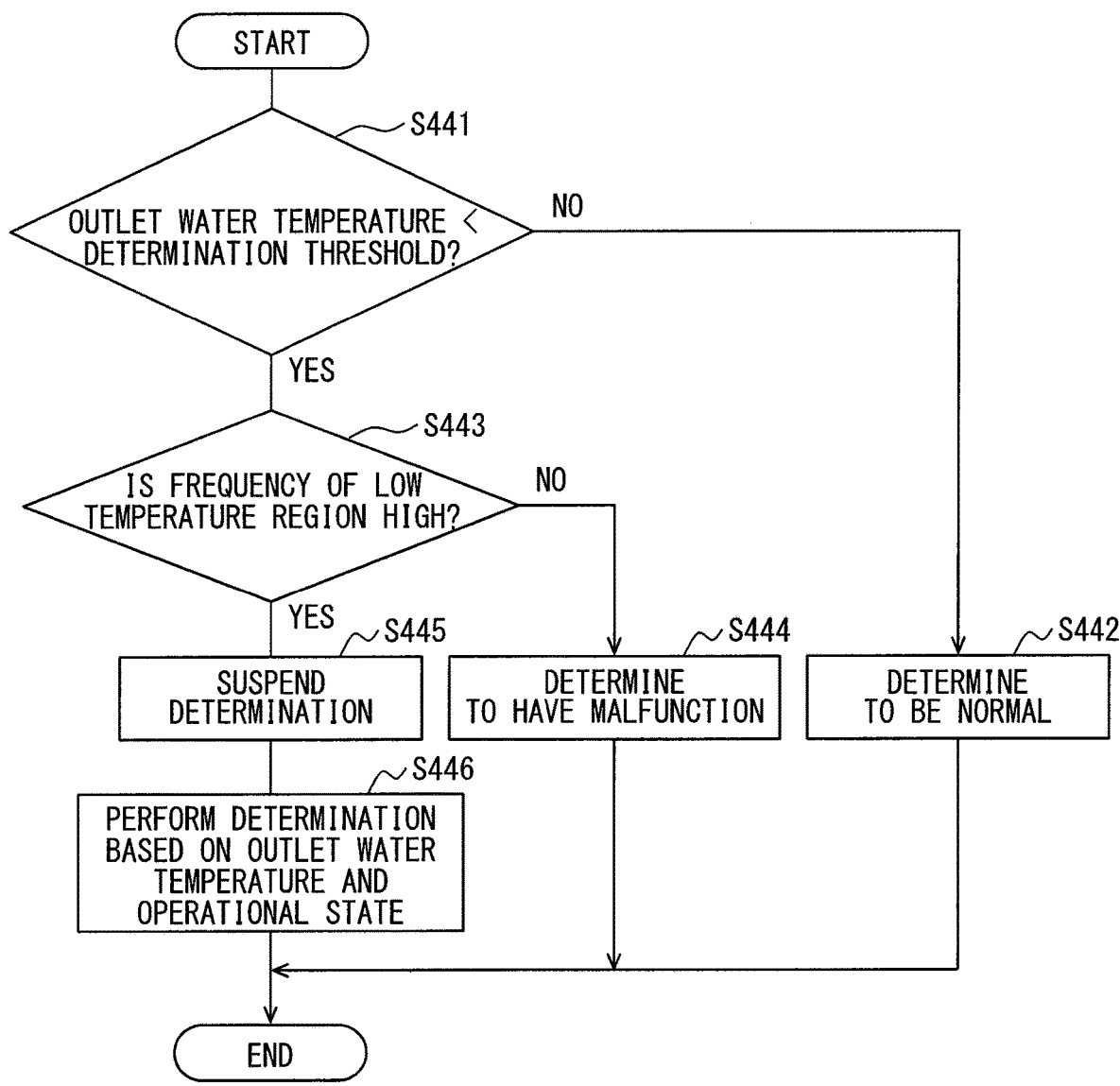
FIG. 43 is a flowchart illustrating the flow of a process performed in a diagnostic device according to a ninth embodiment of the present disclosure.

A specific content of a process performed by the diagnostic device 100 will be described with reference to FIG. 43. A series of processes illustrated in FIG. 43 is repeated by the malfunction determination unit 120 each time a predetermined cycle elapses.

A determination of whether or not the outlet water temperature obtained by the water temperature obtaining unit 110 falls below a predetermined determination threshold is performed in the initial S441. The process performed in S441 is the same as the process performed in S401 of FIG. 30. A transition is made to S442 if the outlet water temperature is greater than or equal to the determination threshold. The temperature adjusting valve 560 is determined to be normal in S442.

A transition is made to S443 in a case where the outlet water temperature is determined to reside below the determination threshold in S441. A determination of whether or not the frequency of operation in the "B" region where the temperature of the coolant is likely to be decreased is high is performed in S443. Specifically, a determination is performed of whether or not the ratio of the cumulative value illustrated in FIG. 42(C) exceeds the threshold ST.

A transition is made to S444 in a case where the ratio of the cumulative value is smaller than or equal to the threshold ST. A transition to S444 means that the outlet water temperature falls below the determination threshold even though the engine 20 is operated in the "A" region where the heat receiving amount is greater than the heat radiating amount. Thus, a malfunction is determined to occur in the temperature adjusting valve 560 in S444. That is, a malfunction of the temperature adjusting valve 560 is determined on the basis of only the outlet water temperature.

Meanwhile, a transition is made to S445 in a case where the ratio of the cumulative value exceeds the threshold ST in S443. A transition to S445 means that a determination of a malfunction based on only the outlet water temperature is suspended.

The same processes as S403 and the subsequent processes of FIG. 30 are performed in S446 subsequent to S445. That is, a malfunction of the temperature adjusting valve 560 is determined on the basis of both the outlet water temperature and the operational state obtained by the state obtaining unit 150.

The process performed in S446 may be the same as S413 and the subsequent processes of FIG. 34, may be the same as S423 and the subsequent processes of FIG. 37, or may be the same as S433 and the subsequent processes of FIG. 40.

As described heretofore, a malfunction of the temperature adjusting valve 560 based on both the outlet water temperature and the operational state is not performed at all times but is performed only in a case where the frequency of operation in the "B" region is high in the diagnostic device 100 according to the present embodiment. That is, a malfunction of the temperature adjusting valve 560 based on both the outlet water temperature and the operational state is performed only in a situation where the outlet water temperature is estimated to be lower than the determination threshold even if the temperature adjusting valve 560 is normally operated. Accordingly, the frequency of a complicated determination that considers multiple elements is reduced. Thus, processing load of the diagnostic device 100 can be decreased.

A thermostat that is switched opened and closed according to the temperature of the coolant is used as the temperature adjusting valve 560 in the present embodiment. That is, the temperature adjusting valve 560 is not switched opened and closed by an external electrical control but is switched opened and closed by an internal mechanism that senses and reacts to the temperature of the coolant.

Figure 27:
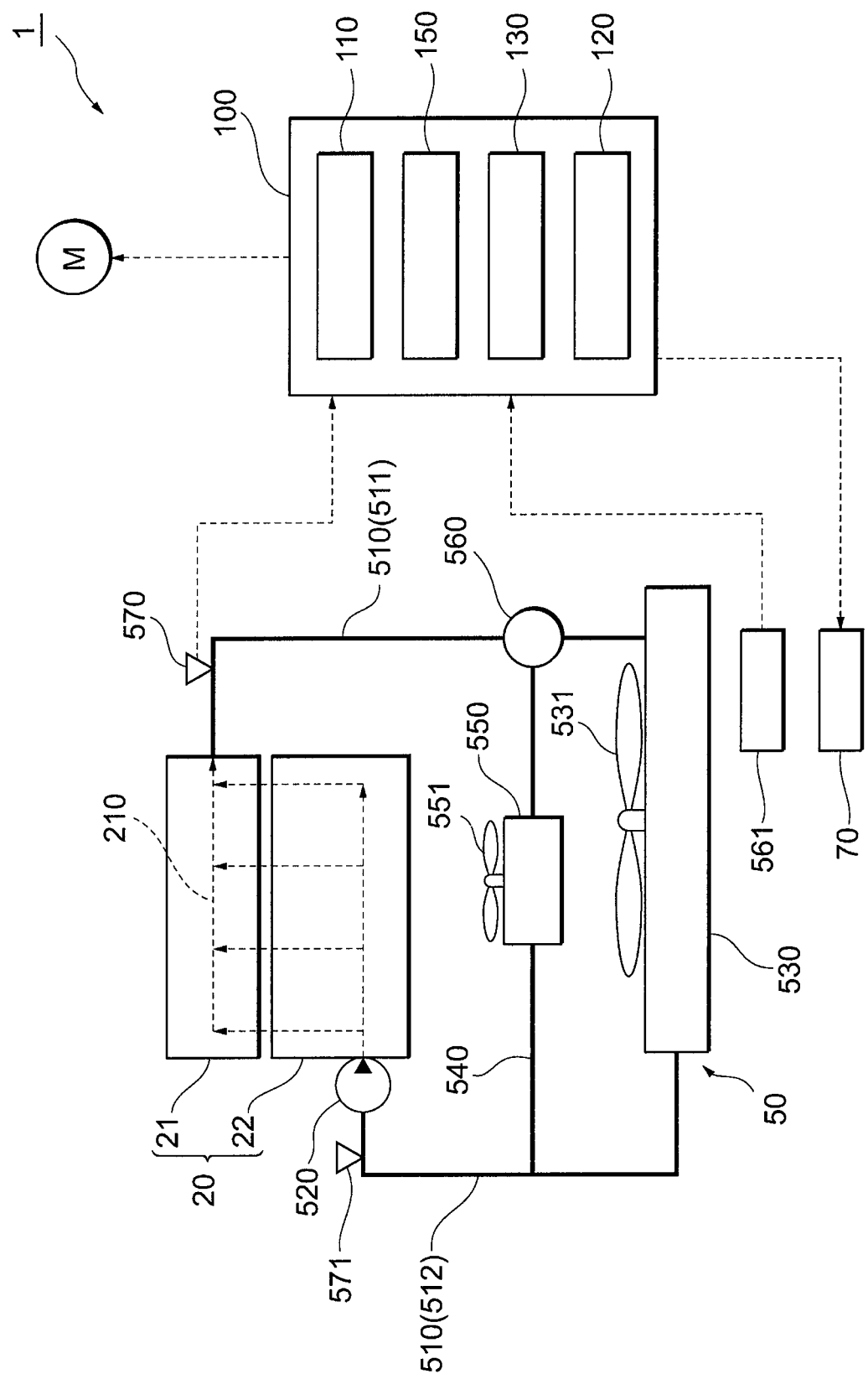
FIG. 27 is a diagram illustrating configurations of a diagnostic device according to a fifth embodiment of the present disclosure and a vehicle equipped with the diagnostic device.

However, the type of the temperature adjusting valve 560 is not particularly limited for embodying the present disclosure. An electric type may be used as the temperature adjusting valve 560. Hereinafter, a case where the temperature adjusting valve 560 of FIG. 27 is replaced by an electric temperature adjusting valve will be described. The electric temperature adjusting valve will be referred to as "temperature adjusting valve 560" in the same manner as heretofore described.

Figure 44:
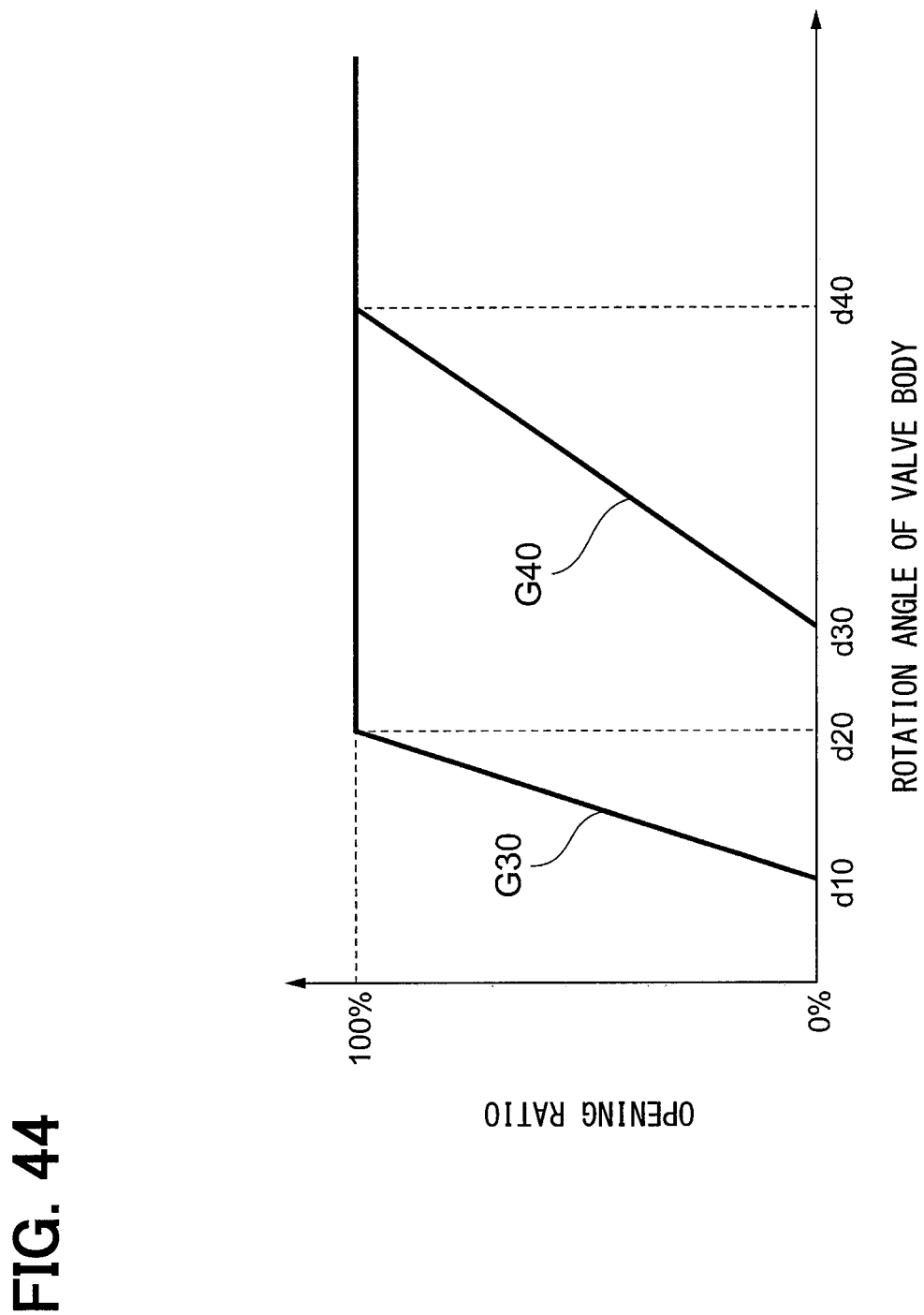
FIG. 44 is a diagram illustrating operation of a temperature adjusting valve in a case where an electric temperature adjusting valve is used.

FIG. 44 illustrates a graph illustrating operating characteristics of the electric temperature adjusting valve 560. The horizontal axis of the graph is the rotation angle of the valve body provided in the temperature adjusting valve 560. The vertical axis of the graph is the ratio of opening, that is, the opening ratio of the temperature adjusting valve 560. A line G30 illustrates a change in the opening ratio of a flow channel from the temperature adjusting valve 560 toward the heater core 550. A line G40 illustrates a change in the opening ratio of the flow channel from the temperature adjusting valve 560 toward the radiator 530.

The valve body of the electric temperature adjusting valve 560 is rotated on the basis of an external control signal. When the rotation angle of the valve body is smaller than d10, both the flow channel toward the heater core 550 and the channel toward the radiator 530 are closed.

When the rotation angle is increased over d10, only the opening ratio of the flow channel toward the heater core 550 is increased in accordance with the change in the rotation angle. When the rotation angle is equal to d20, only the flow channel toward the heater core 550 is wide opened.

Then, when the rotation angle is increased over d30, the opening ratio of the flow channel toward the radiator 530 is increased in accordance with the change in the rotation angle. At this point, the flow channel toward the heater core 550 remains wide opened. When the rotation angle is equal to d40, both the flow channel toward the radiator 530 and the channel toward the heater core 550 are wide opened.

Even the use of such an electric temperature adjusting valve 560 achieves the same effect as described heretofore. When, for example, the outlet water temperature falls below the determination threshold in S401 of FIG. 30, the temperature adjusting valve 560 is controlled in such a manner that the flow channel toward the radiator 530 is fully closed, after which the process of S403 is performed. The same applies to S421 of FIG. 37, S431 of FIG. 40, and S441 of FIG. 43.

An embodiment of the present disclosure is described heretofore with reference to specific examples. However, the present disclosure is not limited to the specific examples. That is, the specific examples after appropriately modified in design by those skilled in the art are to be included in the scope of the present invention, provided that the modified specific examples include the features of the present disclosure. For example, each element included in above each specific example and the arrangement, the material, the condition, the shape, and the size thereof are not limited to the illustrations and can be appropriately modified. Each element included in above each embodiment can be combined to the extent technically possible, and combined elements are to be included in the scope of the present invention provided that the combined elements include the features of the present invention.

Tenth Embodiment

Figure 45:
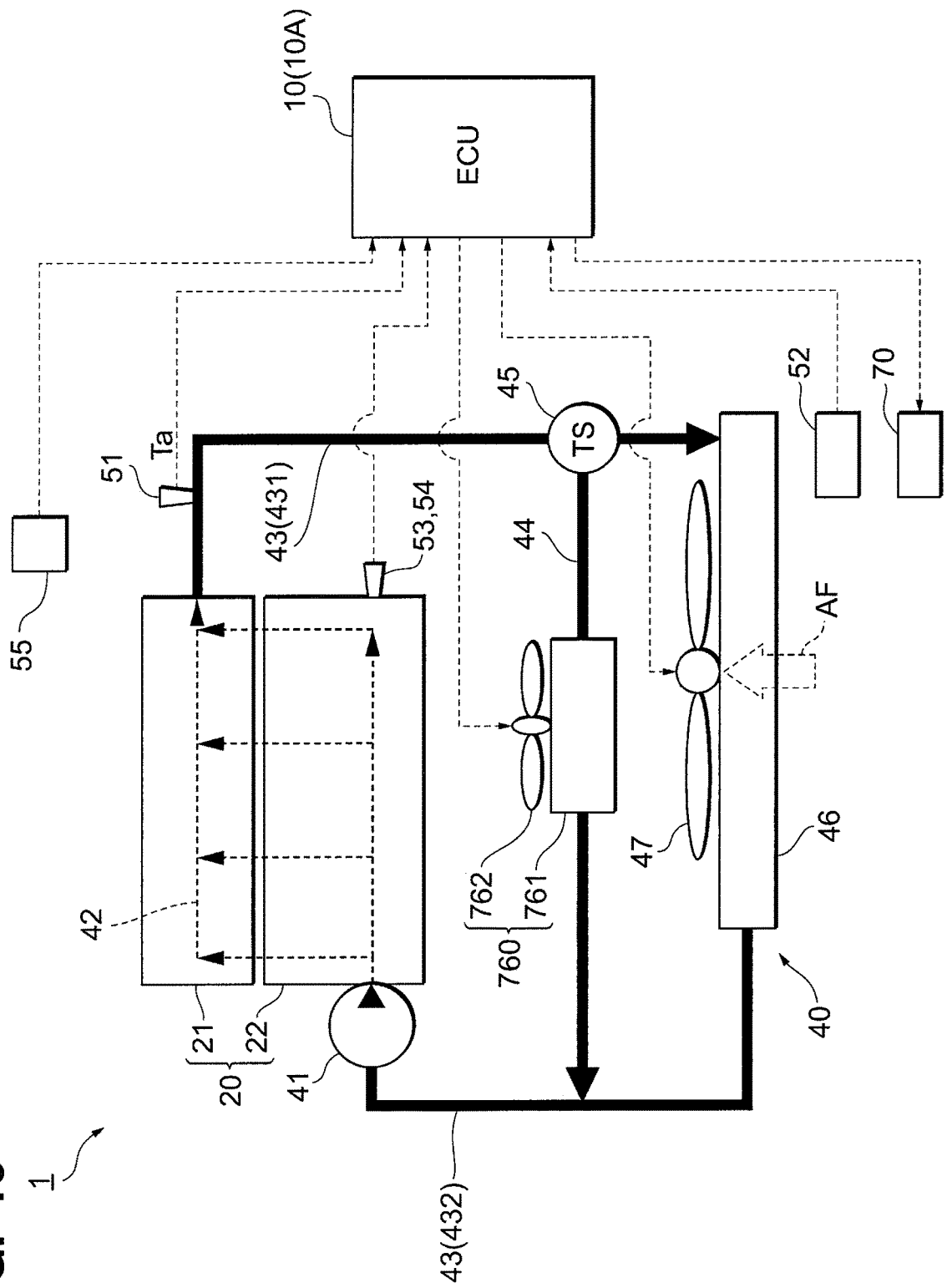
FIG. 45 is a schematic diagram illustrating configurations of an ECU according to a tenth embodiment and an eleventh embodiment and a vehicle equipped with the ECU.

First, an ECU 10 according to a tenth embodiment and a vehicle 1 equipped with the ECU 10 will be described with reference to FIG. 45. The vehicle 1 is equipped with an engine 20 which is an internal combustion engine as a power source. A reference sign 10A of an ECU according to an eleventh embodiment described later is illustrated in parentheses in FIG. 45.

The engine 20 is, for example, a reciprocating engine that uses gasoline as fuel. The engine 20 includes a cylinder head 21 and a cylinder block 22. The engine 20 includes multiple cylinders not illustrated. Each cylinder generates a torque by repeating each stroke of an intake stroke, a compression stroke, a combustion stroke, and an exhaust stroke. The torque is output through a crankshaft, not illustrated, included in the engine 20 and is used for traveling of the vehicle 1.

The vehicle 1 is also equipped with a cooling device 40 and a heating device 760.

The cooling device 40 is a device that cools the engine 20 generating a great amount of heat of combustion in the combustion stroke and maintains the engine 20 at an appropriate temperature. The cooling device 40 includes a water pump 41, an engine cooling flow channel 42, a circulation flow channel 43, a bypass flow channel 44, and a radiator 46.

The water pump 41 is a fluid machine that pumps a coolant. The coolant contains an LLC which is an antifreeze. The water pump 41 is rotationally driven by receiving a part of the output of the engine 20 through the crankshaft. Rotational driving of the water pump 41 pressurizes the coolant supplied from the upstream side of the water pump 41, and the coolant is supplied to the downstream side of the water pump 41.

The engine cooling flow channel 42 is a coolant channel that is provided in the engine 20. For example, the engine cooling flow channel 42 is provided in the cylinder block 22 to enclose each cylinder.

The circulation flow channel 43 is a coolant channel that is provided in a pipe. The pipe has one end connected to the downstream end of the engine cooling flow channel 42 and the other end connected to the water pump 41. Accordingly, the circulation flow channel 43 with the engine cooling flow channel 42 constitutes a channel that circulates the coolant to the engine 20. The circulation flow channel 43 includes a first circulation flow channel 431 that extends from the downstream end of the engine cooling flow channel 42 to the radiator 46 described later and a second circulation flow channel 432 that extends from the radiator 46 to the water pump 41.

The bypass flow channel 44 is a coolant channel that is provided in a pipe. The pipe has one end connected midway of the pipe constituting the first circulation flow channel 431 and the other end connected midway of the pipe constituting the second circulation flow channel 432. Accordingly, the bypass flow channel 44 constitutes a channel that branches off from the first circulation flow channel 431 and joins the second circulation flow channel 432 midway of the second circulation flow channel 432 by detouring the radiator 46.

The radiator 46 is a heat exchanger that is provided in the circulation flow channel 43. The radiator 46 includes a tube and a corrugated fin, all of which are not illustrated. The tube is a metal tubular member in which the coolant flows. The corrugated fin is provided by folding a metal plate. The radiator 46 is provided by alternately stacking multiple tubes and multiple corrugated fins.

The radiator fan 47 is a blower that is provided adjacent to the radiator 46. When the radiator fan 47 is rotationally driven by receiving a control signal transmitted by the ECU 10, air is taken through a grille, not illustrated, of the vehicle 1 as illustrated by an arrow AF. The air flows between adjacent tubes of the radiator 46 and passes through the radiator 46 and exchanges heat with the coolant that flows in the tubes. Accordingly, the heat of the coolant flowing in the radiator 46 is radiated, and the temperature of the coolant is decreased.

The heating device 760 is a device that heats the vehicle interior of the vehicle 1. The heating device 760 includes a heater core 761 and a heating blower 762.

The heater core 761 is a heat exchanger that is provided midway of the bypass flow channel 44. The heater core 761 includes a tube and a corrugated fin, all of which are not illustrated. The tube is a metal tubular member in which the coolant flows. The corrugated fin is provided by folding a metal plate. The heater core 761 is provided by alternately stacking multiple tubes and multiple corrugated fins.

The heating blower 762 is a fan that is provided in the vicinity of the heater core 761. When the heating blower 762 is rotationally driven by receiving a control signal transmitted by the ECU 10, air is taken from the vehicle interior or from the vehicle exterior and is supplied to the heater core 761. The air exchanges heat with the heater core 761 when passing through the heater core 761, and the temperature of the air is adjusted. The air of which the temperature is adjusted is supplied into the vehicle interior.

A thermostat 45 is arranged on the downstream side and the radiator 46 side of a part at which the pipe constituting the bypass flow channel 44 branches off from the pipe constituting the circulation flow channel 43. The thermostat 45 includes a valve body not illustrated. The valve body in the thermostat 45 is configured to be moved in response to the temperature of the coolant in the vicinity thereof. The thermostat 45 is configured to be switched between a closed state and an opened state by movement of the valve body that is opened on the basis that the temperature of the coolant is greater than or equal to a valve open threshold Tc2 (for example, 80° C.). The thermostat 45, on the basis of the temperature of the coolant, adjusts the ratio of the flow rate of the coolant supplied to the engine 20 through the radiator 46 and the flow rate of the coolant supplied to the engine 20 through the bypass flow channel 44.

Next, operation of the cooling device 40 and the heating device 760 configured as described heretofore will be described with reference to FIG. 45.

When the engine 20 is started by receiving supply of fuel, a great amount of heat of combustion generated in the combustion stroke gradually increases the temperature of the engine 20. The water pump 41 receives the output of the engine 20 through the crankshaft and is rotationally driven. Accordingly, the coolant of the second circulation flow channel 432 is pressurized and is supplied to the engine cooling flow channel 42 of the engine 20.

The coolant exchanges heat with the cylinder head 21 and the cylinder block 22 while flowing in the engine cooling flow channel 42. Accordingly, the cylinder head 21 and the cylinder block 22 lose heat and are cooled, while the coolant receives heat and the temperature thereof is increased.

The temperature of the engine 20 is comparatively low in a state immediately after the engine 20 is started. Thus, the temperature of the coolant discharged from the engine cooling flow channel 42 and flowing in the first circulation flow channel 431 (hereinafter, referred to as "discharge coolant" as well) is also comparatively low. In this case, the valve body of the thermostat 45 is arranged in a position closing the downstream side of the first circulation flow channel 431 and opening the bypass flow channel 44.

Accordingly, the discharge coolant is not supplied to the radiator 46 and flows in the bypass flow channel 44 and is supplied to the second circulation flow channel 432. That is, the coolant circulates while detouring the radiator 46 in a state where the temperature of the engine 20 is comparatively low. In this case, since the discharge coolant is not cooled by the radiator 46, the engine 20 is not excessively cooled by the coolant. Therefore, a warm-up upon starting the engine 20 is not impeded by the coolant.

Meanwhile, the temperature of the discharge coolant is comparatively high in a state where the temperature of the engine 20 is greater than or equal to an appropriate temperature. In this case, the valve body of the thermostat 45 is arranged in a position opening both the downstream side of the first circulation flow channel 431 and the bypass flow channel 44.

Accordingly, a part of the discharge coolant is supplied to the radiator 46, and the remaining part flows in the bypass flow channel 44 and is supplied to the second circulation flow channel 432. That is, in a state where the temperature of the engine 20 is greater than or equal to an appropriate temperature, the part of the discharge coolant supplied to the radiator 46 is cooled, and the remaining part of the discharge coolant flows by detouring the radiator 46. These coolants join each other in the second circulation flow channel 432, and the joined coolant is pressurized by the water pump 41 and is again supplied to the engine cooling flow channel 42.

As described above, the coolant flowing in the bypass flow channel 44 exchanges heat with air when passing through the heater core 761. The air of which the temperature is increased by heating through the exchange of heat is guided into the vehicle interior of the vehicle 1 by a duct not illustrated and is used to heat the inside of the cabin.

Next, the electronic control unit (ECU) 10 will be described with reference to FIG. 46. A part or the entirety of the ECU 10 includes an analog circuit or a digital processor. Either way, a functional control block is included in the ECU 10 in order to achieve a function of outputting a control signal on the basis of a received signal.

Figure 46:
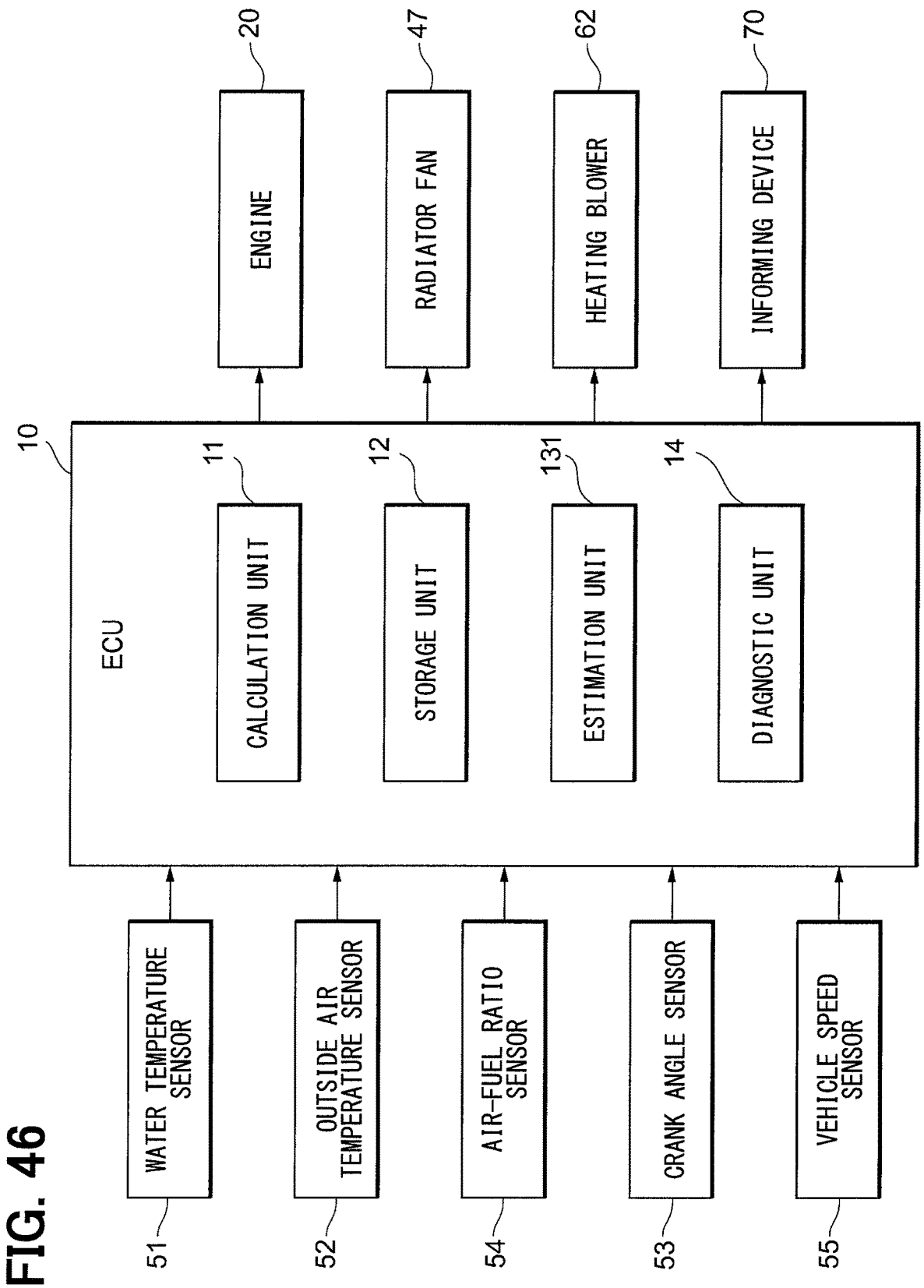
FIG. 46 is a functional block diagram illustrating the ECU of FIG. 45.

FIG. 46 illustrates a functional control block diagram of the ECU 10. Software modules that are incorporated into the analog circuit or the digital processor constituting the ECU 10 are not necessarily required to be divided as the control blocks illustrated in FIG. 46. That is, in actuality, analog circuits or modules may be configured to function as the multiple control blocks illustrated in FIG. 46 or may be further subdivided. The actual configuration in the ECU 10 can be appropriately modified by those skilled in the art, provided that the ECU 10 is configured to be capable of performing processes described later.

The ECU 10 is electrically connected with each sensor of a water temperature sensor 51, an outside air temperature sensor 52, an air-fuel ratio sensor 54, a crank angle sensor 53, and a vehicle speed sensor 55. The water temperature sensor 51 is a sensor that is arranged in the first circulation flow channel 431 (refer to FIG. 45) and generates and transmits a signal corresponding to a measured value Ta of the temperature of the discharge coolant. The outside air temperature sensor 52 is a sensor that is arranged in a portion of the vehicle 1 which is in contact with the outside air (refer to FIG. 45) and generates and transmits a signal corresponding to the outside air temperature. The air-fuel ratio sensor 54 is a sensor that is provided in a discharge gas flow channel not illustrated (refer to FIG. 45) and generates and transmits a signal corresponding to the oxygen concentration of gas discharged from the engine 20. The crank angle sensor 53 is a sensor that is attached to the engine 20 (refer to FIG. 45) and generates and transmits a signal corresponding to the angle of the crankshaft. The vehicle speed sensor 55 is a sensor that is attached to an axle, not illustrated, of the vehicle 1 (refer to FIG. 45) and generates and transmits a signal corresponding to the rotating speed of the axle.

The ECU 10 is also electrically connected with each vehicle-mounted device of the engine 20, the radiator fan 47, the heating blower 762, and an informing device 70. The informing device 70 is a device that informs an occupant of the vehicle 1 in various manners. The informing device 70 includes known devices such as a display panel and a buzzer. The ECU 10 transmits a control signal to control operation of each vehicle-mounted device.

The meaning of the expression "electrically connected" used in the present application is not limited to a form in which one is connected to another by a signal line and may include a form in which one is capable of communicating with another in a wireless manner.

The ECU 10 includes a calculation unit 11, a storage unit 12, an estimation unit 131, and a diagnostic unit 14.

The calculation unit 11 is a part that performs various calculations required for controlling each vehicle-mounted device. Specifically, the calculation unit 11, in response to a driver stepping on an accelerator not illustrated, performs a calculation that causes the engine 20 to generate a torque. The calculation unit 11 performs a predetermined calculation on the basis of a signal received from the water temperature sensor 51 and obtains the measured value Ta of the temperature of the discharge coolant. The calculation unit 11 performs a predetermined calculation on the basis of a signal received from the outside air temperature sensor 52 and obtains the outside air temperature. The calculation unit 11 performs a predetermined calculation on the basis of a signal received from the air-fuel ratio sensor 54 and calculates the air-fuel ratio in the cylinders of the engine 20. The calculation unit 11 performs a predetermined calculation on the basis of a signal received from an air flow sensor not illustrated and calculates the flow rate of air taken into the engine 20. The calculation unit 11 performs a predetermined calculation on the basis of a signal received from the crank angle sensor 53 and obtains the engine speed. The calculation unit 11 performs a predetermined calculation on the basis of a signal received from the vehicle speed sensor 55 and obtains the speed of movement of the vehicle 1 on a road (hereinafter, referred to as "vehicle speed" as well).

The storage unit 12 is a part that stores various types of information. The storage unit 12 includes, for example, a non-volatile memory. The storage unit 12 stores information such as a map in advance. The information is read by the calculation unit 11 and is used for calculations. The storage unit 12 is capable of storing results of calculations of the calculation unit 11.

The estimation unit 131 is a part that estimates the value of the temperature of the discharge coolant. Hereinafter, the value of the temperature of the discharge coolant estimated by the estimation unit 131 will be referred to as "estimated value Te" as well. The estimation unit 131 calculates the estimated value Te using a known technique on the basis of each value of the flow rate of air taken into the engine 20, the engine speed, the outside air temperature, and the vehicle speed obtained by the calculation unit 11. Specifically, the estimation unit 131 calculates the estimated value Te using each value by referencing the map stored in the storage unit 12 and performing various calculations using the value obtained as a result of the reference.

The diagnostic unit 14 is a part that diagnoses the thermostat 45. Specifically, the diagnostic unit 14 diagnoses the presence of a malfunction that the valve body of the thermostat 45 cannot be normally moved and is not switched between the above closed state and the opened state.

Figure 47:
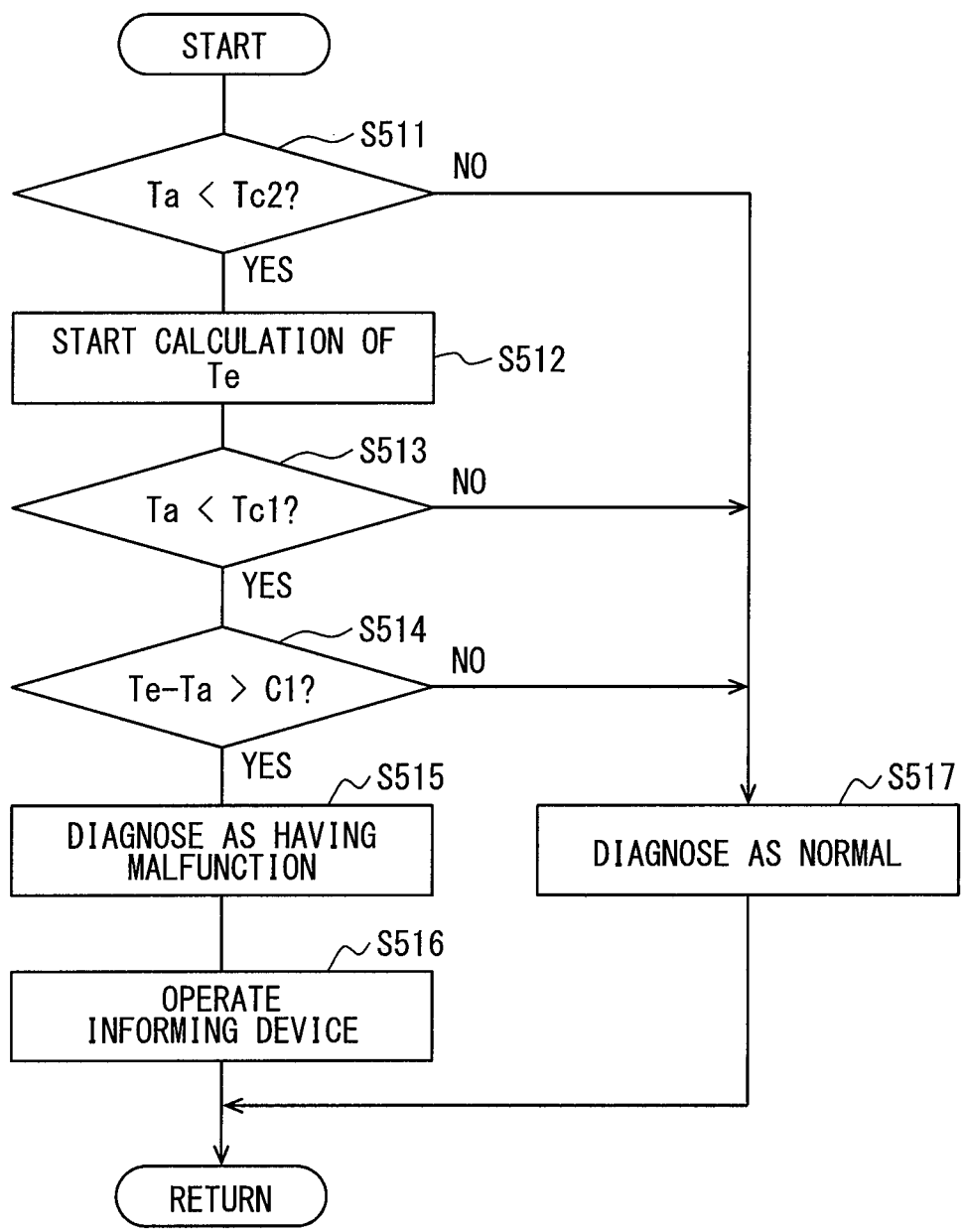
FIG. 47 is a flowchart illustrating a process performed by the ECU of FIG. 45.

Next, the flow of a process performed by the ECU 10 will be described with reference to FIG. 47 and FIG. 48. FIG. 47 is a flowchart illustrating a process that is performed by the ECU 10 after completion of the warm-up of the engine 20. Hereinafter, a process that is specifically performed by the calculation unit 11 and the like of the ECU 10 will be generally described as being performed by the ECU 10 for simplification.

First, the ECU 10 in S511 illustrated in FIG. 47 determines whether or not the measured value Ta of the temperature of the discharge coolant is lower than the predetermined valve open threshold Tc2. As described above, the valve open threshold Tc2 is the temperature of the coolant at which the valve body of the thermostat 45 is opened. The ECU 10 proceeds to the process of S517 in a case where the measured value Ta is determined to be greater than or equal to the valve open threshold Tc2 as in a state before a time point t11 illustrated in FIG. 48, and the thermostat 45 is diagnosed as normal. Meanwhile, the ECU 10 proceeds to the process of S512 illustrated in FIG. 47 in a case where the measured value Ta is determined to be lower than the valve open threshold Tc2 as in a state after the time point t11 illustrated in FIG. 48.

Next, the ECU 10 in S512 starts calculating the estimated value Te of the temperature of the discharge coolant. As illustrated in FIG. 48, the ECU 10 does not calculate the estimated value Te before the time point t11. Calculation of the estimated value Te started by the ECU 10 is triggered when the measured value Ta is determined to be lower than the valve open threshold Tc2. The ECU 10 calculates the estimated value Te on the basis of an estimation algorithm that uses the measured value Ta as an initial value. Thus, the estimated value Te is a value equal to the measured value Ta at the time point t11 as illustrated in FIG. 48.

Next, the ECU 10 in S513 determines whether or not the measured value Ta is lower than a predetermined diagnosis threshold Tc1 (for example, 60° C.). The diagnosis threshold Tc1 is set to a value lower than the valve open threshold Tc2. The diagnosis threshold Tc1 is set to a value with which a diagnosis related to a fuel system, a catalyst, and the like is not appropriately performed in a case where the actual value of the temperature of the discharge coolant falls below the value. The ECU 10 proceeds to the process of S517 in a case where the measured value Ta is determined not to be lower than the diagnosis threshold Tc1 as in a state from the time point t11 until a time point t12 illustrated in FIG. 48, and the thermostat 45 is diagnosed as normal. Meanwhile, the ECU 10 proceeds to the process of S514 illustrated in FIG. 47 in a case where the measured value Ta is determined to be lower than the diagnosis threshold Tc1 as in a state after the time point t12 illustrated in FIG. 48.

Next, the ECU 10 in S514 determines whether or not a deviation (Te−Ta) between the estimated value Te and the measured value Ta is greater than a predetermined deviation threshold C1. The ECU 10 proceeds to the process of S517 in a case where the deviation (Te−Ta) is determined not to be greater than the deviation threshold C1 as in a state from the time point t12 until a time point t13 illustrated in FIG. 48, and the thermostat 45 is diagnosed as normal.

Figure 48:
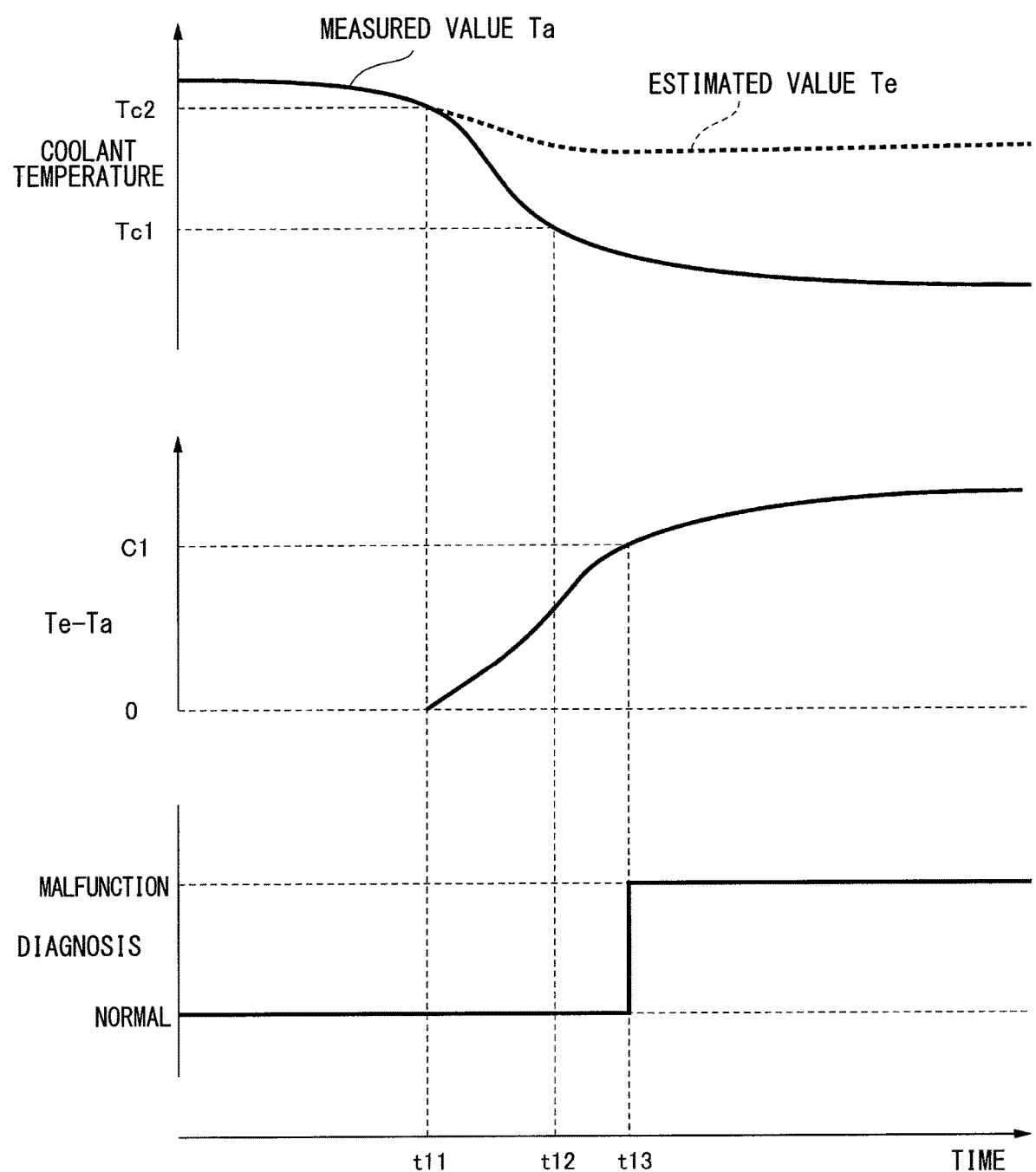
FIG. 48 is a time chart illustrating a change in permitting or suspending a diagnosis performed by the ECU of FIG. 45.

Meanwhile, the valve body in the thermostat 45 can be estimated not to be appropriately moved in a case where the deviation (Te−Ta) is determined to be greater than the deviation threshold C1 as in a state after the time point t13 illustrated in FIG. 48. That is, it can be estimated that the discharge coolant of which the flow rate is greater than a required flow rate is supplied from the thermostat 45 to the radiator 46 and that the discharge coolant is cooled in the radiator 46. Therefore, in this case, the ECU 10 proceeds to the process of S515, and the thermostat 45 is diagnosed as having a malfunction. Furthermore, the ECU 10 in S516 causes the informing device 70 to be operated and is capable of prompting a user of the vehicle 1 to perform inspection and the like.

As described heretofore, the ECU 10 according to the tenth embodiment performs estimation related to the temperature of the discharge coolant only in a case where the measured value Ta of the temperature of the discharge coolant is lower than the valve open threshold Tc2 which is the temperature at which the valve body of the thermostat 45 is opened. Accordingly, the estimation related to the temperature of the discharge coolant can be performed under a condition that the discharge coolant does not radiate heat in the radiator 46 if the thermostat 45 is normal. Therefore, the thermostat 45 can be accurately diagnosed even in a case where the diagnostic unit 14 diagnoses the thermostat 45 on the basis of the measured value Ta of the temperature of the discharge coolant and the estimated value Te which is the result of the estimation related to the temperature of the discharge coolant.

The estimation unit 131 estimates the value of the temperature of the discharge coolant in the ECU 10. The diagnostic unit 14 diagnoses the thermostat 45 as having a malfunction in a case where the deviation (Te−Ta) between the estimated value Te and the measured value Ta is greater than the deviation threshold C1.

The temperature of the discharge coolant after the warm-up of the engine 20 is changed in a complicated manner on the basis of various causes such as the opening ratio of the thermostat 45 and the operational state of the engine 20. Therefore, if the estimated value Te is desired to be accurately calculated after the warm-up of the engine 20, a complicated estimation algorithm is required, and processing load of the ECU 10 accompanied by the algorithm is increased.

Regarding this point, the estimated value Te is calculated in the ECU 10 under a condition that the discharge coolant does not radiate heat in the radiator 46 if the thermostat 45 is normal. Therefore, the estimation algorithm used is comparatively simplified, and processing load of the ECU 10 accompanied by calculation can be decreased. The thermostat 45 can be diagnosed by calculating the deviation (Te−Ta) between the estimated value Te calculated as such and the measured value Ta and by comparing the deviation (Te−Ta) between the estimated value Te and the measured value Ta with the deviation threshold C1. That is, a diagnosis of a malfunction that the valve body in the thermostat 45 cannot be appropriately moved and the discharge coolant of which the flow rate is greater than a required flow rate is supplied from the thermostat 45 to the radiator 46 can be made in a case where the deviation (Te−Ta) is greater than the deviation threshold C1.

The diagnostic unit 14 in the ECU 10 diagnoses the thermostat 45 as having a malfunction in a case where the measured value Ta is lower than the diagnosis threshold Tc1, which is set to be lower than the valve open threshold Tc2, and the deviation (Te−Ta) is greater than the deviation threshold C1.

According to this configuration, the thermostat 45 can be diagnosed as having a malfunction on the basis that the temperature of the discharge coolant reaches the diagnosis threshold Tc1 at which a diagnosis related to the fuel system, the catalyst, and the like is not appropriately performed and that the discharge coolant of which the flow rate is greater than a required flow rate is supplied from the thermostat 45 to the radiator 46. The estimation unit 131 starts calculating the estimated value Te at the valve open threshold Tc2. Therefore, the estimation unit 131 can promptly calculate the deviation (Te−Ta) in a case where the measured value Ta reaches the diagnosis threshold Tc1 and can compare the deviation (Te−Ta) with the deviation threshold C1.

Eleventh Embodiment

Next, an ECU 10A according to an eleventh embodiment will be described with reference to FIG. 49 to FIG. 53. The ECU 10A is an electronic control unit with which a vehicle 1 is equipped (refer to FIG. 45) and that diagnoses a thermostat 45 which is a temperature adjusting valve in the same manner as the ECU 10 according to the tenth embodiment. A part of the ECU 10A having the same configuration as the ECU 10 according to the tenth embodiment will be appropriately designated by the same reference sign and will not be described.

Figure 49:
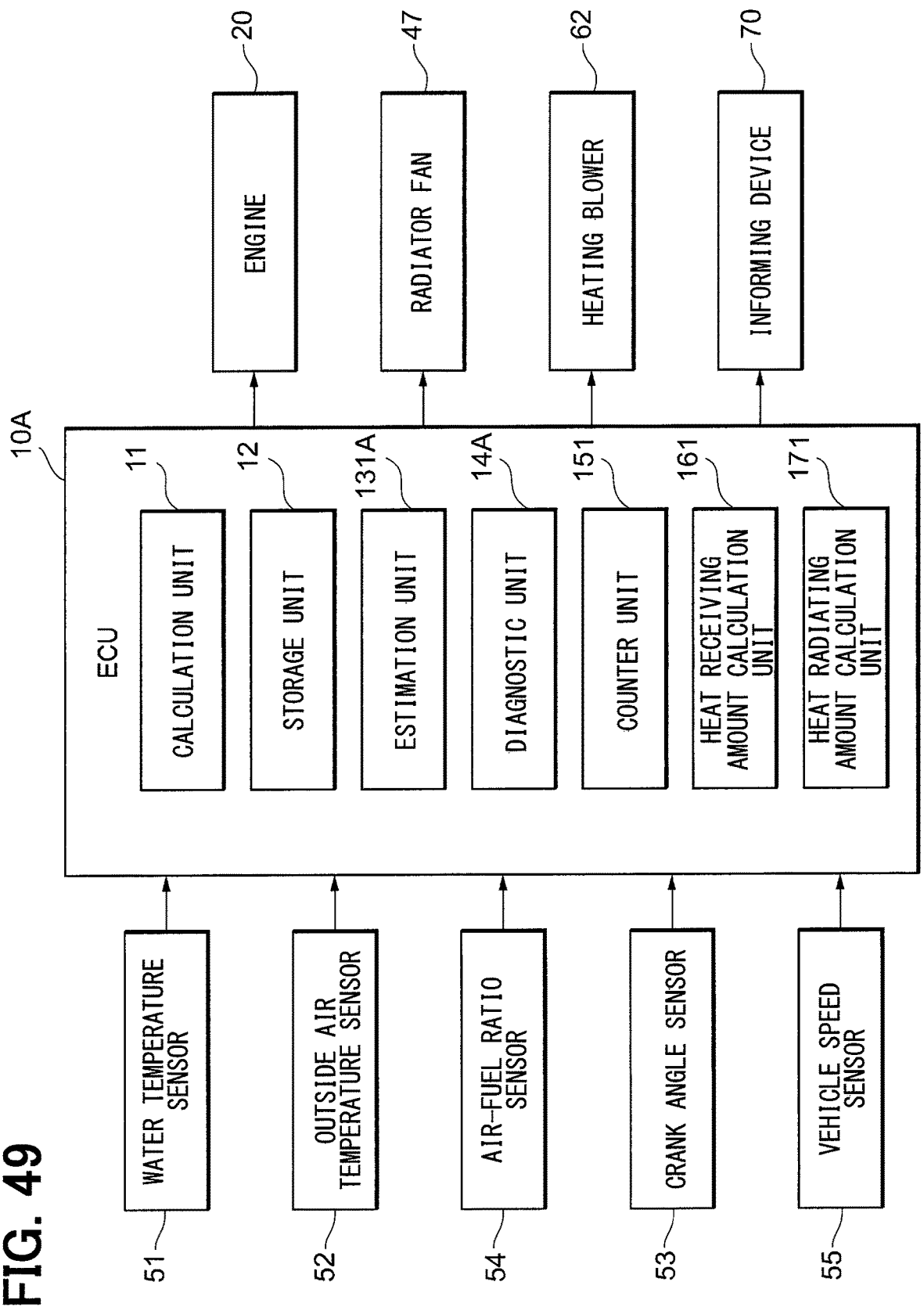
FIG. 49 is a functional block diagram illustrating the ECU according to the eleventh embodiment.

As illustrated in FIG. 49, the ECU 10A according to the eleventh embodiment includes a calculation unit 11 and a storage unit 12 in the same manner as the above ECU 10. The ECU 10A further includes an estimation unit 131A, a diagnostic unit 14A, a counter unit 151, a heat receiving amount calculation unit 161, and a heat radiating amount calculation unit 171.

The estimation unit 131A is a part that estimates the tendency of change in the temperature of a discharge coolant. As described later, the estimation unit 131A estimates an increase or a decrease in the temperature of the discharge coolant on the basis of heat balance of a coolant.

The diagnostic unit 14A is a part that diagnoses the thermostat 45. Specifically, the diagnostic unit 14A diagnoses the presence of a malfunction that the valve body of the thermostat 45 cannot be normally moved and is not switched between the above closed state and the opened state.

The counter unit 151 is a part that performs various types of counting. The counter unit 151 counts, for example, the time length in which an engine 20 is operated in a specific operation region of multiply divided operation regions of the engine 20.

The heat receiving amount calculation unit 161 is a part that calculates the amount of heat transmitted per unit time from the engine 20 to the coolant (hereinafter, referred to as "heat receiving amount" as well). As described later, the heat receiving amount calculation unit 161 calculates the heat receiving amount on the basis of the engine speed and the like.

The heat radiating amount calculation unit 171 is a part that calculates the amount of heat radiated per unit time from the coolant to the outside (hereinafter, referred to as "heat radiating amount" as well). As described later, the heat radiating amount calculation unit 171 calculates the heat radiating amount on the basis of the outside air temperature and the like.

Figure 50:
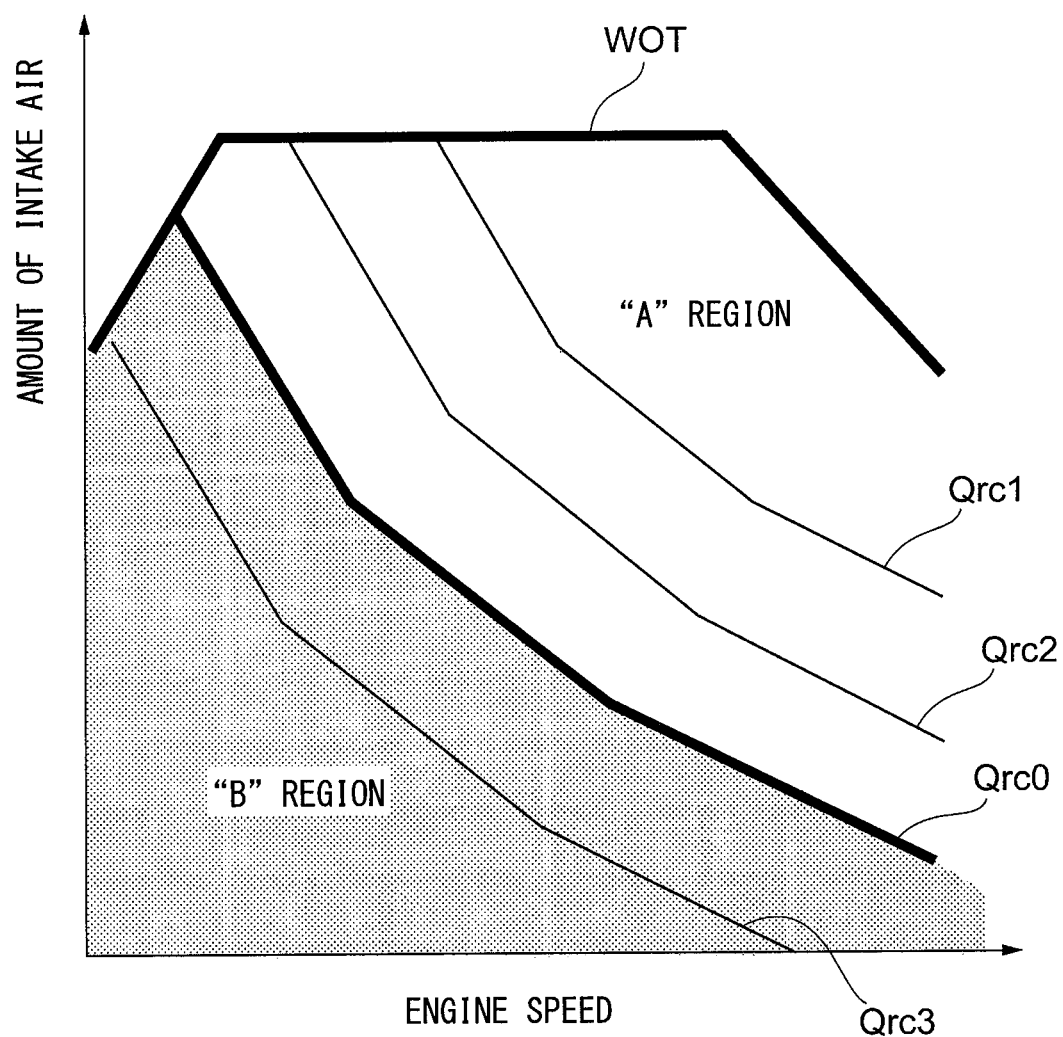
FIG. 50 is a descriptive diagram illustrating operation regions of an engine of FIG. 45.

FIG. 50 illustrates a map of a heat receiving amount Qrc in which the engine speed is plotted on the horizontal axis and the amount of air taken into the engine 20 is plotted on the vertical axis. The map of the heat receiving amount Qrc is stored in the storage unit 12 of the ECU 10A. The amount of air taken into the engine 20 at each rotating speed has upper limit values illustrated by a solid line WOT (wide open throttle; the wide opened state of a throttle valve).

The heat receiving amount Qrc of the coolant in a case where the engine 20 is operated along solid lines Qrc1, Qrc2, Qrc0, and Qrc3 is respectively Qrc1, Qrc2, Qrc0, and Qrc3. The values of the heat receiving amounts Qrc1, Qrc2, Qrc0, and Qrc3 decrease in this order. That is, the heat receiving amount Qrc of the coolant has a greater value as the region in which the engine 20 is operated moves upward and rightward in the map illustrated in FIG. 50. The same map as the map illustrated in FIG. 50 can be created by plotting a torque generated by the engine 20 on the vertical axis instead of the amount of air taken into the engine 20.

The heat receiving amount Qrc of the coolant is greater than a heat radiating amount Qrd in a case where the engine 20 is operated in an "A" region where the heat receiving amount Qrc of the coolant has a greater value than Qrc0 and has a smaller value than the solid line WOT (that is, a region to which the heat receiving amounts Qrc1 and Qrc2 belong). In this case, the temperature of the discharge coolant tends to be increased on the basis of heat balance.

Meanwhile, the heat receiving amount Qrc of the coolant is smaller than the heat radiating amount Qrd in a case where the engine 20 is operated in a "B" region where the heat receiving amount Qrc of the coolant has a smaller value than Qrc0 and has a smaller value than the solid line WOT (that is, a region to which the heat receiving amount Qrc3 belongs). In this case, the temperature of the discharge coolant tends to be decreased on the basis of heat balance. That is, the heat receiving amount Qrc0 is a threshold as a boundary at which the temperature of the discharge coolant is changed to be increased or decreased.

It is difficult to determine whether a decrease in the temperature of the discharge coolant while the engine 20 is operated in the "B" region is due to a malfunction of the thermostat 45 or other causes. Therefore, if the thermostat 45 is diagnosed in such a state, a concern for an erroneous diagnosis result is increased. A diagnosis of the thermostat 45 is preferably suspended in a case where the frequency of the engine 20 being operated in the "B" region is high.

Next, determination of permitting or suspending a diagnosis of the thermostat 45 will be described with reference to FIG. 51 and FIG. 52.

Figure 51:
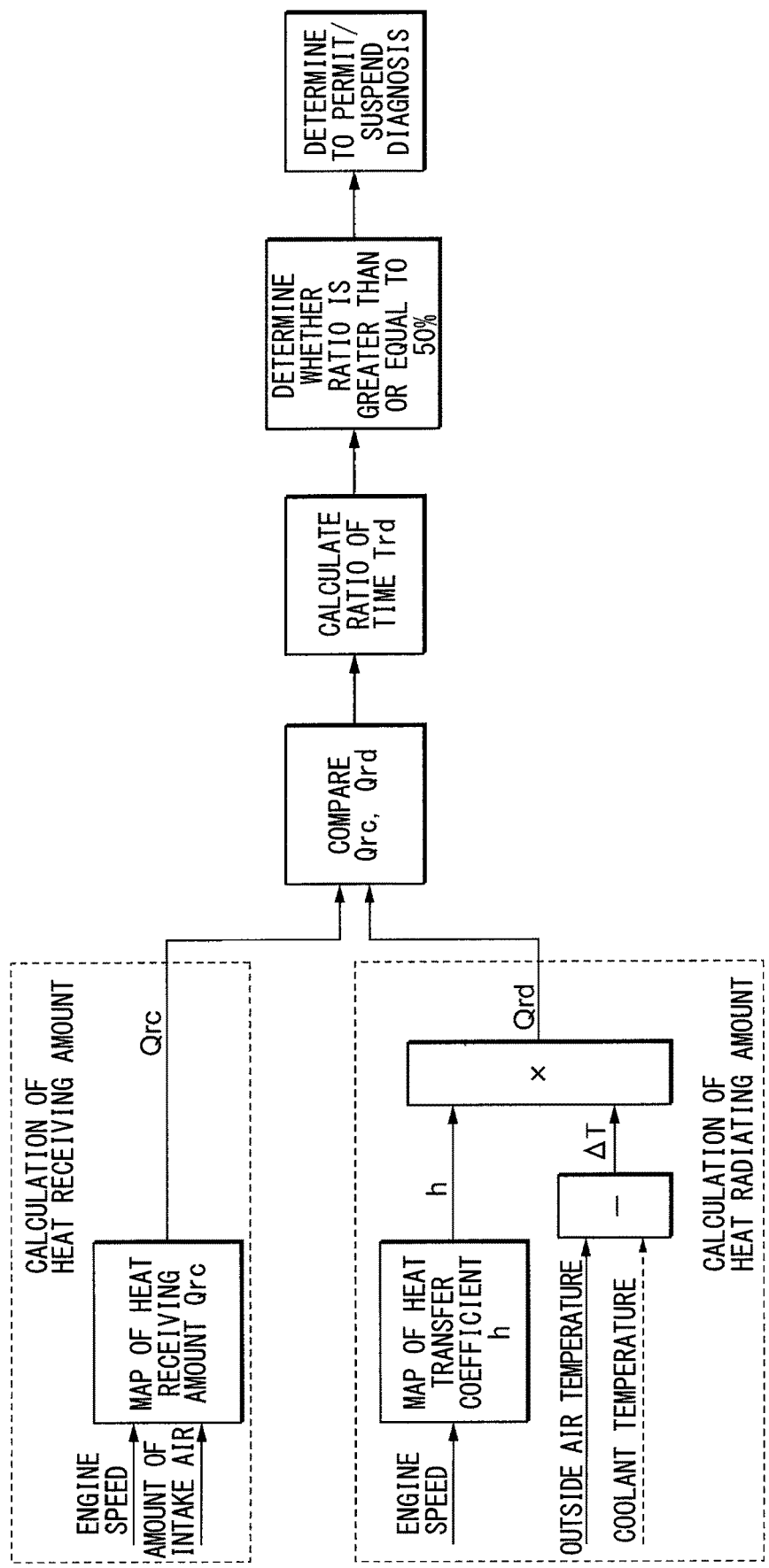
FIG. 51 is a descriptive diagram illustrating a determination logic for permitting or suspending a diagnosis performed by the ECU of FIG. 49.

The heat receiving amount calculation unit 161 of the ECU 10A compares the engine speed and the amount of air taken into the engine 20 with the map of the heat receiving amount Qrc stored in the storage unit 12 as illustrated in FIG. 51. Accordingly, the heat receiving amount Qrc of the coolant in the operational state of the engine 20 is obtained.

The heat radiating amount calculation unit 171 of the ECU 10A compares the engine speed with a map of a heat transfer coefficient "h". The heat transfer coefficient "h" is a constant that is used when the amount of heat transferred from the coolant to the outside air is calculated. The heat transfer coefficient "h" is experimentally determined in advance considering material properties and the shapes of the pipes constituting the circulation flow channel 33 and the bypass flow channel 34 and correlates with the flow speed of the coolant. Since the water pump 41 that pumps the coolant is rotationally driven by receiving the output of the engine 20 in the present embodiment, the flow speed of the coolant correlates with the engine speed. Therefore, the engine speed and the heat transfer coefficient "h" at the rotating speed are associated with each other in the map of the heat transfer coefficient "h". The heat transfer coefficient "h" is obtained by comparing the engine speed with the map of the heat transfer coefficient "h".

The heat radiating amount calculation unit 171 calculates a temperature difference $\Delta T$ that is the difference between the outside air temperature and the temperature of the coolant. The heat radiating amount calculation unit 171 obtains the heat radiating amount Qrd of the coolant by multiplying the temperature difference $\Delta T$ by the heat transfer coefficient "h".

The ECU 10A compares the heat receiving amount Qrc of the coolant with the heat radiating amount Qrd obtained as described heretofore. In a case where the heat radiating amount Qrd is greater than the heat receiving amount Qrc, the engine 20 is operated in the "B" region illustrated in FIG. 50, and the temperature of the discharge coolant tends to be decreased.

The ECU 10A, during a predetermined period in which the engine 20 is operated, calculates a time length Tb of a period in which the heat radiating amount Qrd is greater than the heat receiving amount Qrc. The ECU 10A calculates a ratio (Tb/Td) of the time length Tb to a time length Td of the predetermined period. The ECU 10A determines whether or not the ratio (Tb/Td) is greater than or equal to 50% which is a ratio threshold. In a case where the ratio (Tb/Td) is greater than or equal to 50% (that is, in a case where Tb/Td is greater than or equal to 0.5), the engine 20 is frequently operated in the "B" region, and a concern for an erroneous result of a diagnosis of the thermostat 45 is high. Thus, the diagnostic unit 14A of the ECU 10A suspends a diagnosis of the thermostat 45. Meanwhile, in a case where the ratio (Tb/Td) is smaller than 50% (that is, in a case where Tb/Td is smaller than 0.5), a concern for an erroneous result of a diagnosis of the thermostat 45 is low. Thus, the diagnostic unit 14A of the ECU 10A does not suspend a diagnosis (that is, permits a diagnosis).

Figure 52:
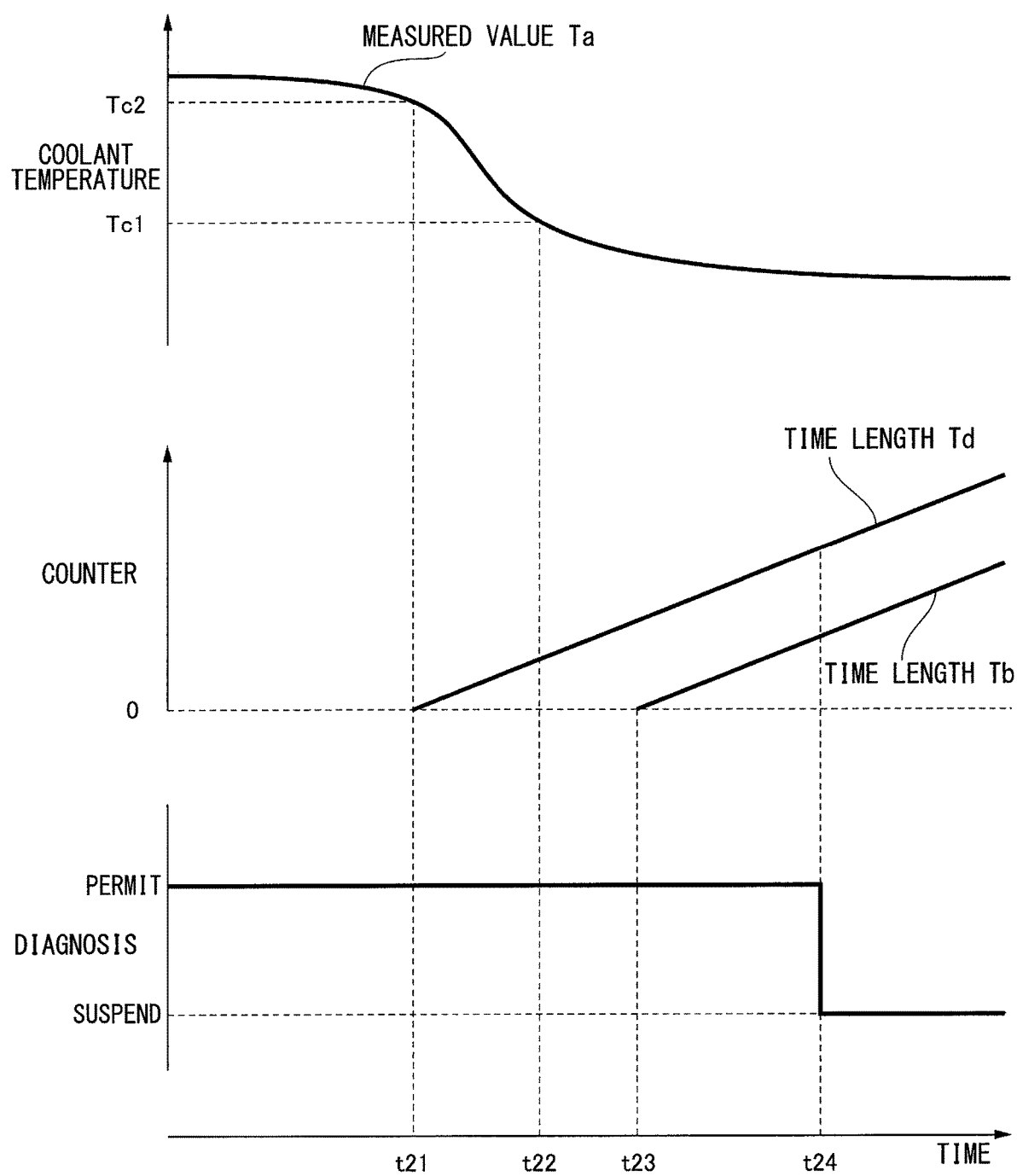
FIG. 52 is a time chart illustrating a change in permitting or suspending a diagnosis performed by the ECU of FIG. 49.

FIG. 52 illustrates a change in permitting or suspending a diagnosis of the thermostat 45 and a change in time. The counter unit 151 of the ECU 10A counts the time length Td of the period of operation of the engine 20 from a time point t21 at which a measured value Ta is decreased below a valve open threshold Tc2. Since the engine 20 is not operated in the "B" region illustrated in FIG. 50 from the time point t21 to a time point t23, the ratio (Tb/Td) is smaller than 50% which is the ratio threshold. In this case, the diagnostic unit 14A of the ECU 10A does not suspend a diagnosis (that is, permits a diagnosis).

When, for example, new heat of combustion generated in the engine 20 is decreased at the time point t23, the heat receiving amount of the coolant is decreased, and the frequency of the engine 20 being operated in the "B" region is gradually increased. The counter unit 151 of the ECU 10A starts counting the time length Tb of the period in which the engine 20 is operated in the "B" region.

The diagnostic unit 14A of the ECU 10A suspends a diagnosis when the ratio (Tb/Td) of the time length Tb to the time length Td at a time point t24 reaches 50% which is the ratio threshold. Accordingly, a diagnosis of the thermostat 45 is suspended in a situation where a concern for an erroneous diagnosis is high. That is, the temperature of the discharge coolant in the operating condition of the engine 20 after the time point t24 is decreased from the temperature of the discharge coolant in the operating condition of the engine 20 until the time point t24.

Figure 53:
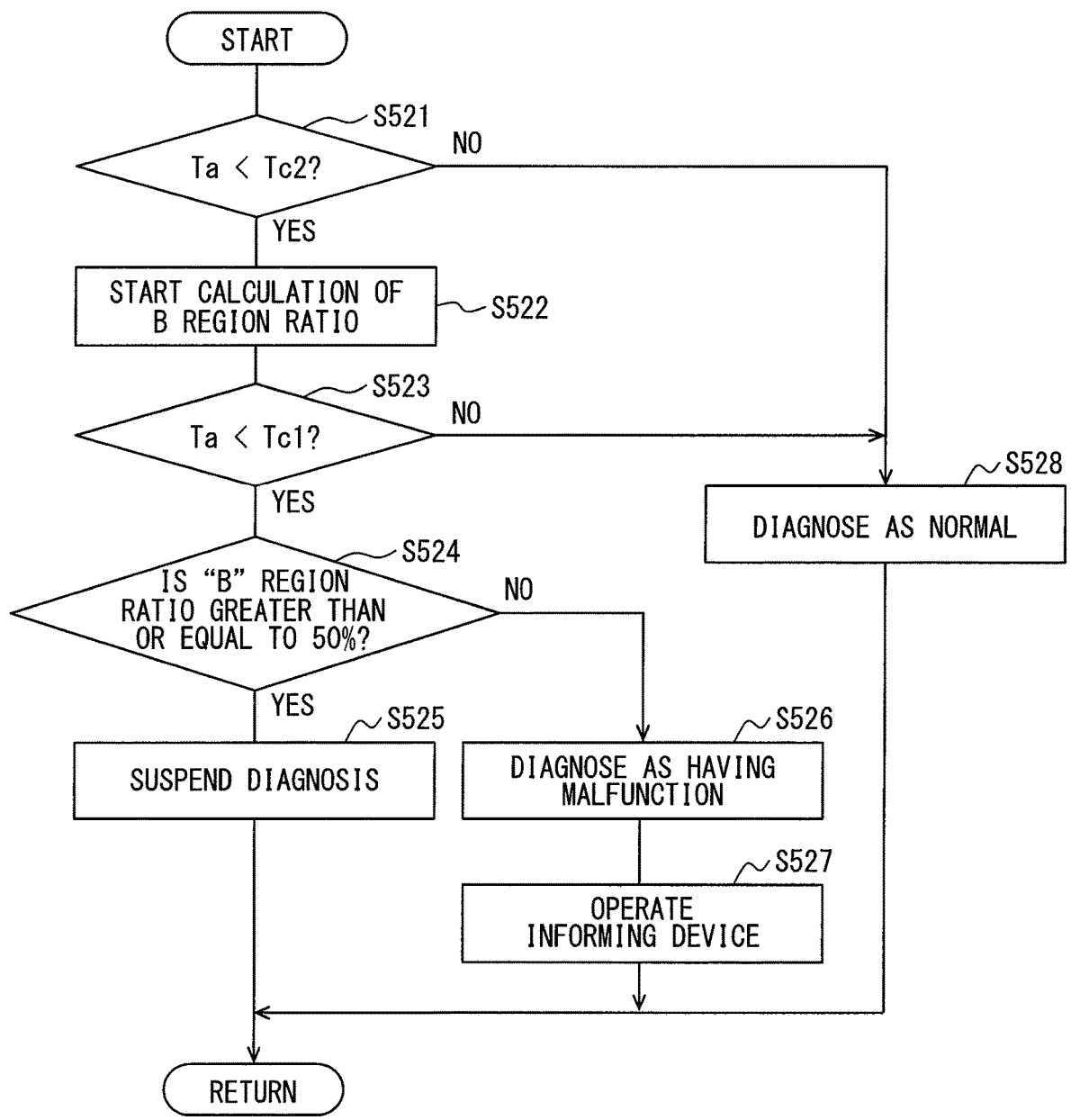
FIG. 53 is a flowchart illustrating a process performed by the ECU of FIG. 49.

Next, the flow of a process performed by the ECU 10A will be described with reference to FIG. 52 and FIG. 53. FIG. 53 is a flowchart illustrating a process that is performed by the ECU 10A after completion of a warm-up of the engine 20. Hereinafter, a process that is specifically performed by the calculation unit 11 and the like of the ECU 10A will be generally described as being performed by the ECU 10A for simplification.

First, the ECU 10A in S521 illustrated in FIG. 53 determines whether or not the measured value Ta of the temperature of the discharge coolant is lower than the predetermined valve open threshold Tc2. The process performed by the ECU 10A in S521 is the same as the process performed by the ECU 10 in S511 described above. The ECU 10A proceeds to the process of S528 in a case where the measured value Ta is determined to be greater than or equal to the valve open threshold Tc2 as in a state before the time point t21 illustrated in FIG. 52, and the thermostat 45 is diagnosed as normal. Meanwhile, the ECU 10A proceeds to the process of S522 illustrated in FIG. 53 in a case where the measured value Ta is determined to be lower than the valve open threshold Tc2 as in a state after the time point t23 illustrated in FIG. 52.

Next, the ECU 10A in S522 starts calculating the ratio (Tb/Td) of the time length Tb to the time length Td. As illustrated in FIG. 52, the ECU 10A does not count the time length Td and the time length Tb before the time point t21 and does not calculate the ratio (Tb/Td). Calculation of the ratio (Tb/Td) started by the ECU 10A is triggered when the measured value Ta is determined to be lower than the valve open threshold Tc2.

Next, the ECU 10A in S523 determines whether or not the measured value Ta is lower than a predetermined diagnosis threshold Tc1 (for example, 60° C.). The process performed by the ECU 10A in S523 is the same as the process performed by the ECU 10 in S513 described above. The ECU 10A proceeds to the process of S528 in a case where the measured value Ta is determined not to be lower than the diagnosis threshold Tc1 as in a state from the time point t21 until a time point t22 illustrated in FIG. 52, and the thermostat 45 is diagnosed as normal. Meanwhile, the ECU 10A proceeds to the process of S524 illustrated in FIG. 53 in a case where the measured value Ta is determined to be lower than the diagnosis threshold Tc1 as in a state after the time point t22 illustrated in FIG. 52.

Next, the ECU 10A in S524 determines whether or not the ratio (Tb/Td) is greater than or equal to 50% which is the ratio threshold. The ECU 10A proceeds to the process of S525 in a case where the ratio (Tb/Td) is determined to be greater than or equal to 50%.

Next, the ECU 10A in S525 suspends a diagnosis of the thermostat 45. That is, since it is estimated in S524, described above, that the engine 20 is frequently operated in the "B" region and that a concern for an erroneous result of the diagnosis is high, the ECU 10A suspends the diagnosis.

Meanwhile, the ECU 10A proceeds to the process of S526 in a case where the ratio (Tb/Td) is determined not to be greater than or equal to 50% which is the ratio threshold in S524. Next, the ECU 10A in S526 diagnoses the thermostat 45 as having a malfunction. Furthermore, the ECU 10A in S527 causes an informing device 70 to be operated and is capable of prompting a user of the vehicle 1 to perform inspection and the like.

As described heretofore, the ECU 10A according to the eleventh embodiment includes the heat receiving amount calculation unit 161 that calculates the heat receiving amount Qrc of the coolant after completion of the warm-up of the engine 20 and includes the heat radiating amount calculation unit 171 that calculates the heat radiating amount Qrd of the coolant after completion of the warm-up of the engine 20. The estimation unit 131A estimates an increase or a decrease in the temperature of the discharge coolant on the basis of the heat receiving amount Qrc calculated by the heat receiving amount calculation unit 161 and the heat radiating amount Qrd calculated by the heat radiating amount calculation unit 171.

According to this configuration, the heat receiving amount Qrc and the heat radiating amount Qrd of the coolant are calculated under a condition that the discharge coolant does not radiate heat in the radiator 46 if the thermostat 45 is normal. Therefore, an algorithm used when the heat receiving amount Qrc and the heat radiating amount Qrd of the coolant are calculated is comparatively simplified, and processing load of the ECU 10A accompanied by calculation can be decreased. A diagnosis of the thermostat 45 in a situation where a concern for an erroneous diagnosis is high can be avoided by suspending a diagnosis of the thermostat 45 on the basis of the heat receiving amount Qrc and the heat radiating amount Qrd of the coolant calculated as such.

The diagnostic unit 14A in the ECU 10A suspends a diagnosis in a case where the heat radiating amount Qrd calculated by the heat radiating amount calculation unit 171 is greater than the heat receiving amount Qrc calculated by the heat receiving amount calculation unit 161.

According to this configuration, a decrease in the temperature of the discharge coolant even if the thermostat 45 is normal can be estimated on the basis that the heat radiating amount Qrd is greater than the heat receiving amount Qrc. Therefore, the thermostat 45 can be accurately diagnosed by suspending a diagnosis performed by the diagnostic unit 14A in a case where the heat radiating amount Qrd is greater than the heat receiving amount Qrc.

The diagnostic unit 14A in the ECU 10A suspends a diagnosis in a case where the ratio (Tb/Td), which is the ratio of the time length Tb of the period in which the heat radiating amount Qrd calculated by the heat radiating amount calculation unit 171 is greater than the heat receiving amount Qrc calculated by the heat receiving amount calculation unit 161 in the predetermined period to the time length Td of the predetermined period after completion of the warm-up of the engine 20, is greater than 50% which is the ratio threshold.

According to this configuration, a decrease in the temperature of the discharge coolant even if the thermostat 45 is normal can be estimated on the basis that the ratio (Tb/Td) of the time length Tb of the period in which the heat radiating amount Qrd is greater than the heat receiving amount Qrc to the time length Td of the predetermined period is greater than 50%. Therefore, the thermostat 45 can be accurately diagnosed by suspending a diagnosis performed by the diagnostic unit 14A in a case where the ratio (Tb/Td) is greater than 50%.

An embodiment of the present disclosure is described heretofore with reference to specific examples. However, the present disclosure is not limited to the specific examples. That is, the specific examples after appropriately modified in design by those skilled in the art are to be included in the scope of the present invention, provided that the modified specific examples include the features of the present disclosure. Each element included in above each specific example and the arrangement, the material, the condition, the shape, the size, and the like thereof are not limited to the illustrations and can be appropriately modified.

Twelfth Embodiment

Figure 54:
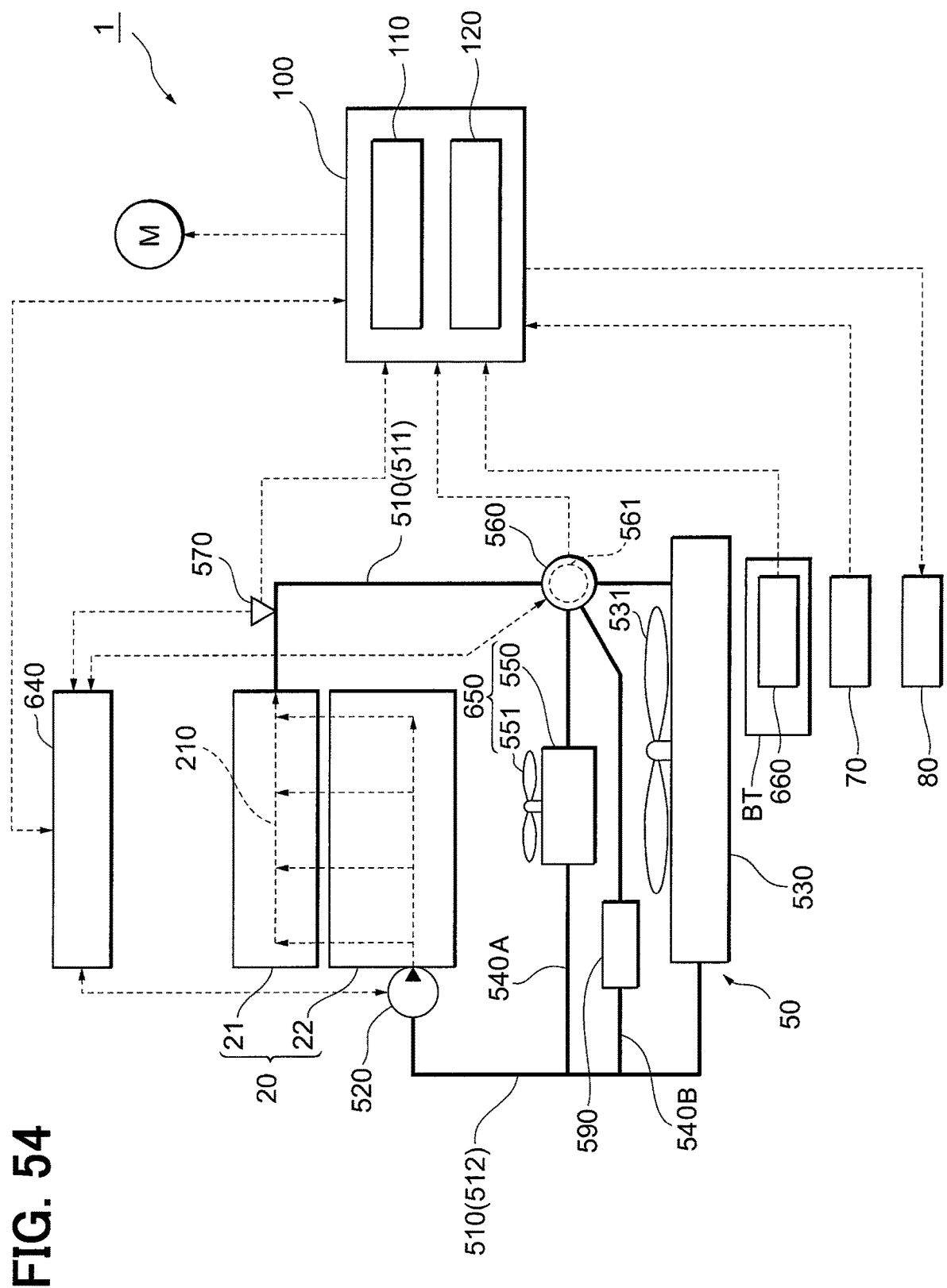
FIG. 54 is a diagram illustrating configurations of a diagnostic device according to a twelfth embodiment of the present disclosure and a vehicle equipped with the diagnostic device.

A diagnostic device 100 according to a twelfth embodiment is a device that diagnoses the operational state of a vehicle 1. First, a configuration of the vehicle 1 will be described with reference to FIG. 54. The vehicle 1 is configured as a so-called hybrid vehicle that includes an internal combustion engine 20 and a motor M.

The internal combustion engine 20 is a four-cycle reciprocating engine that is driven by using gasoline as fuel. The internal combustion engine 20 includes a cylinder head 21 and a cylinder block 22. Multiple cylinders not illustrated are provided in the cylinder head 21 and the cylinder block 22. Each stroke of an intake stroke, a compression stroke, a combustion stroke, and an exhaust stroke is repeated in each cylinder, thereby generating driving power required for traveling of the vehicle 1.

The motor M is a three-phase AC motor. The vehicle 1 is equipped with a battery and a power converter (all of which are not illustrated). DC power that is output from the battery is converted into three-phase AC power by the power converter, and the three-phase AC power is supplied to the motor M. When the three-phase AC power is supplied to the motor M, driving power required for traveling of the vehicle 1 is generated. The magnitude of the driving power is adjusted by a switching operation of the power converter.

The vehicle 1 is capable of traveling using both driving power of the internal combustion engine 20 and driving power of the motor M. The vehicle 1 is capable of traveling using only the driving power of the internal combustion engine 20 or traveling using only the driving power of the motor M.

The vehicle 1 includes a cooling device 50, a voltage sensor 660, an outside air temperature sensor 80, an informing device 70, and a control device 640 in addition to the internal combustion engine 20 and the motor M described heretofore.

The cooling device 50 is a device that cools the internal combustion engine 20 generating a great amount of heat during operation thereof and maintains the internal combustion engine 20 at an appropriate temperature. The cooling device 50 includes a circulation flow channel 510, a water pump 520, a radiator 530, a first bypass flow channel 540A, a second bypass flow channel 540B, and a temperature adjusting valve 560.

The circulation flow channel 510 is a channel that circulates a coolant between the internal combustion engine 20 and the radiator 530 described later. Hereinafter, a channel of the circulation flow channel 510 in which the coolant flows from the internal combustion engine 20 toward the radiator 530 will be referred to as "first flow channel 511" as well. A channel of the circulation flow channel 510 in which the coolant flows from the radiator 530 toward the internal combustion engine 20 will be referred to as "second flow channel 512" as well.

An internal flow channel 210 is provided in the internal combustion engine 20. The coolant that is supplied to the internal combustion engine 20 by passing through the second flow channel 512 captures heat from the internal combustion engine 20 while passing through the internal flow channel 210. Accordingly, the temperature of the coolant is increased, and the coolant is discharged from the internal flow channel 210 to the first flow channel 511.

A water temperature sensor 570 that measures the temperature of the coolant immediately after discharged from the internal combustion engine 20 is provided at a position near the internal combustion engine 20 in the first flow channel 511. A signal that is based on a water temperature measured by the water temperature sensor 570 is input into the diagnostic device 100 and the control device 640.

The water pump 520 is an electric pump that pumps the coolant to circulate the coolant in the circulation flow channel 510. The water pump 520 is arranged at a position near the internal combustion engine 20 in the second flow channel 512. Operation of the water pump 520 is controlled by the control device 640 described later. The diagnostic device 100 is also capable of controlling operation of the water pump 520 through the control device 640.

The water pump 520 outputs a signal that indicates the rotating speed of the water pump 520. The signal is input into the control device 640. The control device 640 controls operation of the water pump 520 by referencing the signal from the water pump 520.

The radiator 530 is a heat exchanger that decreases the temperature of the coolant by causing the coolant flowing in the circulation flow channel 510 to exchange heat with air introduced from the outside of the vehicle 1. A radiator fan 531 is provided in the vicinity of the radiator 530. The radiator fan 531 transports air into the radiator 530 so that heat is efficiently exchanged in the radiator 530.

The first bypass flow channel 540A is a channel that is provided to connect the first flow channel 511 and the second flow channel 512. Operation of the temperature adjusting valve 560 described later allows the coolant to flow only in the first bypass flow channel 540A without passing through the radiator 530. In addition, operation of the temperature adjusting valve 560 allows the coolant to flow in both the radiator 530 and the first bypass flow channel 540A.

A heater core 550 is provided midway of the first bypass flow channel 540A. The heater core 550 with a blower 551 described later constitutes a part of a heating device 650 included in the vehicle 1. The heater core 550 is a heat exchanger that increases the temperature of air passing through the heater core 550 by causing the high temperature coolant flowing in the heater core 550 to exchange heat with the air. A blower 551 is provided in the vicinity of the heater core 550. The blower 551 transports air into the heater core 550 so that heat is efficiently exchanged in the heater core 550. Air that passes through the heater core 550 and of which the temperature is increased is supplied into the vehicle interior of the vehicle 1 by passing through a duct not illustrated.

The temperature of the coolant is decreased by exchange of heat with air when the coolant passes through the heater core 550. The amount of heat that the coolant loses when passing through the heater core 550 is changed according to the operational state of the heating device 650 that includes the heater core 550.

The second bypass flow channel 540B is a channel that is provided to connect the first flow channel 511 and the second flow channel 512 in the same manner as the first bypass flow channel 540A. Operation of the temperature adjusting valve 560 allows the coolant to flow in the first bypass flow channel 540A and the second bypass flow channel 540B without passing through the radiator 530. In addition, operation of the temperature adjusting valve 560 allows the coolant to flow in all of the radiator 530, the first bypass flow channel 540A, and the second bypass flow channel 540B.

An oil cooler 590 is provided midway of the second bypass flow channel 540B. The oil cooler 590 is a heat exchanger that cools oil supplied to the internal combustion engine 20. The temperature of the coolant is increased by exchange of heat with oil when the coolant passes through the oil cooler 590.

The temperature adjusting valve 560 is provided at a part where the first flow channel 511 and the first bypass flow channel 540A branch. The part is also a part at which the first flow channel 511 and the second bypass flow channel 540B branch.

The temperature adjusting valve 560 is an electric valve in which flow channels can be switched by a valve body 561 in the temperature adjusting valve 560 that is rotated by receiving supply of power. Operation of the temperature adjusting valve 560, specifically, a change in the rotation angle of the valve body 561, is controlled by the control device 640.

Rotation of the valve body 561 can bring about a state where the coolant is supplied from the first flow channel 511 to only the first bypass flow channel 540A (hereinafter, referred to as "first state" as well). In addition, rotation of the valve body 561 can bring about a state where the coolant is supplied from the first flow channel 511 to the first bypass flow channel 540A and the second bypass flow channel but is not supplied to the radiator 530 (hereinafter referred to as "second state" as well). Furthermore, rotation of the valve body 561 can bring about a state where the coolant is supplied from the first flow channel 511 to all of the first bypass flow channel 540A, the second bypass flow channel, and the radiator 530 (hereinafter, referred to as "third state" as well).

Figure 55:
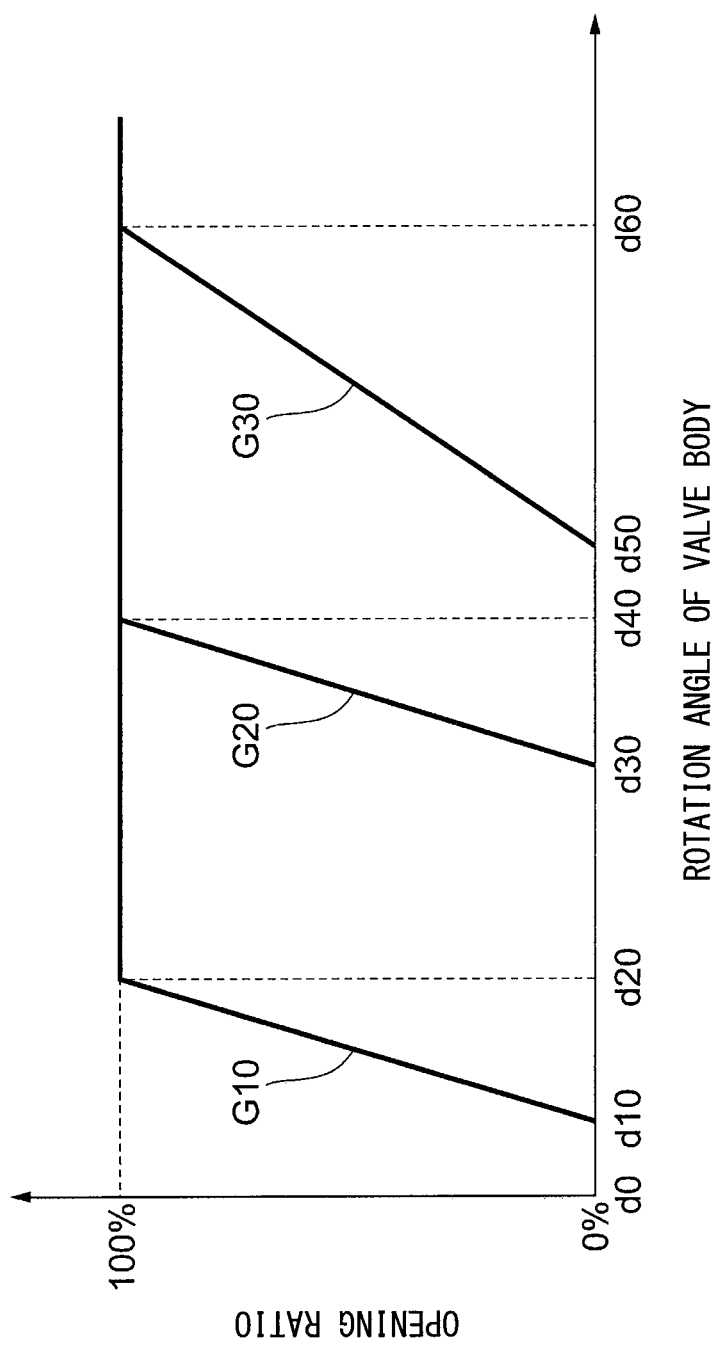
FIG. 55 is a diagram illustrating operation of a temperature adjusting valve.

FIG. 55 illustrates a graph illustrating operating characteristics of the temperature adjusting valve 560. The horizontal axis of the graph is the rotation angle of the valve body 561 in the temperature adjusting valve 560. The vertical axis of the graph is the ratio of opening, that is, the opening ratio of the temperature adjusting valve 560. A line G10 illustrates a change in the opening ratio of a flow channel from the temperature adjusting valve 560 toward the heater core 550. A line G20 illustrates a change in the opening ratio of a flow channel from the temperature adjusting valve 560 toward the oil cooler 590. A line G30 illustrates a change in the opening ratio of a flow channel from the temperature adjusting valve 560 toward the radiator 530.

The temperature adjusting valve 560, which is an electric valve, rotates the valve body 561 on the basis of a control signal from the control device 640. When the rotation angle of the valve body 561 is in the range from d0 to d10, all of the flow channel toward the heater core 550, the channel toward the oil cooler 590, and the channel toward the radiator 530 are fully closed.

When the rotation angle of the valve body 561 is increased over d10, only the opening ratio of the flow channel toward the heater core 550 is increased in accordance with the change in the rotation angle. When the rotation angle of the valve body 561 is equal to d20, only the flow channel toward the heater core 550 is wide opened. All of the flow channel toward the oil cooler 590 and the channel toward the radiator 530 remain fully closed.

Then, when the rotation angle of the valve body 561 is increased over d30, the opening ratio of the flow channel toward the oil cooler 590 is increased in accordance with the change in the rotation angle. At this point, the flow channel toward the heater core 550 remains wide opened. The flow channel toward the radiator 530 remains fully closed. When the rotation angle of the valve body 561 is equal to d40, both the flow channel toward the heater core 550 and the channel toward the oil cooler 590 are wide opened. The flow channel toward the radiator 530 remains fully closed.

Then, when the rotation angle of the valve body 561 is increased over d50, the opening ratio of the flow channel toward the radiator 530 is increased in accordance with the change in the rotation angle. At this point, all of the flow channel toward the heater core 550 and the channel toward the oil cooler 590 remain wide opened. When the rotation angle of the valve body 561 is equal to d60, all of the flow channel toward the heater core 550, the channel toward the oil cooler 590, and the channel toward the radiator 530 are wide opened.

A state where the rotation angle of the valve body 561 falls between d10 and d30 corresponds to the first state described above. A state where the rotation angle of the valve body 561 falls between d30 and d50 corresponds to the second state described above. A state where the rotation angle of the valve body 561 falls between d50 and d60 corresponds to the third state described above.

While the opening ratio of the temperature adjusting valve 560, which is an electric valve, may be changed by rotational motion of the valve body 561 as in the present embodiment, the opening ratio may be changed by translational motion of the valve body 561. That is, a configuration that may be used is such that the opening ratio of the temperature adjusting valve 560 is changed by operating the valve body 561 and changing the position of the valve body 561.

The rotation angle of the valve body 561 illustrated on the horizontal axis of FIG. 55 will be referred to as "valve body position" as well in the description provided below. The valve body position can be said to indicate the amount of operation of the valve body 561 in a case where the valve body 561 is operated to change the opening ratio of the temperature adjusting valve 560. The valve body position includes the position of the valve body 561 in a case where the valve body 561 has a translational motion in addition to the rotation angle in a case where the valve body 561 has a rotational motion as in the present embodiment.

Figure 56:
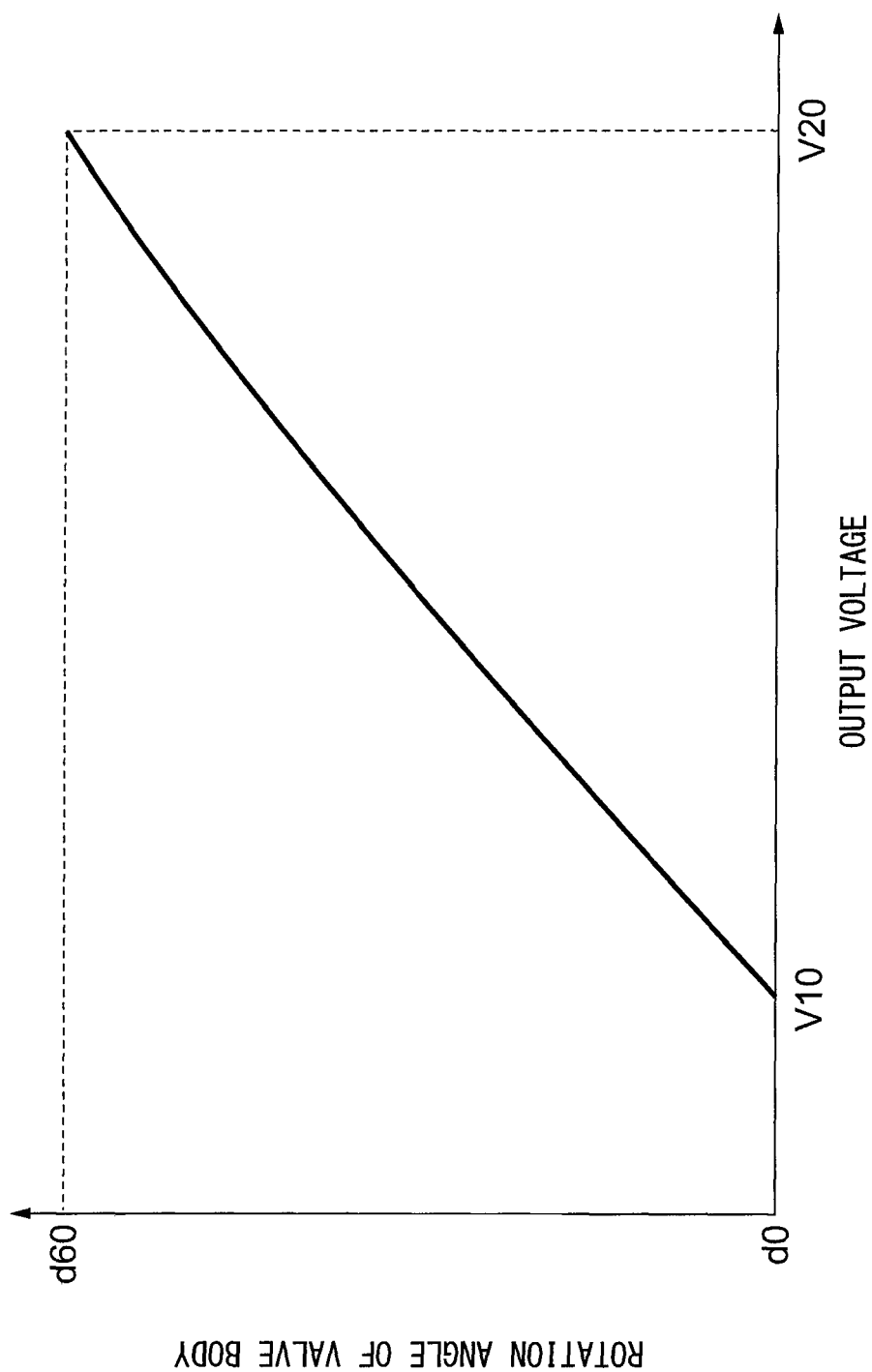
FIG. 56 is a diagram illustrating a relationship between an output voltage that is output from the temperature adjusting valve and the position of a valve body of the temperature adjusting valve.

The temperature adjusting valve 560 has a function of outputting a voltage that corresponds to the rotation angle of the valve body 561 at the current point in time, that is, the valve body position. FIG. 56 illustrates a graph illustrating a relationship between the output voltage from the temperature adjusting valve 560 and the valve body position. The output voltage is approximately proportional to the valve body position in the present embodiment. The output voltage is equal to a value V10 when the valve body position is equal to d0 (refer to FIG. 55). The output voltage is equal to a value V20 that is greater than the value V10 when the valve body position is equal to d60 (refer to FIG. 55).

The output voltage from the temperature adjusting valve 560 is input into both the control device 640 and the diagnostic device 100. The control device 640 performs a control that causes the valve body position to match a target position while recognizing the valve body position at the current point in time using the output voltage.

FIG. 54 is referred to again for description. The voltage sensor 660 is a sensor that measures the voltage across terminals of a storage battery BT with which the vehicle 1 is equipped (hereinafter, referred to as "storage battery voltage" as well). The storage battery BT supplies power to power consuming devices with which the vehicle 1 is equipped. The power consuming devices include the temperature adjusting valve 560. A signal that is based on the measured storage battery voltage is input into the diagnostic device 100.

The outside air temperature sensor 80 is a sensor that measures the temperature outside of the vehicle 1, that is, the outside air temperature. A signal that is based on the measured outside air temperature is input into the diagnostic device 100.

The informing device 70 is a device that informs a driver of a diagnosis result of the vehicle 1 performed by the diagnostic device 100. When the diagnostic device 100 diagnoses any malfunction occurring in the vehicle 1, the informing device 70 informs the driver by turning on a warning lamp provided on a front panel.

The control device 640 is an ECU that controls operation of the entirety of the vehicle 1. The control device 640 is configured as a computer system that includes a CPU, a ROM, a RAM, and the like. The control device 640 controls operation of the water pump 520 and operation of the temperature adjusting valve 560 and the like as described above.

The control device 640 performs a control that causes the temperature of the coolant measured by the water temperature sensor 570 to match a target temperature, when the vehicle 1 is operated. For example, when the temperature of the coolant is higher than the target temperature, the target position of the valve body 561 is changed to a side on which the valve body 561 is opened (that is, the right side in FIG. 55) so that the flow rate of the coolant supplied to the radiator 530 is increased.

When the temperature of the coolant is lower than the target temperature, the target position of the valve body 561 is changed to a side on which the valve body 561 is closed (that is, to the left side in FIG. 55) so that the flow rate of the coolant supplied to the radiator 530 is decreased.

The control device 640 switches the valve body 561 to the first state or the second state immediately after the internal combustion engine 20 is started, thereby closing the flow channel from the temperature adjusting valve 560 toward the radiator 530. Accordingly, a warm-up of the internal combustion engine 20 is promoted.

Hereinafter, the difference between the actual valve body position and the target position will be referred to as "position deviation" as well. The difference between the actual temperature of the coolant and the target temperature will be referred to as "water temperature deviation" as well. The control device 640 performs a control that causes both the position deviation and the water temperature deviation to approach zero.

The control device 640 changes the target temperature according to the operating status of the vehicle 1. For example, when traveling load of the vehicle 1 is great, the target temperature is changed to be decreased in order to prevent occurrence of knocking.

As such, the target temperature is not constant at all times but is changed according to the operating status of the vehicle 1. In other words, the temperature adjusting valve 560 which is an electric valve is used so that the temperature of the coolant can be appropriately changed according to the operating status.

The diagnostic device 100 is configured as a computer system that includes a CPU, a ROM, a RAM, and the like in the same manner as the control device 640 described above. The diagnostic device 100 may be configured as a separate device from the control device 640 which controls the entirety of the vehicle 1 or may be configured as a device integrated with the control device 640. That is, a part or the entirety of the function of the diagnostic device 100 described below may be included in the control device 640.

The diagnostic device 100 includes a water temperature obtaining unit 110 and a malfunction determination unit 120 as functional control blocks.

The water temperature obtaining unit 110 is a part that calculates and obtains the temperature of the coolant discharged from the internal combustion engine 20 on the basis of a signal received from the water temperature sensor 570.

The malfunction determination unit 120 is a part that determines whether or not a malfunction occurs in the temperature adjusting valve 560. The valve body 561 may not be moved while the temperature adjusting valve 560 remains opened when, for example, a state where the temperature of the coolant is low continues for a long amount of time. In addition, the coolant may leak on the radiator side of the valve body 561 due to, for example, a crack generated in the valve body 561. That is, the coolant is estimated to be continuously cooled by passing through the radiator 530 because the flow channel in which the coolant flows toward the radiator 530 is not completely closed.

The malfunction determination unit 120 determines whether or not a malfunction occurs in the temperature adjusting valve 560 on the basis of both the position deviation and the water temperature deviation. Hereinafter, a specific determination method will be described.

Figure 57:
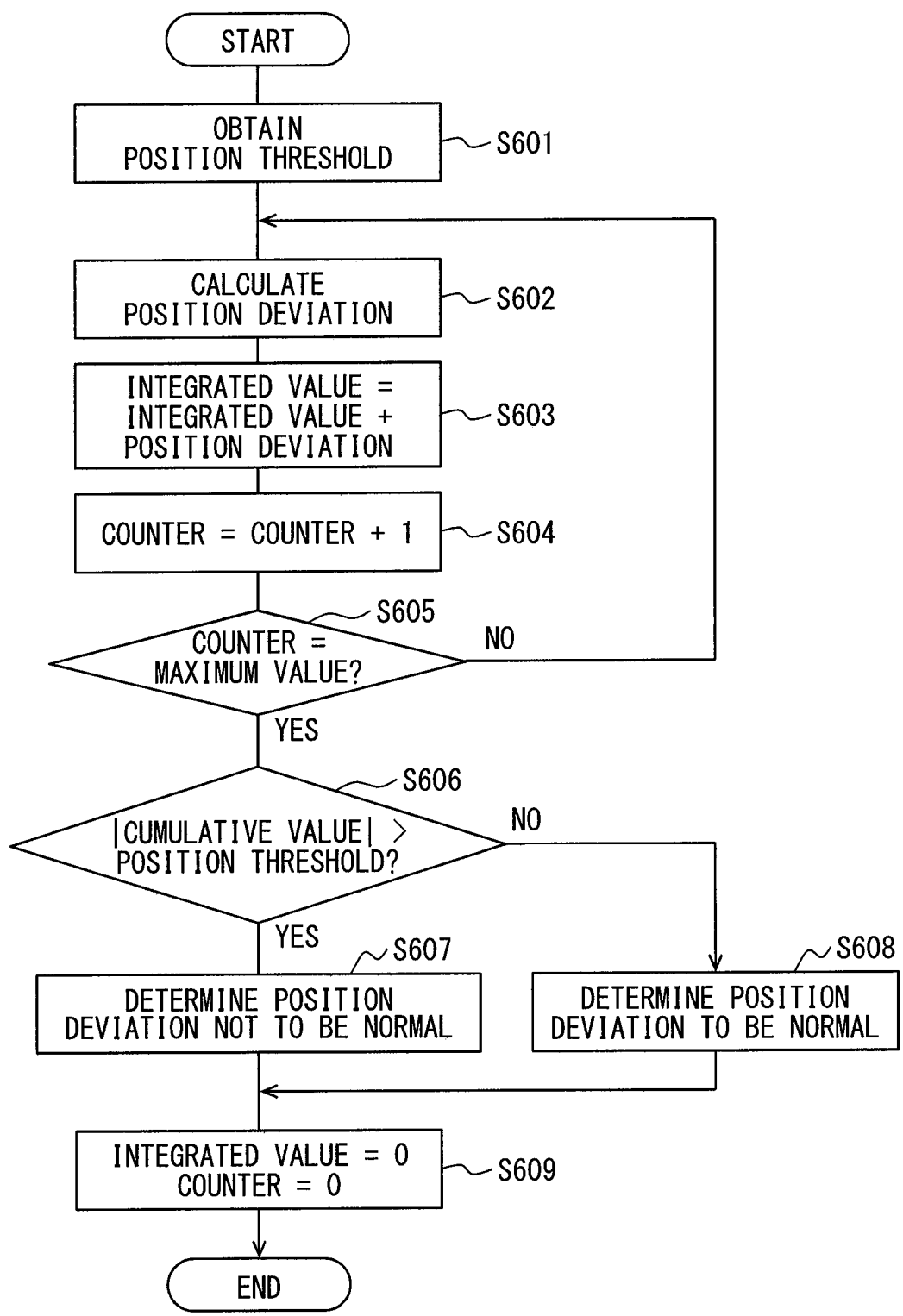
FIG. 57 is a flowchart illustrating the flow of a process performed in the diagnostic device.

A process that is performed by the malfunction determination unit 120 in order to determine whether or not the position deviation is normal will be described with reference to FIG. 57. A series of processes illustrated in FIG. 57 is repeated as a subroutine called from the process of FIG. 62 described later each time a predetermined cycle elapses.

A position threshold is obtained in the initial S601. The position threshold is a threshold that is used to determine whether or not the position deviation is normal. As described later, the position deviation is determined not to be normal in a case where the absolute value of the cumulative value of the position deviation exceeds the position threshold.

Operation of the valve body 561 in the temperature adjusting valve 560 tends to be slowed down when the storage battery voltage is small, that is, when a voltage supplied to the temperature adjusting valve 560 is small. As a result, the position deviation is temporarily increased even though no malfunction occurs in the temperature adjusting valve 560, and the position deviation may be determined not to be normal.

Figure 58:
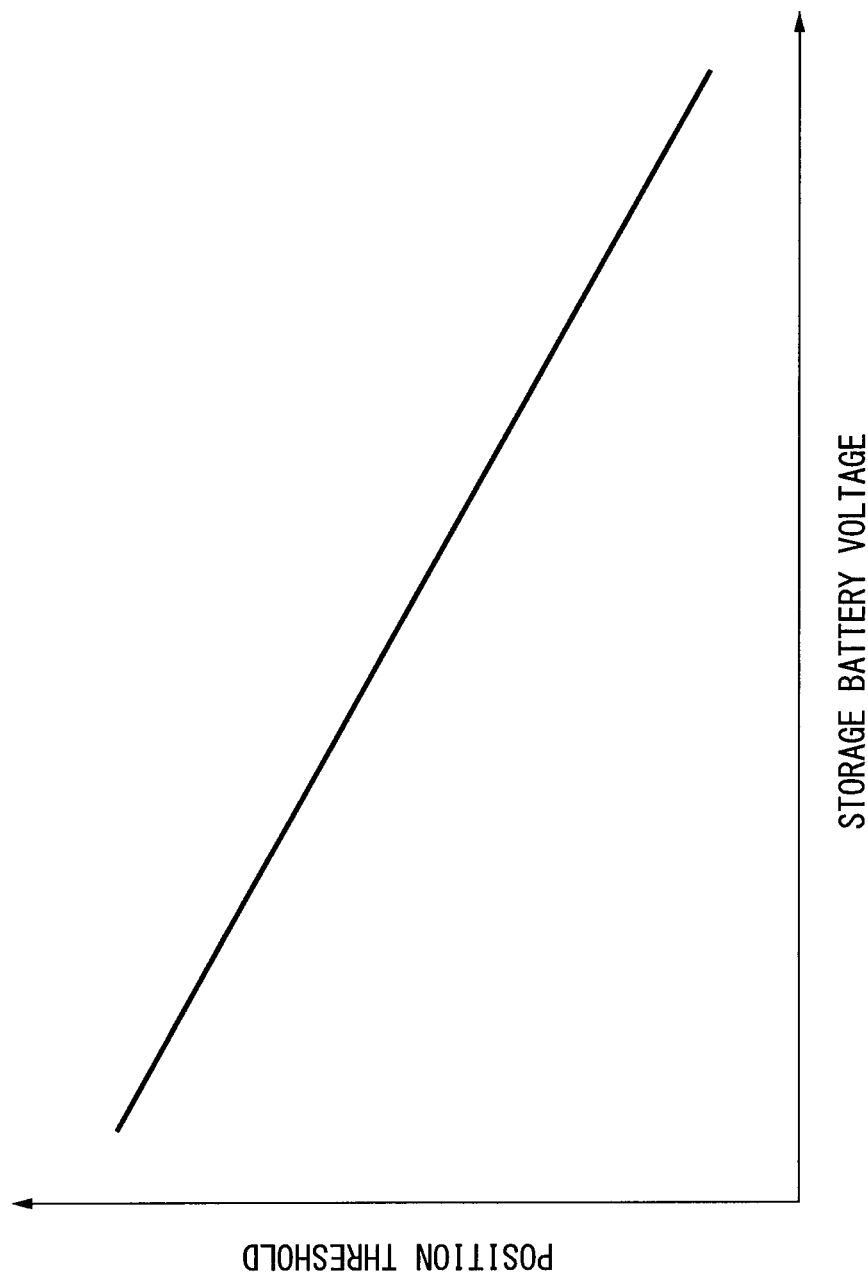
FIG. 58 is a diagram illustrating a relationship between the voltage of a storage battery and a position threshold that is set.

Therefore, the position threshold is appropriately changed according to the storage battery voltage in the present embodiment. FIG. 58 illustrates a relationship between the storage battery voltage and the position threshold that is set according to the storage battery voltage. As illustrated in FIG. 58, the position threshold is changed to a smaller value as the storage battery voltage is increased. In other words, the position threshold is changed to a greater value as the storage battery voltage is decreased.

Thus, determining the position deviation not to be normal even if the storage battery voltage is decreased and operation of the valve body 561 is slowed down is prevented. The relationship between the storage battery voltage and the position threshold illustrated in FIG. 58 is created in advance as a map and is stored in the ROM of the diagnostic device 100. The malfunction determination unit 120 obtains the position threshold corresponding to the storage battery voltage by referencing the map.

FIG. 57 is referred to again for description. The current position deviation is calculated in S602 subsequent to S601. Specifically, the valve body position is obtained on the basis of the output voltage from the temperature adjusting valve 560, and the current position deviation is calculated by subtracting the target position from the valve body position.

The position deviation calculated in S602 is added to the cumulative value thereof in S603 subsequent to S602. The cumulative value is a variable having an initial value of zero and is a variable to which the position deviation is added each time the process of S603 is performed.

A counter is incremented by one in S604 subsequent to S603. The counter is a variable having an initial value of zero and is a variable that is incremented by one each time the process of S604 is performed. The counter is a variable counting the number of times that the processes of S602 and S603 are performed so that the processes of S602 and S603 are repeated only a predetermined number of times.

A determination of whether or not the value of the counter reaches a maximum value is performed in S605 subsequent to S604. The maximum value referred hereto is the "predetermined number of times". A transition is made to S606 if the value of the counter reaches the maximum value. S602 and the subsequent processes are performed again if the value of the counter does not reach the maximum value yet.

A determination of whether or not the absolute value of the cumulative value calculated in S603 exceeds the position threshold obtained in S601 is performed in S606. A transition is made to S607 if the absolute value of the cumulative value exceeds the position threshold. A transition to S607 means that a state where the valve body position is shifted from the target position occurs at high frequency. Thus, the position deviation is determined not to be normal in S607.

A transition is made to S608 if the absolute value of the cumulative value does not exceed the position threshold in S606. A transition to S608 means that a state where the valve body position is shifted from the target position occurs at low frequency and that the valve body 561 is approximately normally operated. Thus, the position deviation is determined to be normal in S608.

The cumulative value and the counter are set to zero in S609 subsequent to S607 and S608. Then, the series of processes illustrated in FIG. 57 is ended.

An example of changes in the valve body position, the position deviation, and the like when a determination of the position deviation is performed by the malfunction determination unit 120 as described heretofore will be described with reference to FIG. 59. FIG. 59(A) illustrates a change in the actual valve body position. FIG. 59(B) illustrates a change in the position deviation. In this example, a control that causes the valve body position to match a constant target position SP is performed. However, a failure occurs in the temperature adjusting valve 560 at a time point t10, and then, the valve body position is separated from the target position SP. That is, the absolute value of the position deviation is great after the time point t10.

FIG. 59(C) illustrates a change in the cumulative value calculated in S606 of FIG. 57. The absolute value of the cumulative value is smaller than a position threshold PT before the time point t10 at which a failure occurs in the temperature adjusting valve 560. However, the absolute value of the cumulative value is gradually increased after the time point t10 and exceeds the position threshold PT at a time point t150.

FIG. 59(D) illustrates a change in the counter calculated in S604 of FIG. 57. In the example of FIG. 59(D), the value of the counter reaches a maximum value UC and, at the same time, is reset to zero at a time point t100 and a time point t200. A determination of whether or not the absolute value of the cumulative value exceeds the position threshold (that is, the process of S606) is performed at a timing when the value of the counter reaches the maximum value.

The absolute value of the cumulative value does not exceed the position threshold PT at the time point t100 since a failure occurs immediately after the time point t100. Thus, the position deviation is determined to be normal. Meanwhile, the absolute value of the cumulative value exceeds the position threshold PT at the time point t200 after the time point t150. Thus, the position deviation is determined not to be normal.

A determination of whether or not the position deviation is not normal may not be performed on the basis of the cumulative value of the position deviation as described above and may be performed on the basis of the instantaneous value of the position deviation. That is, a determination of whether or not the absolute value of the position deviation exceeds the position threshold may be performed in S606 of FIG. 57.

However, in a case of using such a manner, the position deviation may be erroneously determined not to be normal when the position deviation is only instantaneously increased, when noise occurs in the output voltage indicating the valve body position, or the like. Thus, it is desirable to perform a determination based on the cumulative value of the position deviation as in the present embodiment in order to stably determine whether or not the position deviation is not normal.

Figure 60:
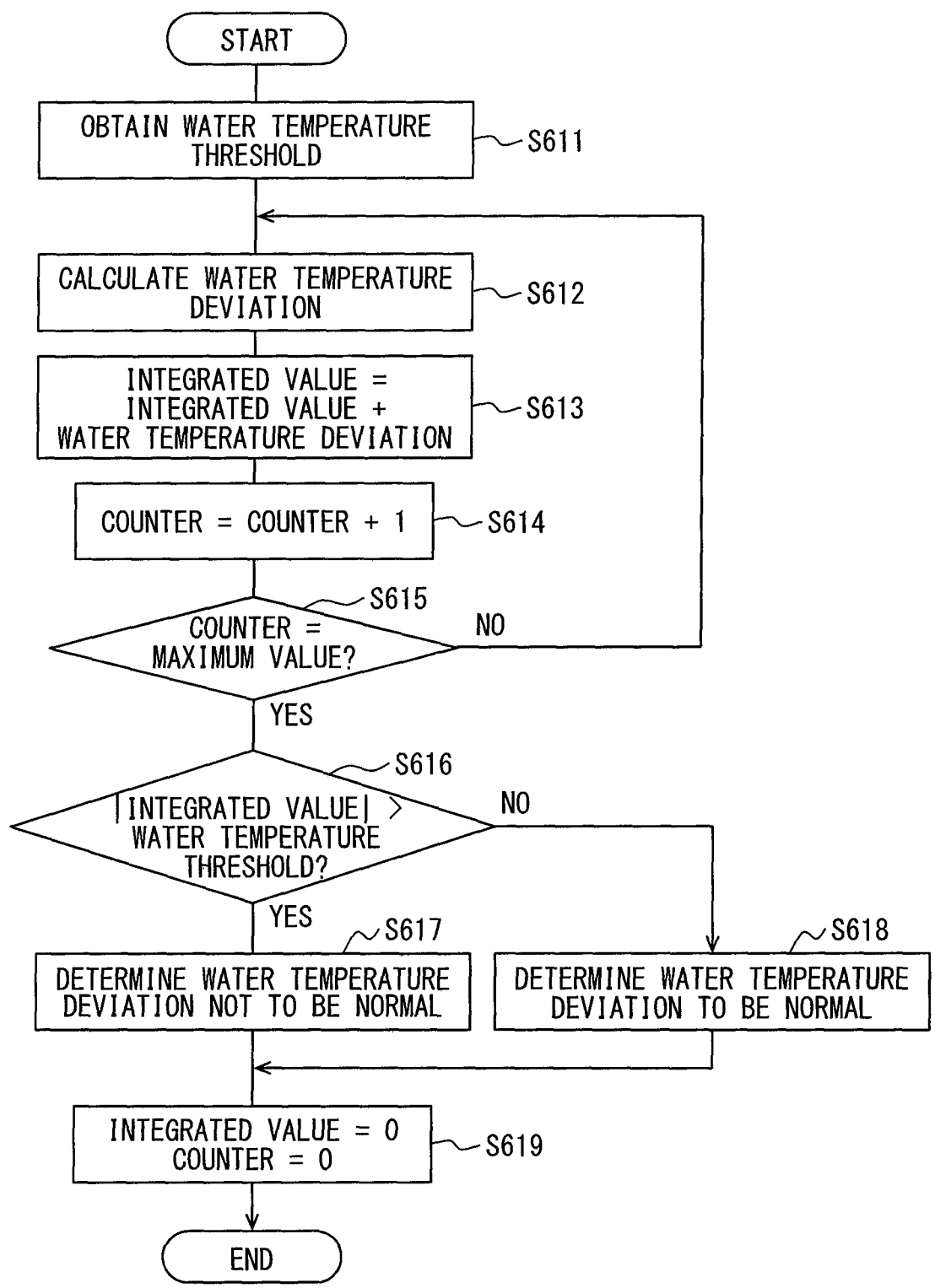
FIG. 60 is a flowchart illustrating the flow of a process performed in the diagnostic device.

Next, a process that is performed by the malfunction determination unit 120 in order to determine whether or not the water temperature deviation is normal will be described with reference to FIG. 60. A series of processes illustrated in FIG. 60 is repeated as a subroutine called from the process of FIG. 62 described later each time a predetermined cycle elapses.

A water temperature threshold is obtained in the initial S611. The water temperature threshold is a threshold that is used to determine whether or not the water temperature deviation is normal. As described later, the water temperature deviation is determined not to be normal in a case where the absolute value of the cumulative value of the water temperature deviation exceeds the water temperature threshold.

The coolant is likely to radiate heat in the radiator 530, the circulation flow channel 510, and the like when the outside air temperature is low. Thus, the temperature of the coolant tends to be comparatively unstable. As a result, the water temperature deviation is temporarily increased even though no malfunction occurs in the temperature adjusting valve 560, and the water temperature deviation may be determined not to be normal.

Figure 61:
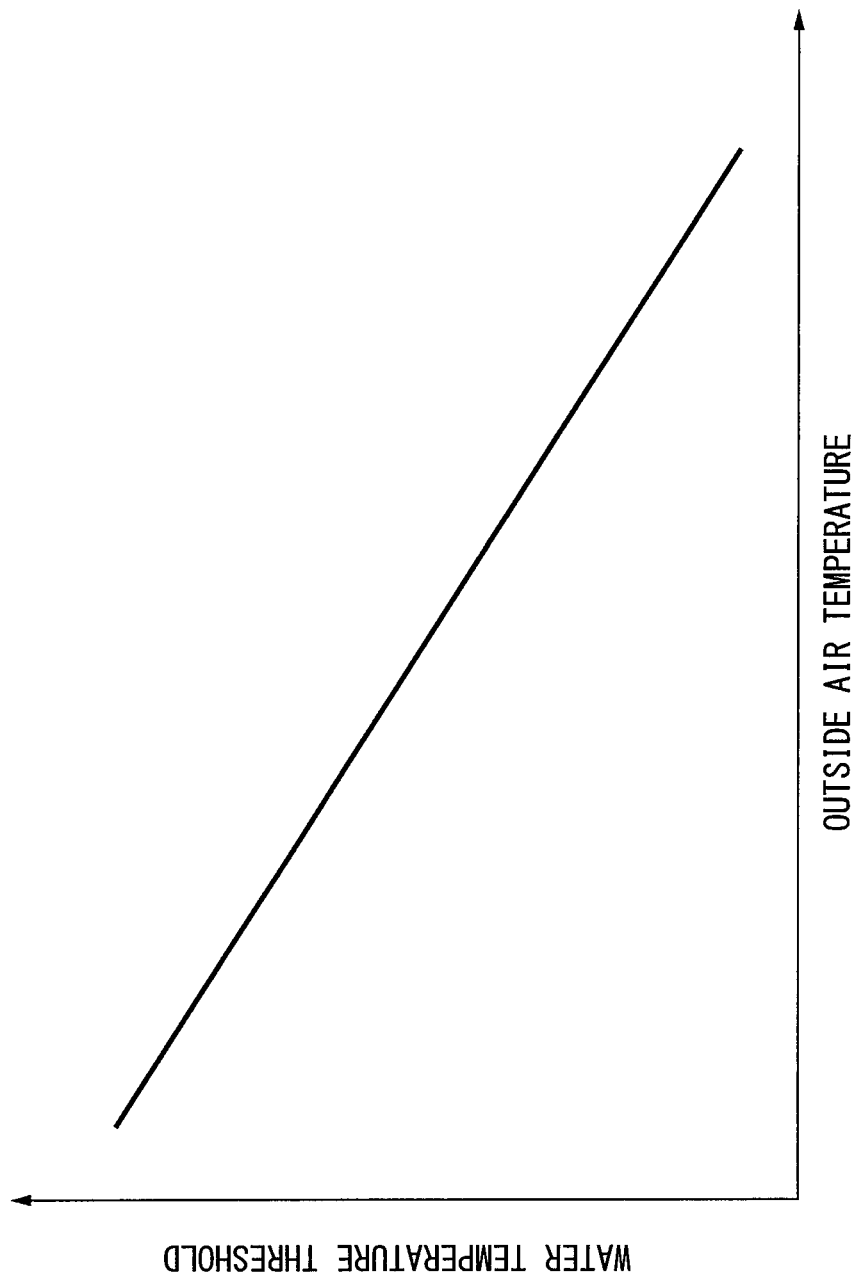
FIG. 61 is a diagram illustrating a relationship between the outside air temperature and a water temperature threshold that is set.

Therefore, the water temperature threshold is appropriately changed according to the outside air temperature measured by the outside air temperature sensor 80 in the present embodiment. FIG. 61 illustrates a relationship between the outside air temperature and the water temperature threshold that is set according to the outside air temperature. As illustrated in FIG. 61, the water temperature threshold is changed to a smaller value as the outside air temperature is increased. In other words, the water temperature threshold is changed to a greater value as the outside air temperature is decreased.

Thus, determining the water temperature deviation not to be normal even if the outside air temperature is decreased and the temperature of the coolant is unstable is prevented. The relationship between the outside air temperature and the water temperature threshold illustrated in FIG. 61 is created in advance as a map and is stored in the ROM of the diagnostic device 100. The malfunction determination unit 120 obtains the water temperature threshold corresponding to the outside air temperature by referencing the map.

FIG. 60 is referred to again for description. The current water temperature deviation is calculated in S612 subsequent to S611. Specifically, the temperature of the coolant is obtained on the basis of a signal from the water temperature sensor 570, and the current water temperature deviation is calculated by subtracting the target temperature from the temperature of the coolant.

The water temperature deviation calculated in S612 is added to the cumulative value thereof in S613 subsequent to S612. The cumulative value is a variable having an initial value of zero and is a variable to which the water temperature deviation is added each time the process of S613 is performed.

A counter is incremented by one in S614 subsequent to S613. The counter is a variable having an initial value of zero and is a variable that is incremented by one each time the process of S614 is performed. The counter is a variable counting the number of times that the processes of S612 and S613 are performed so that the processes of S612 and S613 are repeated only a predetermined number of times.

A determination of whether or not the value of the counter reaches a maximum value is performed in S615 subsequent to S614. The maximum value referred hereto is the "predetermined number of times". A transition is made to S616 if the value of the counter reaches the maximum value. S612 and the subsequent processes are performed again if the value of the counter does not reach the maximum value yet.

A determination of whether or not the absolute value of the cumulative value calculated in S613 exceeds the water temperature threshold obtained in S611 is performed in S616. A transition is made to S617 if the absolute value of the cumulative value exceeds the water temperature threshold. A transition to S617 means that a state where the temperature of the coolant is shifted from the target temperature occurs at high frequency. Thus, the water temperature deviation is determined not to be normal in S617.

A transition is made to S618 if the absolute value of the cumulative value does not exceed the water temperature threshold in S616. A transition to S618 means that a state where the temperature of the coolant is shifted from the target temperature occurs at low frequency and that the valve body 561 is approximately normally operated. Thus, the water temperature deviation is determined to be normal in S618.

The cumulative value and the counter are set to zero in S619 subsequent to S617 and S618. Then, the series of processes illustrated in FIG. 60 is ended.

A determination of whether or not the water temperature deviation is not normal may not be performed on the basis of the cumulative value of the water temperature deviation as described above and may be performed on the basis of the instantaneous value of the water temperature deviation. That is, a determination of whether or not the absolute value of the water temperature deviation exceeds the water temperature threshold may be performed in S616 of FIG. 60.

However, in a case of using such a manner, the water temperature deviation may be erroneously determined not to be normal when the water temperature deviation is only instantaneously increased, when noise occurs in the signal from the water temperature sensor 570, or the like. Thus, it is desirable to perform a determination based on the cumulative value of the water temperature deviation as in the present embodiment in order to stably determine whether or not the water temperature deviation is not normal.

Figure 59:
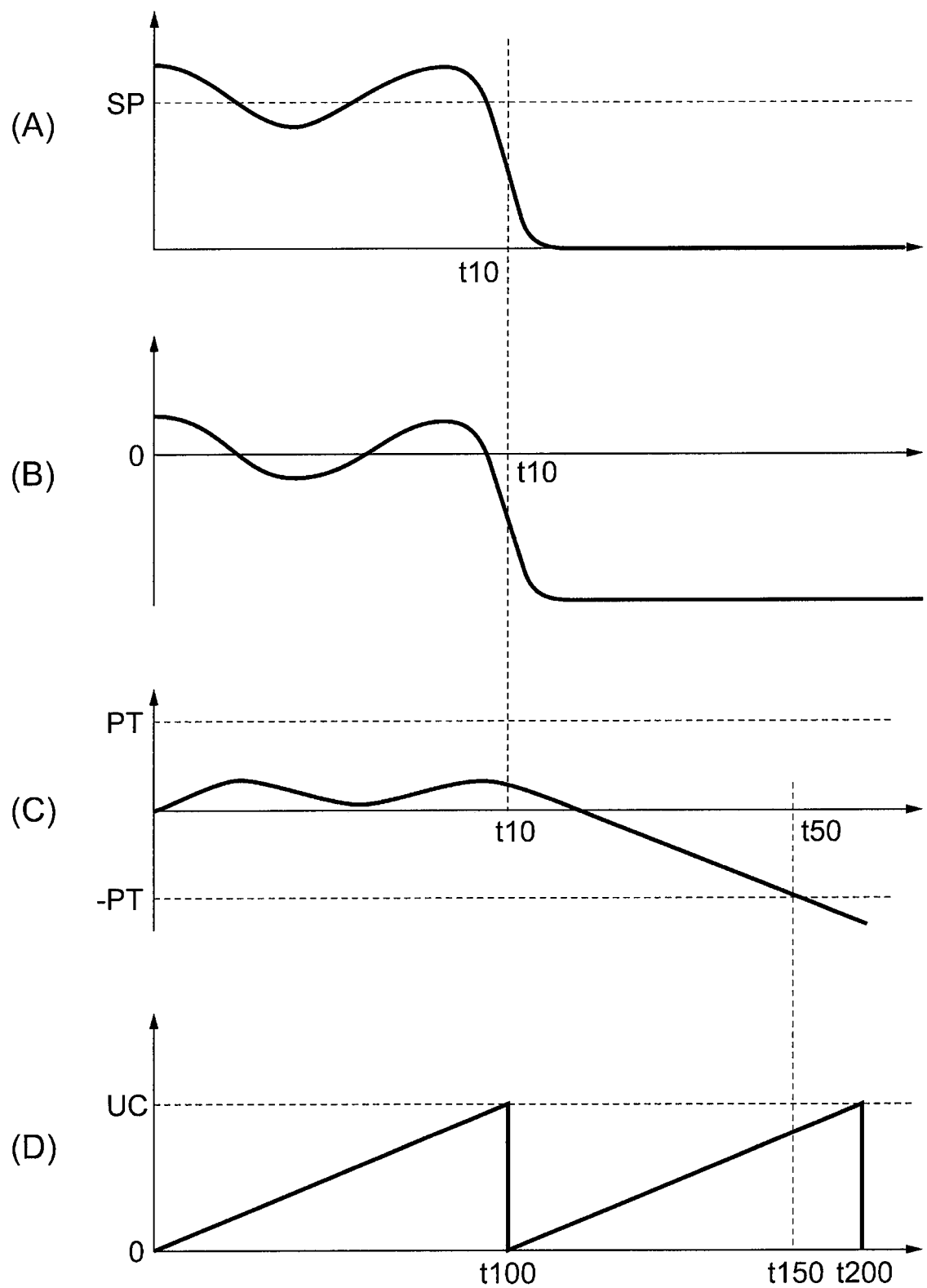
FIG. 59 is a diagram illustrating a change in the position of the valve body and the like when a malfunction of the temperature adjusting valve is determined.

Changes in the temperature of the coolant, the water temperature deviation, the cumulative value of the water temperature deviation, and the like when a determination of the water temperature deviation is performed by the malfunction determination unit 120 as described heretofore are the same as the changes in the position deviation and the like illustrated in FIG. 59. Thus, illustrations and specific descriptions thereof will not be provided.

Figure 62:
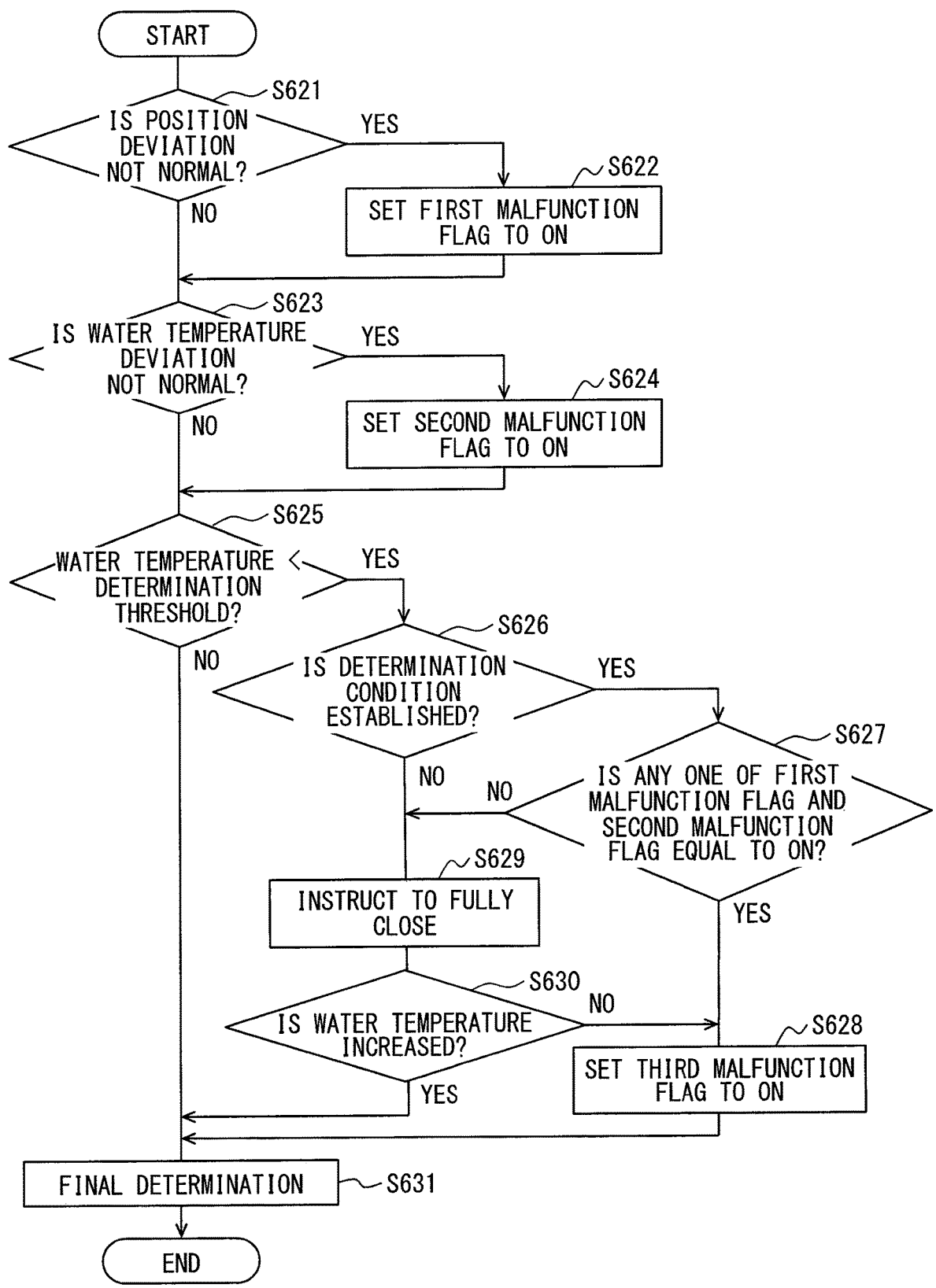
FIG. 62 is a flowchart illustrating the flow of a process performed in the diagnostic device.

A process that is performed by the malfunction determination unit 120 of the diagnostic device 100 in order to determine whether or not a malfunction occurs in the temperature adjusting valve 560 will be described with reference to FIG. 62. A series of processes illustrated in FIG. 62 is repeated each time a predetermined cycle elapses.

A determination of whether or not the position deviation is not normal is performed in the initial S621 by performing the process of FIG. 57 described above. A transition is made to S623 in a case where the position deviation is normal. A transition is made to S622 in a case where the position deviation is not normal. A first malfunction flag is set to ON in S622. The first malfunction flag is a variable that is stored in the RAM of the diagnostic device 100 and is set to the value of either ON or OFF. The initial value of the first malfunction flag is equal to OFF before the process of FIG. 62 is started. A transition is made to S623 when the first malfunction flag is set to ON in S622.

A determination of whether or not the water temperature deviation is not normal is performed in S623 by performing the process of FIG. 60 described above. A transition is made to S625 in a case where the water temperature deviation is normal. A transition is made to S624 in a case where the water temperature deviation is not normal. A second malfunction flag is set to ON in S624. The second malfunction flag is a variable that is stored in the RAM of the diagnostic device 100 and is set to the value of either ON or OFF. The initial value of the second malfunction flag is equal to OFF before the process of FIG. 62 is started. A transition is made to S625 when the second malfunction flag is set to ON in S624.

A determination of whether or not the temperature of the coolant obtained by the water temperature obtaining unit 110 falls below a predetermined determination threshold is performed in S625. The determination threshold is a threshold that is set in advance to a value below which the temperature of the coolant is not supposed to reside if the temperature adjusting valve 560 is normally operated after completion of the warm-up. A transition is made to S631 if the temperature of the coolant is greater than or equal to the determination threshold.

A transition is made to S626 if the temperature of the coolant falls below the determination threshold in S625. A transition to S626 means that the temperature of the coolant is excessively decreased by some cause. Thus, a malfunction is estimated to occur in the temperature adjusting valve 560. A process that determines the state of the temperature adjusting valve 560 in detail is performed from S626.

A determination of whether or not a determination condition is established is performed in S626. The determination condition is a condition that indicates whether or not it is appropriate to determine a malfunction of the temperature adjusting valve 560 on the basis of the temperature of the coolant.

When, for example, the heat generation amount of the internal combustion engine 20 is small, the temperature of the coolant may reside below the determination threshold even if the temperature adjusting valve 560 is normally operated. That is, even if the temperature of the coolant is decreased, it is not appropriate to immediately determine a malfunction to occur in the temperature adjusting valve 560. Thus, the determination condition is not established in such a case.

Meanwhile, when the heat generation amount of the internal combustion engine 20 is great, the temperature of the coolant may reside below the determination threshold due to a cause other than a malfunction of the temperature adjusting valve 560. Thus, the determination condition is established in such a case.

Figure 63:
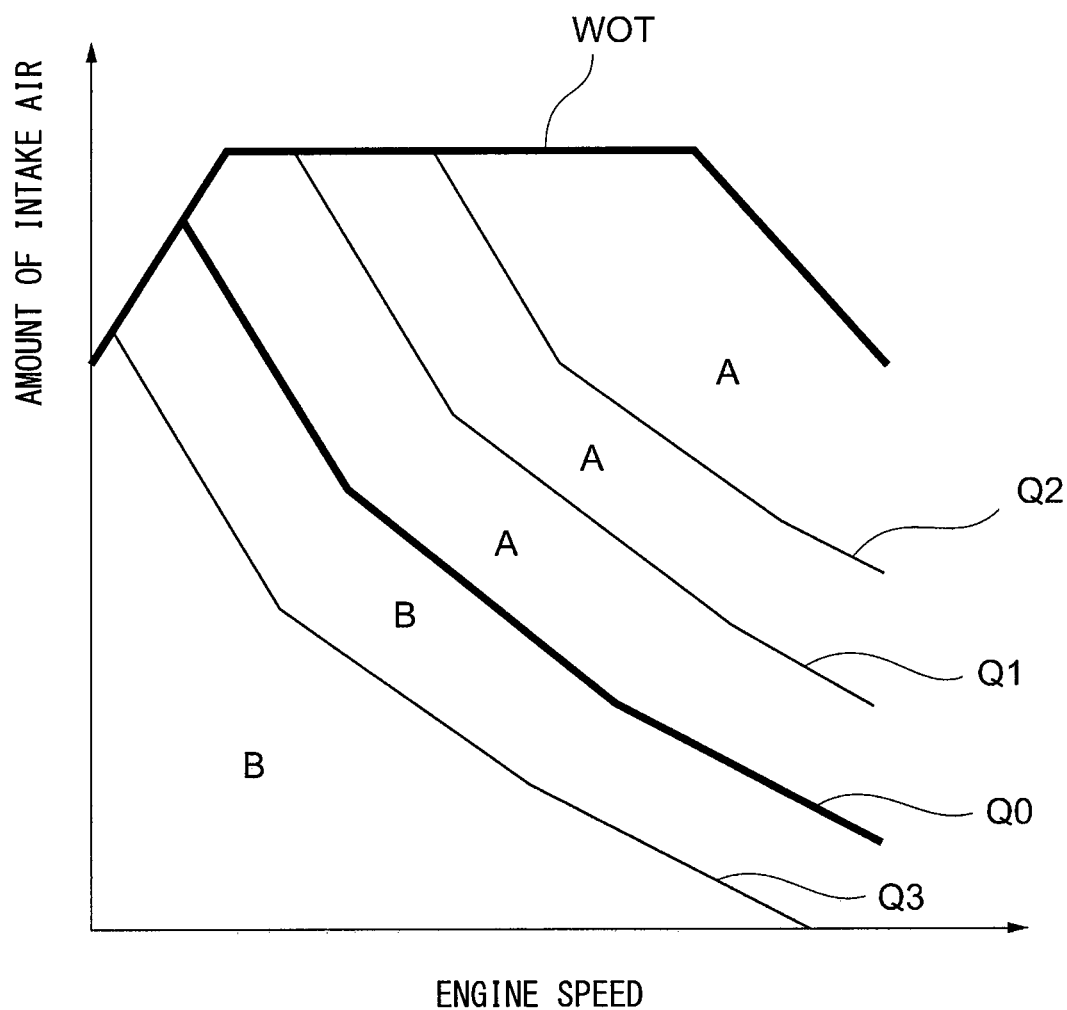
FIG. 63 is a diagram illustrating a relationship between the operational state of an internal combustion engine and a heat receiving amount of a coolant.

The determination condition in the present embodiment will be described with reference to FIG. 63. FIG. 63 illustrates a map illustrating a relationship between the operational state of the internal combustion engine 20 and the heat receiving amount of the coolant. The heat receiving amount of the coolant is the amount of heat added per unit time to the coolant circulating in the circulation flow channel 510. The engine speed is illustrated on the horizontal axis of the map, and the amount of air taken into the internal combustion engine 20 is illustrated on the vertical axis of the map. The heat receiving amount in each operational state that is determined by the engine speed on the horizontal axis and the amount of air on the vertical axis is drawn by contour lines in FIG. 63. The map of FIG. 63 is created in advance and is stored in the ROM included in the diagnostic device 100.

A boldfaced line WOT illustrates the upper limit value of the amount of air taken into the internal combustion engine 20 at each engine speed, that is, the flow rate of air taken into the internal combustion engine 20 in a state where a throttle valve is wide opened.

The heat receiving amount of the coolant approximately matches the amount of heat radiated per unit time from the coolant to the outside (hereinafter, referred to as "heat radiating amount" as well) in an operational state such as illustrated along a line Q0 of FIG. 63. The heat receiving amount of the coolant is greater than the heat radiating amount in an operational state such as illustrated along a line Q1 of FIG. 63. Thus, the temperature of the coolant tends to be increased in a case where the coolant does not pass through the radiator 530.

The heat receiving amount of the coolant is further increased in an operational state such as illustrated along a line Q2 of FIG. 63. Thus, the temperature of the coolant tends to be further increased in a case where the coolant does not pass through the radiator 530.

The heat receiving amount of the coolant is smaller than the heat radiating amount in an operational state such as illustrated along a line Q3 of FIG. 63. Thus, the temperature of the coolant may tend to be decreased even in a case where the coolant does not pass through the radiator 530.

As such, the heat receiving amount of the coolant has a greater value as the operation region of the internal combustion engine 20 moves upward and rightward in the map illustrated in FIG. 63. Conversely, the heat receiving amount of the coolant has a smaller value as the operation region of the internal combustion engine 20 moves downward and leftward. A torque generated by the internal combustion engine 20 may be illustrated on the vertical axis of the map. Even in that case, approximately the same map as FIG. 63 is drawn.

Hereinafter, an operation region on the upper side of the line Q0, that is, an operation region designated by a reference sign "A" in FIG. 63, will be referred to as "A region". An operation region on the lower side of the line Q0, that is, an operation region designated by a reference sign "B" in FIG. 63, will be referred to as "B region". The "A" region is an operation region in which the heat receiving amount of the coolant is greater than the heat radiating amount. The "B" region is an operation region in which the heat receiving amount of the coolant is smaller than the heat radiating amount.

As described above, a malfunction may occur in the temperature adjusting valve 560 when the temperature of the coolant is decreased. However, even when the temperature adjusting valve 560 is normal, the temperature of the coolant is unlikely to be increased if the internal combustion engine 20 is operated in the "B" region.

That is, when the frequency of operation in the "B" region is high, the cause of the temperature of the coolant residing below the determination threshold is not limited to a malfunction occurring in the temperature adjusting valve 560. Therefore, the determination condition is not established in S626 of FIG. 62 in the present embodiment when the frequency of operation in the "B" region is high. Meanwhile, the determination condition is established when the frequency of operation in the "A" region is high.

Figure 64:
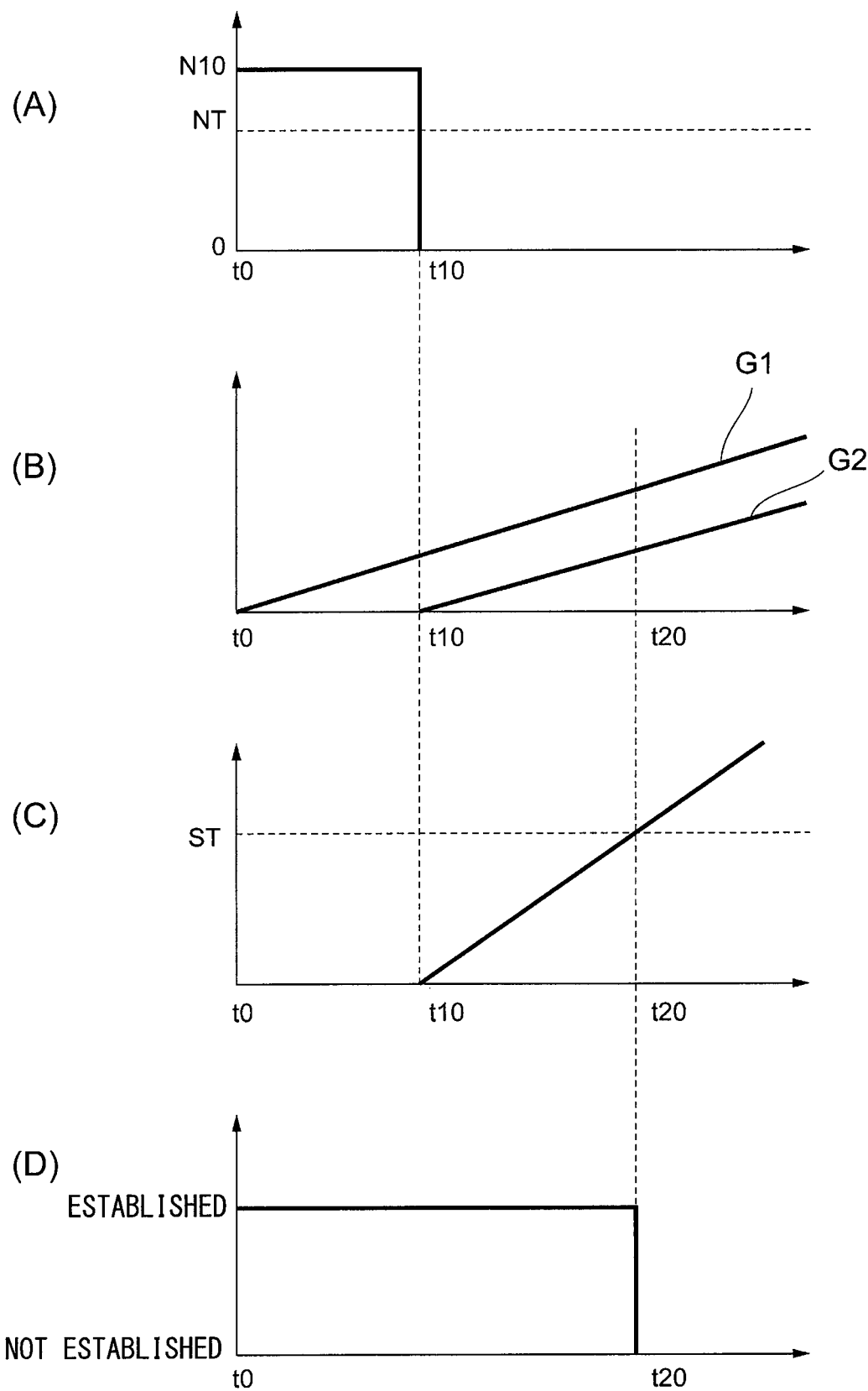
FIG. 64 is a diagram illustrating a determination condition.

An example of a case where the determination condition is not established will be described with reference to FIG. 64. FIG. 64(A) illustrates a change in the torque generated by the internal combustion engine 20. A torque of a value N10 higher than a threshold NT is generated during a period from a time point t0 until the time point t10 in the example of FIG. 64A. At this point, the operation region of the internal combustion engine 20 is the "A" region in which the heat receiving amount is great.

The internal combustion engine 20 is stopped after the time point t10, and the vehicle 1 travels using only the driving power of the motor M. The torque of the internal combustion engine 20 is decreased below the threshold NT to zero. Then, the operation region of the internal combustion engine 20 is the "B" region in which the heat receiving amount is small.

FIG. 64(B) illustrates a line G1 illustrating the cumulative value of the amount of time of operation after the time point t0 and a line G2 illustrating the cumulative value of the amount of time of operation in the "B" region. FIG. 64(C) illustrates a change in the ratio of the cumulative value of the amount of time of operation in the "B" region to the cumulative value of the amount of time of operation. That is, a change in the ratio of the value illustrated by the line G2 to the value illustrated by the line G1 is illustrated. The ratio is gradually increased by operation of the engine 20 in the "B" region after the time point t10.

The malfunction determination unit 120 regards the determination condition as not established when the ratio of operation in the "B" region exceeds a predetermined threshold ST. FIG. 64(D) is a graph illustrating how a state where the determination condition is established is switched to a state where the determination condition is not established. The ratio of the "B" region exceeds the threshold ST at a time point t20 in the example of FIG. 64, and the determination condition is established after the time point t20. The threshold ST is set to 50% in the present embodiment.

Such cumulation of the amount of time of operation in the "B" region and calculation of the ratio of the cumulative value described heretofore are continuously performed in the diagnostic device 100 independently of the measured value of the temperature of the coolant.

While the line Q0 indicating a boundary between the "A" region and the "B" region (refer to FIG. 63) is described heretofore as being fixed, a manner that may be used is such that the boundary is changed in a real-time manner on the basis of an estimated value of the heat radiating amount at the current point in time.

The heat radiating amount at the current point in time can be estimated on the basis of, for example, the temperature of the coolant, the outside air temperature, and the engine speed of the internal combustion engine 20. The heat receiving amount obtained from the map of FIG. 63 is compared with the estimated heat radiating amount. When the heat receiving amount is greater, it can be determined that the engine 20 is currently operated in the "A" region. Conversely, when the heat radiating amount is greater, it can be determined that the engine 20 is currently operated in the "B" region.

FIG. 62 is referred to again for description. A transition is made to S627 in a case where the determination condition is established in S626. A determination of whether or not both the first malfunction flag and the second malfunction flag are equal to ON is performed in S627. A transition is made to S628 if both the first malfunction flag and the second malfunction flag are equal to ON. A third malfunction flag is set to ON in S628. The third malfunction flag is a variable that is stored in the RAM of the diagnostic device 100 and is set to the value of either ON or OFF. The initial value of the third malfunction flag is equal to OFF before the process of FIG. 62 is started. A transition is made to S631 when the third malfunction flag is set to ON in S628.

A transition is made to S629 in a case where both the first malfunction flag and the second malfunction flag are equal to OFF in S627. A transition is made to S629 in a case where the determination condition is not established in S626.

The temperature adjusting valve 560 is controlled in S629 in such a manner that the flow channel in which the coolant flows from the temperature adjusting valve 560 toward the radiator 530 is fully closed. Specifically, a signal is transmitted from the diagnostic device 100 toward the control device 640. The control device 640 that receives the signal transmits a control signal to the temperature adjusting valve 560 to switch the temperature adjusting valve 560 to the first state or the second state.

At this point, the coolant is not supplied to the radiator 530 if the temperature adjusting valve 560 is normal. Since the coolant is not cooled in the radiator 530, the temperature of the coolant obtained by the water temperature obtaining unit 110 is supposed to be gradually increased.

Conversely, the flow rate of the coolant supplied to the radiator 530 is not changed if the temperature adjusting valve 560 fails and the valve body 561 may not be operated. Therefore, the temperature of the coolant obtained by the water temperature obtaining unit 110 remains constant. Alternatively, the temperature of the coolant may be decreased by being continuously cooled by the radiator 530.

Therefore, a determination of whether or not the temperature of the coolant obtained by the water temperature obtaining unit 110 is increased is performed in S630 subsequent to S629.

Figure 65:
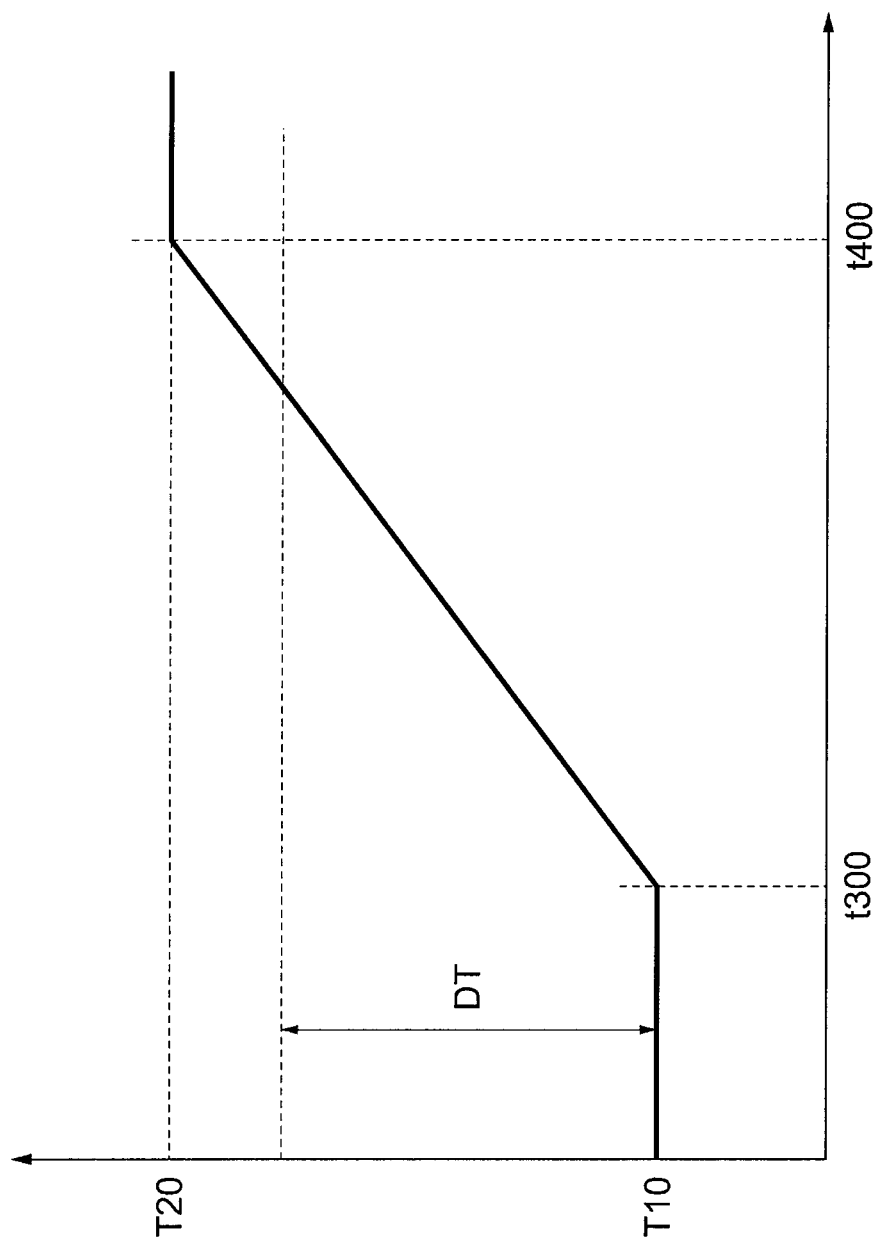
FIG. 65 is a diagram illustrating a change in the temperature of the coolant when a full closing command is provided.

An example of the determination will be described with reference to FIG. 65. FIG. 65 illustrates an example of a change in the temperature of the coolant when the process of S629 of FIG. 62 is performed in a period from a time point t300 until a time point t400. The temperature adjusting valve is placed into the second state after the time point t300, and the coolant is not supplied to the radiator 530. Therefore, the temperature of the coolant is gradually increased.

In the example of FIG. 65, the temperature of the coolant at the time point t300 is designated by T10, and the temperature of the coolant at the time point t400 is designated by T20. The temperature of the coolant is determined to be increased in the present embodiment in a case where an increase in the temperature during the period in which the process of S629 of FIG. 62 is performed exceeds a threshold DT as in the example of FIG. 65. Meanwhile, the temperature of the coolant is determined not to be increased in S630 in a case where an increase in the temperature during the period in which the process of S629 is performed is smaller than the threshold DT.

Figure 66:
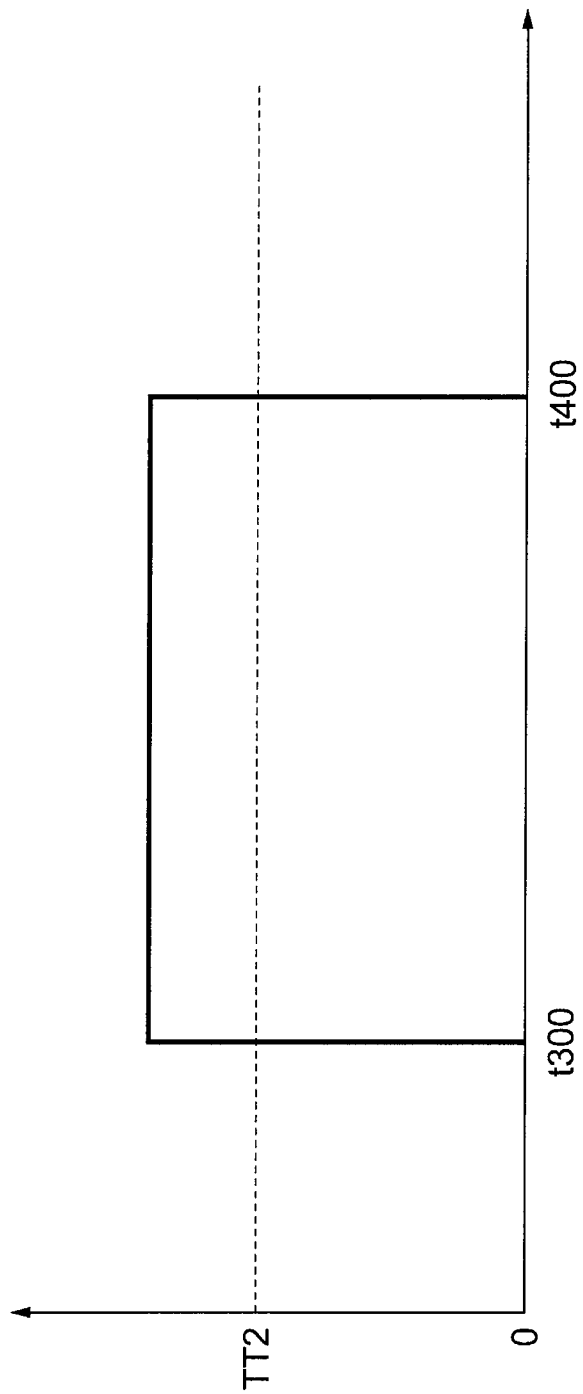
FIG. 66 is a diagram illustrating a change in the temperature of the coolant when a full closing command is provided.

Another example of the determination in S630 will be described with reference to FIG. 66. FIG. 66 illustrates a change in the temperature of the coolant when the process of S629 of FIG. 62 is performed in the period from the time point t300 until the time point t400. Specifically, a change in the difference between the temperature of the coolant at the current point in time and the temperature of the coolant one second before the point in time is illustrated. The vertical axis of a graph illustrated as such is also said to represent the speed of change in the temperature of the coolant.

In the example of FIG. 66, the temperature of the coolant is determined to be increased in a case where the value of the graph exceeds a predetermined threshold TT2 in the period from the time point t300 until the time point t400. Meanwhile, the temperature of the coolant is determined not to be increased in S630 in a case where the value of the graph does not exceed the threshold TT2 in the same period. As such, a determination of whether or not the temperature of the coolant is increased may be performed by comparing the speed of change in the temperature of the coolant and the predetermined threshold TT2.

FIG. 62 is referred to again for description. A transition is made to S628 in a case where the water temperature is determined not to be increased in S630, and the third malfunction flag is set to ON. A transition is made to S631 in a case where the water temperature is determined to be increased. As such, a malfunction of the temperature adjusting valve 560 is determined on the basis of a change in the temperature of the coolant after a control that stops supply of the coolant to the radiator 530 is performed in S629.

A final determination of a failure status of the temperature adjusting valve 560 is performed in S631 on the basis of each setting state of the first malfunction flag, the second malfunction flag, and the third malfunction flag. Specifically, a failure status of the temperature adjusting valve 560 is determined on the basis of a correspondence table illustrated in FIG. 67.

The temperature adjusting valve 560 is determined to be normal in a case where all of the first malfunction flag, the second malfunction flag, and the third malfunction flag are equal to OFF as in the first row designated by a reference sign L1. Meanwhile, some malfunction is determined to occur in the temperature adjusting valve 560 in a case where at least one of the first malfunction flag, the second malfunction flag, and the third malfunction is equal to ON.

It is determined that the valve body 561 of the temperature adjusting valve 560 may not be operated, in a case where only the first malfunction flag is equal to ON and all of the second malfunction flag and the third malfunction flag are equal to OFF as in the second row designated by a reference sign L2. Hereinafter, such a malfunction state will be referred to as "valve position malfunction" as well.

The valve position malfunction is determined to be present also in a case where the first malfunction flag and the second malfunction flag are equal to ON and the third malfunction flag is equal to OFF as in the third row designated by a reference sign L3.

The coolant is determined to leak due to, for example, a crack generated in the temperature adjusting valve 560 in a case where only the second malfunction flag is equal to ON and all of the first malfunction flag and the third malfunction flag are equal to OFF as in the fourth row designated by a reference sign L4. Hereinafter, such a malfunction state will be referred to as "valve leakage malfunction" as well.

Malfunctions that are different from the valve position malfunction and the valve leakage malfunction described heretofore are determined to occur in the temperature adjusting valve 560 in a case where all of the first malfunction flag and the second malfunction flag are equal to OFF and the third malfunction flag is equal to ON as in the fifth row designated by a reference sign L5. Hereinafter, such malfunction states will be collectively referred to as "valve functional malfunction" as well.

The valve functional malfunction and the valve position malfunction are determined to occur in combination in a case where only the second malfunction flag is equal to OFF and all of the first malfunction flag and the third malfunction flag are equal to ON as in the sixth row designated by a reference sign L6. The valve functional malfunction and the valve position malfunction are determined to occur in combination also in a case where all of the first malfunction flag, the second malfunction flag, and the third malfunction flag are equal to ON as in the seventh row designated by a reference sign L7.

The valve functional malfunction and the valve leakage malfunction are determined to occur in combination in a case where only the first malfunction flag is equal to OFF and all of the second malfunction flag and the third malfunction flag are equal to ON as in the eighth row designated by a reference sign L8.

As described heretofore, a malfunction of the temperature adjusting valve 560 is determined in the diagnostic device 100 according to the present embodiment on the basis of not only the water temperature deviation which is the difference between the temperature of the coolant and the target temperature but also the position deviation which is the difference between the valve body position and the target position. Influence of a malfunction of the temperature adjusting valve 560 appears in a shorter amount of time on the position deviation than the influence thereof does on the water temperature deviation. Thus, according to the diagnostic device 100, a malfunction occurring in the temperature adjusting valve 560 can be detected in a short amount of time.

A failure status (that is, the type of an occurring malfunction) of the temperature adjusting valve 560 is determined on the basis of a combination of the first malfunction flag which indicates that the water temperature deviation is not normal, the second malfunction flag which indicates that the position deviation is not normal, and the third malfunction flag which indicates that a malfunction occurs in the function of the temperature adjusting valve 560. As such, not only a malfunction occurring in the temperature adjusting valve 560 is simply determined but also the type of the malfunction can be determined.

Thirteenth Embodiment

A thirteenth embodiment of the present disclosure will be described. Only a method for setting a position threshold in the present embodiment is different from that in the twelfth embodiment. Other points are the same as the twelfth embodiment.

Figure 68:
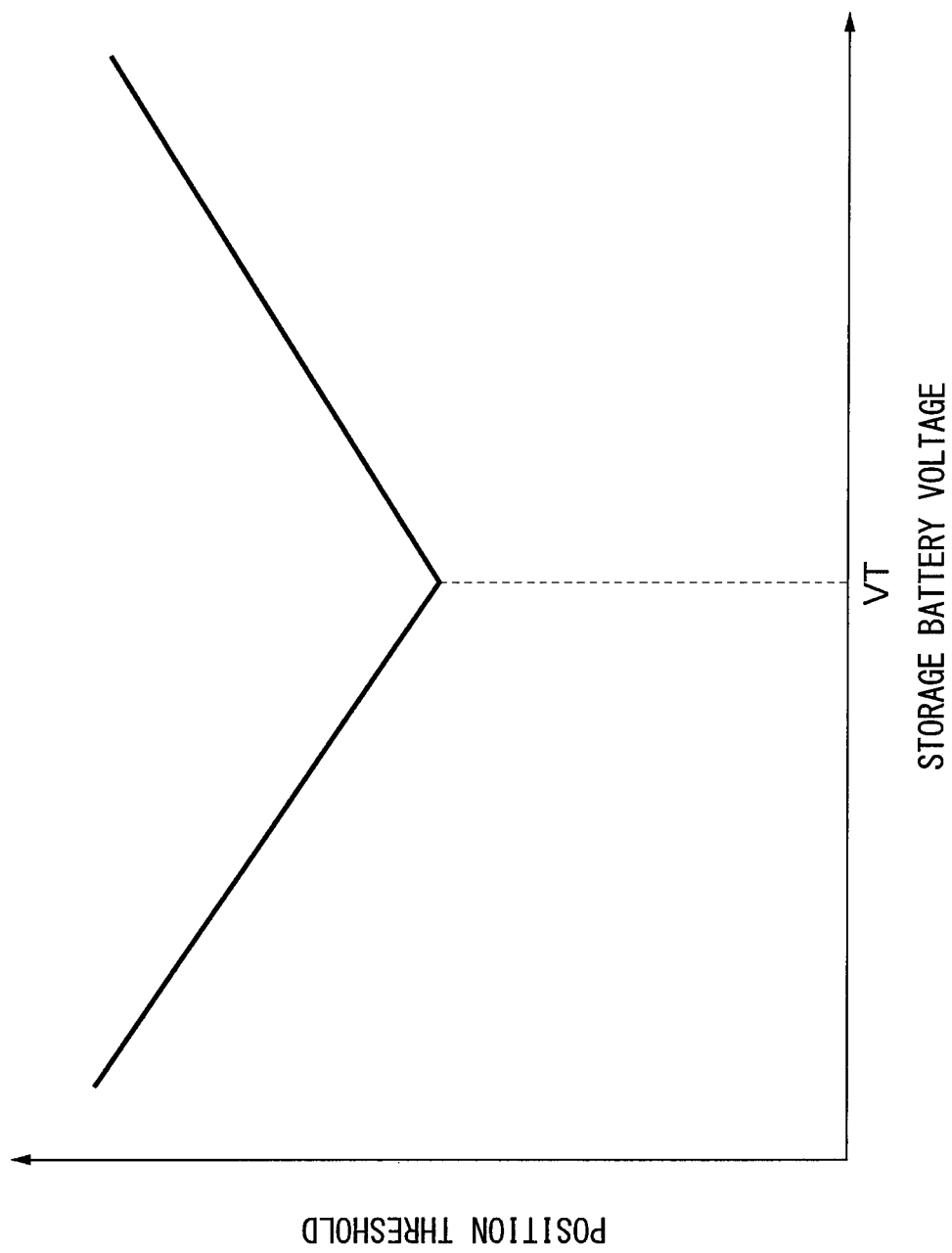
FIG. 68 is a diagram illustrating a relationship between the voltage of a storage battery and a position threshold that is set, in a diagnostic device according to a thirteenth embodiment of the present disclosure.

FIG. 68 illustrates a relationship between the storage battery voltage and the position threshold that is set according to the storage battery voltage. As illustrated in FIG. 68, the position threshold is changed to a smaller value as the storage battery voltage is increased in the present embodiment. However, when the storage battery voltage exceeds a predetermined voltage value VT, the position threshold is changed to a greater value as the storage battery voltage is increased.

The speed of operation of the valve body 561 is increased when the storage battery voltage is great. Thus, when the valve body position is changed, overshoot of the valve body position may occur. When such overshoot occurs, the position deviation is temporarily increased even though no malfunction occurs in the temperature adjusting valve 560, and the position deviation may be determined not to be normal.

Therefore, in a case of using the temperature adjusting valve 560 having a configuration in which overshoot occurs comparatively easily, it is desirable to set the position threshold as in FIG. 68 and prevent determining a malfunction to be present when the storage battery voltage is great.

Fourteenth Embodiment

A fourteenth embodiment of the present disclosure will be described. Only a method for setting a position threshold in the present embodiment is different from that in the twelfth embodiment. Other points are the same as the twelfth embodiment.

Figure 69:
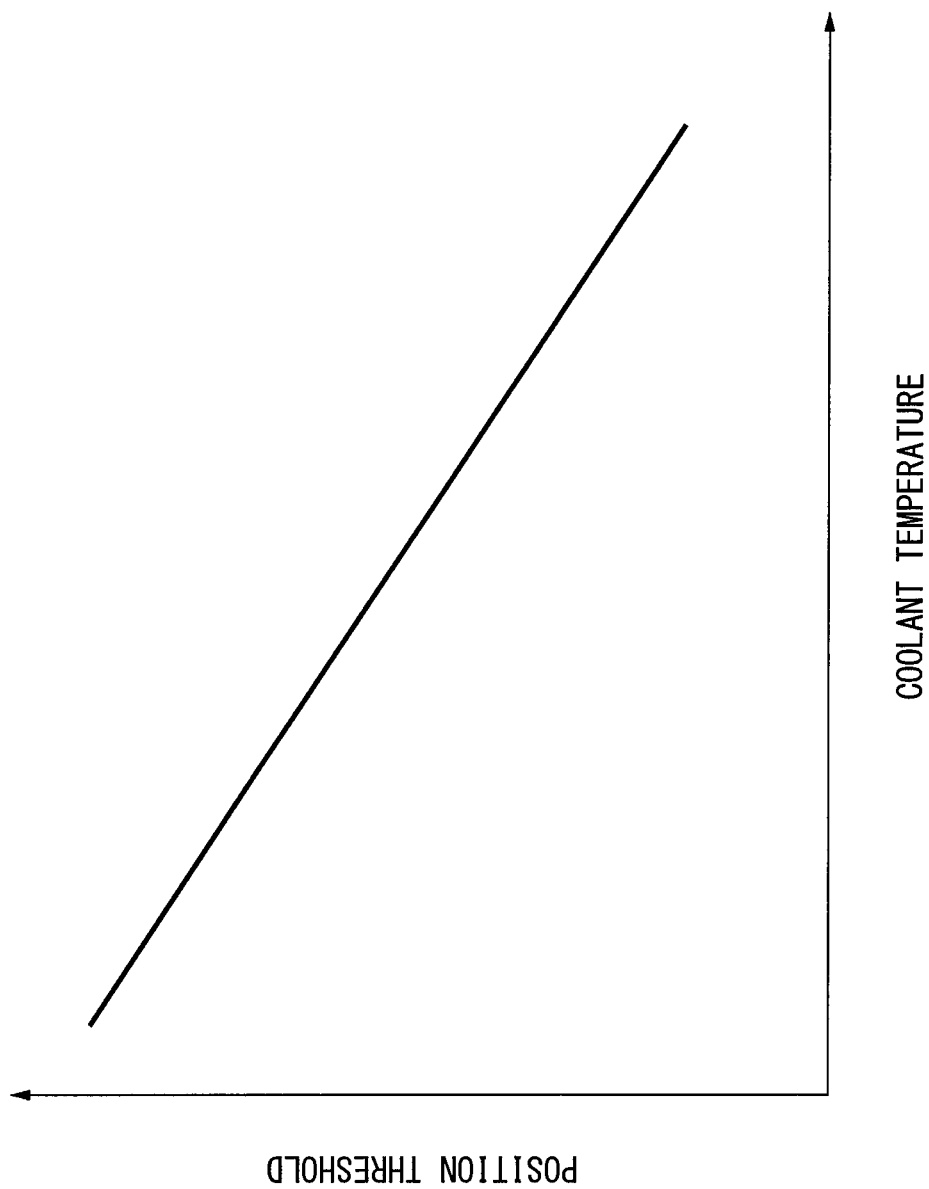
FIG. 69 is a diagram illustrating a relationship between the temperature of a coolant and a position threshold that is set, in a diagnostic device according to a fourteenth embodiment of the present disclosure.

FIG. 69 illustrates a relationship between the temperature of the coolant obtained by the water temperature obtaining unit 110 and the position threshold that is set according to the temperature of the coolant. As illustrated in FIG. 69, the position threshold is changed to a smaller value as the temperature of the coolant is increased. In other words, the position threshold is changed to a greater value as the temperature of the coolant is decreased.

The kinematic viscosity of the coolant is increased when the temperature of the coolant is low. Thus, the speed of response of the valve body 561 is likely to be decreased. As a result, the position deviation tends to be increased during operation of the temperature adjusting valve 560. Thus, the position deviation is temporarily increased even though no malfunction occurs in the temperature adjusting valve 560, and the position deviation may be determined not to be normal.

Therefore, if the position threshold is changed to a greater value as the temperature of the coolant is decreased as in FIG. 69, erroneously determining the position deviation not to be normal when the temperature of the coolant is decreased and the kinematic viscosity thereof is increased can be prevented.

Fifteenth Embodiment

A fifteenth embodiment of the present disclosure will be described. Only a method for setting a water temperature threshold in the present embodiment is different from that in the twelfth embodiment. Other points are the same as the twelfth embodiment.

When the heating device 650 is operated, the water temperature threshold is changed to be increased in the present embodiment from the water temperature threshold when the heating device 650 is not operated. In the example illustrated in FIG. 70, when operation of the heating device 650 is started at the time point t10, the water temperature threshold is changed from a value OT1 to a value OT2 that is greater than the value OT1.

The amount of heat that is captured when the coolant passes through the heater core 550 is increased when the heating device 650 is operated. Accordingly, the temperature of the coolant is comparatively not stable, and the water temperature deviation tends to be increased. Thus, the water temperature deviation is temporarily increased even though no malfunction occurs in the temperature adjusting valve 560, and the water temperature deviation may be determined not to be normal.

Figure 70:
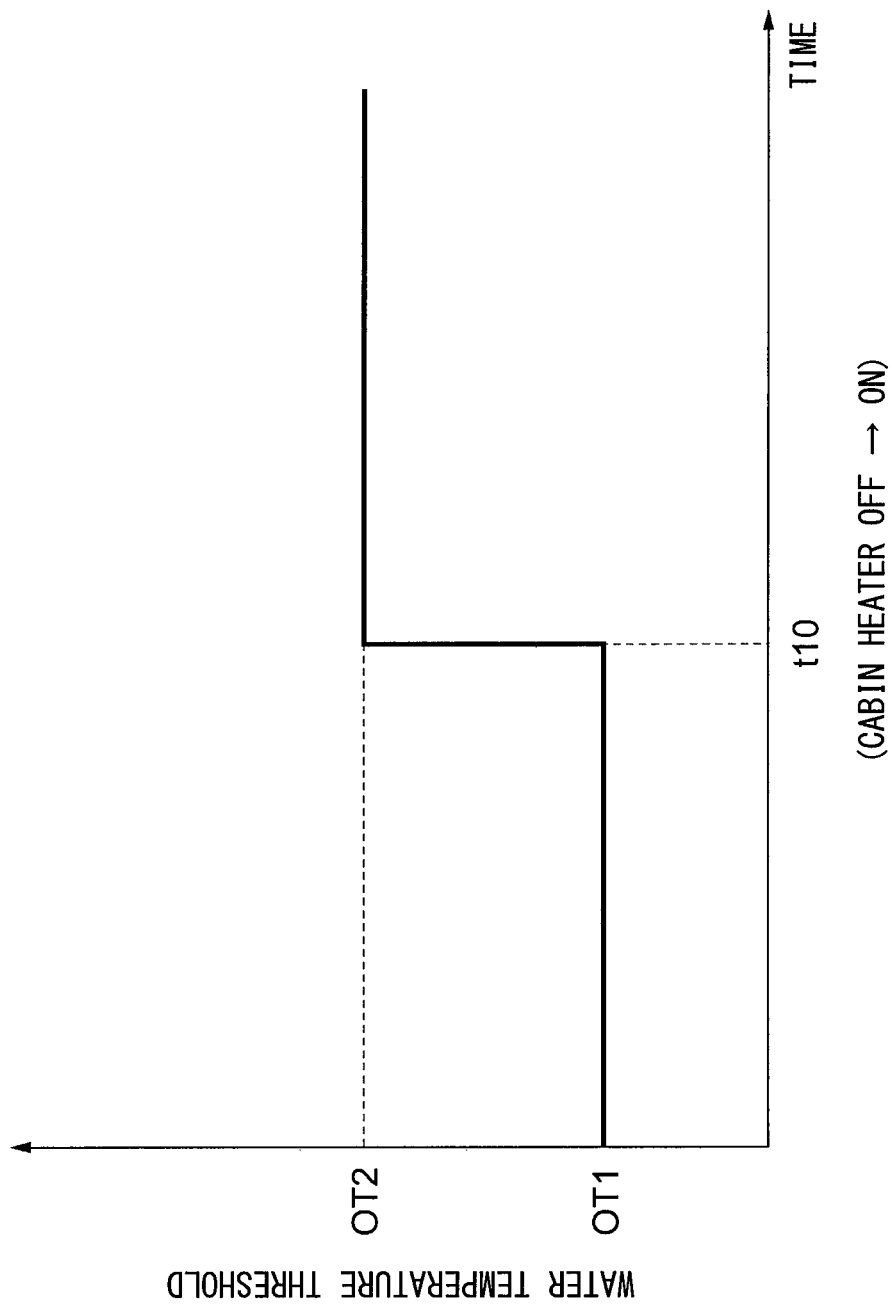
FIG. 70 is a diagram illustrating a relationship between the operational state of a heating device and a water temperature threshold that is set, in a diagnostic device according to a fifteenth embodiment of the present disclosure.

Therefore, if the water temperature threshold is changed to a greater value as illustrated in FIG. 70 when the heating device 650 is operated, erroneously determining the water temperature deviation not to be normal can be prevented.

Sixteenth Embodiment

A sixteenth embodiment of the present disclosure will be described. Only a method for setting a water temperature threshold in the present embodiment is different from that in the twelfth embodiment. Other points are the same as the twelfth embodiment.

Figure 71:
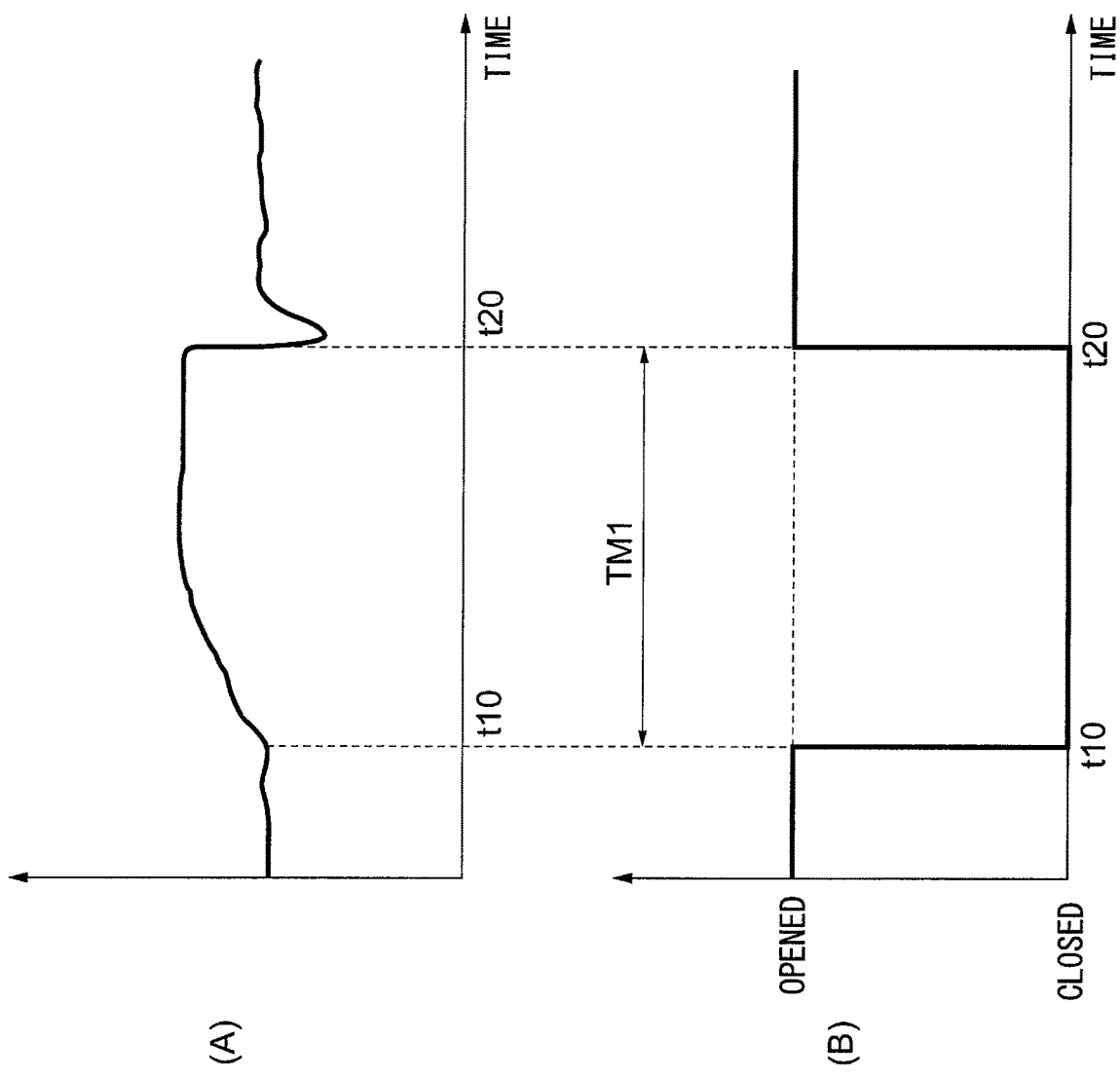
FIG. 71 is a diagram illustrating a change in the temperature of a coolant measured by a water temperature sensor when supply of the coolant to a radiator is started.

FIG. 71A illustrates a change in the temperature of the coolant obtained by the water temperature obtaining unit 110. FIG. 71B illustrates a change in the opening ratio of the flow channel from the temperature adjusting valve 560 toward the radiator 530. In the example illustrated in FIG. 71B, the third state is switched to the second state at the time point t10, and the second state is switched to the third state again at the time point t20 after the time point t10. That is, supply of the coolant to the radiator 530 is temporarily stopped during a period from the time point t10 until the time point t20.

In the period, the temperature of the coolant obtained by the water temperature obtaining unit 110 is gradually increased. However, since the coolant that stays in the radiator 530 is continuously cooled, the temperature thereof is decreased in the radiator 530.

The low temperature coolant that stays in the radiator 530 is supplied to the internal combustion engine 20 when the time point t20 arrives and the second state is switched to the third state. Thus, as illustrated in FIG. 71A, the temperature of the coolant obtained by the water temperature obtaining unit 110 is instantaneously decreased, and undershoot may occur. The magnitude of such undershoot tends to be increased as the period during which supply of the coolant to the radiator 530 is stopped, that is, a valve close period TM1 from the time point t10 until the time point t20, is lengthened.

The water temperature deviation is obviously increased when the magnitude of undershoot is increased. Thus, the water temperature deviation is temporarily increased even though no malfunction occurs in the temperature adjusting valve 560, and the water temperature deviation may be determined not to be normal.

Figure 72:
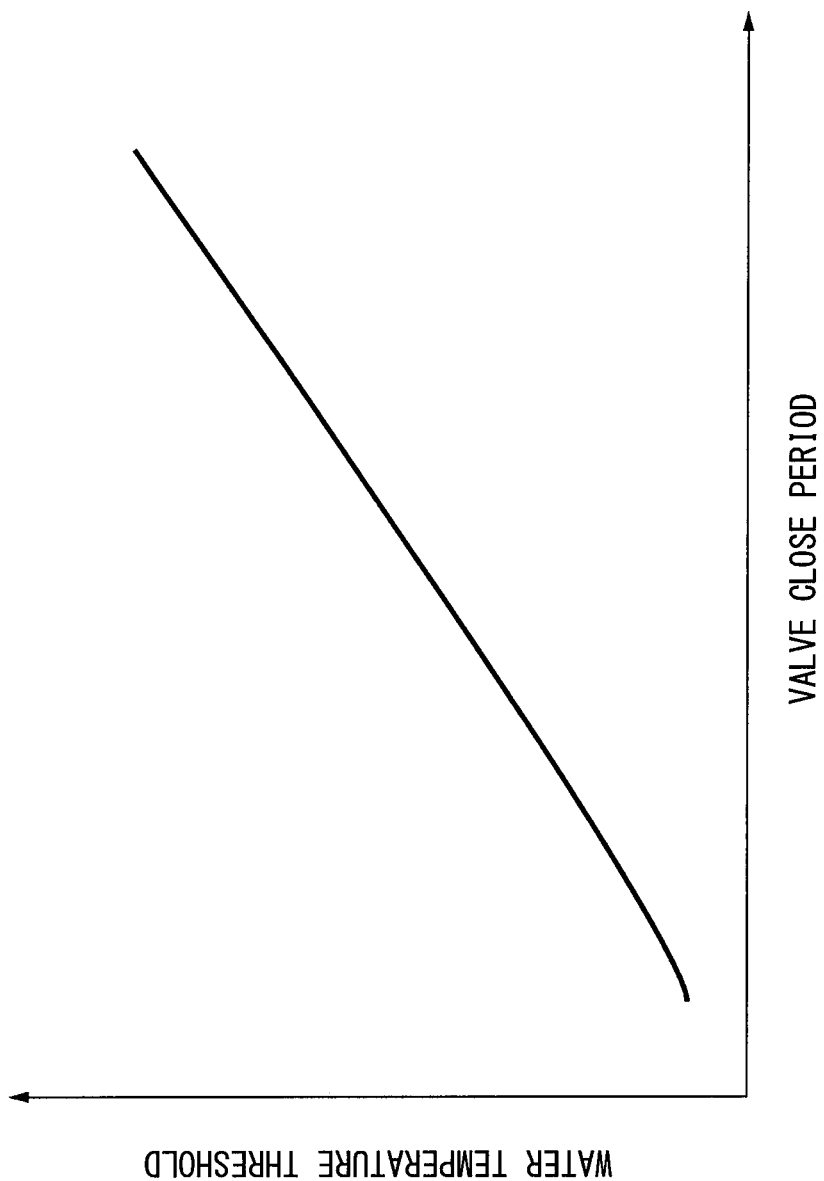
FIG. 72 is a diagram illustrating a relationship between a valve close period and a water temperature threshold that is set, in a diagnostic device according to a sixteenth embodiment of the present disclosure.

Therefore, the water temperature threshold is changed according to the length of the valve close period in the present embodiment. Specifically, as illustrated in FIG. 72, the water temperature threshold is changed to be increased as the valve close period is lengthened. Thus, when undershoot of the water temperature as in FIG. 71A occurs, erroneously determining the water temperature deviation not to be normal can be prevented.

An embodiment of the present disclosure is described heretofore with reference to specific examples. However, the present invention is not limited to the specific examples. That is, the specific examples after appropriately modified in design by those skilled in the art are to be included in the scope of the present invention, provided that the modified specific examples include the features of the present invention. For example, each element included in above each specific example and the arrangement, the material, the condition, the shape, and the size thereof are not limited to the illustrations and can be appropriately modified. Each element included in above each embodiment can be combined to the extent technically possible, and combined elements are to be included in the scope of the present invention provided that the combined elements include the features of the present invention.

What is claimed is:

1. A diagnostic device for a temperature adjusting valve that adjusts a temperature of a coolant supplied to an engine of a vehicle, the device comprising:
   a processing system, including a computer processor, the processing system being at least configured to:
      obtain the temperature of a discharge coolant which is the coolant discharged from the engine;
      diagnose the temperature adjusting valve by comparing the temperature of the discharge coolant and a threshold; and
      suspend a performed diagnosis of the temperature adjusting valve in a case where the temperature of the discharge coolant is estimated to be lower than the threshold according to an operating condition of the vehicle even though the temperature adjusting valve is normal;
      calculate a heat receiving amount of the coolant after completion of a warm-up of the engine; and
      calculate a heat radiating amount of the coolant after completion of the warm-up of the engine;
      wherein a performed diagnosis of the temperature adjusting valve is suspended in a case where the calculated heat radiating amount of the coolant after completion of the warm-up of the engine is greater than the calculated heat receiving amount of the coolant after completion of the warm-up of the engine.

2. The diagnostic device according to claim 1, wherein the processing system is further configured to:
   calculate the heat receiving amount of the coolant during a predetermined period after completion of the warm-up of the engine, and
   calculate the heat radiating amount of the coolant during the predetermined period.

3. The diagnostic device according to claim 2,
   wherein the processing system is further configured to:
      suspend a performed diagnosis in a case where the ratio of the length of time in which the calculated heat radiating amount is greater than the calculated heat receiving amount in the predetermined period to the time length of the predetermined period is greater than a predetermined value.

4. The diagnostic device according to claim 3, wherein the processing system is further configured to:
   release suspending performed by the processing system on the basis of an increase in the temperature of the discharge coolant.

5. The diagnostic device according to claim 4, wherein the processing system is further configured to:
   perform a suspending release promotion control which at least increases the heat receiving amount of the coolant or decreases the heat radiating amount of the coolant in a case where a performed diagnosis is suspended.

6. The diagnostic device according to claim 5,
   wherein the processing system is further configured to increase the heat receiving amount of the coolant by not permitting an idle stop operation that stops supply of fuel to the engine during a stoppage of the vehicle.

7. The diagnostic device according to claim 5,
   wherein the processing system is further configured to increase the heat receiving amount of the coolant by increasing the engine speed during a stoppage of the vehicle.

8. The diagnostic device according to claim 5,
   wherein the processing system is further configured to increase the heat receiving amount of the coolant by not performing a fuel cut-off operation that stops supply of fuel to the engine during traveling of the vehicle.

9. The diagnostic device according to claim 5, wherein the processing system is further configured to increase the heat receiving amount of the coolant by restraining driving of an electric motor that assists the engine by generating a torque during traveling of the vehicle.

10. The diagnostic device according to claim 5, wherein the processing system is further configured to increase the heat receiving amount of the coolant by retarding an ignition timing in the engine.

11. The diagnostic device according to claim 5, wherein the processing system is further configured to decrease the heat radiating amount of the coolant by restraining operation of a heating device that heats the inside of a vehicle interior of the vehicle using the coolant as a heat source.

12. The diagnostic device according to claim 5, wherein the processing system is further configured to:
diagnose the temperature adjusting valve in a case where a performed diagnosis is suspended,
wherein the temperature adjusting valve is diagnosed as having a malfunction in a case where the temperature of the discharge coolant is not increased even though the processing system performs the suspending release promotion control.

* * * * *

UNITED STATES PATENT AND TRADEMARK OFFICE
CERTIFICATE OF CORRECTION

PATENT NO. : 10,519,875 B2  
APPLICATION NO. : 15/220493  
DATED : December 31, 2019  
INVENTOR(S) : Nakanishi Page 1 of 1

It is certified that error appears in the above-identified patent and that said Letters Patent is hereby corrected as shown below:

On the Title Page

(30) Foreign Application Priority Data  
The last listed priority document should read:  
Sep. 15, 2015 (JP) .......................... 2015-181498

Signed and Sealed this  
Third Day of March, 2020

Andrei Iancu  
*Director of the United States Patent and Trademark Office*